US012516245B2

(12) United States Patent
Hirschmann et al.

(10) Patent No.: US 12,516,245 B2
(45) Date of Patent: Jan. 6, 2026

(54) LIQUID-CRYSTALLINE MEDIUM

(71) Applicant: MERCK PATENT GmbH, Darmstadt (DE)

(72) Inventors: Harald Hirschmann, Darmstadt (DE); Sabine Schoen, Darmstadt (DE); Philipp Wucher, Darmstadt (DE)

(73) Assignee: Merck Patent GmbH (DE)

( * ) Notice: Subject to any disclaimer, the term of this patent is extended or adjusted under 35 U.S.C. 154(b) by 0 days.

(21) Appl. No.: 18/854,775

(22) PCT Filed: Apr. 11, 2023

(86) PCT No.: PCT/EP2023/059377
§ 371 (c)(1),
(2) Date: Oct. 7, 2024

(87) PCT Pub. No.: WO2023/198673
PCT Pub. Date: Oct. 19, 2023

(65) Prior Publication Data

US 2025/0230360 A1 Jul. 17, 2025

(30) Foreign Application Priority Data

Apr. 12, 2022 (EP) .................................... 22167891

(51) Int. Cl.
*G02F 1/1333* (2006.01)
*C09K 19/30* (2006.01)
*C09K 19/34* (2006.01)

(52) U.S. Cl.
CPC ...... *C09K 19/3491* (2013.01); *C09K 19/3098* (2013.01); *C09K 19/3402* (2013.01); *C09K 2019/3422* (2013.01)

(58) Field of Classification Search
CPC ........................... C09K 19/34; C09K 19/3491; C09K 19/3098; C09K 19/3402; C09K 2019/3422; G02F 1/1333
See application file for complete search history.

(56) References Cited

U.S. PATENT DOCUMENTS

| | | | | |
|---|---|---|---|---|
| 5,993,691 | A | 11/1999 | Pausch et al. | |
| 6,146,720 | A | 11/2000 | Pausch et al. | |
| 11,359,142 | B2 * | 6/2022 | Manabe | C09K 19/3491 |
| 11,447,703 | B2 * | 9/2022 | Manabe | C09K 19/3098 |
| 12,104,109 | B2 * | 10/2024 | Huang | C09K 19/3497 |
| 2006/0066793 | A1 | 3/2006 | Ohmuro et al. | |
| 2013/0182202 | A1 | 7/2013 | Graziano et al. | |
| 2014/0138581 | A1 | 5/2014 | Archetti et al. | |
| 2015/0166890 | A1 | 6/2015 | Archetti et al. | |
| 2015/0252265 | A1 | 9/2015 | Archetti et al. | |
| 2020/0347301 | A1 | 11/2020 | Brocke et al. | |
| 2021/0139779 | A1 | 5/2021 | Manabe et al. | |
| 2023/0323207 | A1 * | 10/2023 | Manabe | C09K 19/3491 |
| 2024/0228877 | A1 * | 7/2024 | Han | C09K 19/3003 |
| 2025/0230360 | A1 * | 7/2025 | Hirschmann | C09K 19/3402 |

FOREIGN PATENT DOCUMENTS

| | | | |
|---|---|---|---|
| DE | 2209127 | A1 | 9/1973 |
| DE | 2240864 | A1 | 2/1974 |
| DE | 2338281 | A1 | 2/1974 |
| DE | 2321632 | A1 | 11/1974 |
| DE | 2450088 | A1 | 4/1976 |
| DE | 2637430 | A1 | 2/1978 |
| DE | 2853728 | A1 | 7/1980 |
| DE | 3022818 | A1 | 1/1982 |
| DE | 19528106 | A1 | 8/1996 |
| DE | 19509410 | A1 | 9/1996 |
| DE | 19528107 | A1 | 9/1996 |
| DE | 19528104 | A1 | 2/1997 |
| DE | 19824137 | A1 | 7/1999 |
| DE | 102010027099 | A1 | 1/2012 |
| EP | 0588568 | A2 | 3/1994 |
| EP | 0667555 | A1 | 8/1995 |
| EP | 0673986 | A2 | 9/1995 |
| EP | 3733816 | A1 | 11/2020 |
| GB | 1376115 | A | 12/1974 |
| GB | 1418441 | A | 12/1975 |
| GB | 1427390 | A | 3/1976 |
| JP | H07181439 | A | 7/1995 |
| WO | 9110936 | A1 | 7/1991 |
| WO | 9623851 | A1 | 8/1996 |
| WO | 9628521 | A1 | 9/1996 |
| WO | 2010099853 | A1 | 9/2010 |
| WO | 2020002401 | A1 | 1/2020 |

OTHER PUBLICATIONS

Jung et al., “Analysis of Optimal Phase Retardation of a Fringe Field-Driven Homogeneously Aligned Nematic Liquid Crystal Cell”, Japanese Journal of Applied Physics, vol. 43, No. 3, Mar. 2004, pp. 1028-1031. (5 pages).
Soref, “Field effects in nematic liquid crystals obtained with interdigital electrodes”, Journal of Applied Physics, vol. 45, No. 12, Aug. 1974, pp. 5466-5468. (4 pages).
International Search Report (PCT/ISA/210) and Written Opinion (PCT/ISA/237) mailed on Jul. 5, 2023, by the European Patent Office as the International Searching Authority for International Application No. PCT/EP2023/059377. (8 pages).

* cited by examiner

*Primary Examiner* — Geraldina Visconti
(74) *Attorney, Agent, or Firm* — Buchanan Ingersoll & Rooney PC

(57) ABSTRACT

Liquid-crystalline (LC) media having positive dielectric anisotropy and liquid-crystal displays (LCDs) containing these media, especially displays addressed by an active matrix and in particular energy efficient LC displays of the TN, PS-TN, STN, TN-TFT, OCB, IPS, PS-IPS, FFS, HB-FFS, XB-FFS, PS-FFS, SA-HB-FFS, SA-XB-FFS, polymer stabilised SA-HB-FFS, polymer stabilised SA-XB-FFS, positive VA or positive PS-VA type. The media have an improved long-term stability against UV radiation and elevated temperatures.

19 Claims, No Drawings

LIQUID-CRYSTALLINE MEDIUM

CROSS-REFERENCE TO RELATED APPLICATIONS

This application is a U.S. national stage application filed and claiming priority under 35 U.S.C. §§ 120 and 365(a) of International Application No. PCT/EP2023/059377, filed Apr. 11, 2023, and claiming priority under 35 U.S.C. § 119 of and to European Patent Application No. 22167891.5, filed Apr. 12, 2022, each of which applications is incorporated herein by reference in its entirety and for all purposes.

BACKGROUND OF THE INVENTION

The present invention relates to liquid-crystalline (LC) media having positive dielectric anisotropy and to liquid-crystal displays (LCDs) containing these media, especially to displays addressed by an active matrix and in particular to energy efficient LC displays of the TN, PS-TN, STN, TN-TFT, OCB, IPS, PS-IPS, FFS, HB-FFS, XB-FFS, PS-FFS, SA-HB-FFS, SA-XB-FFS, polymer stabilised SA-HB-FFS, polymer stabilised SA-XB-FFS, positive VA or positive PS-VA type. The media have an improved long-term stability against UV radiation and elevated temperatures.

Liquid-crystal displays (LCDs) are used in many areas for the display of information. LCDs are used both for direct-view displays and for projection-type displays. The electro-optical modes used are, for example, the twisted nematic (TN), super twisted nematic (STN), optically compensated bend (OCB) and electrically controlled birefringence (ECB) modes together with their various modifications, as well as others. All these modes utilise an electric field which generated substantially perpendicular to the substrates and the liquid-crystal layer.

Besides these modes, there are also electro-optical modes that utilise an electric field which is substantially parallel to the substrates or the liquid-crystal layer. For example, WO 91/10936 discloses a liquid-crystal display in which the electric signals are generated in such a way that the electric fields have a significant component parallel to the liquid-crystal layer, and which has since then become known as in-plane switching (IPS) display. The principles of operating such a display are described, for example, by R. A. Soref in Journal of Applied Physics, Vol. 45, No. 12, pp. 5466-5468 (1974).

IPS displays contain an LC layer between two substrates with planar orientation, where the two electrodes are arranged on only one of the two substrates and preferably have interdigitated, comb-shaped structures. On application of a voltage to the electrodes an electric field with a significant component parallel to the LC layer is generated between them. This causes realignment of the LC molecules in the layer plane.

EP 0 588 568, for example, discloses various possibilities for the design of the electrodes and for addressing an IPS display. DE 198 24 137 likewise describes various embodiments of such IPS displays.

Liquid-crystalline materials for IPS displays of this type are described, for example, in DE 195 28 104.

Furthermore, so-called "fringe-field switching" (FFS) displays have been reported (see, inter alia, S. H. Jung et al., Jpn. J. Appl. Phys., Volume 43, No. 3, 2004, 1028), which contain two electrodes on the same substrate, one of which is structured in a comb-shaped manner and the other is unstructured. A strong, so-called "fringe field" is thereby generated, i.e. a strong electric field close to the edge of the electrodes, and, throughout the cell, an electric field which has both a strong vertical component and also a strong horizontal component. FFS displays have a low viewing-angle dependence of the contrast. FFS displays usually contain an LC medium with positive dielectric anisotropy, and an alignment layer, usually of polyimide, which provides planar alignment to the molecules of the LC medium.

Liquid-crystal displays of the IPS and FFS electro-optical mode are in particular suitable for use in modern desktop monitors, TV sets and multimedia applications. The liquid-crystalline media according to the present invention are preferably used in displays of this type. In general, dielectrically positive liquid-crystalline media having rather lower values of the dielectric anisotropy are used in FFS displays, but in some cases liquid-crystalline media having a dielectric anisotropy of only about 3 or even less are also used in IPS displays.

A further improvement has been achieved by the HB-FFS mode. One of the unique features of the HB-FFS mode in contrast to the traditional FFS technology is that it enables higher transmittance which allows operation of the panel with less energy consumption.

Another recently developed mode is the XB-FFS mode, wherein the liquid-crystalline medium additionally contains a polar liquid crystal compound with low dielectric anisotropy.

Liquid-crystal compositions which are suitable for LCDs and especially for FFS and IPS displays are known in prior art, for example, from JP 07-181 439 (A), EP 0 667 555, EP 0 673 986, DE 195 09 410, DE 195 28 106 and DE 195 28 107. However, these compositions have certain disadvantages. Amongst other deficiencies, most of them result in disadvantageously long addressing times, have inadequate values of the resistivity and/or require excessively high operating voltages. Both an improvement in the operating properties and also in the shelf life are necessary here.

FFS and IPS displays can be operated as active-matrix displays (AMD) or passive-matrix displays (PMD). In the case of active-matrix displays individual pixels are usually addressed by integrated, non-linear active elements such as, for example, thin-film transistors (TFTs), while in the case of passive-matrix displays individual pixels are usually addressed by the multiplex method as known from the prior art.

The displays according to the present invention are preferably by an active matrix, preferably by a matrix of TFT. However, the liquid crystals according to the invention can also advantageously be used in displays having other known addressing means.

Typical applications of in-plane switching (IPS) and fringe field switching (FFS) technologies are monitors, notebooks, televisions, mobile telephones, tablet PCs, etc.

Both the IPS and the FFS technology have certain advantages over other LCD technologies, such as, for example, the vertical alignment (VA) technology, e.g. a broad viewing angle dependency of the contrast.

The provision of further liquid-crystalline media and the use thereof in a display having high transmission, a good black state and a high contrast ratio is a central challenge for modern FFS and IPS applications. In addition, modern applications also require good low-temperature stability and fast addressing times.

Matrix liquid crystal display (MFK) displays with full array LED backlighting, which have become increasingly common in recent years, include a large number of light-emitting diodes (LEDs) arranged directly behind the layer with the FK medium.

Modern high-performance InGaN LEDs sometimes reach operating temperatures of more than 70° C. and, depending on the design, can emit UV radiation as well as visible light. Direct contact between the LEDs and the FRP medium therefore places special demands on the UV stability and temperature resistance of the FRP medium. State-of-the-art MFK displays therefore do not meet today's requirements.

Recently, MFK displays have been increasingly used in outdoor applications such as PIDs (Public Information Displays) for displaying various types of information at train stations, roads, airports, hotels and shopping malls. Compared to conventional MFK displays, such as those used in TV applications, PIDs should have much higher long-term resistance to solar UV radiation and elevated temperatures, as well as a wider operating temperature range.

In case of FFS displays there is a need for further optimization of response time, contrast, brightness and reliability. However, it was found that the liquid-crystalline materials of the prior art do often not achieve all these requirements at the same time.

The prior art, for example WO 2010/099853 A1 and DE 10 2010 027 099 A1, discloses thiophene-containing LC media. WO 2010/099853 A1 teaches compounds containing a thiophene-2,5-diyl unit which is linked directly to a 2- and/or 6-substituted 1,4-phenylene unit. WO 2010/099853 A1 describes the development of novel materials for use in LC displays. This object was achieved by the provision of compounds of the general formula

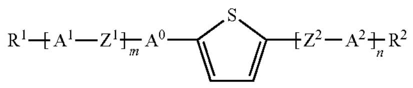

where inter alia $A^0$ denotes a 2,6-difluoro-1,4-phenylene unit, $A^1$ and $A^2$, besides other meanings, denote a 1,4-phenylene or 1,4-cyclohexylene unit, and $Z^1$ and $Z^2$ denote a bridging element or a single bond.

Specific examples described are, for example, the following compounds (see WO 2010/099853 A1):

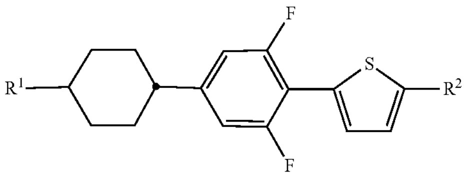

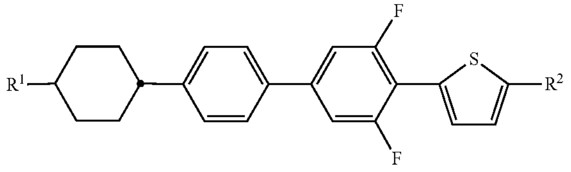

For many practical applications in liquid-crystal displays, the known liquid-crystalline media comprising thiophene compounds are not sufficiently stable. In particular, exposure to UV radiation, but also even irradiation with the usual backlighting, results in an impairment, in particular of the electrical properties. Thus, for example, the conductivity increases significantly.

DE 10 2010 027 099 A1 describes LC media which comprise the compounds disclosed in WO 2010/099853 A1 and bithienyl derivatives of the formula

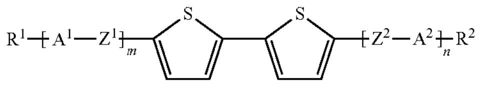

as stabiliser. These bithienyl derivatives are preferably employed in combination with thiophene 1,1-dioxide derivatives of the formula

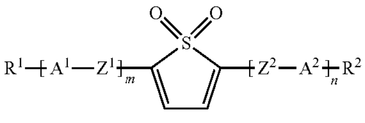

In both the above formulae, $A^1$ and $A^2$ may denote 1,4-phenylene or 1,4-cyclohexylene and $Z^1$ and $Z^2$ denote a single bond. Specific examples described are the following compounds (see DE 10 2010 027 099 A1):

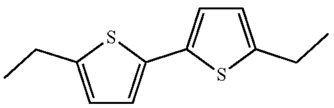

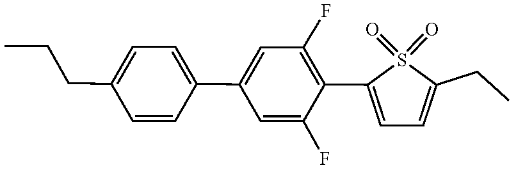

SUMMARY OF THE INVENTION

The present invention has the object of providing liquid-crystalline media, in particular for FFS and IPS displays, but also for TN, positive VA or STN displays, and in particular for active-matrix displays like those addressed by TFTs, which do not exhibit the disadvantages indicated above or only do so to a lesser extent and preferably have high specific resistance, low threshold voltage, high dielectric anisotropy, a good low temperature stability (LTS), fast response times and low rotational viscosities, an excellent long term stability against UV radiation and increased operating temperatures and enable high brightness.

This was achieved by providing liquid-crystalline media as described and claimed hereinafter.

It has now been surprisingly found that liquid-crystalline media according to the present invention which contain a combination of one or more compounds of Formula I and at least one compound of Formula ST show several improvements, especially when being used in FFS mode displays, like a good solubility and a low ratio of γ1/k11, and enable fast response times.

The liquid-crystal media according to the present invention are especially suitable for use in liquid-crystal displays of the FFS, HB-FFS, XB-FFS and IPS mode based on dielectrically positive liquid crystals, and polymer stabilised variants thereof. The subject matter of the present invention is a liquid-crystalline medium, characterised in that it comprises one or more compounds of Formula I

I

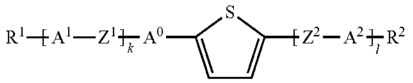

in which the individual substituents have the following meanings:

$R^1$ and $R^2$ each, independently of one another, a H atom, an alkyl or an alkoxy group having 1 to 12 C atoms or an alkenyl or an alkenyloxy group having 2 or 12 C atoms in which one or more non-adjacent $CH_2$ groups are optionally substituted by —C≡C—, —$CF_2$O—, —$OCF_2$—, —CH=CH—,

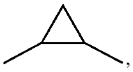, 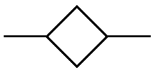, 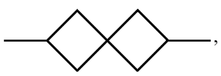, 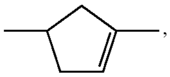, 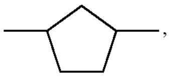,

—O—, —CO—O— or —O—CO— in such a way that 0 atoms are not linked directly to one another, and in which one or more H atoms may be replaced by a halogen atom or a cycloalkyl or a cycloalkoxy group having 3 to 12 C atoms, in which one or more H atoms may be replaced by a halogen atom, $A^0$, $A^1$, $A^2$ each, independently of one another, denote phenylene-1,4-diyl, in which, in addition, one or two CH groups may be replaced by N and one or more H atoms may be replaced by halogen, CN, $CH_3$, $CHF_2$, $CH_2F$, $CF_3$, $OCH_3$, $OCHF_2$ or $OCF_3$, cyclohexane-1,4-diyl, in which, in addition, one or two non-adjacent $CH_2$ groups may be replaced, independently of one another, by O and/or S and one or more H atoms may be replaced by F, cyclohexene-1,4-diyl, bicyclo-[1.1.1]pentane-1,3-diyl, bicyclo[2.2.2]octane-1,4-diyl, spiro[3.3]-heptane-2,6-diyl, tetrahydropyran-2,5-diyl or 1,3-dioxane-2,5-diyl, $Z^1$ and $Z^2$ each, independently of one another, denote —$CF_2$O—, —$OCF_2$—, —$CH_2$O—, —$OCH_2$—, —CO—O—, —O—CO—, —$C_2H_4$—, —$C_2F_4$—, —$CF_2CH_2$—, —$CH_2CF_2$—, —CFHCFH—, —$CFHCH_2$—, —$CH_2$CFH—, —$CF_2$CFH—, —$CFHCF_2$—, —CH=CH—, —CF=CH—, —CH=CF—, —CF=CF—, —C≡C— or a single bond, k and l each, independently of one another, denote 0, 1, 2 or 3.

In addition, the LC medium of the present invention comprises one or more compounds of the following Formula ST:

ST

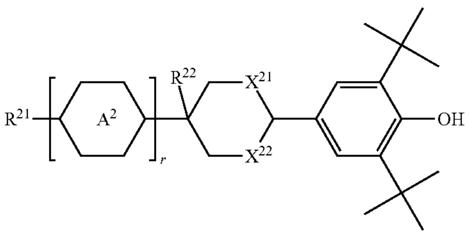

in which the individual substituents have the following meanings:

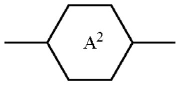 denotes 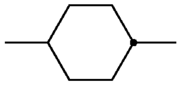, 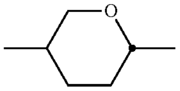 or 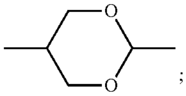;

$X^{21}$, $X^{22}$ each, independently of one another, —O—, —$CH_2$—, —$CHR^{23}$— or —N—$R^{23}$.

$R^{21}$ and $R^{22}$ each, independently of one another, a H atom or an alkyl- or alkoxy group having 1 to 12 C atoms, an alkenyl, alkynyl, alkenyloxy or alkoxyalkyl group having 2 to 12 C atoms or a cycloalkyl group having 3 to 12 C atoms, in which one or more non-adjacent $CH_2$ groups are optionally substituted by —C≡C—, —$CF_2$O—, —$OCF_2$—, —CH=CH—,

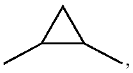, 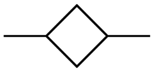, 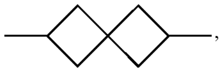, 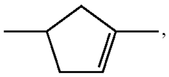, 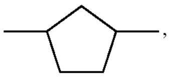,

—O—, —CO—O— or —O—CO— in such a way that O atoms are not linked directly to one another, and in which one or more H atoms may be replaced by a halogen atom or a cycloalkyl or a cycloalkoxy group having 3 to 12 C atoms, in which one or more H atoms may be replaced by a halogen atom, $R^{23}$ denotes a H atom, an alkyl or alkoxy group having 1 to 10 C atoms, r denotes 0 or 1.

The invention further relates to the use of a liquid-crystalline medium as described above and below for electro-optical purposes, in particular for the use in liquid-crystal displays, shutter glasses, LC windows, 3D applications, preferably in TN, PS-TN, STN, TN-TFT, OCB, IPS, PS-IPS, FFS, HB-FFS, XB-FFS, PS-HB-FFS, PS-XB-FFS, SA-HB-FFS, SA-XB-FFS, polymer stabilised SA-HB-FFS, polymer stabilised SA-XB-FFS, positive VA and positive PS-VA displays, very preferably in FFS, HB-FFS, IPS, PS-HB-FFS and PS-IPS displays.

The invention further relates to an electro-optical liquid-crystal display containing a liquid-crystalline medium as described above and below, in particular a TN, PS-TN, STN, TN-TFT, OCB, IPS, PS-IPS, FFS, HB-FFS, XB-FFS, PS-HB-FFS, PS-XB-FFS, SA-HB-FFS, SA-XB-FFS, polymer stabilised SA-HB-FFS, polymer stabilised SA-XB-FFS, positive VA or positive PS-VA display, preferably a FFS, HB-FFS, IPS, PS-HB-FFS or PS-IPS display.

In the present application, all atoms also include their isotopes. In some embodiments of the present invention one or more hydrogen atoms (H) may be replaced by deuterium (D); a high degree of deuteration enables or simplifies analytical determination of compounds, in particular in the case of low concentrations.

In the formulae above and below, if $R^0$, $R^1$, $R^{21}$, $R^{22}$ or $R^2$ denotes an alkyl radical and/or an alkoxy radical, this may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy. $R^0$ preferably denotes straight-chain alkyl having 2 to 6 C atoms.

Oxaalkyl preferably denotes straight-chain 2-oxapropyl (=methoxymethyl), 2- (=ethoxymethyl) or 3-oxabutyl (=2-methoxyethyl), 2-, 3- or 4-oxapentyl, 2-, 3-, 4- or 5-oxahexyl, 2-, 3, 4-, 5- or 6-oxaheptyl, 2-, 3, 4-, 5-, 6- or 7-oxaoctyl, 2-, 3-, 4-, 5-, 6-, 7- or 8-oxanonyl, 2-, 3, 4-, 5-, 6-, 7-, 8- or 9-oxadecyl.

If $R^0$, $R^1$, $R^{21}$, $R^{22}$ or $R^2$ denotes an alkoxy or oxaalkyl group it may also contain one or more additional oxygen atoms, provided that oxygen atoms are not linked directly to one another.

In another preferred embodiment, one or more of $R^0$, $R^1$ and $R^2$ are selected from the group consisting of

, 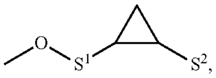, 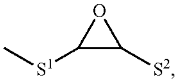, 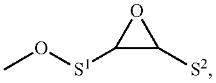, 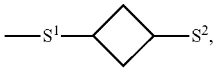, 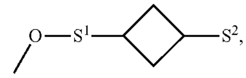, 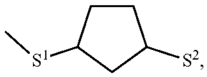, 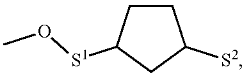, $-S^1-F$, $-O-S^1-F$, $-O-S^1-O-S^2$, wherein $S^1$ is $C_{1-12}$-alkylene or $C_{2-12}$-alkenylene and $S^2$ is H, $C_{1-12}$-alkyl or $C_{2-12}$-alkenyl, and very preferably one or more of $R^0$, $R^1$ and $R^2$ are selected from the group consisting of

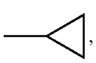, 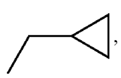, 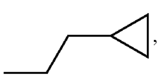, 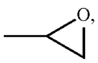, 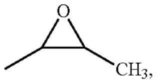, 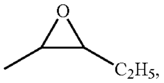, 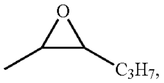, 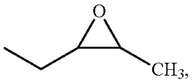, 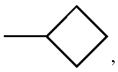, 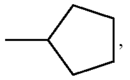, 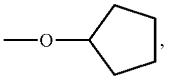, 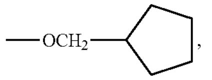, 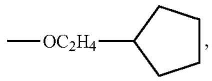, $-OCH_2OCH_3$, $-O(CH_2)_2OCH_3$, $-O(CH_2)_3OCH_3$, $-O(CH_2)_4OCH_3$, $-O(CH_2)_2F$, $-O(CH_2)_3F$, $-O(CH_2)_4F$.

If $R^0$, $R^1$, $R^{21}$, $R^{22}$ or $R^2$ denotes an alkyl radical in which one $CH_2$ group has been replaced by $-CH{=}CH-$, this may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl.

If $R^0$, $R^1$, $R^{21}$, $R^{22}$ or $R^2$ denotes an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of mono-substitution, the fluorine or chlorine substituent may be in any desired position, but is preferably in the (ω-position.

In the formulae above and below, $X^0$ is preferably F, Cl or a mono- or polyfluorinated alkyl or alkoxy radical having 1, 2 or 3 C atoms or a mono- or polyfluorinated alkenyl radical having 2 or 3 C atoms. $X^0$ is particularly preferably F, Cl, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$, $OCH{=}CF_2$ or $CH{=}CF_2$, very particularly preferably F or $OCF_3$, furthermore $CF_3$, $OCF{=}CF_2$, $OCHF_2$ or $OCH{=}CF_2$.

In the LC media according to the present invention the use of compounds of Formula I together with compounds of formulae Z1 to Z3 or their sub-formulae enables to achieve an increased value of $\varepsilon_{\perp}$ and at the same time a decrease of the rotational viscosity and the ratios of $\gamma_1/k_{22}$ and $\gamma_1/k_{11}$, and thus fast response times.

DETAILED DESCRIPTION OF THE INVENTION

Compounds of Formula I

Preference is given to LC media comprising the compounds of Formula I in which $A^0$ denotes phenylene-1,4-diyl, in which, in addition, one or two CH groups may be replaced by N and one or more H atoms may be replaced by halogen, CN, $CH_3$, $CHF_2$, $CH_2F$, $OCH_3$, $OCHF_2$, $CF_3$ or $OCF_3$. Particularly preferred are compounds in which $A^0$ denotes

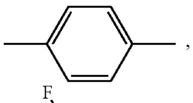, 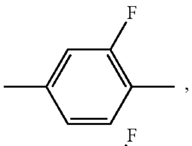, 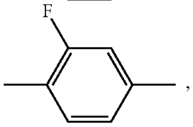, 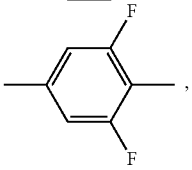, 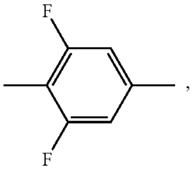, 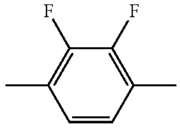 or 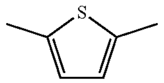.

and very particularly preferably in which $A^0$ denotes denotes 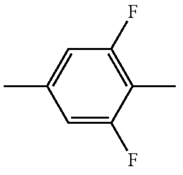 .

The preferred compounds of the Formula I result in media having a particularly high clearing point, low rotational viscosity, a broad nematic phase, high birefringence and an excellent long-term thermal and UV stability.

Preference is furthermore given to compounds of the Formula I in which m and n denote 0, 1 or 2, particularly preferably 0 or 1. Particular preference is given to compounds of the Formula I in which n denotes 0, i.e. the thiophene ring is a terminal ring. Preference is furthermore given to compounds of the Formula I in which m denotes 0, 1 or 2, preferably 1 or 2 and very particularly preferably 1.

$A^1$ and $A^2$ in Formula I particularly preferably denote phenylene-1,4-diyl, which may also be mono- or polysubstituted by F, furthermore cyclohexane-1,4-diyl, cyclohexenylene-1,4-diyl, tetrahydropyran-2,5-diyl or 1,3-dioxane-2,5-diyl.

$Z^1$ and $Z^2$ in Formula I particularly preferably denote $—CF_2O—$, $—OCF_2—$ or a single bond, wherein a single bond is particularly preferred.

$A^1$ and $A^2$ in Formula I particularly preferably denote

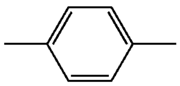 , 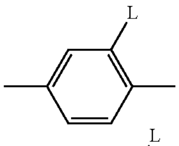 ,

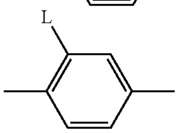 or 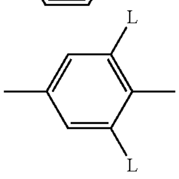 , preferably unsubstituted 1,4-phenylene, in which L denotes halogen, $CF_3$ or CN, preferably F.

Preference is furthermore given to compounds of the Formula I in which $R^1$ and $R^2$ each, independently of one another, denote H, F, Cl, Br, —CN, —SCN, —NCS, $SF_5$, halogen, or alkyl, alkenyl or alkynyl having 1 to 8, preferably 1 to 5, C atoms, each of which is optionally substituted by halogen, in particular by F.

Particularly preferred radicals $R^1$ and $R^2$ in Formula I denote H, halogen, or alkyl, alkenyl, alkynyl or alkoxy having 1 to 12, preferably 1 to 8, C atoms, each of which is optionally substituted by halogen, in particular by F, particularly preferred are H, F, alkyl, alkenyl or alkynyl having 1 to 8 C atoms. Preferably, at least one radical is not H, particularly preferably both radicals $R^1$ and $R^2$ are not H. $R^1$ is very particularly preferably equal to alkyl. $R^2$ is furthermore preferably H, alkyl or fluorine. Very particularly preferably, $R^1$ is alkyl and $R^2$ is H or alkyl. $R^1$, $R^2$ each, independently of one another, very particularly preferably denote unbranched alkyl having 1 to 5 C atoms. If $R^1$ and $R^2$ denote substituted alkyl, alkoxy, alkenyl or alkynyl, the total number of C atoms in the two groups $R^1$ and $R^2$ is preferably less than 10.

Preferred alkyl groups are, for example, methyl, ethyl, n-propyl, n-butyl, n-pentyl, n-hexyl, n-heptyl and n-octyl.

Preferred alkenyl groups are, for example, ethenyl, propenyl, butenyl and pentenyl.

Preferred alkynyl groups are, for example, ethynyl, propynyl, butynyl, pentynyl, hexynyl, heptynyl and octynyl.

Preferred alkoxy groups are, for example, methoxy, ethoxy, n-propoxy, n-butoxy, n-pentoxy, n-hexoxy, n-heptoxy, n-octoxy.

Halogen preferably denotes F or Cl.

Particularly preferred compounds of the Formula I are those selected from the following sub-formulae:

I-1-1

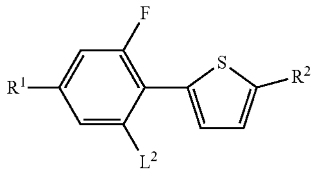

I-1-2

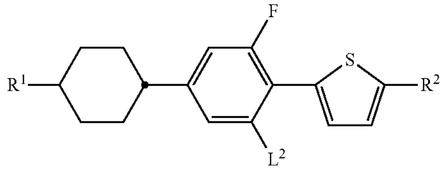

I-1-3

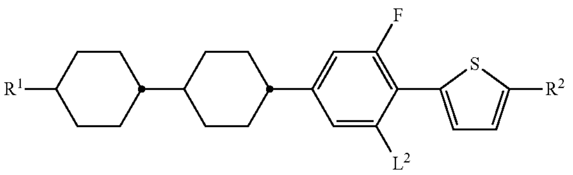

I-1-4

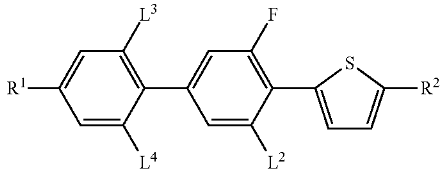

I-1-4-1

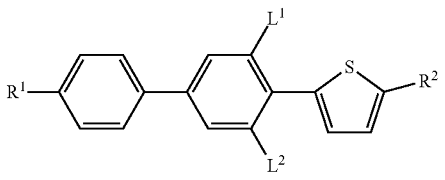

I-1-5

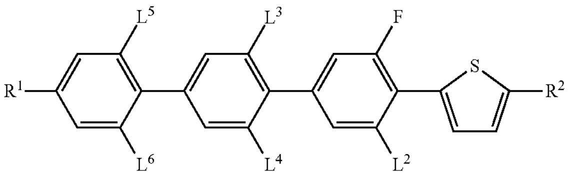

-continued

I-1-6

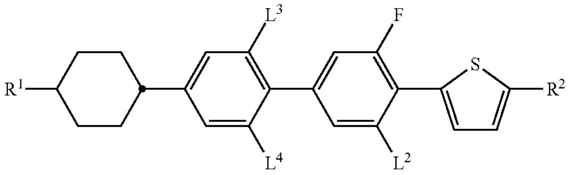

in which $R^1$ and $R^2$ have the meanings indicated in Formula I, and $L^1$ to $L^6$ independently denote H or F. $R^1$ and $R^2$ therein preferably denote optionally fluorinated alkyl or alkoxy having 1 to 12 C atoms, optionally fluorinated alkenyl or alkynyl having 2 to 12 C atoms, optionally fluorinated cycloalkyl having 3 to 12 C atoms.

Particularly preferred are optionally fluorinated alkyl, alkenyl or alkynyl having 1 to 5 C atoms. $L^2$ in the Formulae I-1-1 to I-1-6 preferably denotes F. In the Formulae I-1-4 to I-1-6, $L^3$ and $L^4$ preferably denote H. In the Formulae I-1-4 to I-1-6 $L^3$ and $L^4$ preferably denote F.

In a particularly preferred embodiment the compounds of Formula I are selected from the following structures:

I-1-1

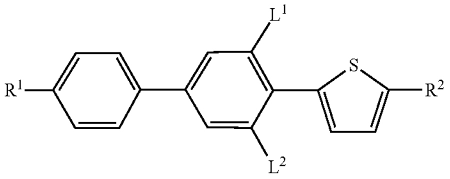

where $R^1$ has the same meaning as in the general Formula I, $L^1$ and $L^2$ independently denote H or F and $R^2$ denotes a straight-chain or branched alkyl or alkoxy group having 1 to 7 C atoms, or an alkenyl, alkenyloxy, alkoxyalkyl group having 1 to 7 C atoms, or a cycloalkyl or a cycloalkoxy group having 3 to 12 C atoms, in which one or more non-adjacent $CH_2$ groups are optionally substituted by —C≡C—, —$CF_2$O—, —O$CF_2$—, —CH═CH—,

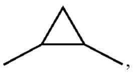, 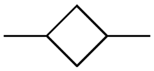, 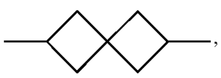, 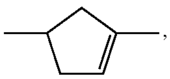, 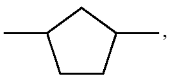,

—O—, —CO—O— or —O—CO— in such a way that O atoms are not linked directly to one another, and in which one or more H atoms may be replaced by a halogen atom, in which one or more H atoms may be replaced by a halogen atom.

LC media according to the invention having a particularly high long-term stability against UV radiation and elevated temperatures and a low rotational viscosity are obtainable with the following compounds of the general Formula I:

I-2-1

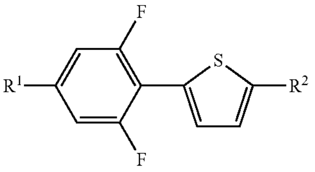

I-2-2

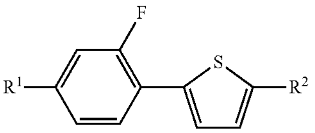

I-2-3

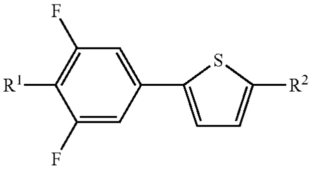

I-2-4

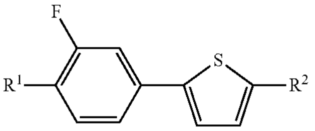

I-2-5

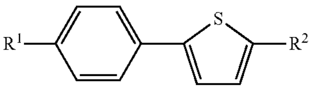

I-2-6

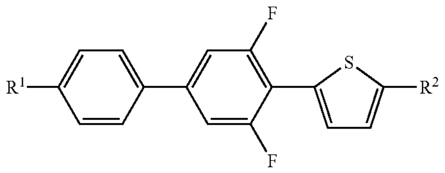

I-2-7

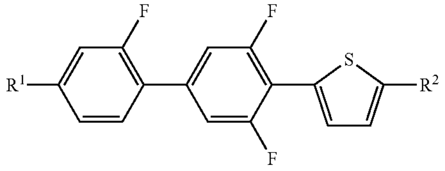

I-2-8

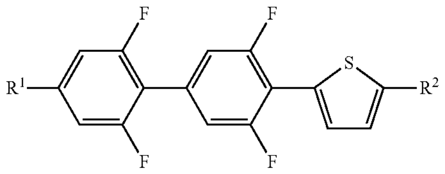

I-2-9

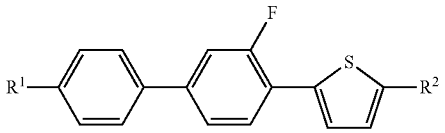

I-2-10

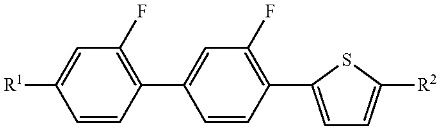

-continued
I-2-11
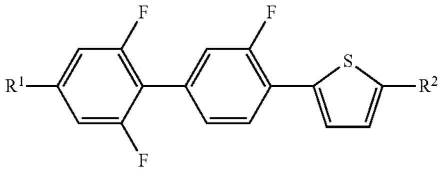
I-2-12
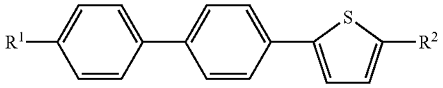
I-2-13
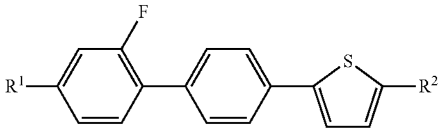
I-2-14
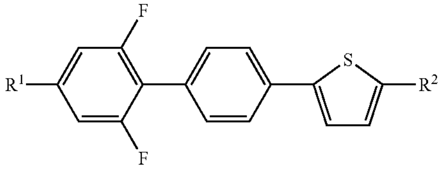
I-2-15
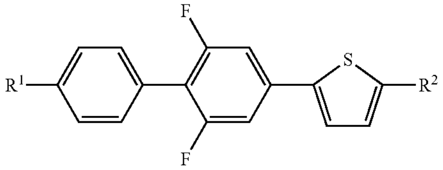
I-2-16
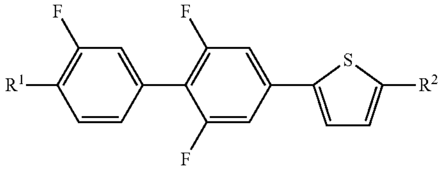
I-2-17
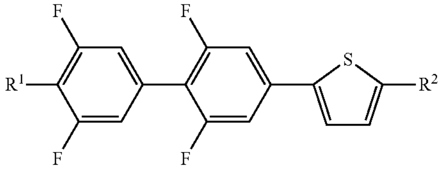
I-2-18
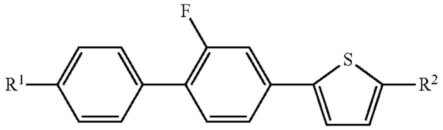
I-2-19
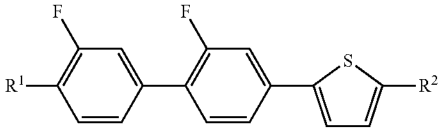
I-2-20
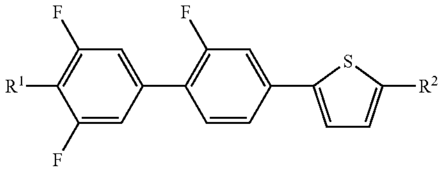
-continued
I-2-21
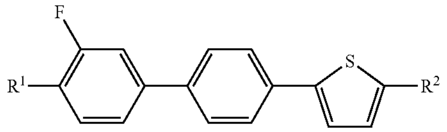
I-2-22
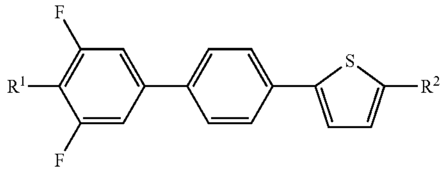
I-2-23
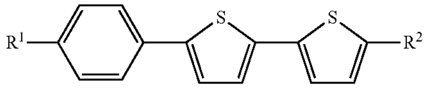
I-2-24
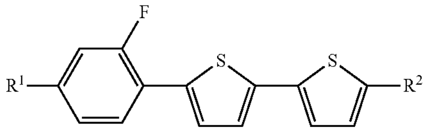
I-2-25
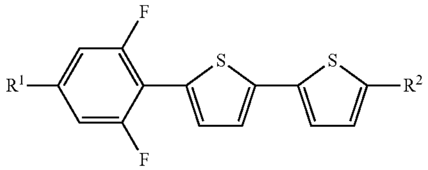
I-2-26
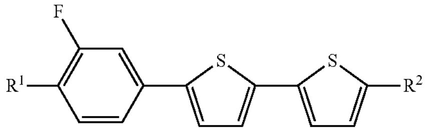
I-2-27
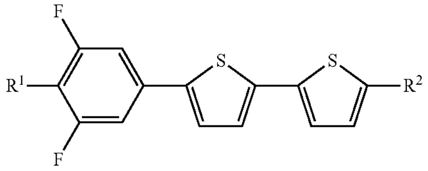
I-2-28
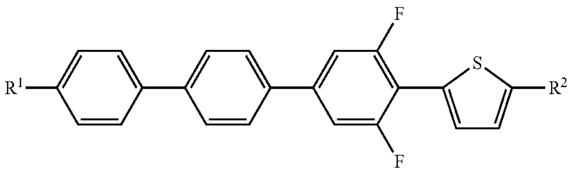
I-2-29
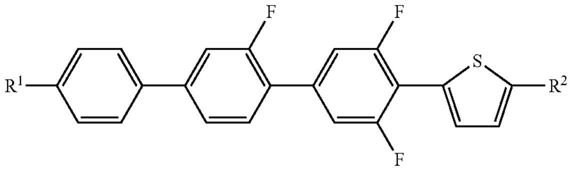
I-2-30
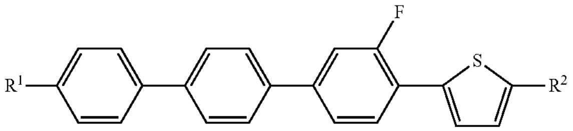

-continued
I-2-31
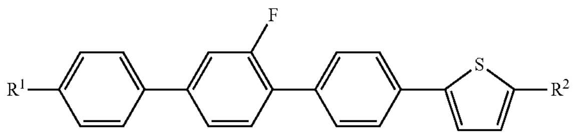
I-2-32
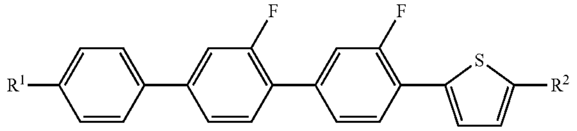
I-2-33
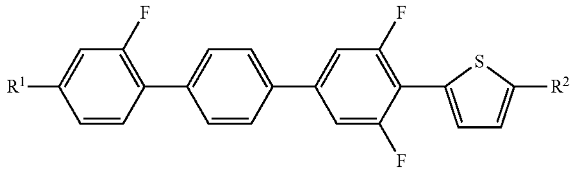
I-2-34
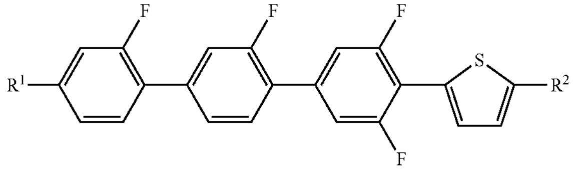
I-2-35
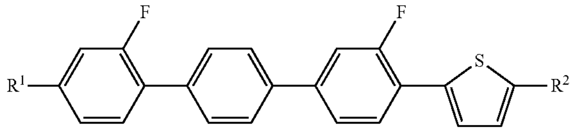
I-2-36
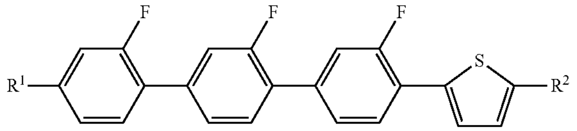
I-2-37
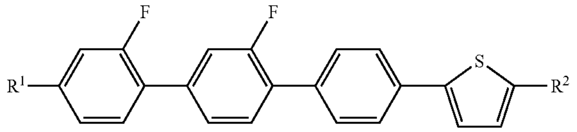
I-2-38
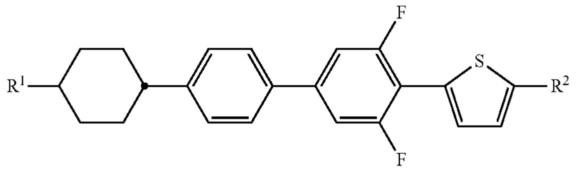
I-2-39
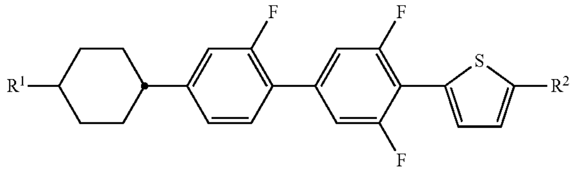
-continued
I-2-40
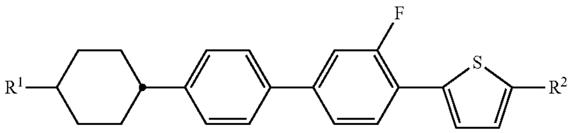
I-2-41
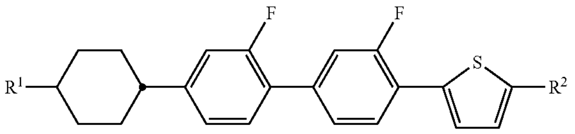
I-2-42
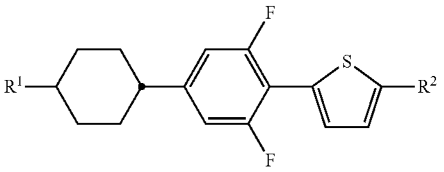
I-2-43
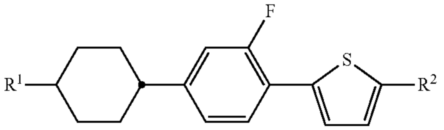
I-2-44
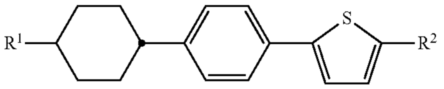
I-2-45
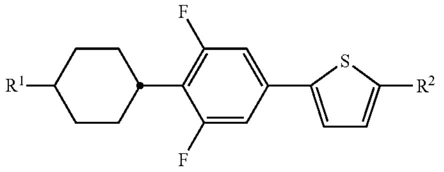
I-2-46
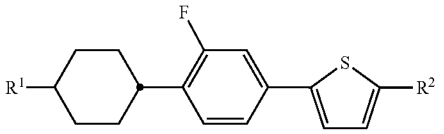
I-2-47
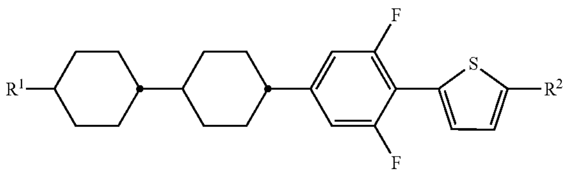
wherein $R^1$ and $R^2$ are as defined above.
Additionally, LC media comprising the following compounds of Formula I are particularly preferred:

I-3-1
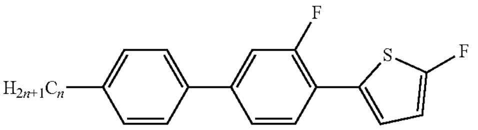
I-3-2
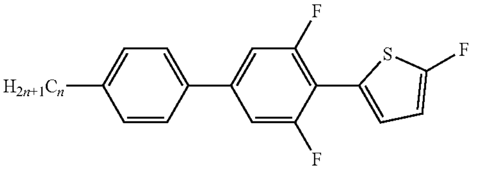
I-3-3
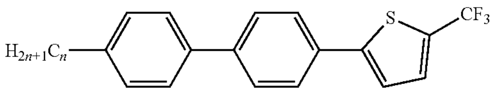
I-3-4
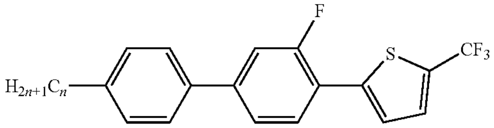
I-3-5
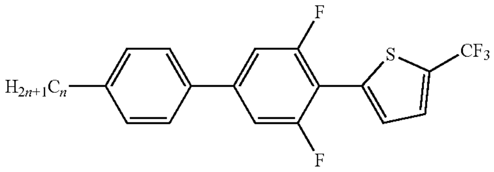
I-3-6
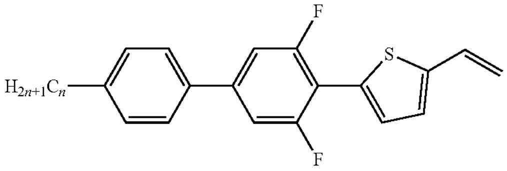
I-3-7
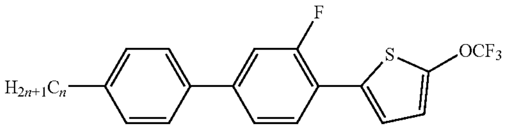
I-3-8
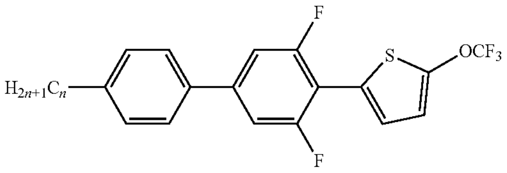
I-3-9
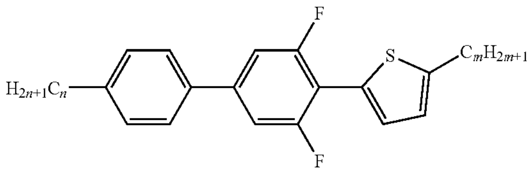
-continued
I-3-10
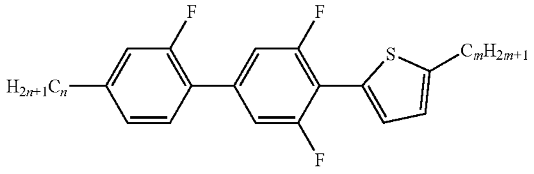
I-3-11
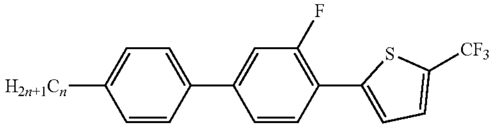
I-3-12
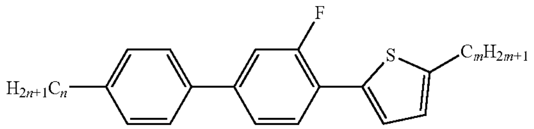
I-3-13
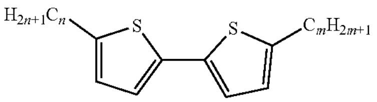
I-3-14
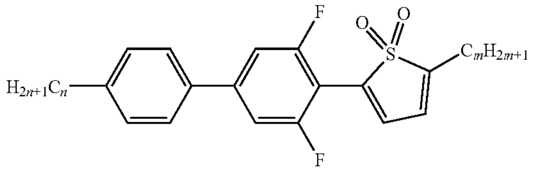
I-3-15
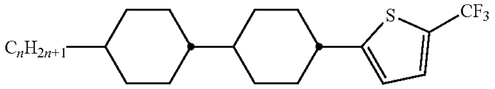
I-3-16
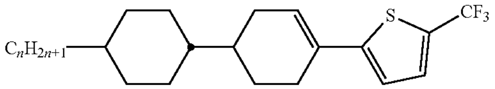
I-3-17
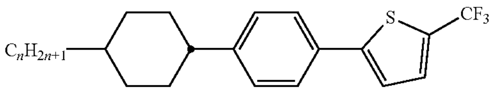
I-3-18
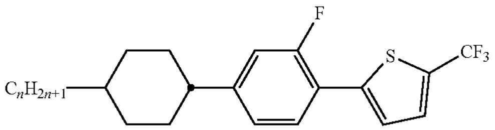
I-3-19
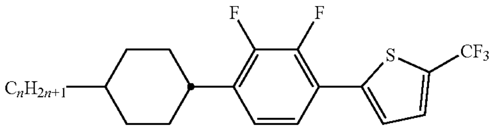

-continued
I-3-20
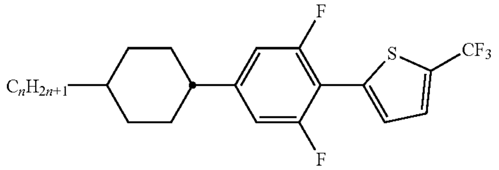
I-3-21
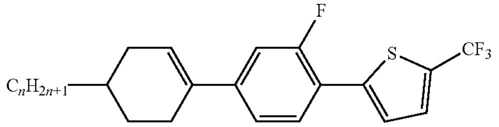
Mostly preferred compounds of Formula I include, in particular, one or more of the following:
I-3-9-1
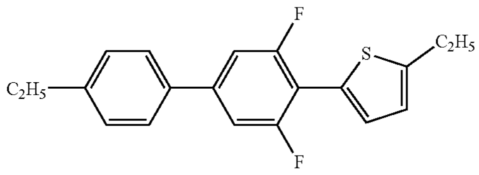
I-3-9-2
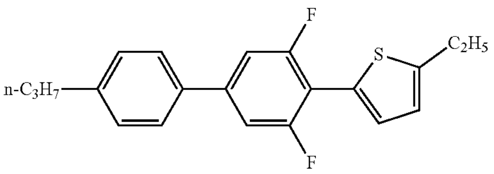
I-3-9-3
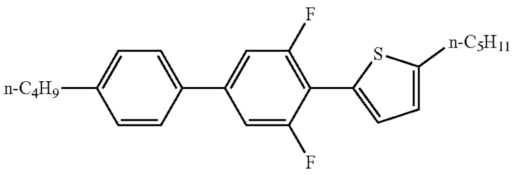
I-3-9-4
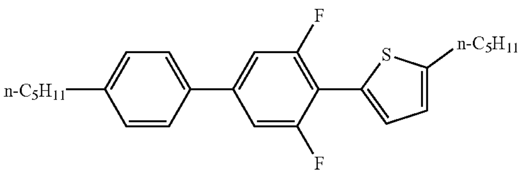
I-3-9-5
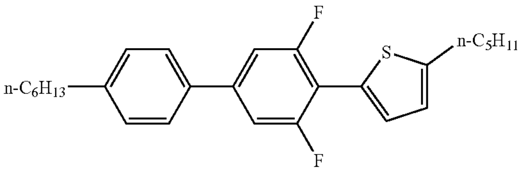
-continued
I-3-9-6
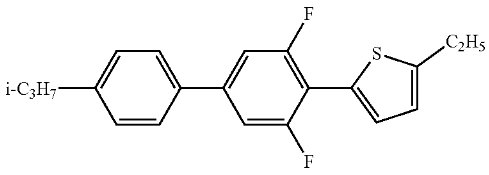
As a further possibility, the following compounds of Formula I can be used:
I-3-22-1
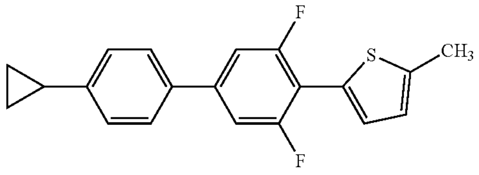
I-3-22-2
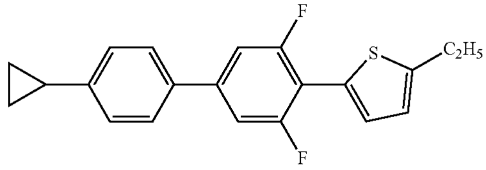
I-3-22-3
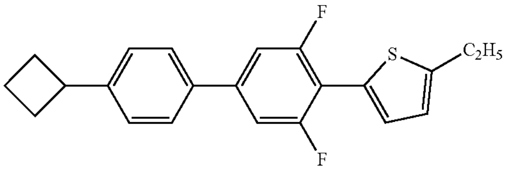
I-3-22-4
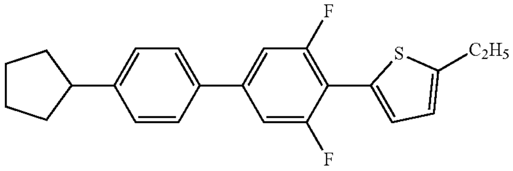
I-3-22-5
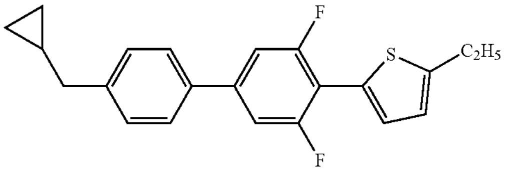
I-3-22-6
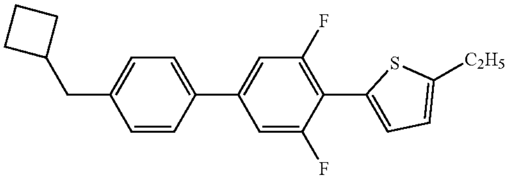

-continued

I-3-6-1

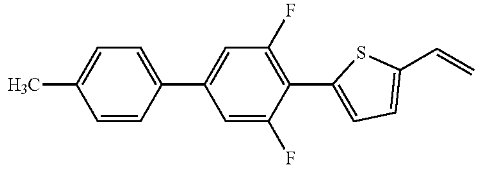

I-3-6-2

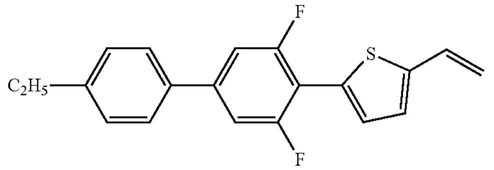

I-3-6-3

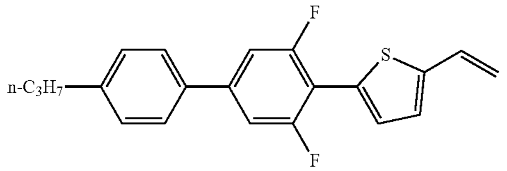

I-3-6-4

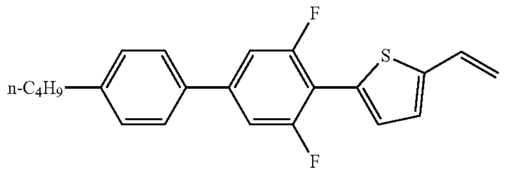

I-3-6-5

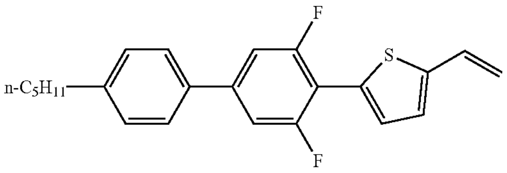

The compounds of the Formula I can be prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart.

Compounds of Formula ST

In addition to thiophene derivatives of general Formula I, the LC medium of the present invention comprises one or more compounds of general Formula ST:

ST

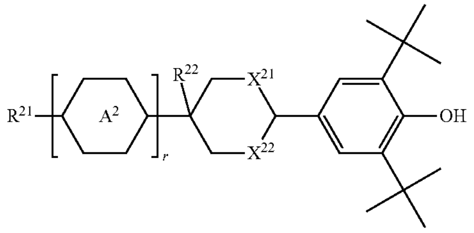

in which the individual substituents $A^2$, $R^{21}$, $R^{22}$, $X^{21}$, $X^{22}$ and r are specified in Claim 1.

LC media comprising compounds of the following sub-formulae ST-1, ST-2 and ST-3 showed a particularly high long-term thermal and UV stability:

ST-1

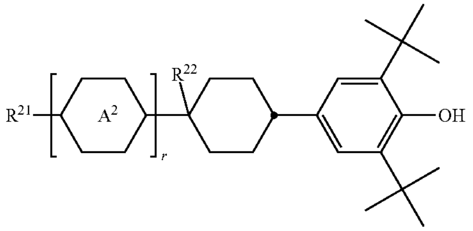

ST-2

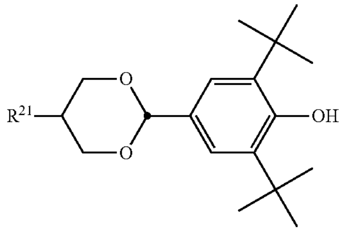

ST-3

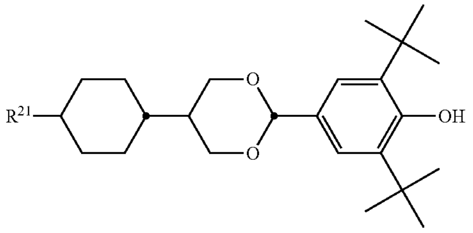

in which the individual substituents have the following meanings:

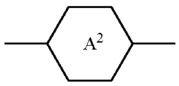
denotes
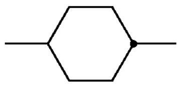
,
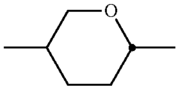
or
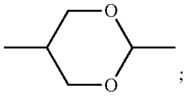
;

$R^{21}$ and $R^{22}$ each, independently of one another, denote a H atom or an alkyl or alkoxy group having 1 to 7 C atoms, and r denotes 0 or 1.

In particularly preferred embodiments, the compounds of general Formula ST can be selected from the following specific structures:

ST-1-1
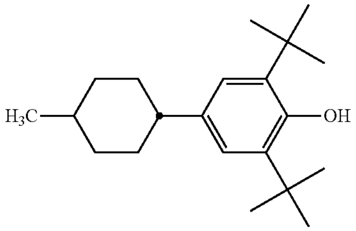
ST-1-2
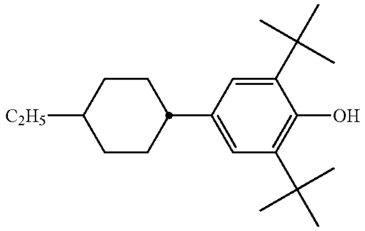
ST-1-3
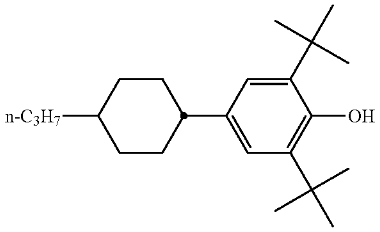
ST-1-4
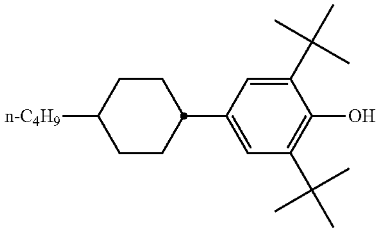
ST-1-5
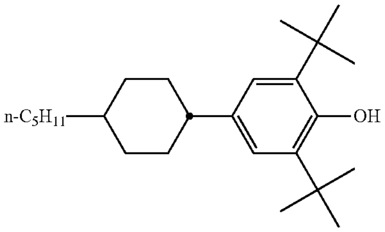
ST-1-6
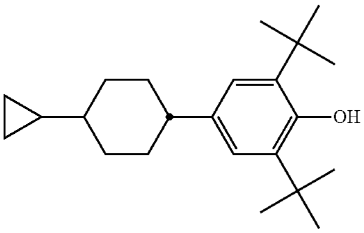
-continued
ST-1-7
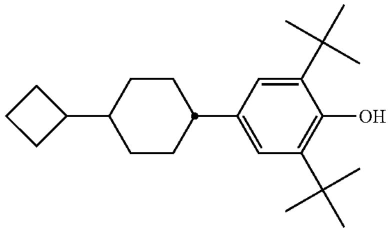
ST-1-8
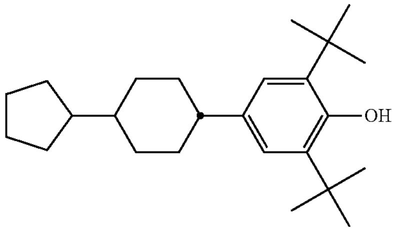
ST-2-1
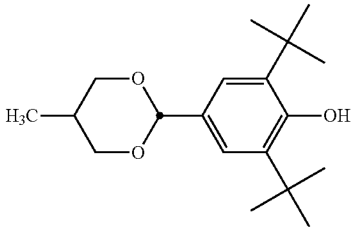
ST-2-2
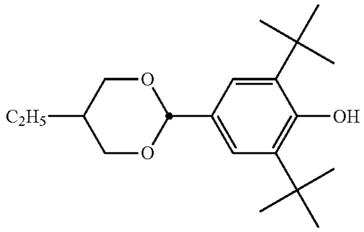
ST-2-3
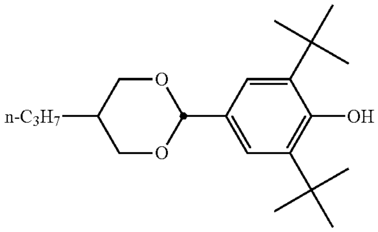

-continued

ST-2-4

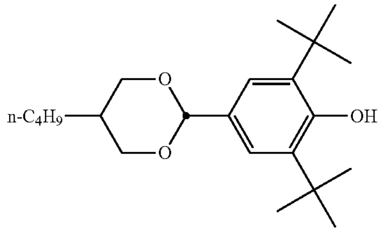

ST-2-5

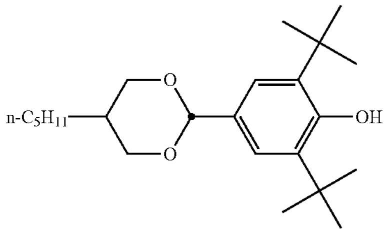

ST-2-6

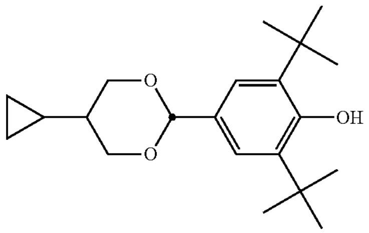

ST-2-7

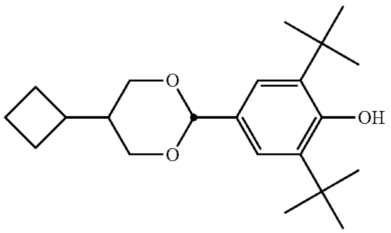

-continued

ST-2-8

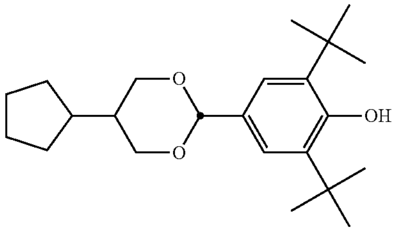

ST-2-9

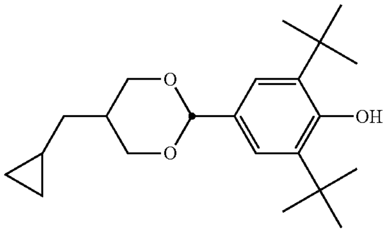

ST-2-10

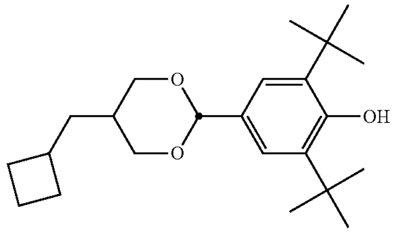

In a further preferred embodiment, the LC medium according to the present invention may comprise at least one further sterically hindered phenol, which is mentioned in Table B below.

Compounds of Formula H

In addition to one or more compounds of Formulae I and ST as defined above the medium may optionally comprise one or more compounds of the Formula H

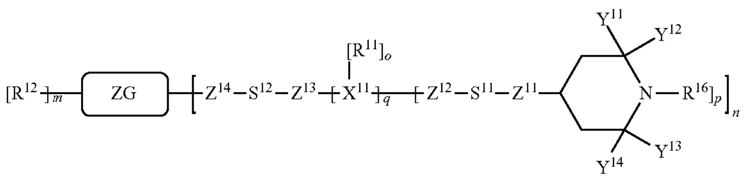

H in which $R^{11}$ each, independently of one another, denotes a H atom, F, an alkyl group having 1 to 20 C atoms, in which one —$CH_2$— group or, if present, a plurality of —$CH_2$— groups may be replaced by —O— or —C(═O)—, but two adjacent —$CH_2$— groups cannot be replaced by —O—, and one or, if present, a plurality of —$CH_2$— groups may be replaced by —CH═CH— or —C≡C—, and in which one H atom or a plurality of H atoms may be replaced by F, $OR^{13}$, $N(R^{13})(R^{14})$ or $R^{15}$ $R^{12}$ each, independently of one another, denotes a H atom, an alkyl group having 1 to 20 C atoms, in which one —$CH_2$— group or a plurality of —$CH_2$— groups may be replaced by —O— or —C(═O)—, but two adjacent —$CH_2$— groups cannot be replaced by —O—, a hydrocarbon radical which contains a cycloalkyl or alkylcycloalkyl unit and in which one —$CH_2$— group or a plurality of —$CH_2$— groups may be replaced by —O— or —C(═O)—, but two adjacent —$CH_2$— groups cannot be replaced by —O—, and in which one H atom or a plurality of H atoms may be replaced by F, $OR^{13}$, $N(R^{13})(R^{14})$ or $R^{15}$, or an aromatic or heteroaromatic hydrocarbon radical, in which one H atom or a plurality of H atoms may be replaced by $OR^{13}$, $N(R^{13})(R^{14})$ or $R^{15}$, $R^{13}$ and $R^{14}$ each, independently of one another, denotes an alkyl or acyl group having 1 to 10 C atoms or an aromatic hydrocarbon or carboxylic acid radical having 6 to 12 C atoms, $R^{15}$ each, independently of one another, denotes an alkyl group having 1 to 10 C atoms, in which one —$CH_2$— group or a plurality of —$CH_2$— groups may be replaced by —O— or —C(═O)—, but two adjacent —$CH_2$— groups cannot be replaced by —O—, $R^{16}$ each, independently of one another a H atom, an alkyl group or an alkoxy group having 1 to 10 C atoms, O-cycloalkyl group having 3 to 12 C atoms, O' or OH, $S^{11}$ and $S^{12}$ each, independently of one another, denote an alkylene group having 1 to 20 C atoms, in which one —$CH_2$— group or, if present, a plurality of —$CH_2$— groups may be replaced by —O— or —C(═O)—, but two adjacent —$CH_2$— groups cannot be replaced by —O—, and in which one H atom or a plurality of H atoms may be replaced by F, $OR^{13}$, $N(R^{13})(R^{14})$ or $R^{15}$, or denote a single bond, $Y^{11}$ to $Y^{14}$ each, independently of one another, denote methyl or ethyl, $X^{11}$ denotes C, $Z^{11}$ to $Z^{14}$ each, independently of one another, denote —O—, —(C═O)—, —O—(C═O)—, —(C═O)—O—, —O—(C═O)—O—, —(N—$R^{13}$)—, —N—$R^{13}$—(C═O)— or a single bond if $S^{11}$ is a single bond, both $Z^{11}$ and $Z^{12}$ do not simultaneously denote —O—; if $S^{12}$ is a single bond, both $Z^{13}$ and $Z^{14}$ do not simultaneously denote —O—; and, if q denotes 0, both $Z^{12}$ and $Z^{13}$ do not simultaneously denote —O—, p denotes 1 or 2, q denotes 0 or 1, denotes (3-p), n denotes an integer from 1 to 10, m denotes an integer from 0 to 8, wherein n*p denotes an integer from 1 to 10, preferably from 3 to 8, and

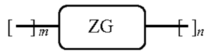

denotes an organic moiety having (m+n) bonding sites,

In some preferred embodiments of the present invention, in the compounds of the Formula H,

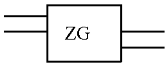

denotes

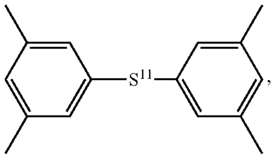

,

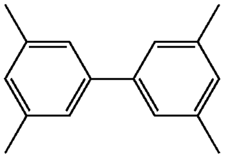 [SMILES: Cc1cc(C)cc(-c2cc(C)cc(C)c2)c1]

(biphenyl-1,1',3,3'-tetrayl) or

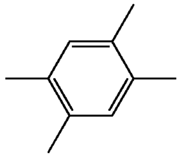

(benzene-1,2,4,5-tetrayl)

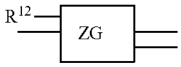

denotes

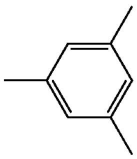

denotes (benzene-1,3,5-triyl) or

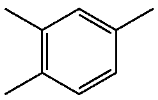

(benzene-1,2,4-triyl),

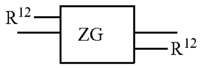

$R^2$-denotes $-(CH_2-)_2$, $-(CH_2-)_3$, $-(CH_2-)_4$, $-(CH_2-)_5$, $-(CH_2-)_6$, $-(CH_2-)_7$, $-(CH_2-)_8$, i.e.

ethane-1,2-diyl, propane-1,3-diyl, butane-1,4-diyl, pentane-1,5-diyl, hexane-1,6-diyl, heptane-1,7-diyl, octane-1,8-diyl,

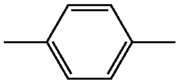

(1,4-phenylene),

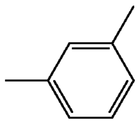

(1,3-phenylene),

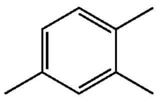

(1,2-phenylene) or

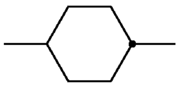

(trans-1,4-cyclohexylene) and/or wherein $-Z^{12}-S^{11}-Z^{11}-$ on each occurrence, independently of one another, denotes $-O-$, $S^{11}-O-$, $-O-S^{11}-O-$, $-(C{=}O)-O-S^{11}-O-$, $-O-(C{=}O)-S^{11}-O-$, $-O-(C{=}O)-S^{11}-(C{=}O)-O-$, $-O-S^{11}-(C{=}O)-O-$, $-(C{=}O)-O-S^{11}-C$, $-(C{=}O)-O-S^{11}-O-(C{=}O)-$ or $-(N-R^{13})-S^1-O-$, $-(N-R^{13}-C({=}O)-S^{11}-(C{=}O)-O$ or a single bond, preferably $-O-$, $-S^{11}-O-$, $-O-S^{11}-O-$, $-(C{=}O)-O-S^{11}-O-$, $-O-(C{=}O)-S^{11}-O-$ or $-O-S^{11}-(C{=}O)-O-$, and/or $S^{11}$ preferably denotes an alkylene group having 1 to 20 C atoms, and/or $R^{11}$ if present, denotes alkyl, alkoxy or H, preferably H or alkyl, and/or $R^{12}$ denotes H, methyl, ethyl, propyl, isopropyl or 3-heptyl, or cyclohexyl.

In a preferred embodiment of the present application, in the compounds of the Formula H,

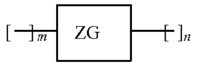

denotes a group selected from the group of the formulae

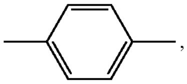, 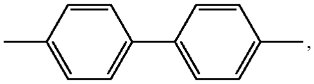,

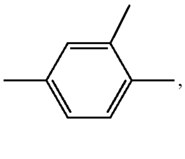, 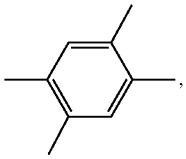,

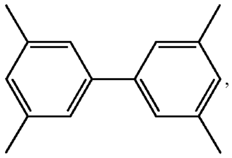,

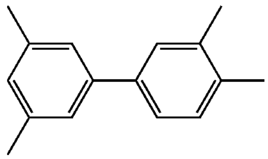 or

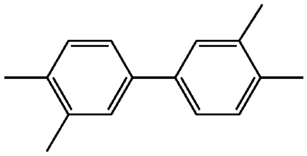

$-(CH_2)_n-$

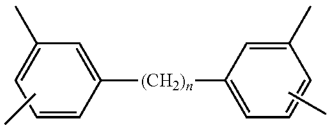

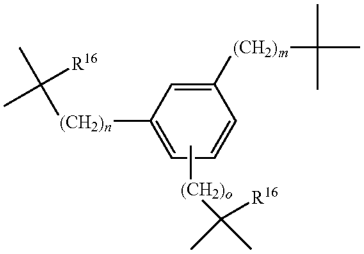

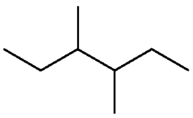 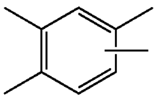 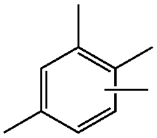

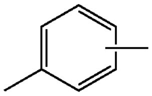

In a further preferred embodiment of the present application, in the compounds of the Formula H,

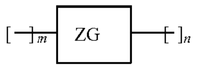

denotes a group selected from the group of the formulae

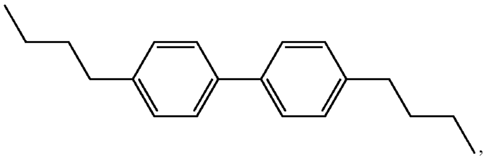

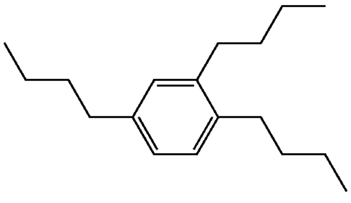

or

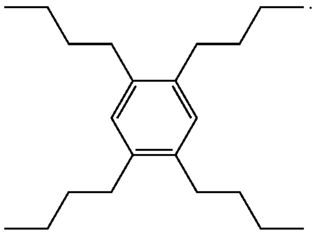

In yet a further preferred embodiment of the present invention, in the compounds of the Formula H in which p preferably denotes 1,

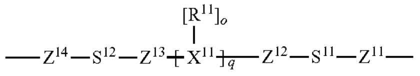

denotes $—Z^{12}—S^{11}—Z^{11}—$, preferably $—O—S^{11}—O—$, $—S^{11}—O—$ or $—O—S^{11}—$, particularly preferably $—O—S^{11}—O—$ or $—S^{11}—O—$.

In a further preferred embodiment of the present invention, in the compounds of the Formula H, the group -continued

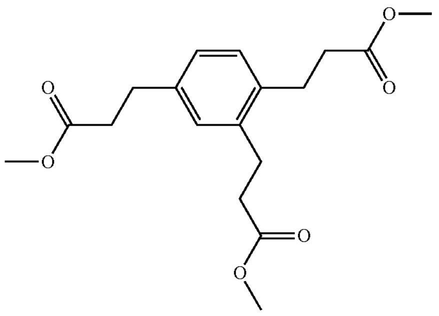

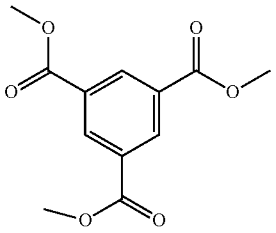

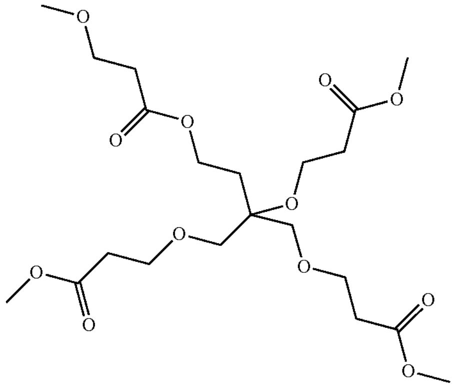

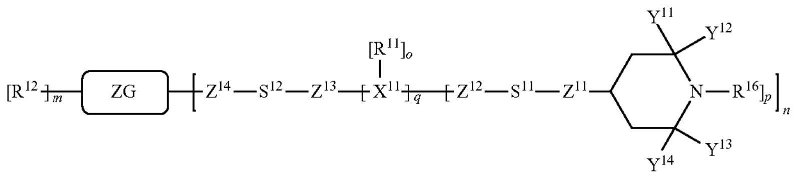

denotes a group selected from the group of the formulae

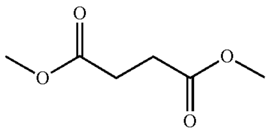

-continued

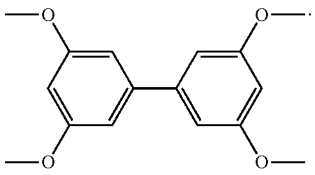

In a further preferred embodiment of the present invention in which p is 2, which may be identical to or different from those described above, in the compounds of the Formula H,

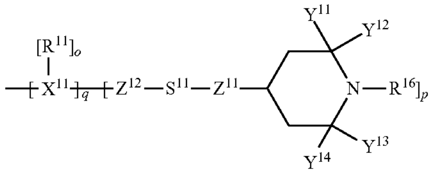

denotes a group selected from the group of the formulae

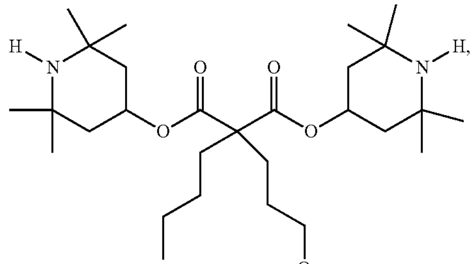

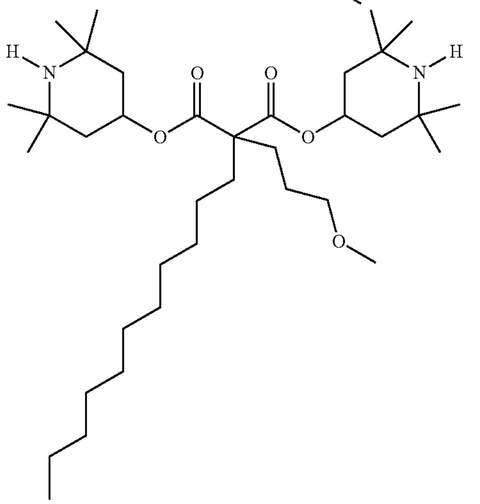

and

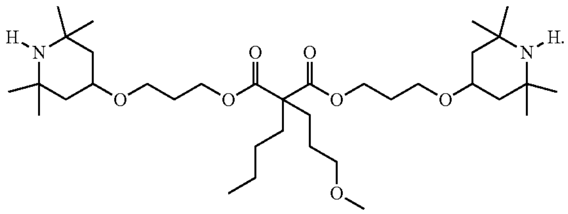

In yet a further preferred embodiment of the present invention, which may be identical to or different from those described above, in the compounds of the Formula H, the group

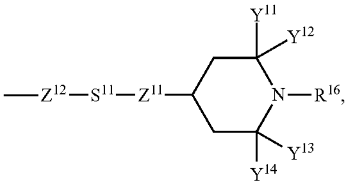

on each occurrence, independently of one another, denotes

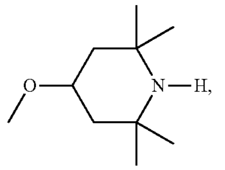

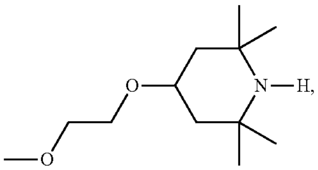

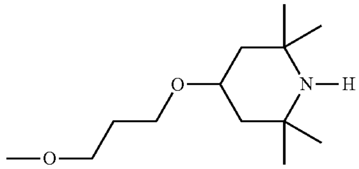

or

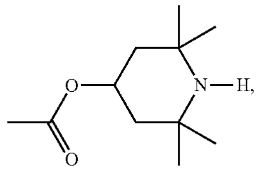

preferably

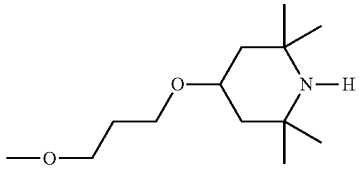

or

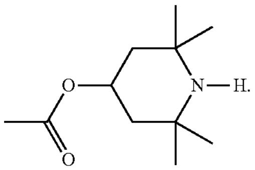

Compounds of the following general Formulae H-1-1, H-1-2 and H-1-3, showed to be particularly efficient UV stabilisers in liquid-crystal mixtures, in particular, in terms of VHR stability:

H-1-1

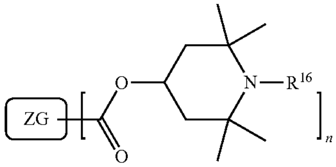

H-1-2

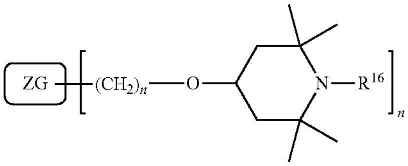

H-1-3

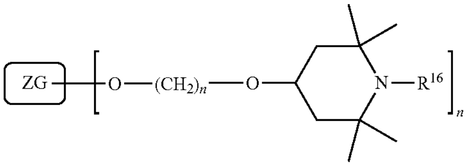

wherein ZG, $R^{16}$ and n are as defined above and n denotes an integer from 1 to 8. These compounds are highly suitable as stabilisers in liquid-crystal mixtures and stabilise the VHR of the mixtures upon a UV exposure.

In a particularly preferred embodiment, the one or more compounds of the Formula H may be selected from the group consisting of the compounds the following Formulae H-2-1 to H-2-6:
H-2-1
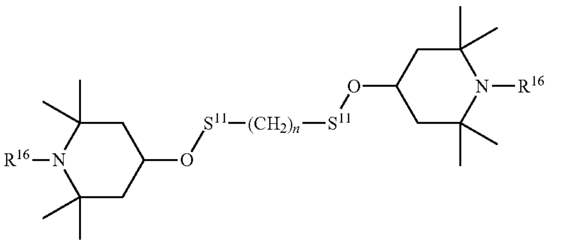
H-2-2
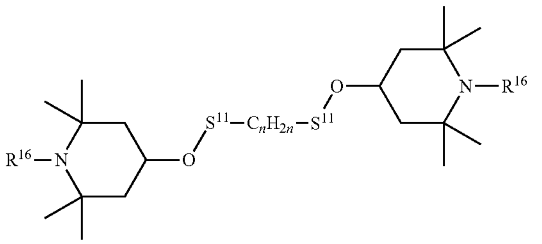
H-2-3
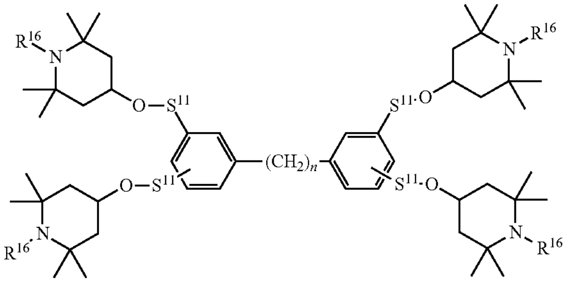
H-2-4
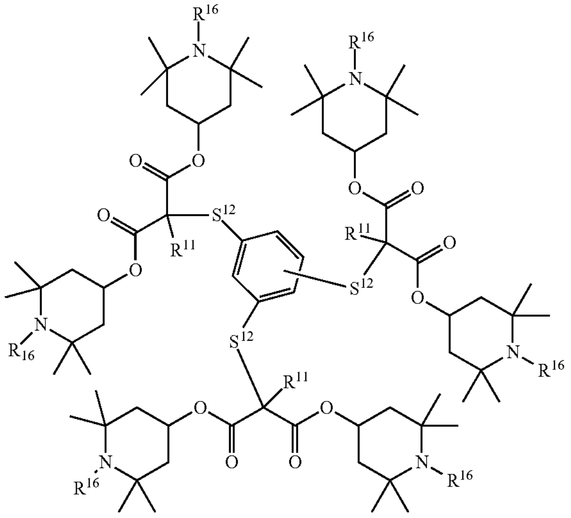
H-2-5
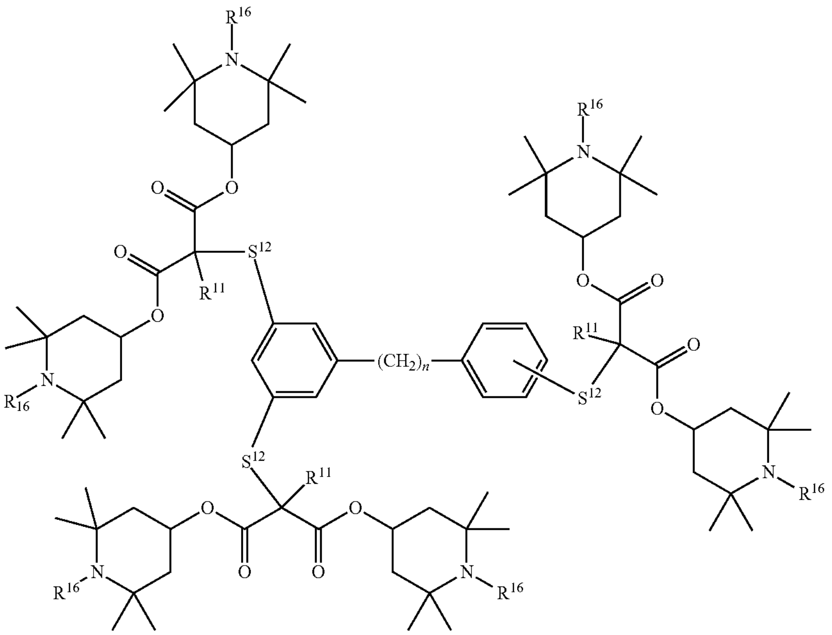

-continued

H-2-6

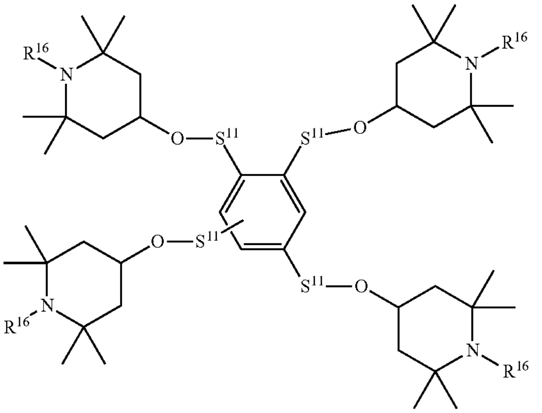

in which $R^{11}$ each, independently of one another, denotes an H atom, an alkyl group having 1 to 20 C atoms, in which one —$CH_2$— group or, if present, a plurality of —$CH_2$— groups may be replaced by —O— or —C(═O)—, but two adjacent —$CH_2$— groups cannot be replaced by —O—, and one or, if present, a plurality of —$CH_2$— groups may be replaced by —CH═CH— or —C≡C—, and in which one H atom or a plurality of H atoms may be replaced by F, $OR^{13}$, $N(R^{13})(R^{14})$ or $R^{15}$ $R^{16}$ denotes a H atom or O*, n denotes an integer from 0 to 12, and $S^{11}$ and $S^{12}$ each, independently of one another, denote an alkylene group having 1 to 20 C atoms, in which one —$CH_2$— group or, if present, a plurality of —$CH_2$— groups may be replaced by —O— or —C(═O)—, but two adjacent —$CH_2$— groups cannot be replaced by —O—, and in which one H atom or a plurality of H atoms may be replaced by F, $OR^{13}$, $N(R^{13})(R^{14})$ or $R^{15}$, or denote a single bond.

In a preferred embodiment of the present invention, the media according to the invention comprise in each case one or more compounds of the Formula H selected from the following group of the compounds of the formulae

H-3-1

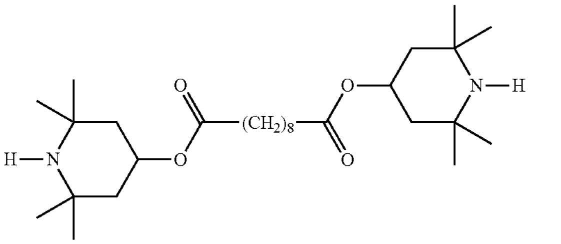

H-3-2

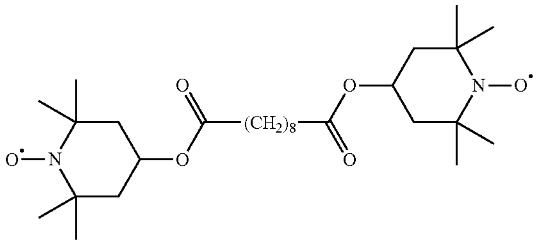

H-3-3

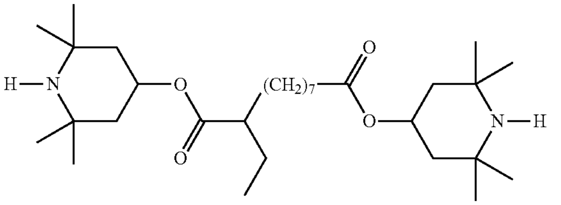

H-3-4

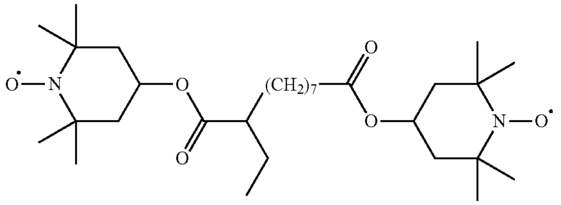

-continued
H-3-5
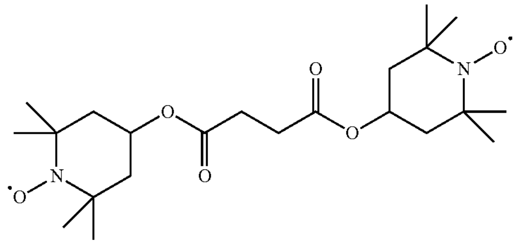
H-3-6
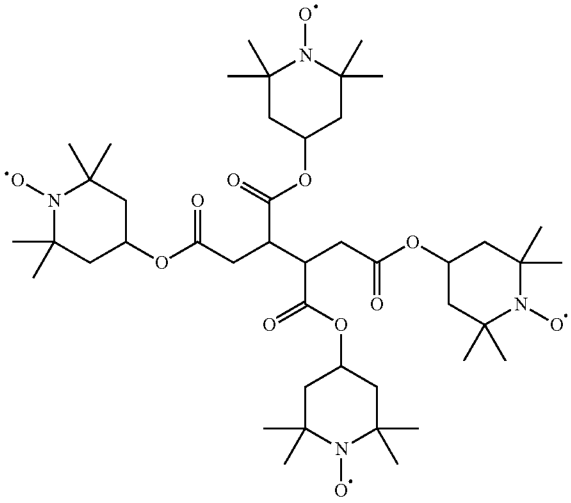
H-3-7
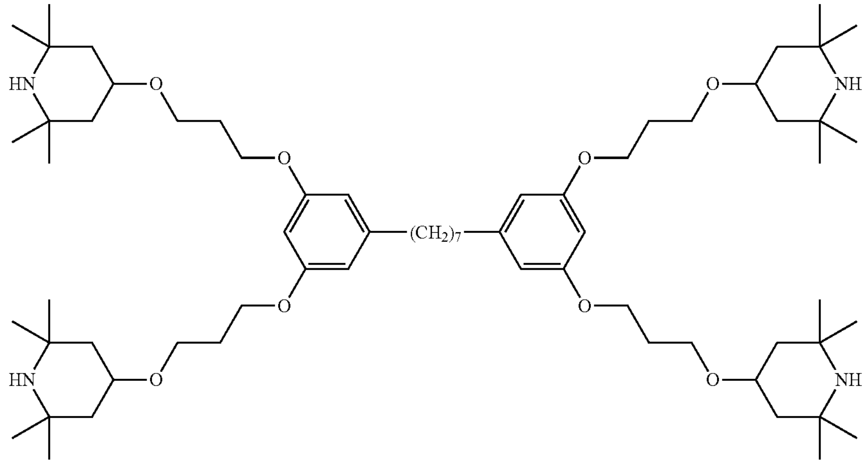
H-3-8
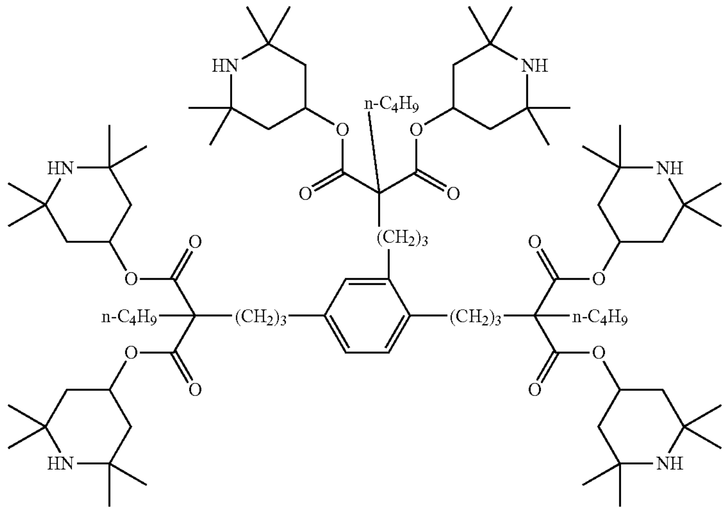

-continued
H-3-9
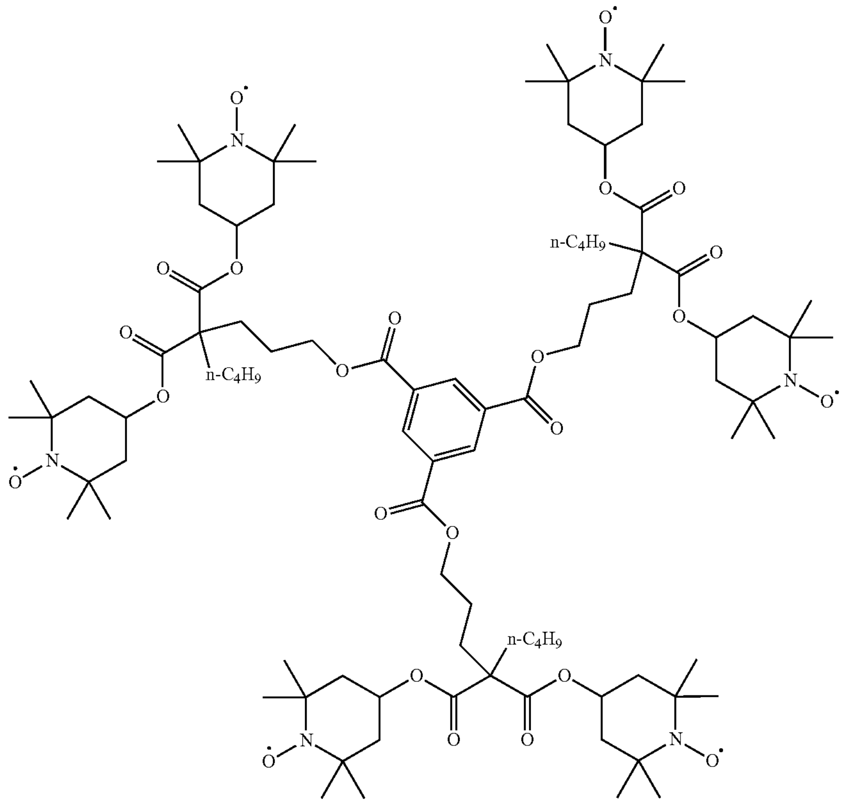
H-3-10
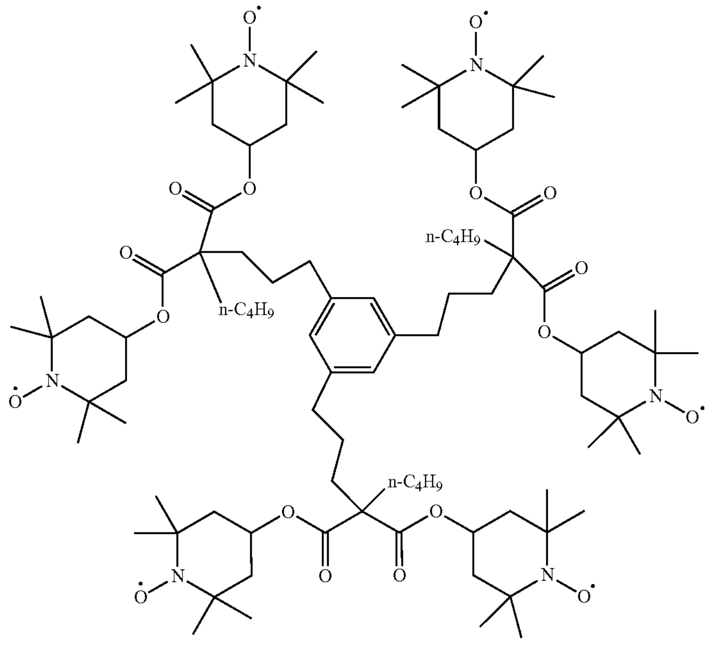

-continued
H-3-11
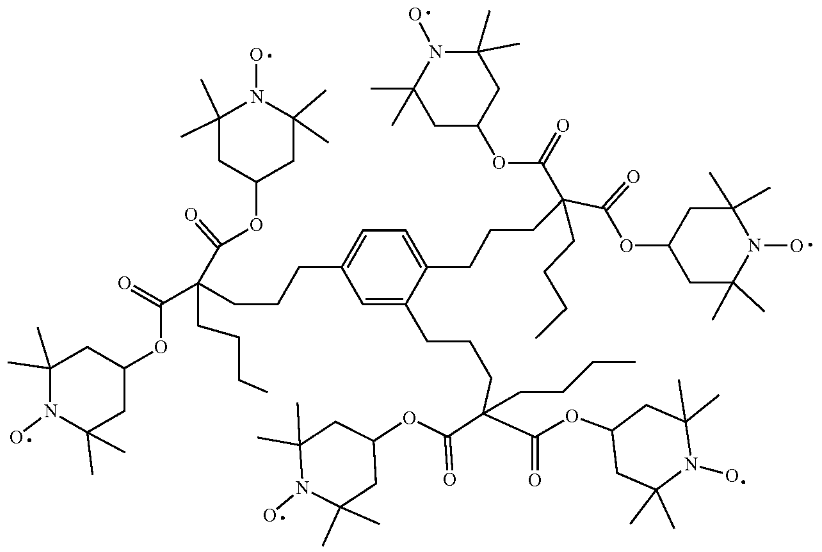
H-3-12
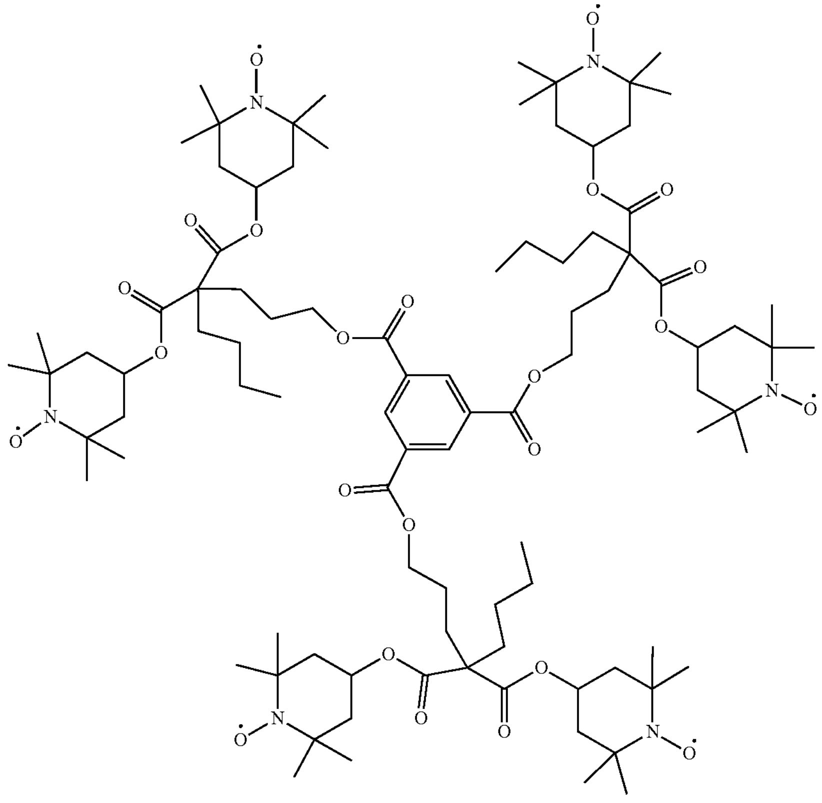

-continued
H-3-13
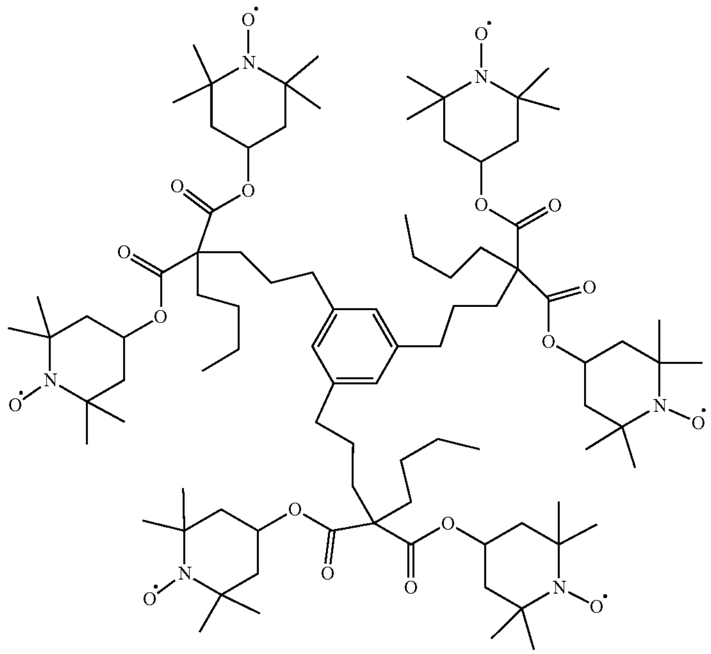
H-3-14
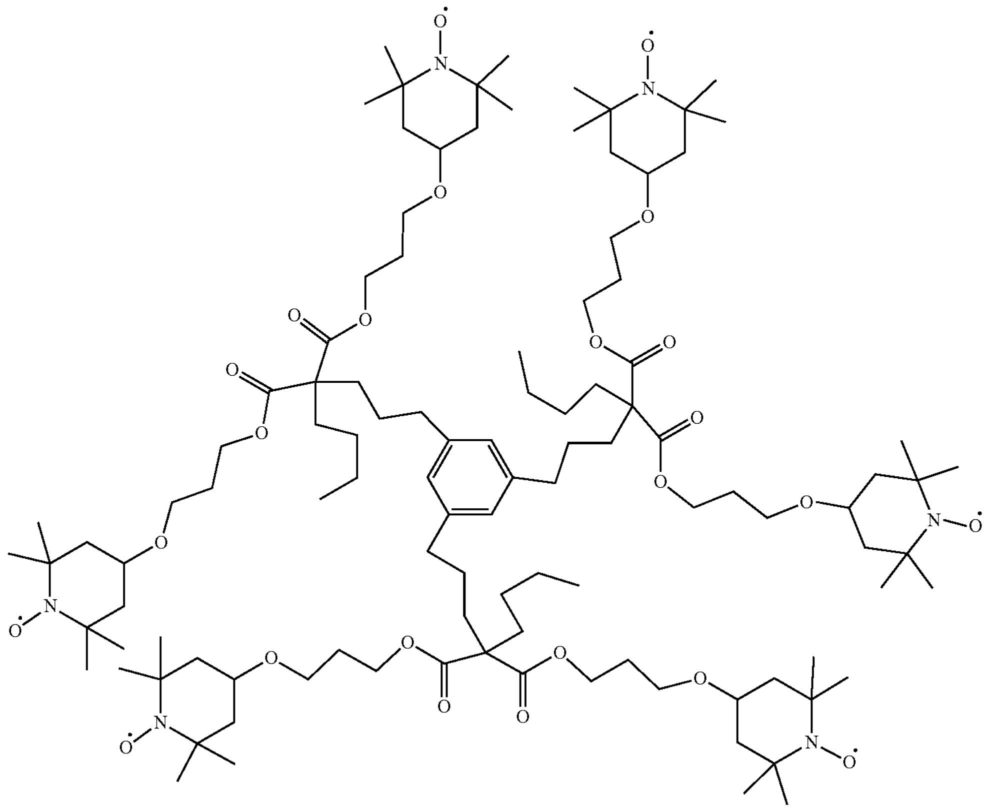

-continued
H-3-15
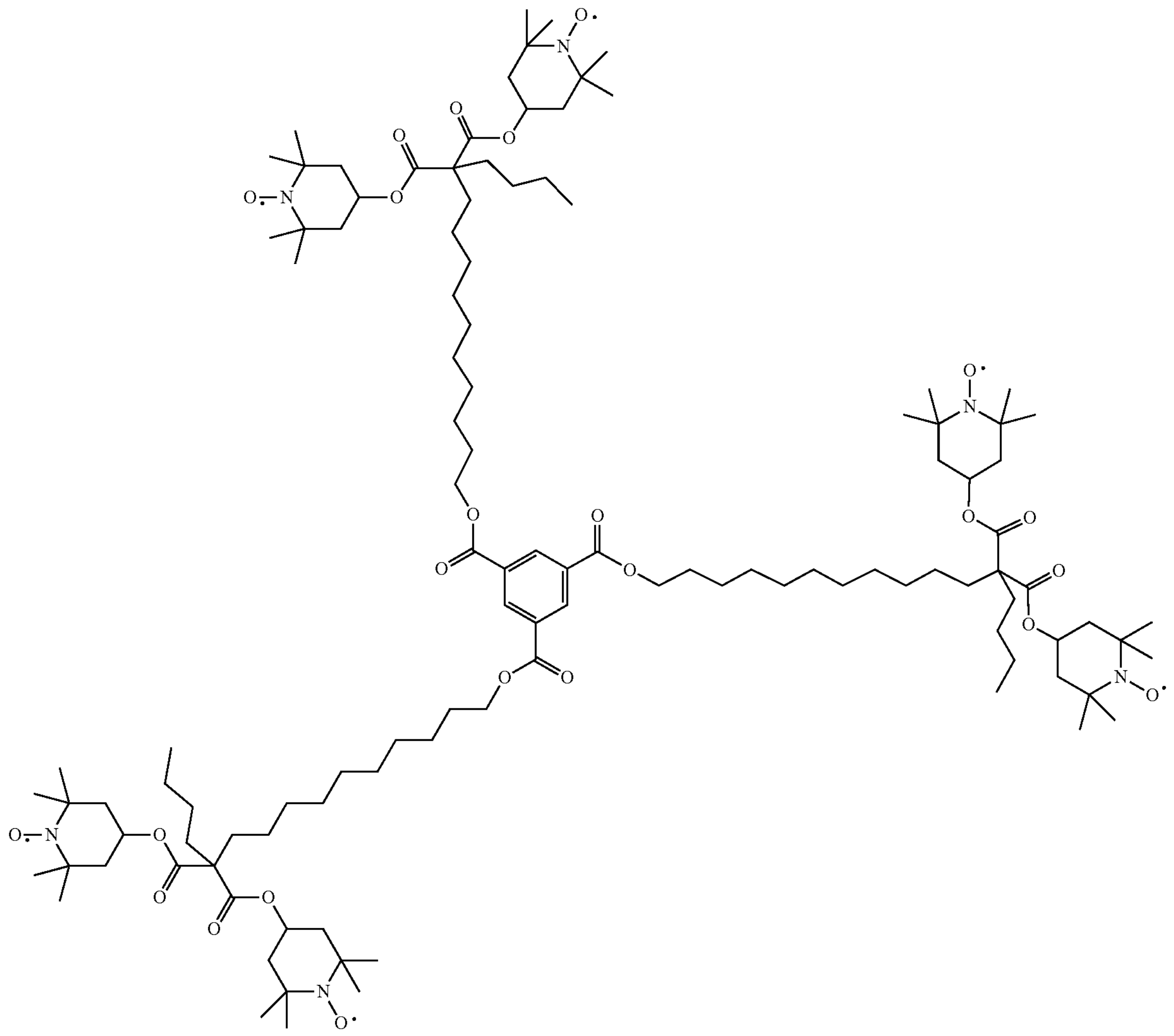

H-3-16
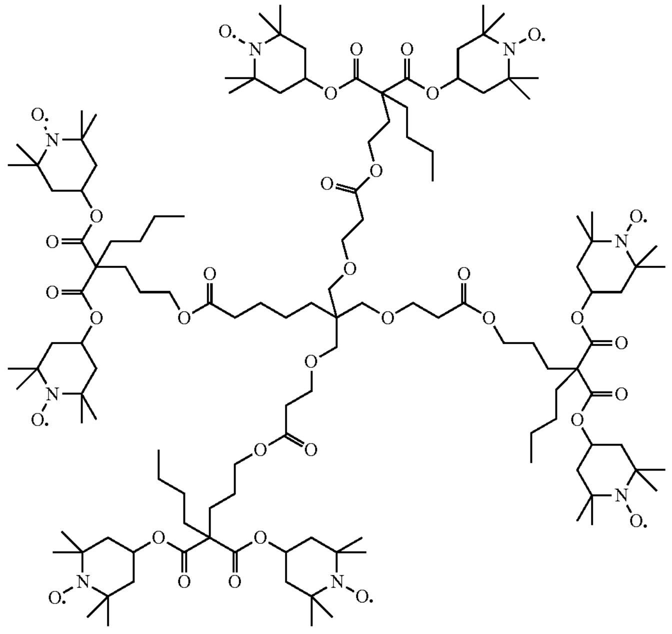
H-3-17
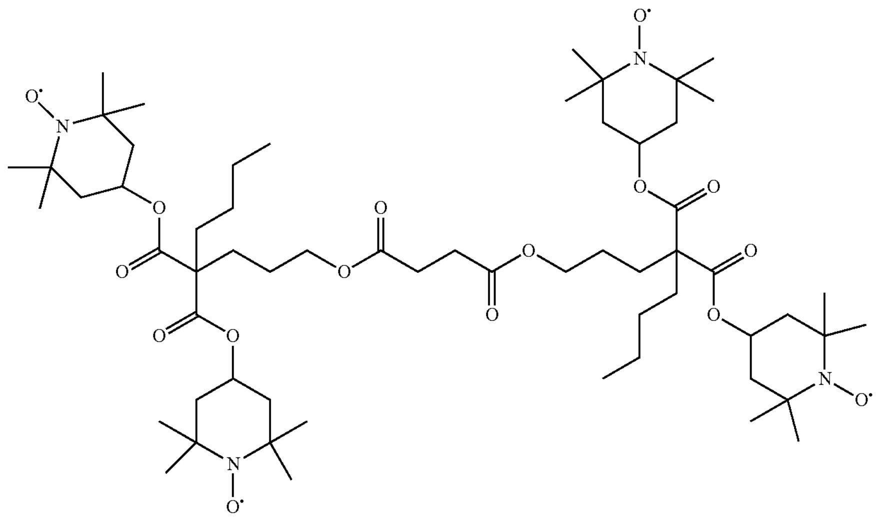

-continued
H-3-18
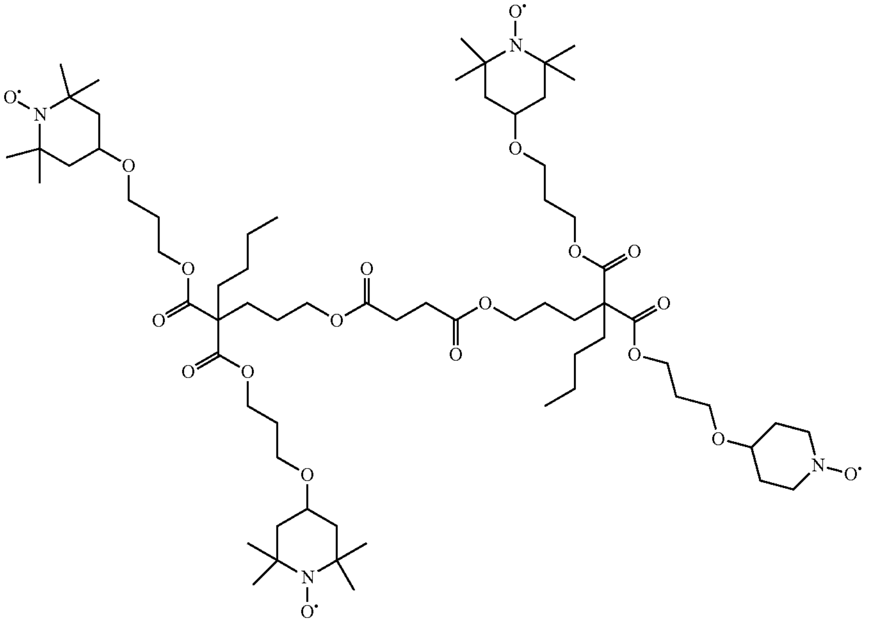
H-3-19
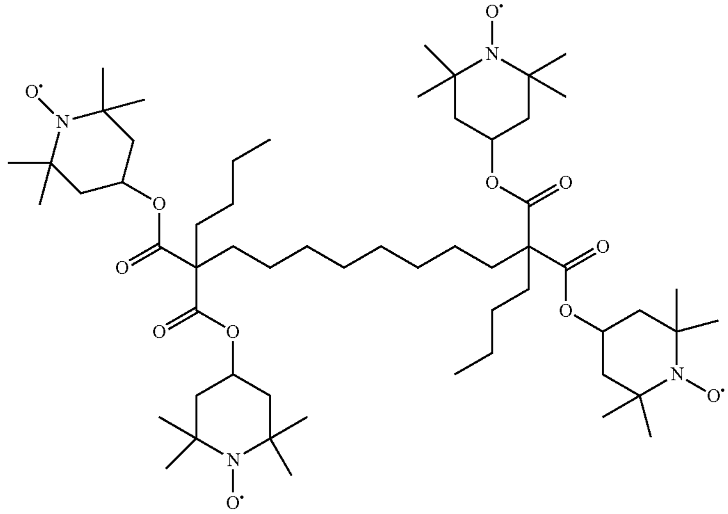
H-3-20
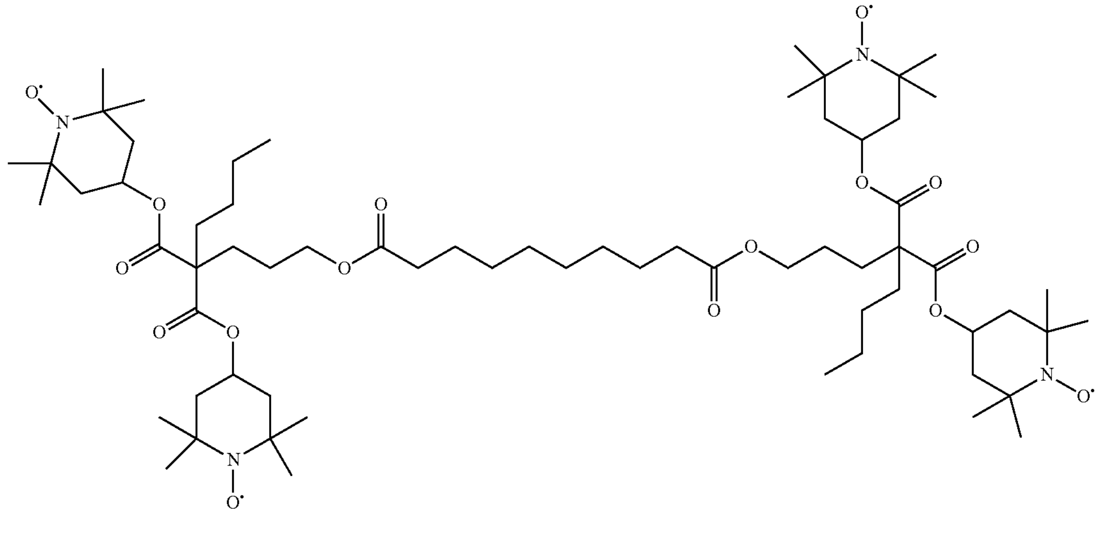

-continued

H-3-21

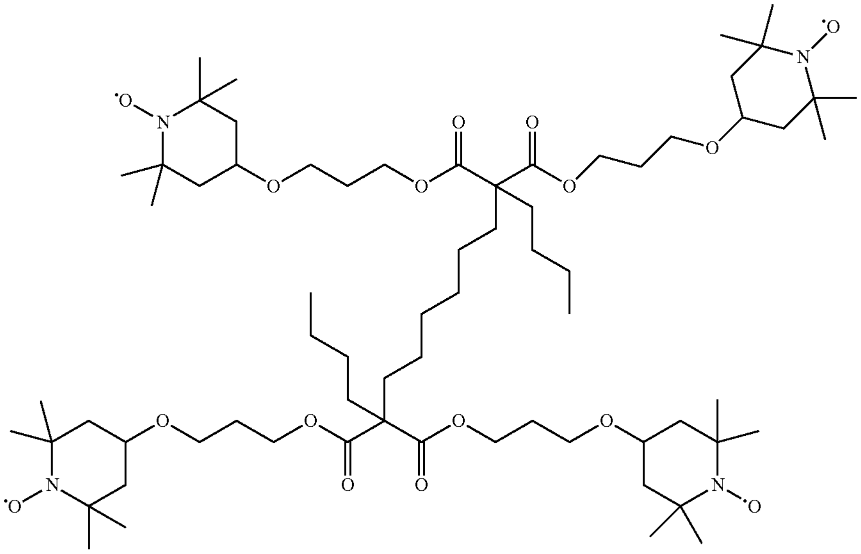

The preferred content of the one or more compounds of Formula H in the LC medium depends inter alia on the inherent chemical stability of the LC medium as well as on the nature of the compound of Formula H. Compounds of Formula H in which $R^{16}$ denotes O*, which are known as NO radical type HALS are preferably used in proportion ranging from 50 ppm to 1000 ppm, based on the weight of the LC medium. Compounds of Formula H in which $R^{16}$ denotes an H atom, which are known as NH radical type HALS are advantageously used in proportion ranging from 50 ppm to 2000 ppm, based on the weight of the LC medium.

Further Mesogenic Components

Preferably the LC medium of the present invention contains, in addition to the compounds of Formulae I and ST, one or more compounds selected from the following formulae:

Z1

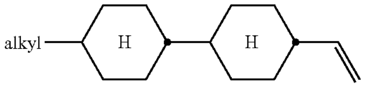

Z2

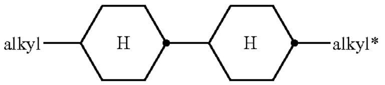

Z3

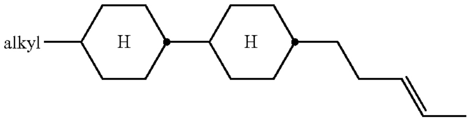

Z4

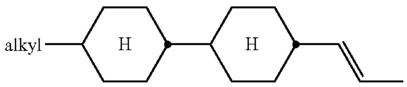

-continued

Z5

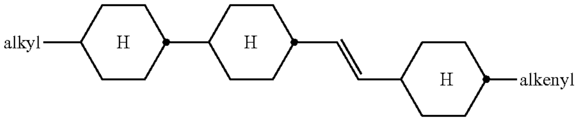

Z6

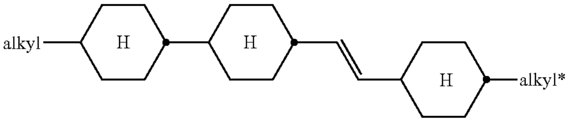

Z7

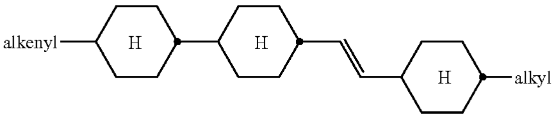

Z8

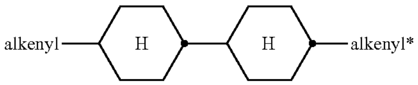

wherein

"alkyl" and "alkyl*" are, independently from one another, $C_{1-6}$-alkyl, and preferably denotes ethyl, propyl, butyl or pentyl, very preferably ethyl, propyl or butyl "alkenyl" and "alkenyl*" preferably denote $C_{2-6}$-alkenyl. Very preferred are compounds of Formula $Z^1$ and $Z^2$.

Preferred compounds of Formula $Z^1$ to $Z^6$ are those selected from the following subformulae

Z1-1

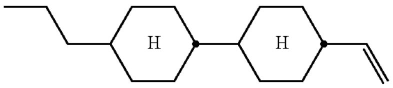

-continued

Z1-2

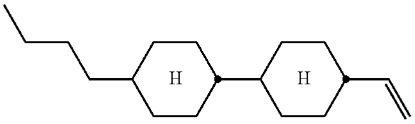

Z1-3

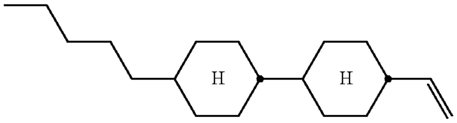

Z2-1

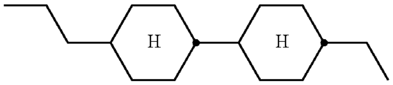

Z2-2

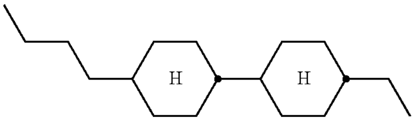

Z2-3

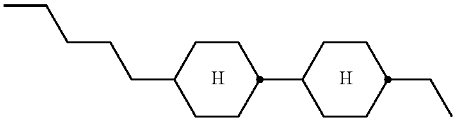

Z2-4

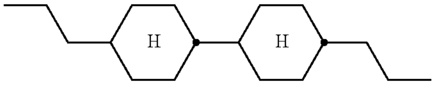

Z2-5

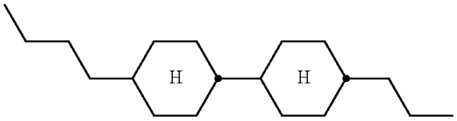

Z2-6

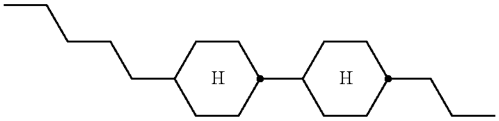

Z3-1

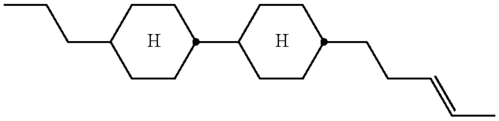

Z4-1

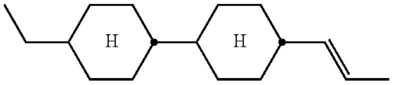

Z4-2

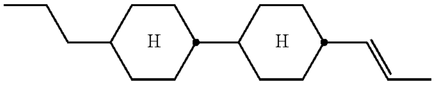

Z4-3

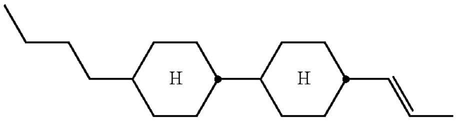

Z4-4

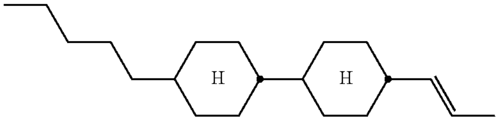

-continued

Z5-1

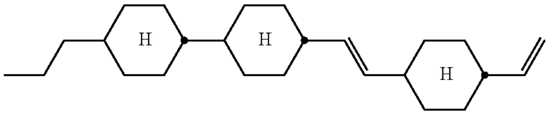

Z8-1

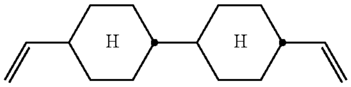

Z8-2

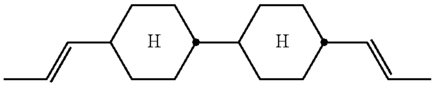

Z8-3

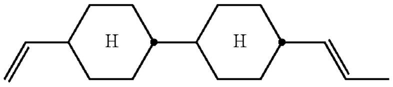

In another preferred embodiment the medium contains one or more compounds of Formula Z1 or its preferred subformulae and/or one or more compounds selected from Formulae Z2, Z3, Z4 and Z5 or their preferred subformulae.

Preferably the total proportion of compounds of Formula Z1, Z2, Z3, Z4, Z5 and Z6 or their subformulae, such as CC-3-V in the medium is from 10 to 65%, very preferably from 20 to 60%, most preferably from 25 to 55% by weight. In yet a more preferred embodiment, the compound of Formula Z1-1 is used in concentrations ranging from 10 wt.-% to 60 wt.-%, more preferably 10 wt.-% to 40 wt.-%, based on the total weight of the LC medium.

Preferably the medium contains 1, 2 or 3 compounds selected from the Formulae Z1, Z2, Z3 and Z4 or their subformulae.

The medium may additionally comprise one or more compounds of the following general formulae:

XII

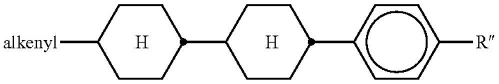

in which

R" denotes $C_{1-6}$-alkyl, $C_{1-6}$-alkoxy or $C_{2-6}$-alkenyl, and "alkenyl" denotes $C_{2-6}$-alkenyl, The compounds of the Formula XII are preferably selected from the following subformulae:

XIIa

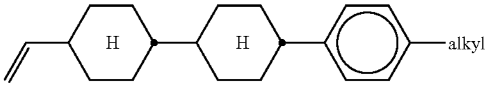

XIIb

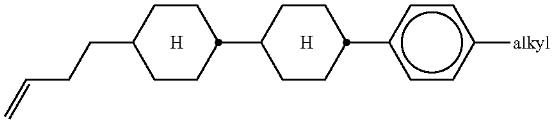

wherein "alkyl" is methyl, butyl, pentyl or hexyl.

Particular preference is given to the compounds of the Formula XIIa. In the Formula XIIb, "alkyl" preferably, independently of one another, denotes n-$C_3H_7$, n-$C_4H_9$ or n-$C_5H_{11}$, in particular n-$C_3H_7$.

Preferred compounds of subformula XIIa are selected from the following group:

XIIa1

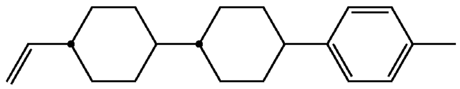

The medium may additionally comprise one or more compounds selected from the following formulae:

XIV

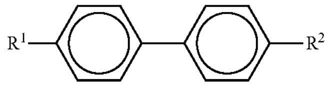

XV

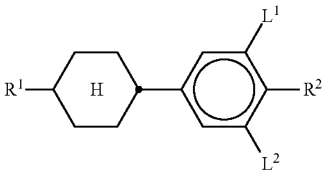

in which $L^1$ and $L^2$ have the meanings indicated in Formula I, and $R^1$ and $R^2$ each, independently of one another, denote n-alkyl, alkoxy, oxaalkyl, fluoroalkyl or alkenyl, each having up to 6 C atoms, and preferably each, independently of one another, denote alkyl having 1 to 6 C atoms; in the compound of the Formula XIV, at least one of the radicals $R^1$ and $R^2$ preferably denotes alkenyl having 2 to 6 C atoms.

The medium may further comprise one or more compounds of the Formula XIV in which at least one of the radicals $R^1$ and $R^2$ denotes alkenyl having 2 to 6 C atoms, preferably those selected from the following subformulae:

XIVa

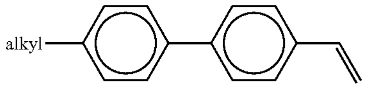

XIVb

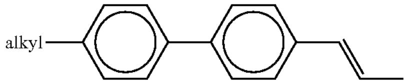

XIVc

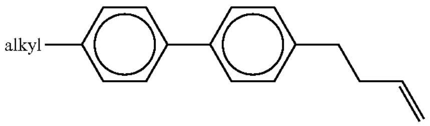

XIVd

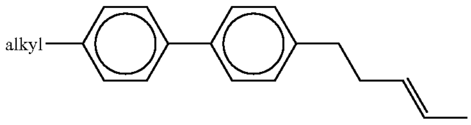

in which "alkyl" has the meaning indicated above, and preferably denotes methyl, ethyl or propyl.

The compounds of the Formula XIV are preferably selected from the following subformulae:

XIVd1

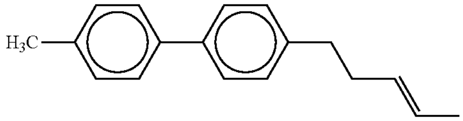

XIVd2

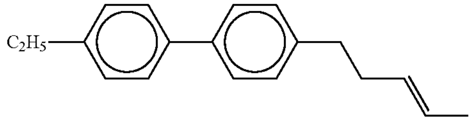

Very preferred are compounds of Formula XIVd1.

In yet a further embodiment the medium comprises one or more compounds of the Formula XVI,

XVI

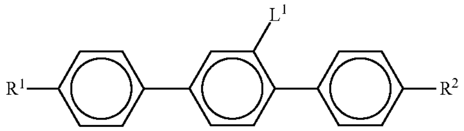

in which $R^1$ and $R^2$ have the meanings indicated in Formula I and preferably each, independently of one another, denote alkyl having 1 to 6 C atoms. L denotes H or F.

Particularly preferred compounds of the Formula XVI are those of the subformulae XVIa

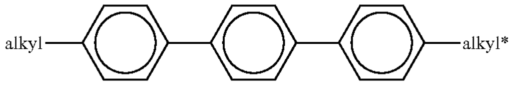

XVIb

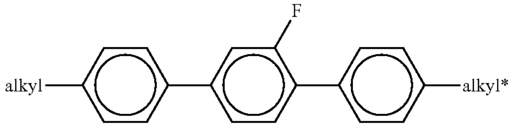

XVIc

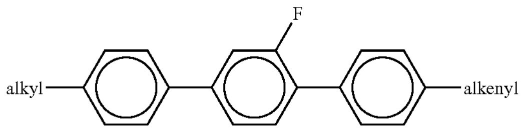

XVId

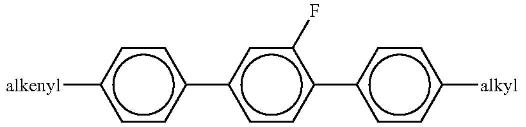

XVIe

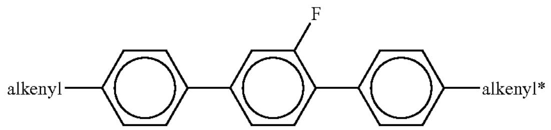

-continued

XVIf

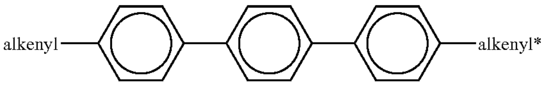

in which alkyl and alkyl* each, independently of one another, denote a straight-chain alkyl radical having 1 to 6 C atoms, in particular ethyl, propyl or pentyl, and alkenyl and alkenyl* each, independently of one another, denote a straight-chain alkenyl radical having 2 to 6 C atoms, in particular $CH_2{=}CHC_2H_4$, $CH_3CH{=}CHC_2H_4$, $CH_2{=}CH$ and $CH_3CH{=}CH$.

Particular preference is given to the compounds of the Formulae XVIb and XVIc. Very particular preference is given to the compounds of the following subformulae XVIb1

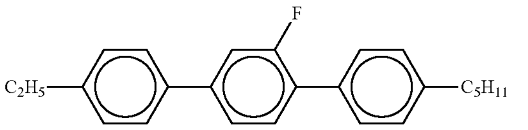

XVIb2

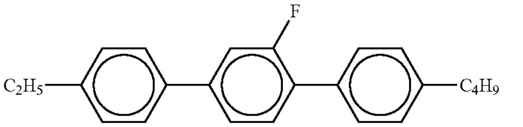

XVIb3

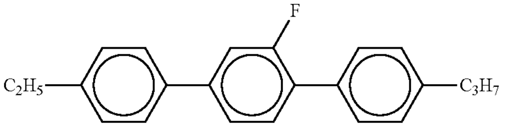

XVIc1

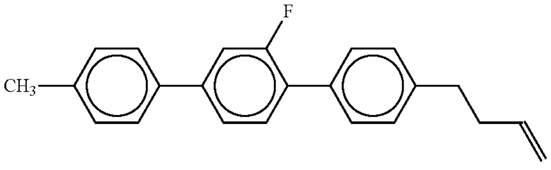

XVIc2

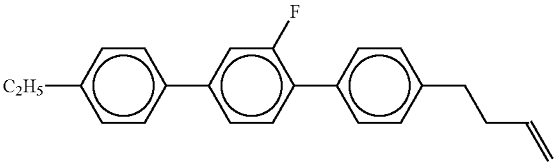

XVIc3

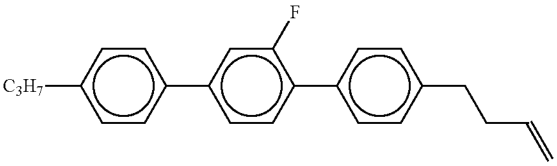

Very preferred are compounds of Formula XVIc2.

The medium comprises one or more compounds of the following formulae:

XVIIa

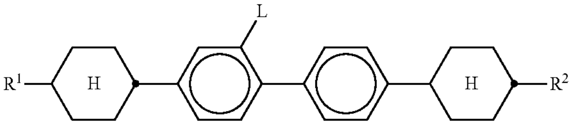

XVIIb

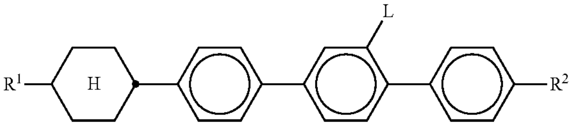

XVIIc

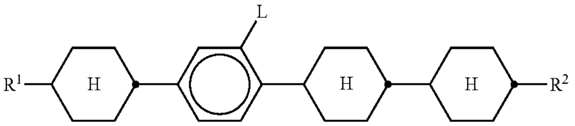

in which $R^1$ and $R^2$ have the meanings indicated in Formula I, respectively, and preferably each, independently of one another, denote alkyl having 1 to 6 C atoms. L denotes H or F.

Very preferred are compounds of Formula XVIIa wherein L is H. Very preferred are compounds of Formula XVIIb wherein L is F.

In one preferred embodiment according to the present invention, the LC medium contains, in addition to the compounds of Formula I and H, one or more compounds selected from the Formulae Y and B

Y

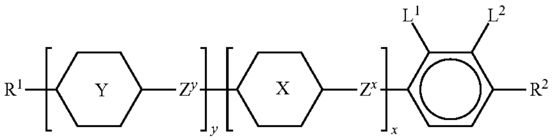

B

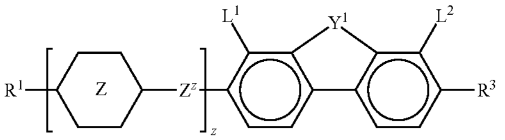

in which the individual radicals, on each occurrence identically or differently, and each, independently of one another, have the following meanings:

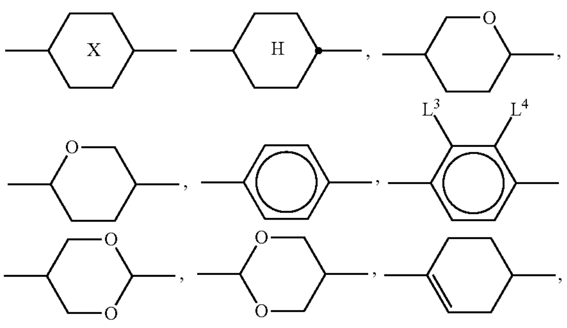

-continued

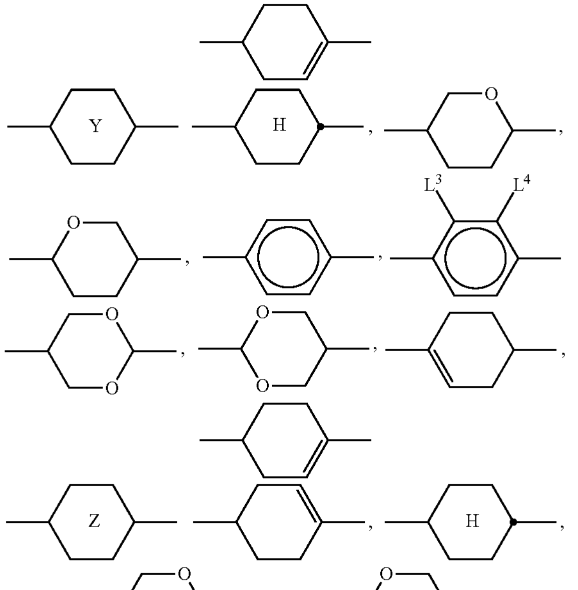

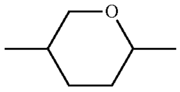

or

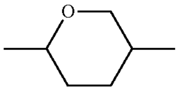

$R^1$, $R^2$ one of the meanings given for $R^1$ and $R^2$ in Formula I, $R^3$ one of the meanings given for $R^1$, $Z^x$, $Z^y$ —$CH_2CH_2$—, —CH═CH—, —$CF_2O$—, —$OCF_2$—, —$CH_2O$—, —$OCH_2$—, —CO—O—, —O—CO—, —$C_2F_4$—, —CF═CF—, —CH═CH—$CH_2O$—, or a single bond, preferably a single bond, $Z^z$ $CH_2O$ or a single bond, $Y^1$ O or S, $L^{1-4}$ H, F or Cl, preferably H or F, very preferably F, x, y 0, 1 or 2, with x+y≤3, z 0 or 1, wherein in Formula B the dibenzofuran or dibenzothiophene group may also be further substituted by a methyl or methoxy group, and wherein the compounds of Formula Y contain at least one substituent $L^{1-4}$ that is F or Cl, preferably F.

Preferably the LC medium according to this first preferred embodiment contains one or more compounds of Formula I and H, one or more compounds selected from Formulae Z1, Z2 and Z3, and one or more compounds selected from Formulae Y and B.

The LC media according to this first preferred embodiment are especially suitable for use in LC displays of the HB-FFS or PS-HB-FFS mode.

In a second preferred embodiment according to the present invention, the LC medium does not contain a compound of the Formulae Y or B.

In the compounds of Formula Y and its subformulae, $R^1$ and $R^2$ preferably denote straight-chain alkyl or alkoxy having 1 to 6 C atoms, furthermore alkenyl having 2 to 6 C atoms, in particular vinyl, 1E-propenyl, 1E-butenyl, 3-butenyl, 1E-pentenyl, 3E-pentenyl or 4-pentenyl.

In the compounds of Formula Y and its subformulae, preferably both radicals $L^1$ and $L^2$ denote F. In another preferred embodiment of the present invention, in the compounds of Formula Y and its subformulae one of the radicals $L^1$ and $L^2$ denotes F and the other denotes Cl.

In a preferred embodiment of the present invention the medium contains one or more compounds of Formula Y selected from the following subformulae

Y1

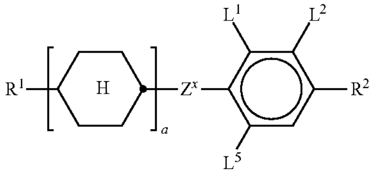

Y2

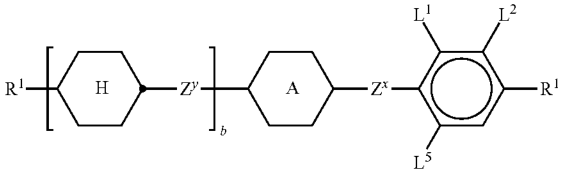

wherein $L^1$, $L^2$, $R^1$, $R^2$, $Z^x$, $Z^y$, x and y have the meanings given in Formula Y or one of the preferred meanings given above in Formula I, a denotes 1 or 2, b denotes 0 or 1,

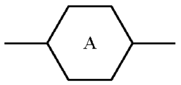

denotes

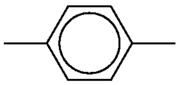

or

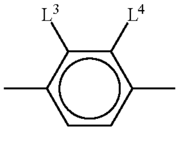

$L^3$, $L^4$ denote F or Cl, preferably F, and $L^5$ denotes a H atom or $CH_3$.

Preferably, in the compounds of Formula Y1 and Y2 both $L^1$ and $L^2$ denote F or one of $L^1$ and $L^2$ denotes F and the other denotes Cl, or both $L^3$ and $L^4$ denote F or one of $L^3$ and $L^4$ denotes F and the other denotes Cl.

Preferably the medium comprises one or more compounds of the Formula Y1 selected from the group consisting of the following subformulae

Y1-1

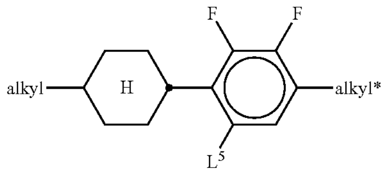

Y1-2

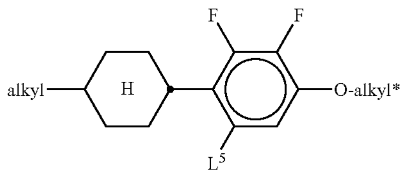

-continued
Y1-3
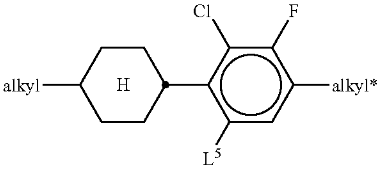
Y1-4
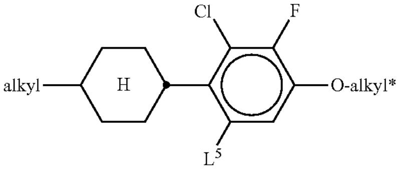
Y1-5
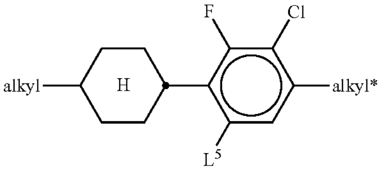
Y1-6
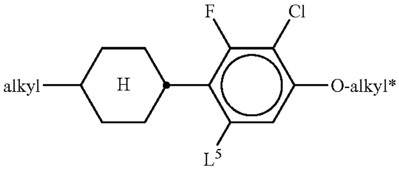
Y1-7
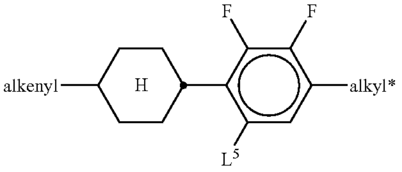
Y1-8
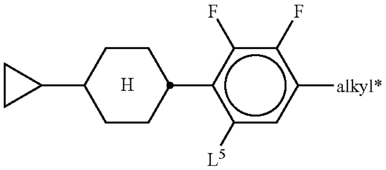
Y1-9
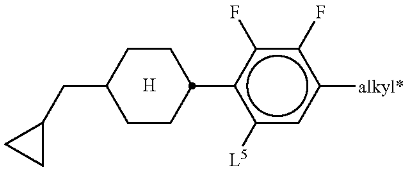
Y1-10
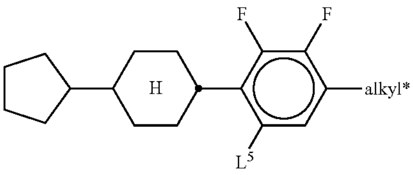
-continued
Y1-11
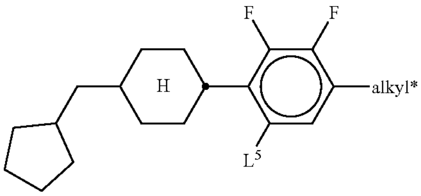
Y1-12
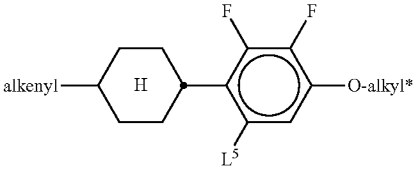
Y1-13
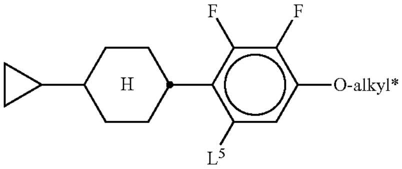
Y1-14
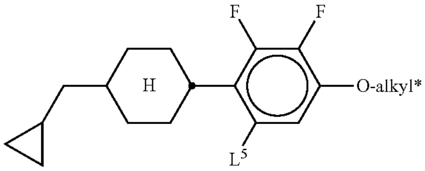
Y1-15
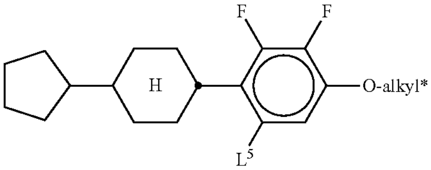
Y1-16
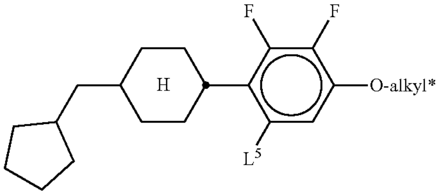
Y1-17
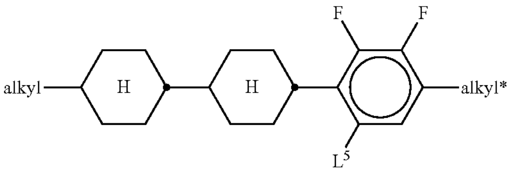
Y1-18
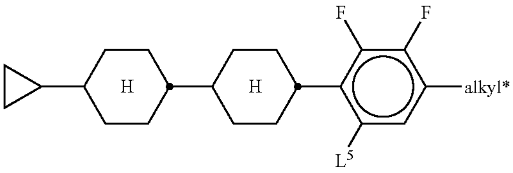

-continued
Y1-19
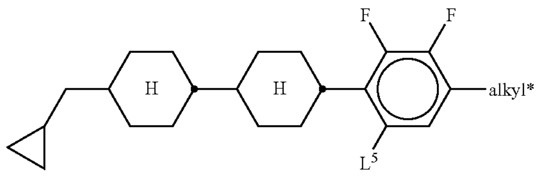
Y1-20
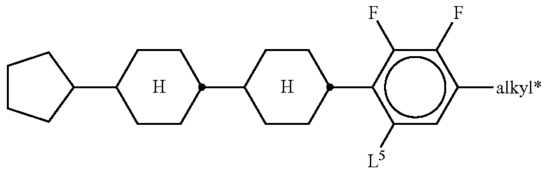
Y1-21
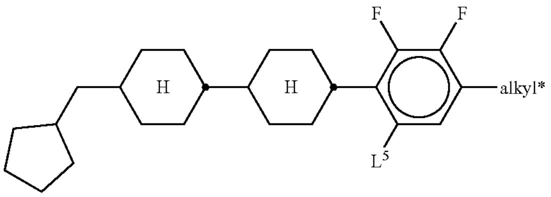
Y1-22
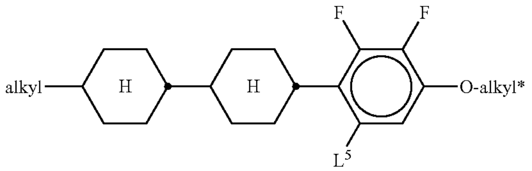
Y1-23
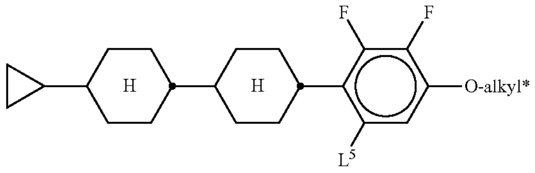
Y1-24
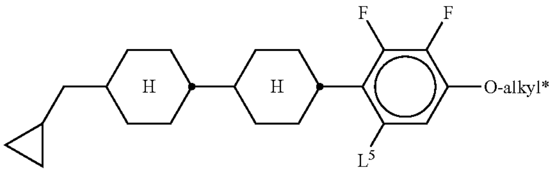
Y1-25
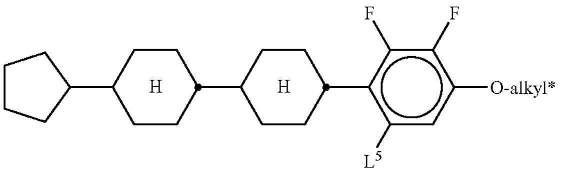
-continued
Y1-26
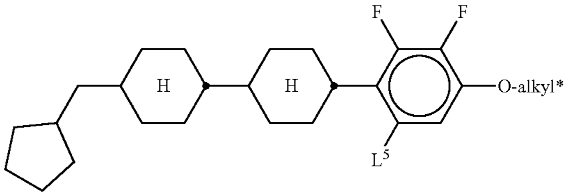
Y1-27
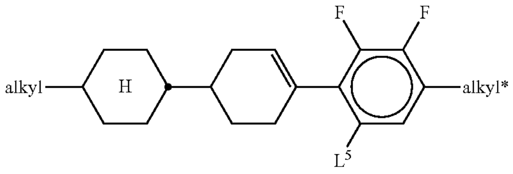
Y1-28
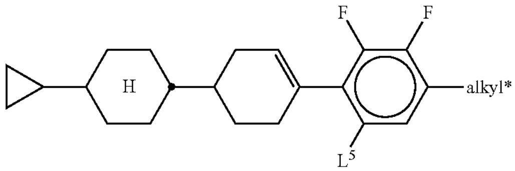
Y1-29
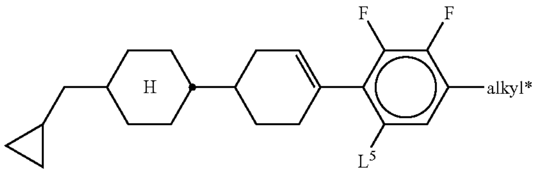
Y1-30
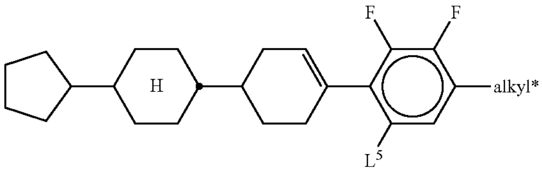
Y1-31
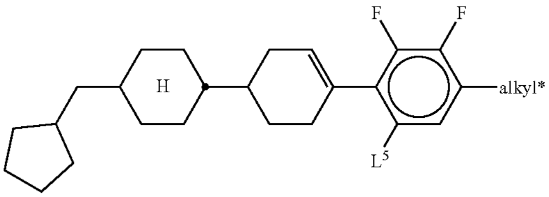
Y1-32
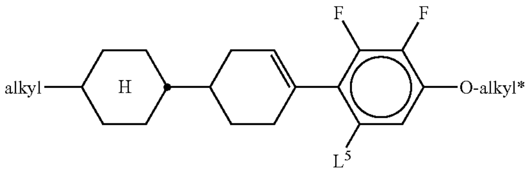

-continued
Y1-33
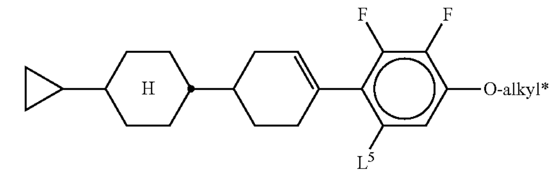
Y1-34
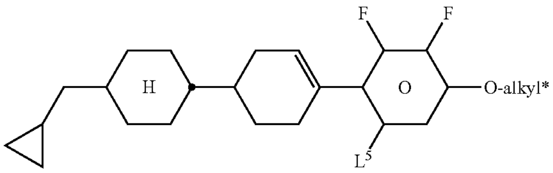
Y1-35
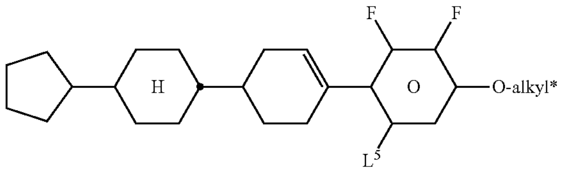
Y1-36
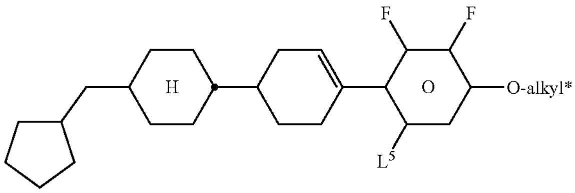
Y1-37
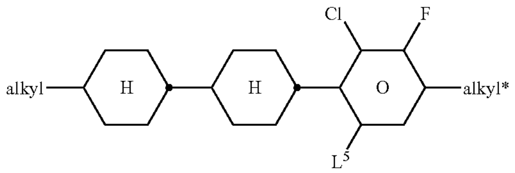
Y1-38
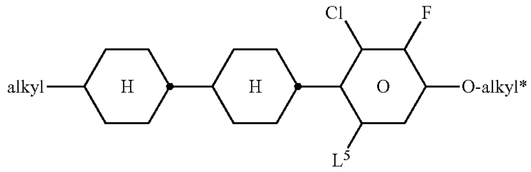
Y1-39
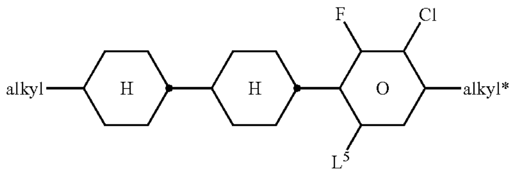
-continued
Y1-40
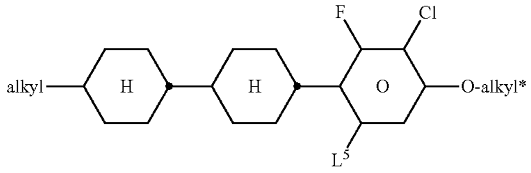
Y1-41
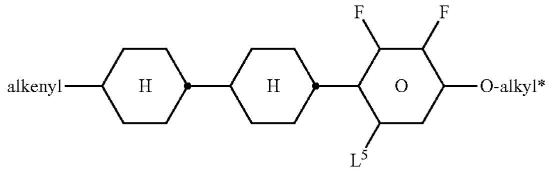
Y1-42
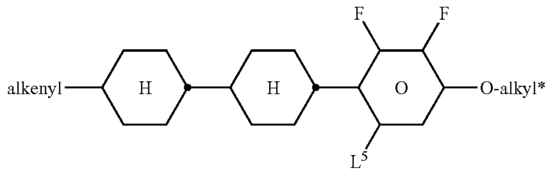
Y1-43
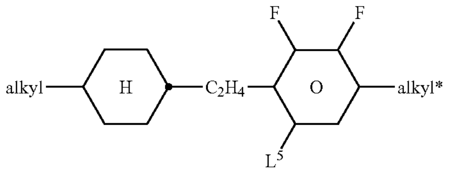
Y1-44
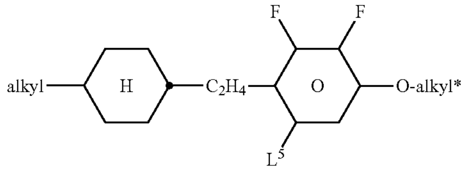
Y1-45
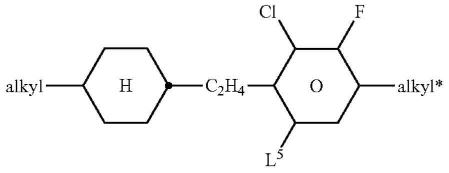
Y1-46
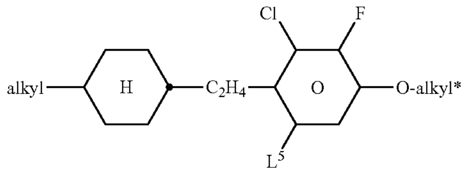
Y1-47
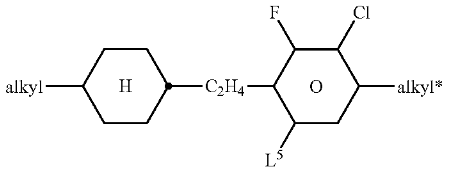

-continued
Y1-48
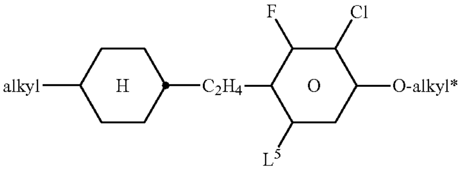
Y1-49
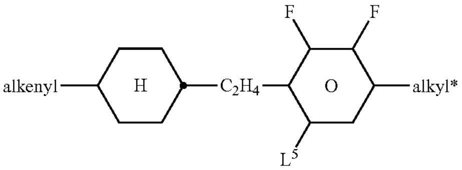
Y1-50
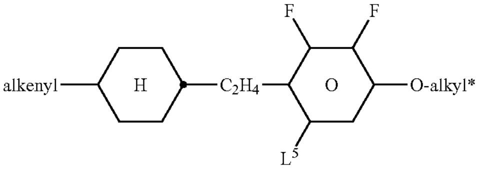
Y1-51
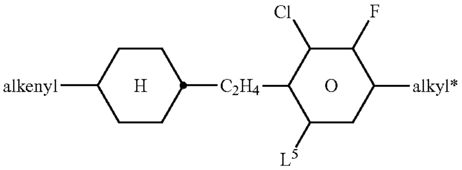
Y1-52
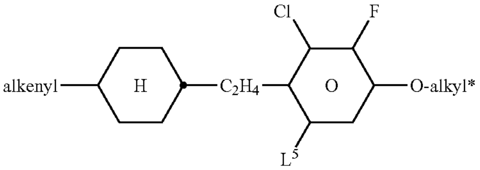
Y1-53
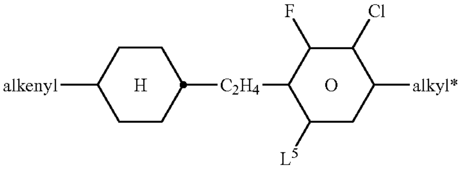
Y1-54
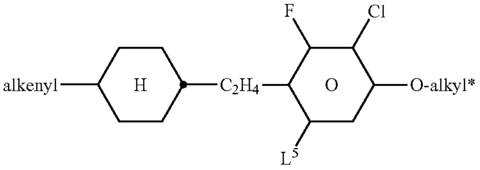
Y1-55
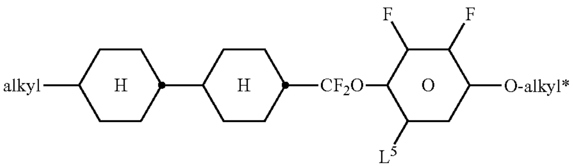
-continued
Y1-56
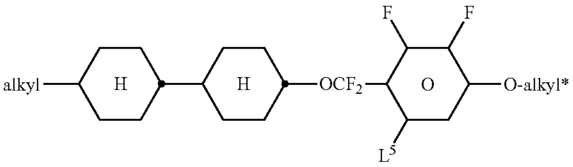
Y1-57
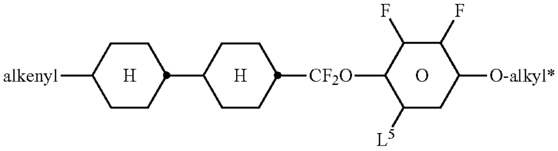
Y1-58
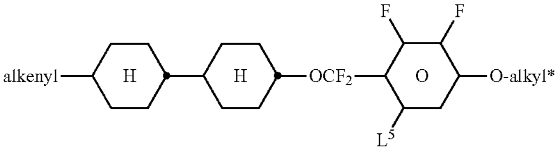
Y1-59
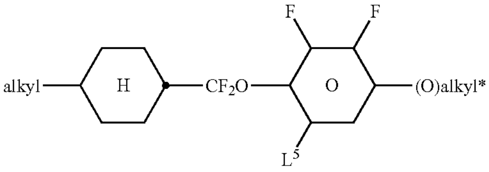
Y1-60
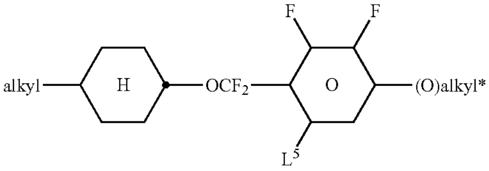
Y1-61
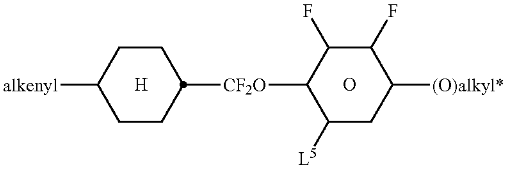
Y1-62
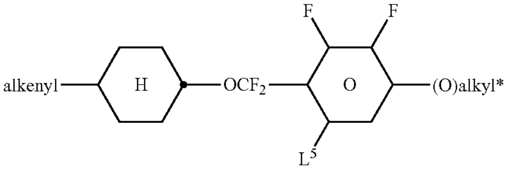
Y1-63
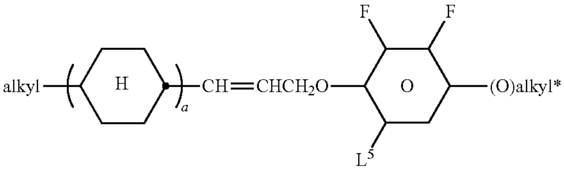

-continued

Y1-64

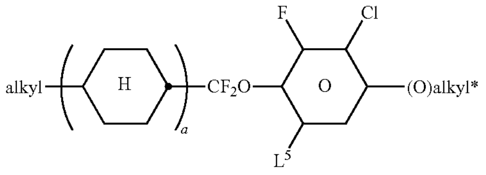

Y1-65

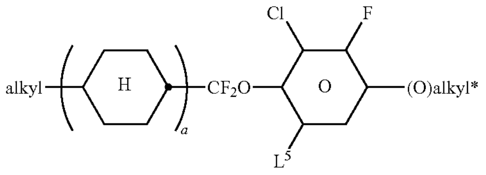

Y1-66

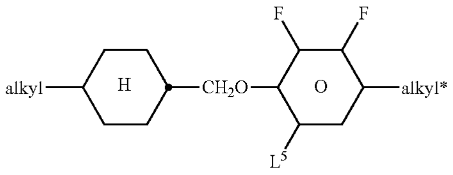

Y1-67

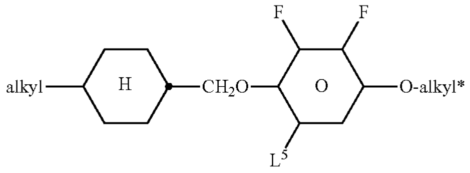

Y1-68

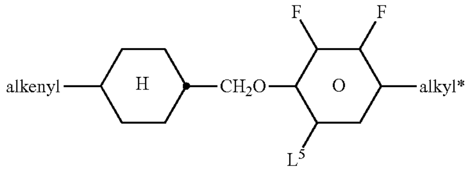

Y1-69

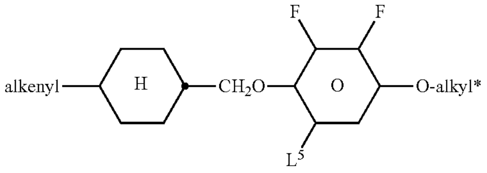

Y1-70

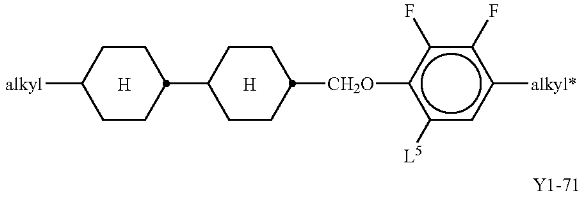

Y1-71

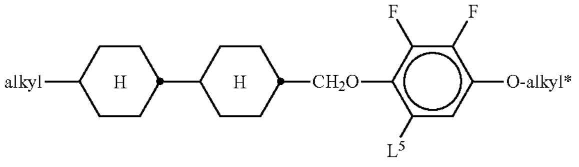

-continued

Y1-72

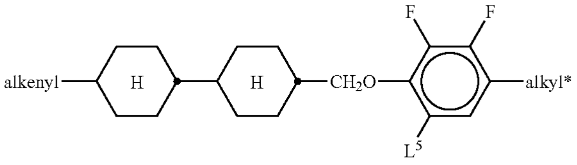

Y1-73

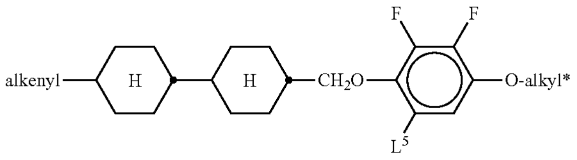

Y1-74

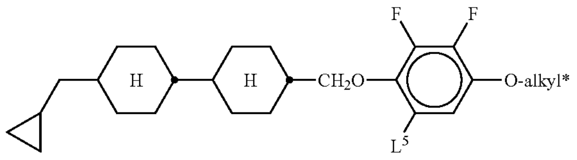

Y1-75

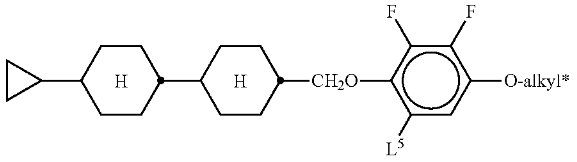

Y1-76

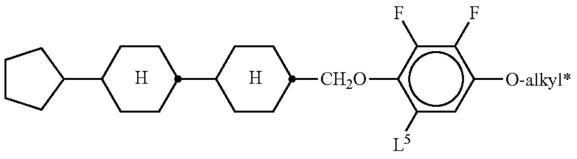

Y1-77

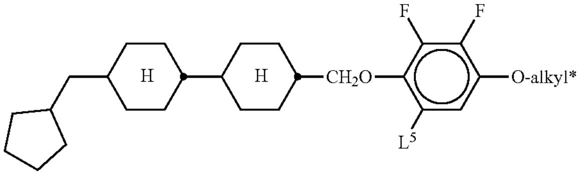

in which a denotes 1 or 2,

“alkyl” and “alky/*” each, independently of one another, denote a straight-chain alkyl radical having 1 to 6 C atoms, “alkenyl” denotes a straight-chain alkenyl radical having 2 to 6 C atoms, and $L^5$ denotes a H atom or $CH_3$.

“alkenyl” preferably denotes $CH_2{=}CH—$, $CH_2{=}CHCH_2CH_2—$, $CH_3—CH{=}CH—$, $CH_3—CH_2—CH{=}CH—$, $CH_3—(CH_2)_2—CH{=}CH—$, $CH_3—(CH_2)_3—CH{=}CH—$ or $CH_3—CH{=}CH—(CH_2)_2—$.

Very preferably the medium contains one or more compounds of Formula Y1 selected from Formulae Y1-1, Y1-2, Y1-7, Y1-12, Y1-17, Y1-22, Y1-40, Y1-41, Y1-42, Y1-44, Y1-50 and Y1-68. $L^5$ preferably denotes a H atom.

Further preferably the medium comprises one or more compounds of the Formula Y2 selected from the group consisting of the following subformulae:

Y2-1
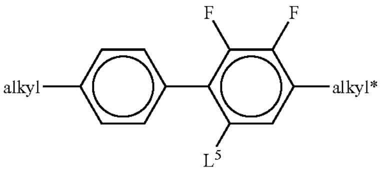
Y2-2
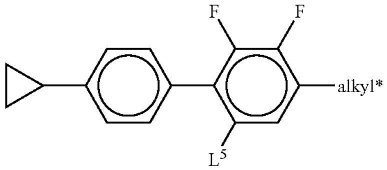
Y2-3
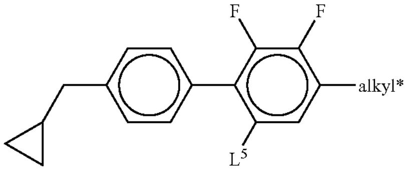
Y2-4
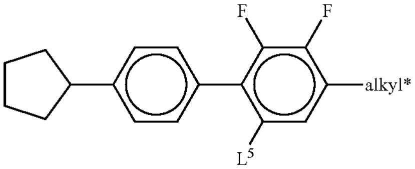
Y2-5
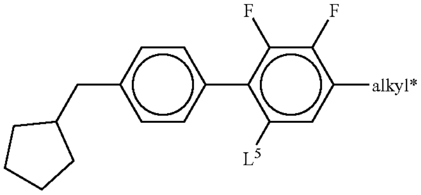
Y2-6
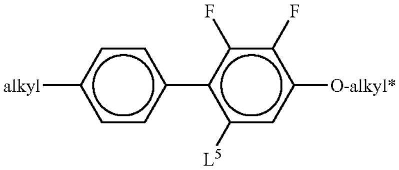
Y2-7
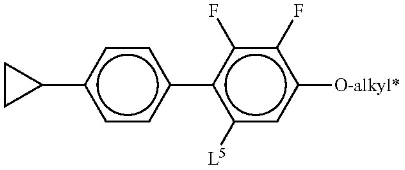
Y2-8
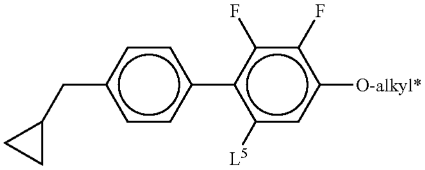
-continued
Y2-9
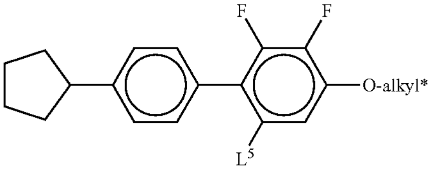
Y2-10
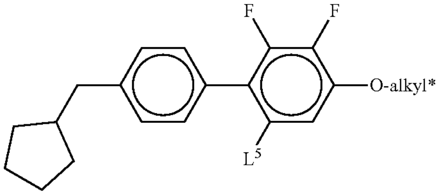
Y2-11
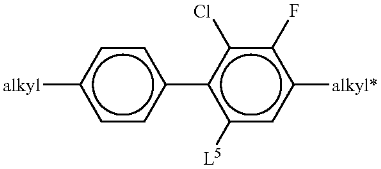
Y2-12
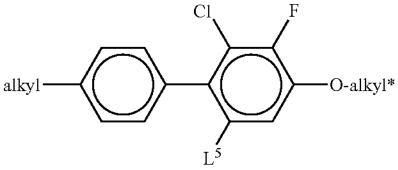
Y2-13
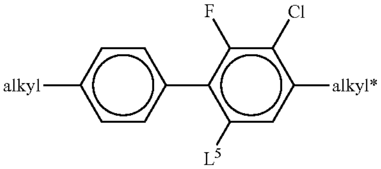
Y2-14
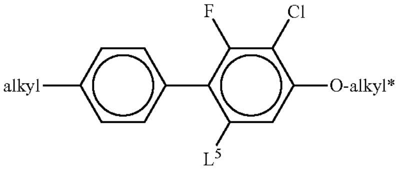
Y2-15
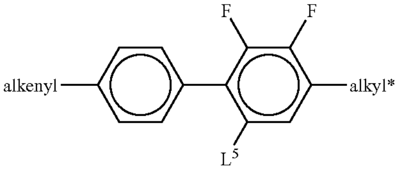
Y2-16
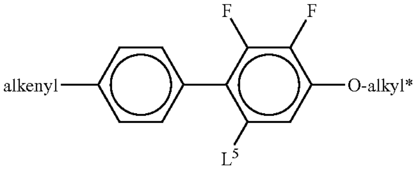

-continued
Y2-17
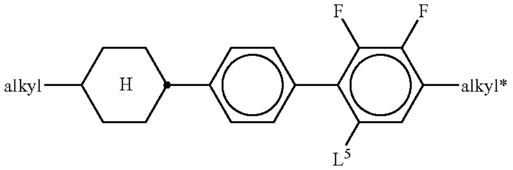
Y2-18
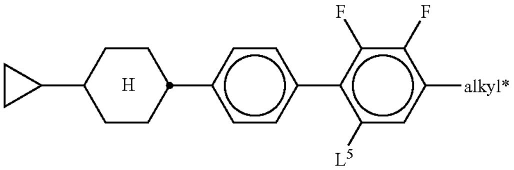
Y2-19
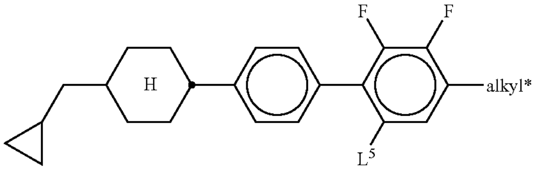
Y2-20
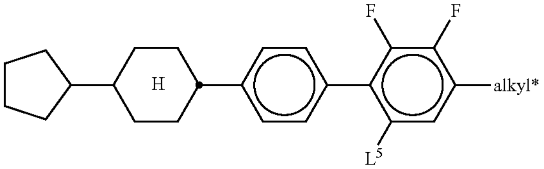
Y2-21
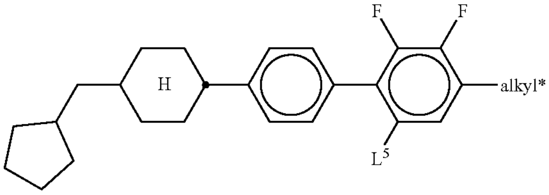
Y2-22
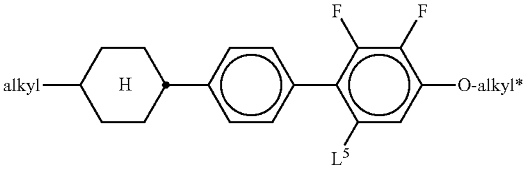
Y2-23
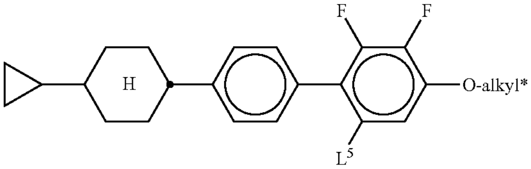
Y2-24
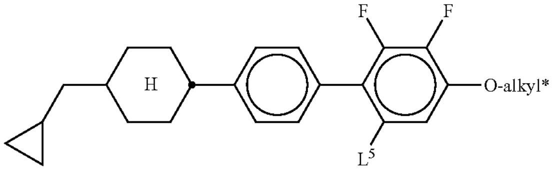
-continued
Y2-25
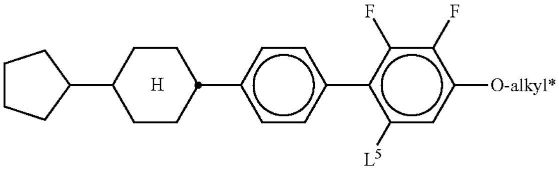
Y2-26
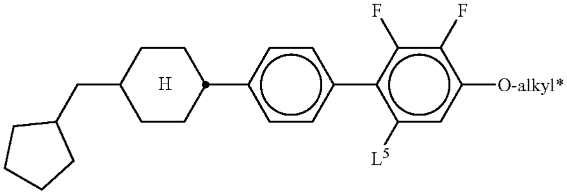
Y2-27
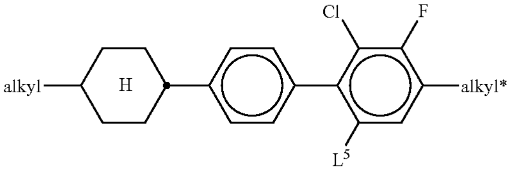
Y2-28
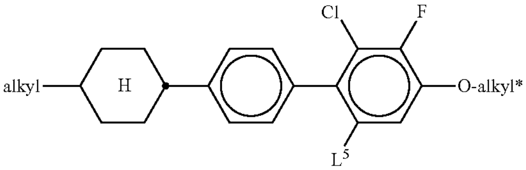
Y2-29
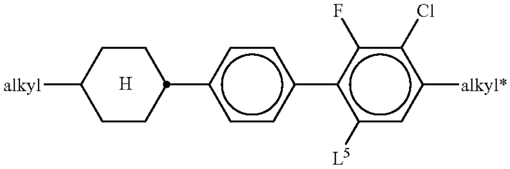
Y2-30
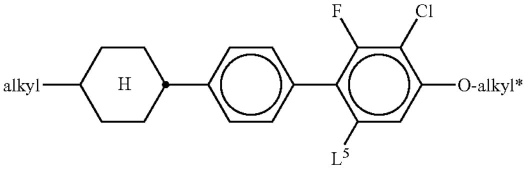
Y2-31
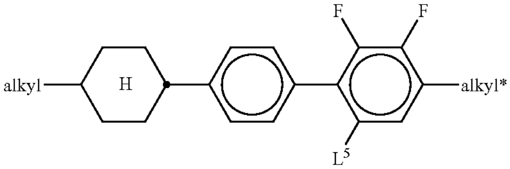

Y2-32

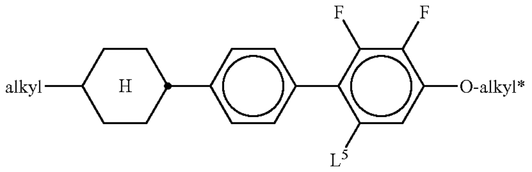

Y2-33

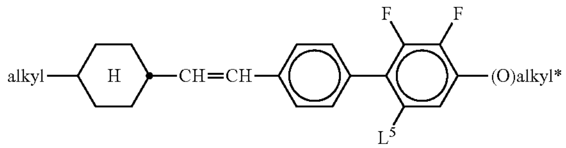

Y2-34

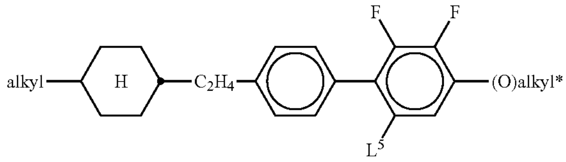

Y2-35

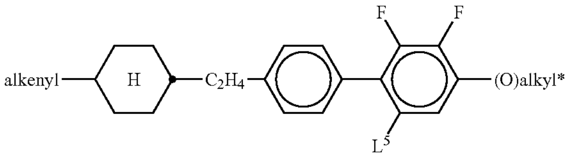

Y2-36

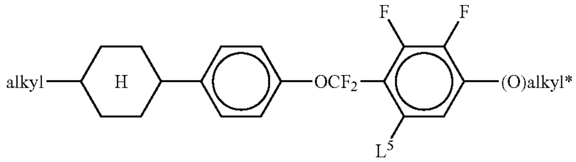

Y2-37

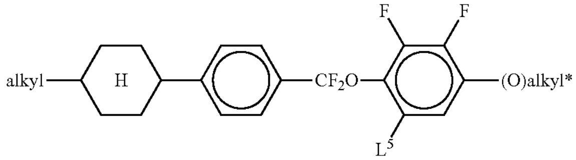

Y2-38

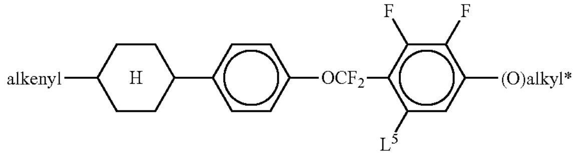

Y2-39

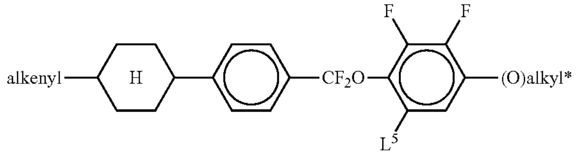

in which

"alkyl" and "alky/*" each, independently of one another, denote a straight-chain alkyl radical having 1 to 6 C atoms, and "alkenyl" denotes a straight-chain alkenyl radical having 2 to 6 C atoms, and (O) denotes an oxygen atom or a single bond, and $L^5$ denotes a H atom or $CH_3$, preferably a H atom.

"alkenyl" preferably denotes $CH_2{=}CH-$, $CH_2{=}CHCH_2CH_2-$, $CH_3-CH{=}CH-$, $CH_3-CH_2-CH{=}CH-$, $CH_3-(CH_2)_2-CH{=}CH-$, $CH_3-(CH_2)_3-CH{=}CH-$ or $CH_3-CH{=}CH-(CH_2)_2-$.

Very preferably the medium contains one or more compounds of Formula Y2 selected from Formulae Y2-2 and Y2-10.

The proportion of the compounds of Formula Y1 or its subformulae in the medium is preferably from 0 to 10% by weight.

The proportion of the compounds of Formula Y2 or its subformulae in the medium is preferably from 0 to 10% by weight.

The total proportion of the compounds of Formula Y1 and Y2 or their subformulae in the medium is preferably from 1 to 20%, very preferably from 2 to 15% by weight.

Preferably the medium contains 1, 2 or 3 compounds of Formula Y1 and Y2 or their subformulae, very preferably selected from Formulae Y1-2, Y1-22, Y1-66, Y1-70, Y2-6 and Y2-22.

In another preferred embodiment of the present invention the medium contains one or more compounds of Formula Y selected from the following subformula

Y3

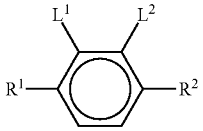

wherein $L^1$, $L^2$, $R^1$ and $R^2$ have one of the meanings given in Formula Y or one of the preferred meanings as given in Formulae I and its subformulae.

Preferred compounds of the Formula Y3 are selected from the group consisting of the following subformulae:

Y3-1

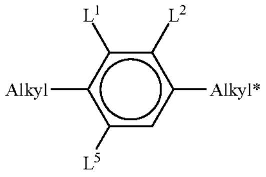

Y3-2

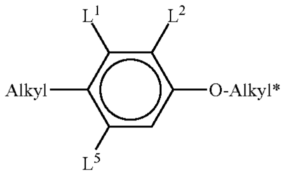

Y3-3

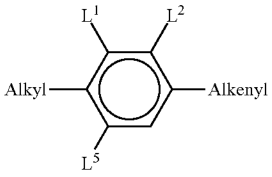

-continued

Y3-4

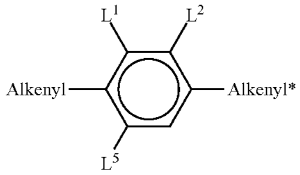

Y3-5

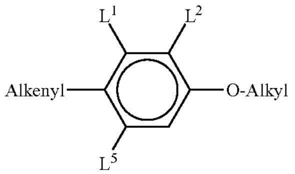

Y3-6

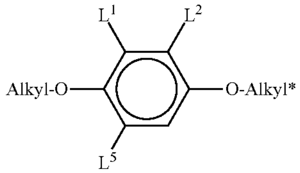

Y3-7

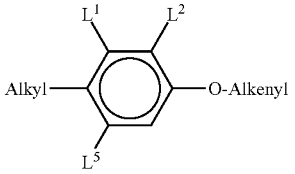

Y3-8

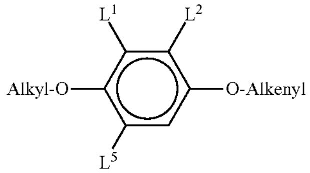

Y3-9

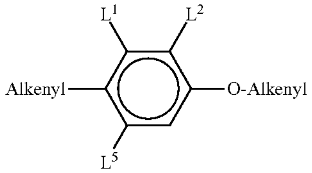

Y3-10

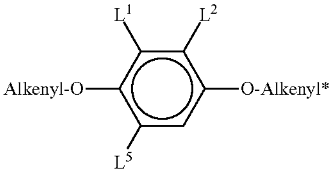

Y3-11

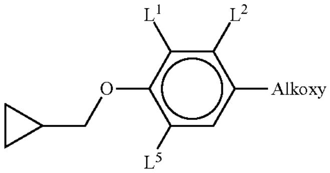

-continued

Y3-12

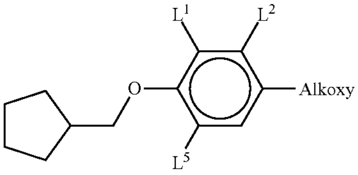

Y3-13

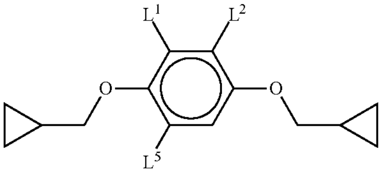

Y3-14

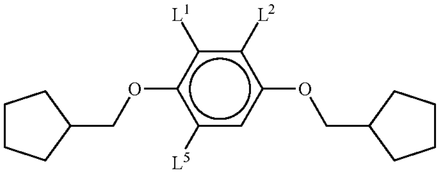

in which,

"Alkyl" and "Alkyl*" each, independently of one another, denote a straight-chain alkyl radical having 1 to 6 C atoms, "Alkenyl" and "Alkenyl*" each, independently of one another, denote a straight-chain alkenyl radical having 2 to 6 C atoms, "Alkoxy" denotes a straight-chain alkoxy having 1 to 6 C atoms, and O denotes an oxygen atom or a single bond.

"Alkenyl" and "Alkenyl*" preferably denote $CH_2{=}CH-$, $CH_2{=}CHCH_2CH_2-$, $CH_3-CH{=}CH-$, $CH_3-CH_2-CH{=}CH-$, $CH_3-(CH_2)_2-CH{=}CH-$, $CH_3-(CH_2)_3-CH{=}CH-$ or $CH_3-CH{=}CH-(CH_2)_2-$.

Particularly preferred compounds of the Formula Y3 are selected from the group consisting of following subformulae:

Y3-6A

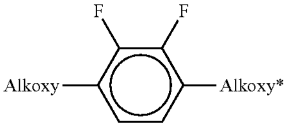

Y3-6B

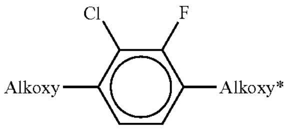

wherein "Alkoxy" and "Alkoxy*" each, independently of one another, preferably denote straight-chain alkoxy with 3, 4, or 5 C atoms.

Preferably in the compounds of Formula Y3 and its subformulae both $L^1$ and $L^2$ denote F. Further preferably in the compounds of Formula Y3 one of the radicals $L^1$ and $L^2$ denotes F and the other denotes Cl.

The proportion of the compounds of Formula Y3 or its subformulae in the medium is preferably from 1 to 10%, very preferably from 1 to 6% by weight.

Preferably the medium contains 1, 2 or 3 compounds of Formula Y3 or its subformulae, preferably of Formula Y3-6, very preferably of Formula Y3-6A.

In another preferred embodiment the present invention the medium contains one or more compounds of Formula Y selected from the subformula Y4

Y4

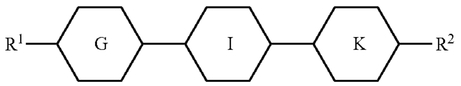

in which $R^1$ and $R^2$ each, independently of one another, have one of the meanings indicated above in Formula Y, and

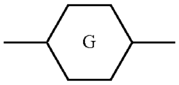
,
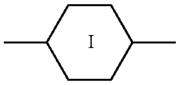
and
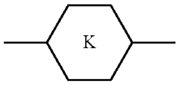

each, independently of one another, denote

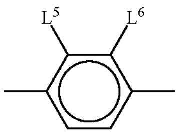
,
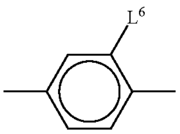
,
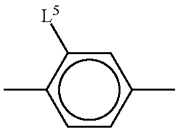
or
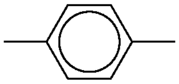

in which $L^5$ denotes F or Cl, preferably F, and $L^6$ denotes F, Cl, $OCF_3$, $CF_3$, $CH_3$, $CH_2F$ or $CHF_2$, preferably F, and preferably at least one of the rings G, I and K is different from unsubstituted benzene.

Preferred compounds of the Formula Y4 are selected from the group consisting of the following subformulae:

Y4-1

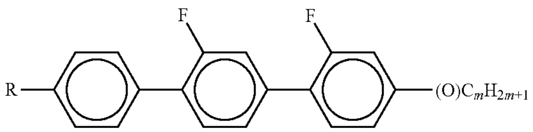

Y4-2

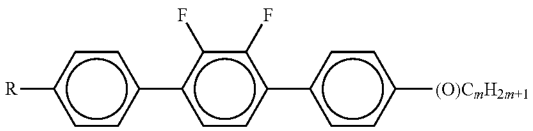

-continued

Y4-3

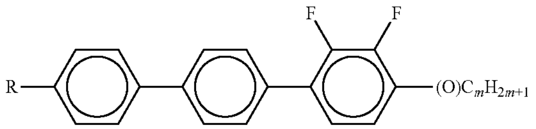

Y4-4

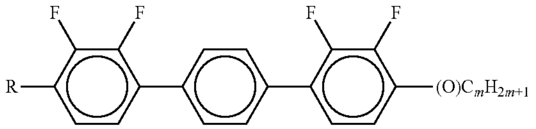

Y4-5

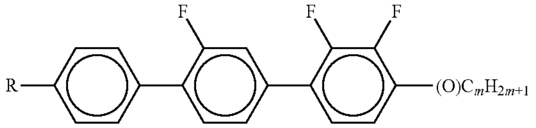

Y4-6

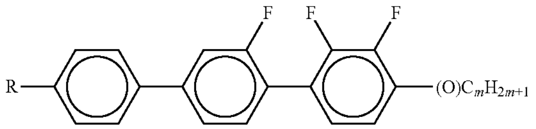

Y4-7

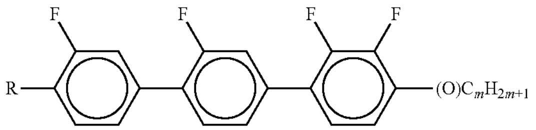

Y4-8

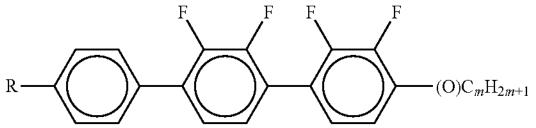

Y4-9

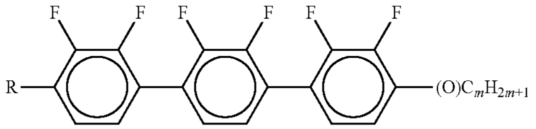

Y4-10

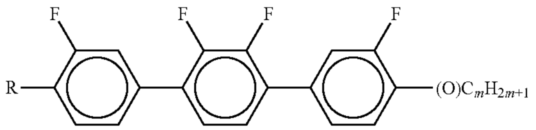

Y4-11

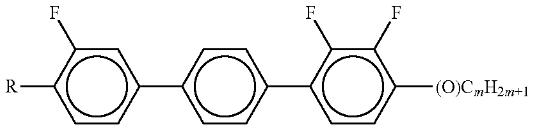

Y4-12

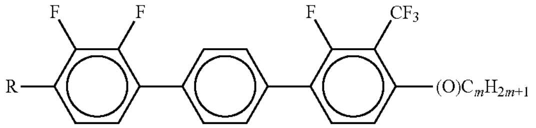

-continued

Y4-13

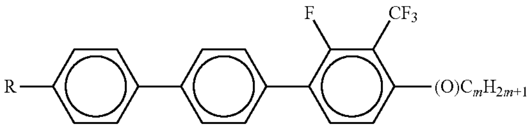

Y4-14

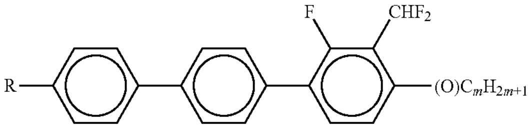

Y4-15

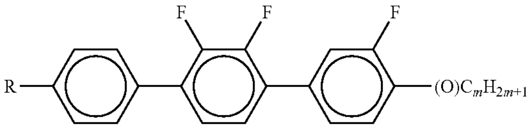

Y4-16

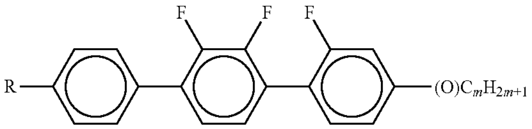

Y4-17

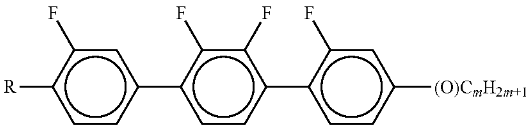

Y4-18

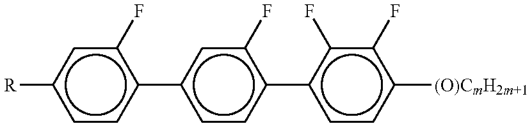

Y4-19

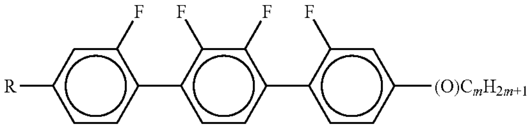

Y4-20

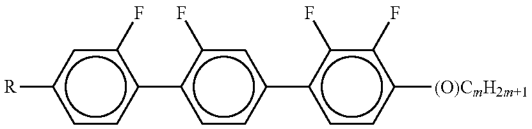

in which

R denotes a straight-chain alkyl or alkoxy radical having 1 to 7 C atoms,

R* denotes a straight-chain alkenyl radical having 2 to 7 C atoms, (O) denotes an oxygen atom or a single bond, and m denotes an integer from 1 to 6.

R* preferably denotes $CH_2{=}CH-$, $CH_2{=}CHCH_2CH_2-$, $CH_3-CH{=}CH-$, $CH_3-CH_2-CH{=}CH-$, $CH_3-(CH_2)_2-CH{=}CH-$, $CH_3-(CH_2)_3-CH{=}CH-$ or $CH_3-CH{=}CH-(CH_2)_2-$.

R preferably denotes methyl, ethyl, propyl, butyl, pentyl, hexyl, methoxy, ethoxy, propoxy, butoxy or pentoxy.

The proportion of the compounds of Formula Y4 or its subformulae in the medium is preferably from 1 to 10%, very preferably from 1 to 6% by weight.

Particularly preferred compounds are those of the subformulae

Y4-2a

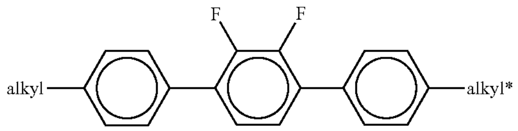

in which alkyl and alkyl* each, independently of one another, denote a straight-chain alkyl radical having 1 to 6 C atoms, in particular ethyl, propyl or pentyl.

Use of the following compounds is particularly advantageous:

Y4-2b

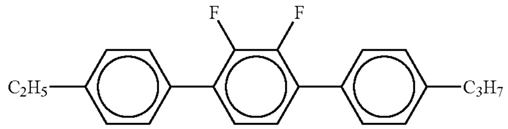

Y4-2c

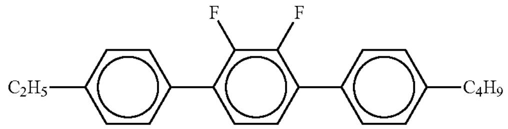

In another preferred embodiment the present invention the medium contains one or more compounds of Formula Y selected from the group consisting of the following subformulae

Y5

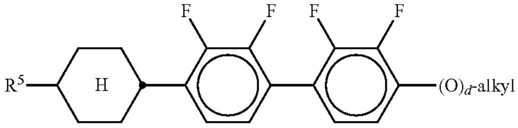

Y6

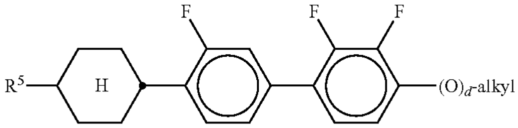

Y7

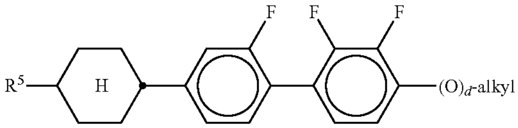

Y8

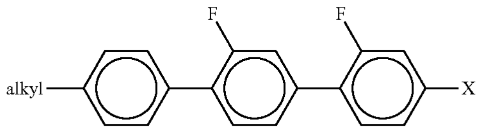

-continued

Y9

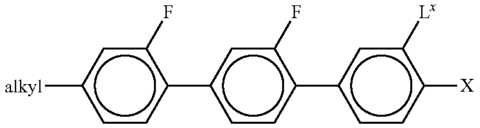

Y10

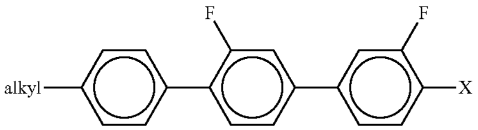

Y11

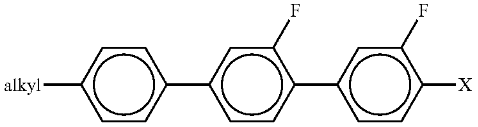

in which $R^5$ has one of the meanings indicated above in Formula Y for $R^1$, "alkyl" denotes a straight-chain alkyl radical having 1 to 6 C atoms, $L^x$ denotes H or F, X denotes F, Cl, $OCF_3$, $OCHF_2$ or $OCH{=}CF_2$, d denotes 0 or 1, and z and m each, independently of one another, denote an integer from 1 to 6.

$R^5$ in these compounds is particularly preferably $C_{2-6}$-alkyl or -alkoxy or $C_{2-6}$-alkenyl, d is preferably 1. X in these compounds is particularly preferably F. The LC medium according to the invention preferably comprises one or more compounds of the above-mentioned formulae in amounts of ≥5% by weight.

In the compounds of Formula B and its subformulae, $R^1$ and $R^3$ preferably denote straight-chain alkyl or alkoxy having 1 to 6 C atoms, in particular methoxy, ethoxy, propoxy or butoxy, furthermore alkenyl having 2 to 6 C atoms, in particular vinyl, 1E-propenyl, 1E-butenyl, 3-butenyl, 1E-pentenyl, 3E-pentenyl or 4-pentenyl.

In a preferred embodiment of the present invention the medium contains one or more compounds of Formula B selected from the following subformulae

B1

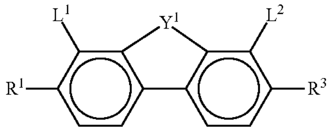

B2

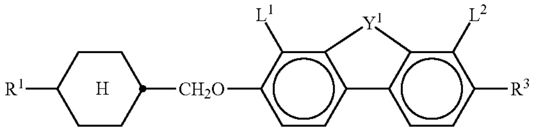

wherein $L^1$, $L^2$, $R^1$, $R^3$ and $Y^1$ have the meanings given in Formula B.

Preferred compounds of Formula B1 are selected from the following subformulae:

B1-1

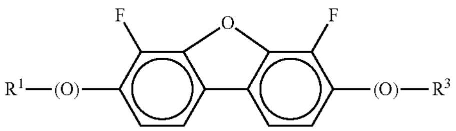

-continued

B1-2

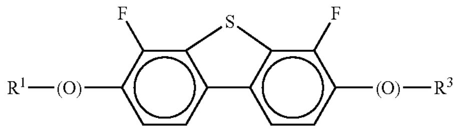

wherein $R^1$ and $R^3$ independently denote a straight-chain alkyl radical having 1 to 6 C atoms, in which one or more $CH_2$ groups are optionally substituted by —C≡C—, —$CF_2$O—, —O$CF_2$—, —CH═CH—,

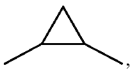,
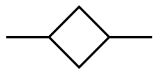,
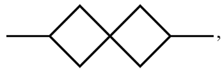,
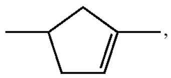,
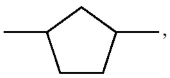,

—O—, —CO—O— or —O—CO— in such a way that O atoms are not linked directly to one another, and in which one or more H atoms may be replaced by a halogen atom. Very preferred are compounds of Formula B1-1 and B1-2 wherein both groups (O) denote an oxygen atom and $R^1$ and $R^3$ independently denote an alkyl group being methyl, ethyl, propyl, butyl, pentyl or hexyl, which are preferably straight-chained. Very preferably one "alkyl" is ethyl and the other "alkyl" is n-pentyl.

Very preferred are compounds of Formula B1-2.

Preferably, the compounds of the Formula B1-1 are selected from the group of compounds of Formulae B1-1-1 to B1-1-11, preferably of Formula B1-1-6,

B1-1-1

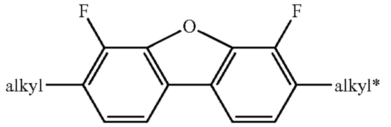

B1-1-2

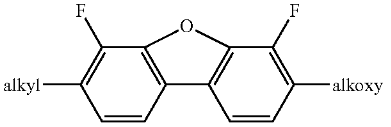

B1-1-3

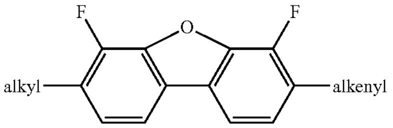

B1-1-4

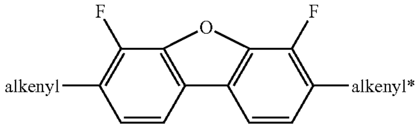

B1-1-5

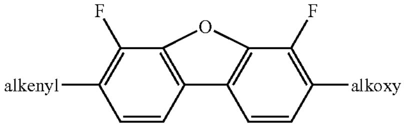

-continued

B1-1-6

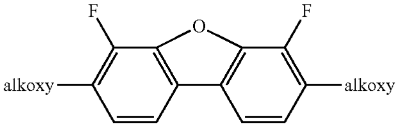

B1-1-7

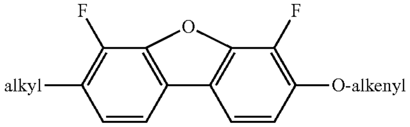

B1-1-8

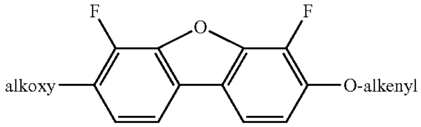

B1-1-9

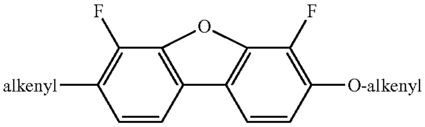

B1-1-10

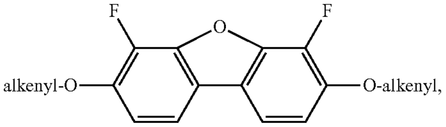

in which alkyl and alkyl* each, independently of one another, denote a straight-chain alkyl radical having 1 to 6 C atoms, alkenyl and alkenyl* each, independently of one another, denote a straight-chain alkenyl radical having 2 to 6 C atoms, alkoxy and alkoxy* each, independently of one another, denote a straight-chain alkoxy radical having 1 to 6 C atoms.

Preferably, the compounds of the Formula B1-2 are selected from the group of compounds of Formulae B1-2-1 to B1-2-10, preferably of Formula B1-2-6,

B1-2-1

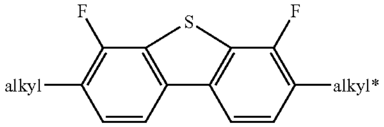

B1-2-2

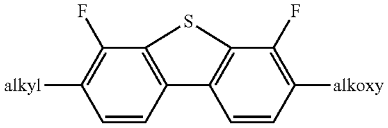

B1-2-3

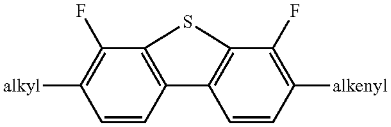

-continued

B1-2-4

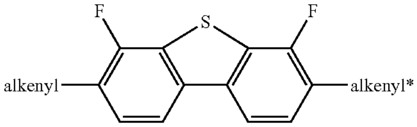

B1-2-5

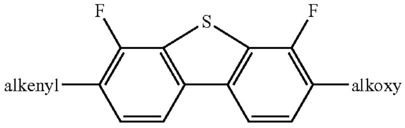

B1-2-6

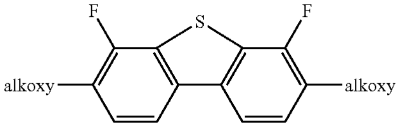

B1-2-7

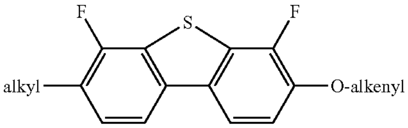

B1-2-8

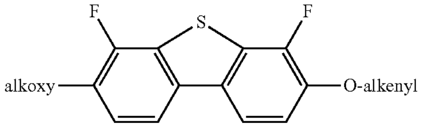

B1-2-9

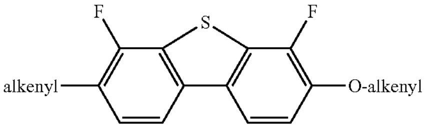

B1-2-10

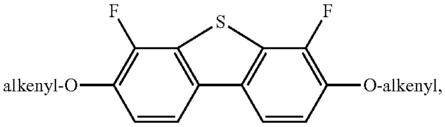

in which alkyl and alkyl* each, independently of one another, denote a straight-chain alkyl radical having 1 to 6 C atoms, alkenyl and alkenyl* each, independently of one another, denote a straight-chain alkenyl radical having 2 to 6 C atoms, alkoxy and alkoxy* each, independently of one another, denote a straight-chain alkoxy radical having 1 to 6 C atoms.

Optionally the medium comprises one or more compounds of the Formula B1-1A and/or B1-2A

B1-1A

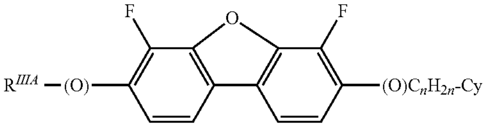

-continued

B1-2A

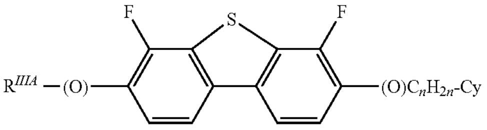

in which (O) denotes O or a single bond, $R^{IIIA}$ denotes alkyl or alkenyl having up to 7 C atoms or a group Cy-$C_mH_{2m+1}$—, m and n are, identically or differently, 0, 1, 2, 3, 4, 5 or 6, preferably 1, 2 or 3, very preferably 1, Cy denotes a cycloaliphatic group having 3, 4 or 5 ring atoms, which is optionally substituted with alkyl or alkenyl each having up to 3 C atoms, or with halogen or CN, and preferably denotes cyclopropyl, cyclobutyl or cyclopentyl.

The compounds of Formulae B1-1A and/or B1-2A are contained in the medium either alternatively or in addition to the compounds of Formulae B1-1 and B1-2, preferably additionally.

Very preferred compounds of the Formulae B1-1A and/or B1-2A are the following:

B1-1A-1

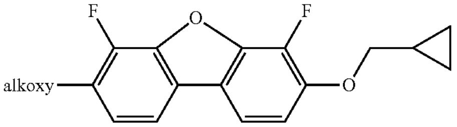

B1-1A-2

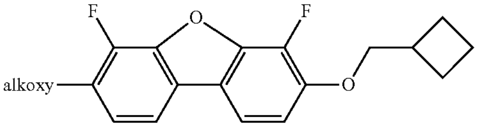

B1-1A-3

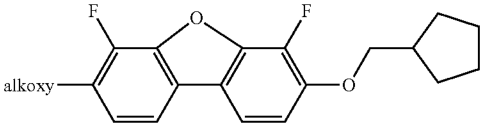

B1-2A-1

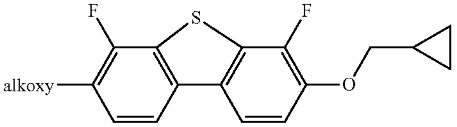

B1-2A-2

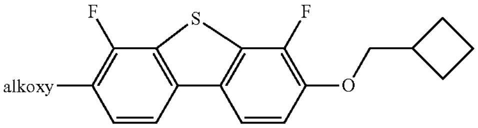

B1-2A-3

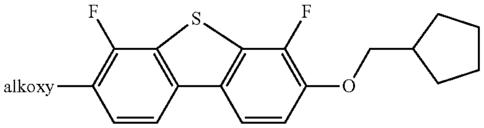

in which alkoxy denotes a straight-chain alkoxy radical having 1 to 6 C atoms or alternatively —$(CH_2)_nF$ in which n is 2,3,4, or 5, preferably $C_2H_4F$.

The proportion of the compounds of Formula B1 or its subformulae in the medium is preferably from 1 to 20%, very preferably from 1 to 15% by weight.

Preferably the medium contains 1, 2 or 3 compounds of Formula B1 or its subformulae.

In a preferred embodiment of the present invention, the medium may comprise one or more compounds of Formula B2-2

B2-2

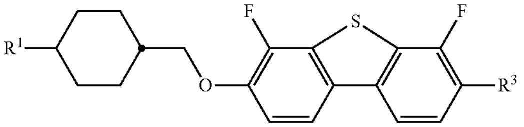

in which $R^1$, $R^3$ identically or differently, denote H, an alkyl or alkoxy radical having 1 to 6 C atoms, in which one or more $CH_2$ groups in these radicals are optionally replaced, independently of one another, by —C≡C—, —$CF_2O$—, —$OCF_2$—, —CH=CH—,

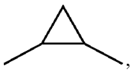, 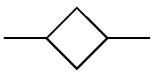, 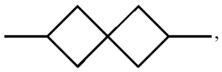, 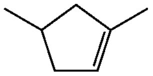, 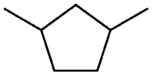,

—O—, —CO—O— or —O—CO— in such a way that O atoms are not linked directly to one another, and in which, in addition, one or more H atoms may be replaced by halogen.

The compounds of Formula B2-2 are preferably selected from the group of compounds of the Formulae B2-2-1 to B2-2-10:

B2-2-1

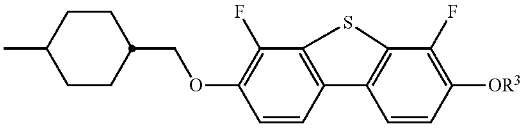

B2-2-2

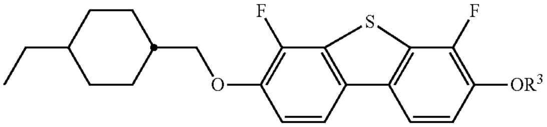

B2-2-3

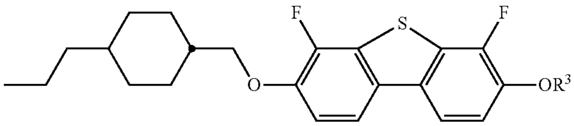

-continued

B2-2-4

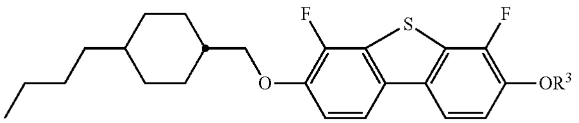

B2-2-5

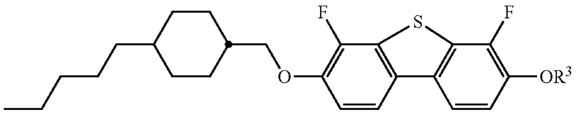

B2-2-6

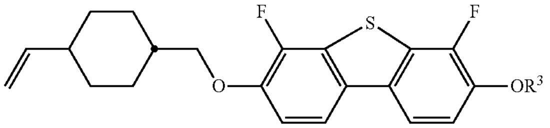

B2-2-7

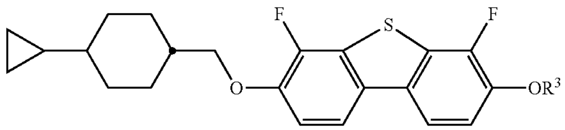

B2-2-8

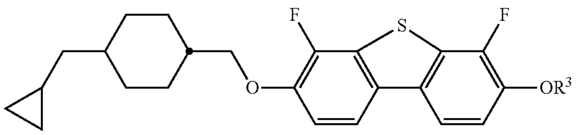

B2-2-9

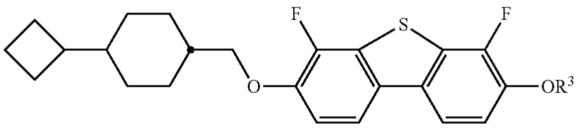

B2-2-10

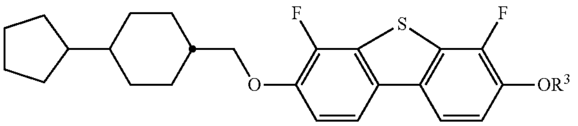

in which $R^3$ denotes alkyl having 1 to 6 C atoms, preferably ethyl, n-propyl or n-butyl, or alternatively cyclopropylmethyl, cyclobutylmethyl or cyclopentylmethyl or alternatively —$(CH_2)_nF$ in which n is 2,3,4, or 5, preferably $C_2H_4F$.

Particularly preferred compounds of Formula B2 are selected from the following subformulae:

B2-2-11

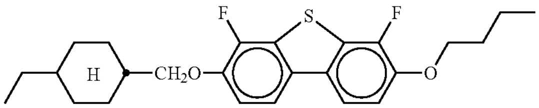

-continued

B2-2-12

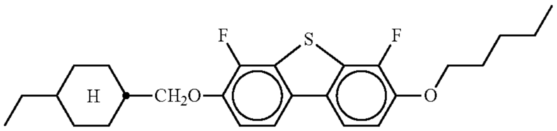

B2-2-13

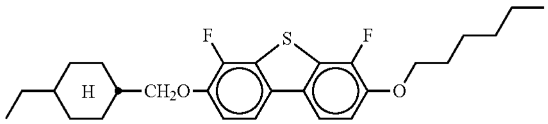

The proportion of the compounds of Formula B2 or its subformulae in the medium is preferably from 1 to 20%, very preferably from 1 to 15% by weight.

Preferably the LC medium contains 1, 2 or 3 compounds of Formula B2 or its subformulae.

Preferred compounds of Formula B3 are selected from the following subformulae:

B3-1

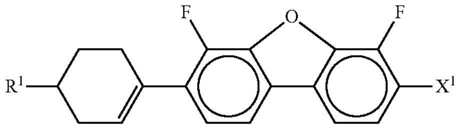

B3-2

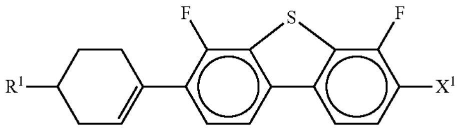

wherein $R^1$ has one of the meanings given in Formula B3 and preferably denotes straight-chain alkyl having 1 to 6 C atoms, very preferably methyl, ethyl, propyl, butyl, pentyl or hexyl, more preferably ethyl or propyl, most preferably propyl, and $X^1$ has one of the meanings given in Formula B3 and preferably denotes $CF_3$ or $OCF_3$.

Preferred compounds of Formula B3 are selected from the following subformulae:

B3-1-1

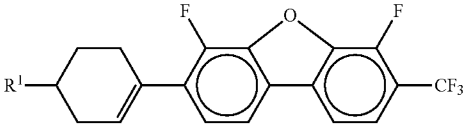

B3-1-2

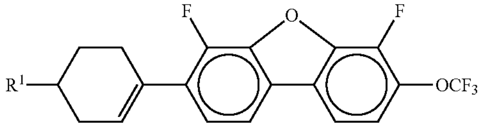

B3-2-1

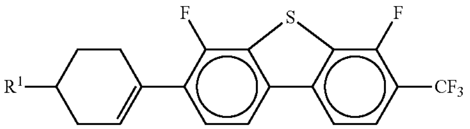

-continued

B3-2-2

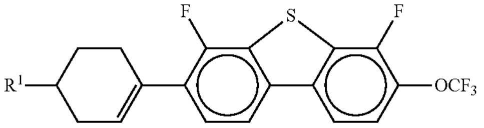

wherein $R^1$ has one of the meanings given in Formula B3 and preferably denotes straight-chain alkyl having 1 to 6 C atoms, very preferably methyl, ethyl, propyl, butyl, pentyl or hexyl, more preferably ethyl or propyl, most preferably propyl.

Most preferred are compounds of Formulae B3-1-1 and B3-2-2.

In a preferred embodiment the medium contains one or more compounds of Formula B or its subformulae B1, B2, B3, B1-1, B1-2, B2-1, B2-2, B2-3, B3-1, B3-2, B3-1-1, B3-1-2, B3-2-1 and B3-2-2 wherein the dibenzofuran or dibenzothiophene group is substituted by a methyl or methoxy group, preferably by a methyl group, preferably in p-position to the substituent F, very preferably in p-position to the substituent F (i.e. in m-position to the terminal group $R^2$ or $X^1$).

The proportion of the compounds of Formula B3 or its subformulae in the LC medium is preferably from 1 to 20%, very preferably from 1 to 10% by weight.

Preferably the LC medium contains 1, 2 or 3 compounds of Formula B3 or its subformulae.

Preferably the total proportion of compounds of Formula Y and B or their subformulae in the medium is from 2 to 25%, very preferably from 3 to 20% by weight.

Further preferred embodiments are indicated below:

The medium comprises one or more compounds of Formula Y selected from the following subformula

LY

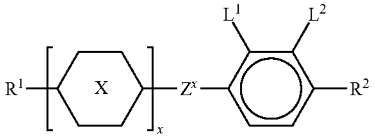

wherein $R^1$, $R^2$, $L^1$, $L^2$, X, x and $Z^x$ have the meanings given in Formula Y, and wherein at least one of the rings X is cyclohexenylene.

Preferably, both radicals $L^1$ and $L^2$ denote F. Further preferably one of the radicals $L^1$ and $L^2$ denotes F and the other denotes Cl.

The compounds of the Formula LY are preferably selected from the group consisting of the following subformulae:

LY1

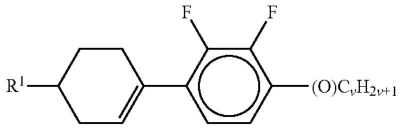

LY2

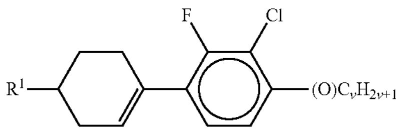

-continued

LY3

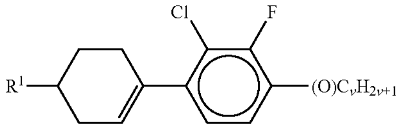

LY4

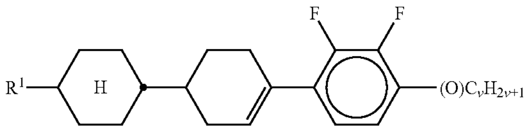

LY5

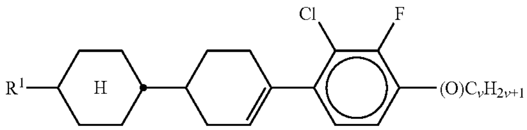

LY6

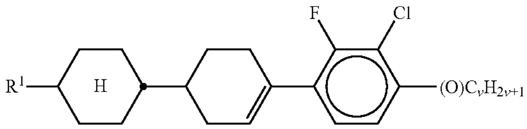

LY7

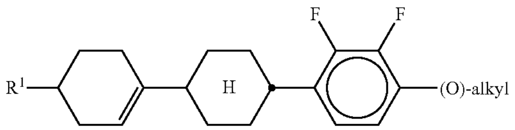

LY8

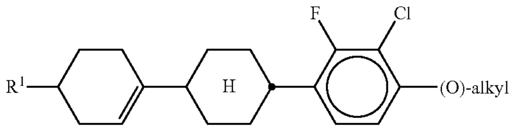

in which $R^1$ has the meaning indicated in Formula Y above, (O) denotes an oxygen atom or a single bond, and v denotes an integer from 1 to 6. $R^1$ preferably denotes straight-chain alkyl having 1 to 6 C atoms or straight-chain alkenyl having 2 to 6 C atoms, in particular $CH_3$, $C_2H_5$, n-$C_3H_7$, n-$C_4H_9$, n-$C_5H_{11}$, $CH_2{=}CH{-}$, $CH_2{=}CHCH_2CH_2{-}$, $CH_3{-}CH{=}CH{-}$, $CH_3{-}CH_2{-}CH{=}CH{-}$, $CH_3{-}(CH_2)_2{-}CH{=}CH{-}$, $CH_3{-}(CH_2)_3{-}CH{=}CH{-}$ or $CH_3{-}CH{=}CH{-}(CH_2)_2{-}$.

Very preferred are compounds of Formula LY4.

Preferably the medium contains 1, 2 or 3 compounds of Formula LY, very preferably of Formula LY4.

The proportion of the compounds of Formula LY or its subformulae in the medium is preferably from 1 to 10% by weight.

The medium comprises one or more compounds of Formula Y selected from the following subformula

AY

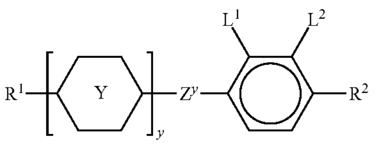

wherein $R^1$, $R^2$, $L^1$, $L^2$, Y, y and $Z^y$ have the meanings given in Formula Y, and wherein at least one of the rings Y is tetrahydropyrane.

The compounds of the Formula AY are preferably selected from the group consisting of the following subformulae:

AY1

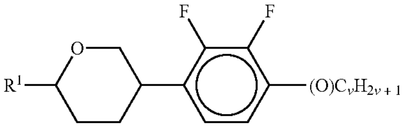

AY2

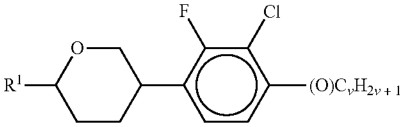

AY3

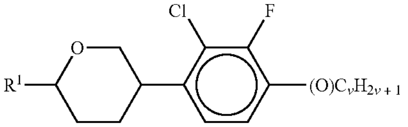

AY4

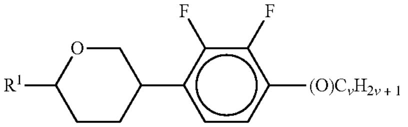

AY5

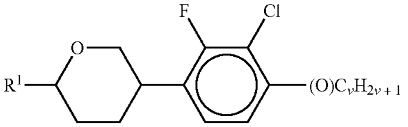

AY6

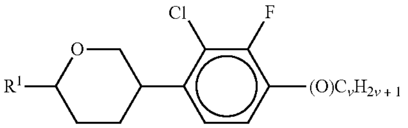

AY7

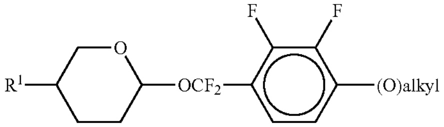

AY8

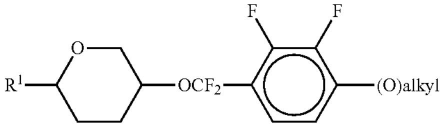

AY9

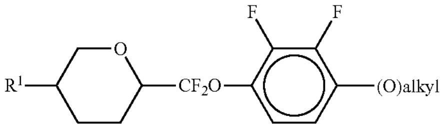

AY10

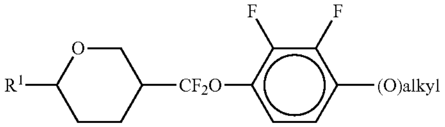

-continued

AY11

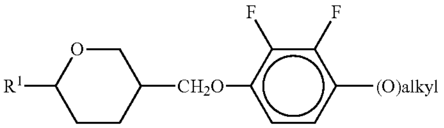

AY12

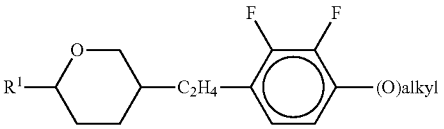

AY13

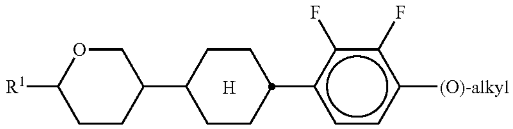

AY14

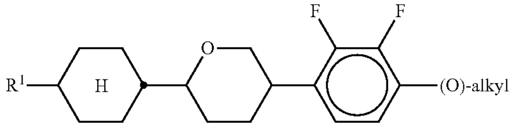

AY15

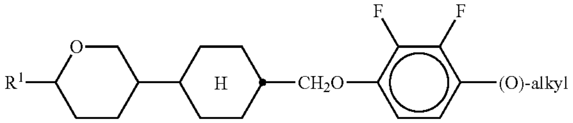

AY16

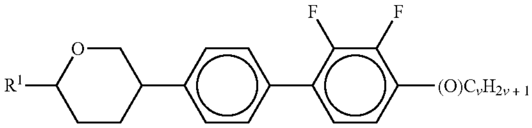

in which $R^1$ has the meaning indicated above, "alkyl" denotes a straight-chain alkyl radical having 1 to 6 C atoms, (O) denotes an oxygen atom or a single bond, and v denotes an integer from 1 to 6. $R^1$ preferably denotes straight-chain alkyl having 1 to 6 C atoms or straight-chain alkenyl having 2 to 6 C atoms, in particular $CH_3$, $C_2H_5$, n-$C_3H_7$, n-$C_4H_9$, n-$C_5H_{11}$, $CH_2{=}CH{-}$, $CH_2{=}CHCH_2CH_2{-}$, $CH_3{-}CH{=}CH{-}$, $CH_3{-}CH_2{-}CH{=}CH{-}$, $CH_3{-}(CH_2)_2{-}CH{=}CH{-}$, $CH_3{-}(CH_2)_3{-}CH{=}CH{-}$ or $CH_3{-}CH{=}CH{-}(CH_2)_2{-}$.

The medium does not contain a compound of Formula Y, B, LY or AY.

The medium does not contain a compound having a 1,4-phenylene group that is substituted in 2- and 3-position with F or Cl.

The medium additionally comprises one or more compounds selected from the following formulae:

II

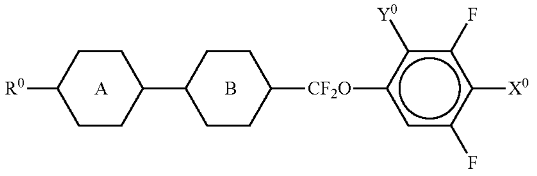

-continued

III

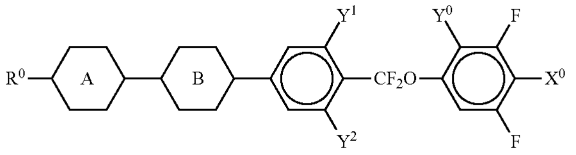

wherein the individual radicals, independently of each other and on each occurrence identically or differently, have the following meanings

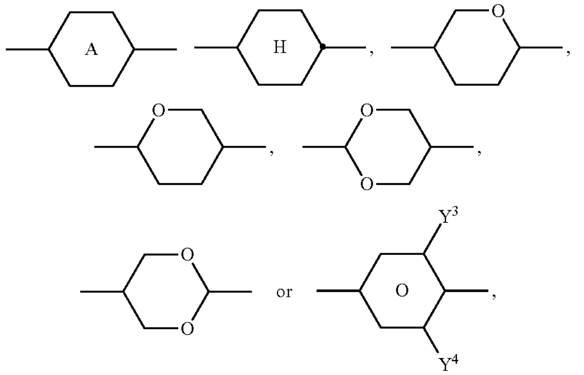

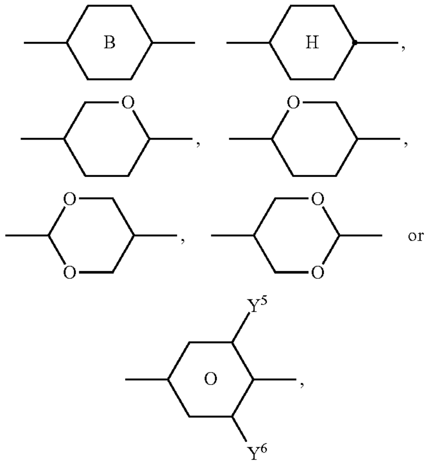

$R^0$ one of the meanings given for $R^1$ in Formula I, $X^0$ F, Cl, CN, $SF_5$, SCN, NCS, a halogenated alkyl radical, a halogenated alkenyl radical, a halogenated alkoxy radical or a halogenated alkenyloxy radical having up to 6 C atoms, and $Y^{1-6}$ H or F, $Y^0$ H or $CH_3$.

Preferred compounds of Formula II and III are those wherein $Y^0$ is H.

Further preferred compounds of Formula II and III are those wherein $R^0$ denotes alkyl having 1 to 6 C atoms, very preferably ethyl or propyl, and $X^0$ denotes F or $OCF_3$, very preferably F.

The medium comprises one or more compounds of Formula II selected from the following subformulae:

II1

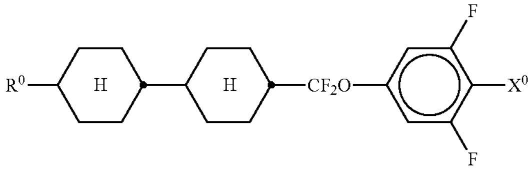

II2

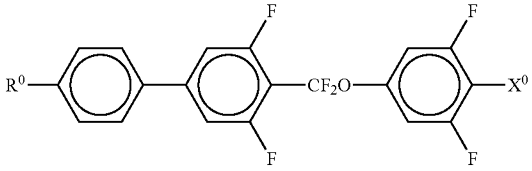

II3

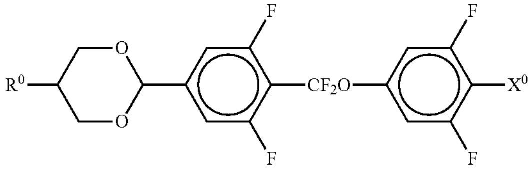

II4

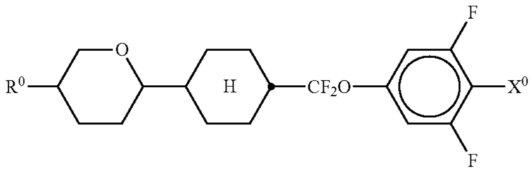

II5

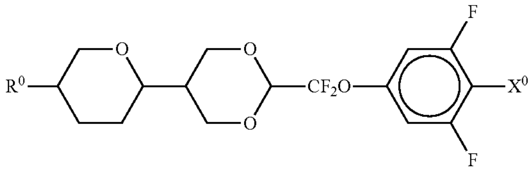

II6

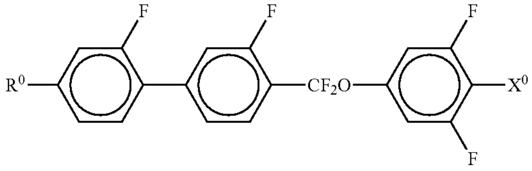

II7

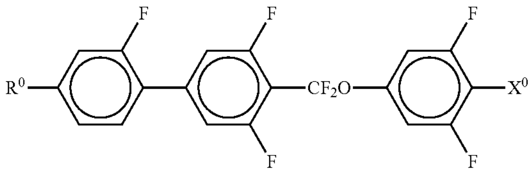

in which $R^0$ and $X^0$ have the meanings given in Formula II.

Preferred compounds are those of Formula II, II2 and II3, very preferred those of Formula II1 and II2.

In the compounds of Formulae II1 to II7 $R^0$ preferably denotes alkyl having 1 to 6 C atoms, very preferably ethyl or propyl, and $X^0$ preferably denotes F or $OCF_3$, very preferably F.

The medium contains one or more compounds of Formula II or their subformulae as described above and below wherein $Y^0$ is $CH_3$, Very preferably the medium according to this preferred embodiment comprises one or more compounds of Formula II selected from the following subformulae:

IIA1

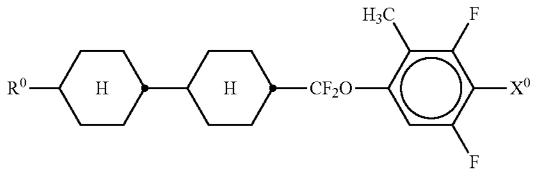

IIA2

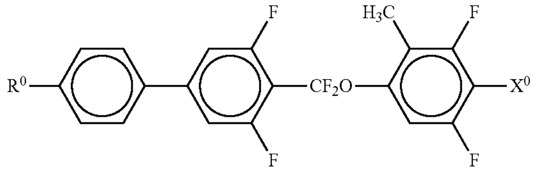

IIA3

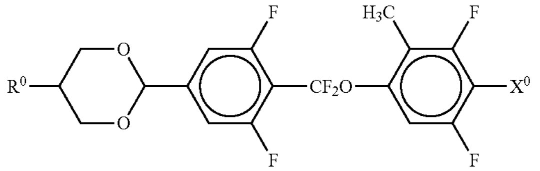

IIA4

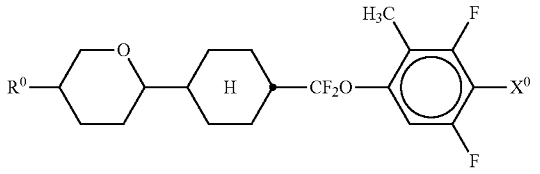

IIA5

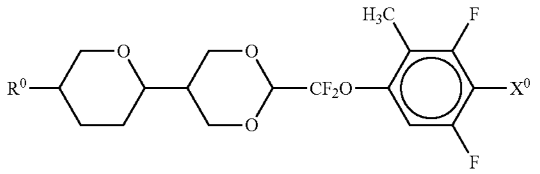

IIA6

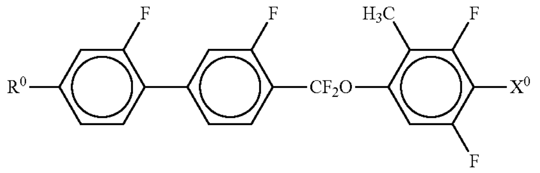

IIA7

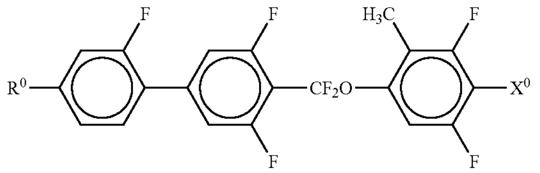

in which $R^0$ and $X^0$ have the meanings given in Formula II.

Preferred compounds are those of Formula IIA1, IIA2 and IIA3, very preferred those of Formula IIA1 and IIA2.

In the compounds of Formulae IIA1 to IIA7 $R^0$ preferably denotes alkyl having 1 to 6 C atoms, very preferably ethyl or propyl, and $X^0$ preferably denotes F or $OCF_3$, very preferably F.

The medium comprises one or more compounds of Formula III selected from the following subformulae:

III1

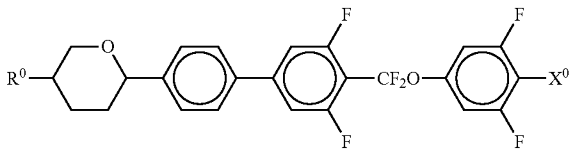

III2

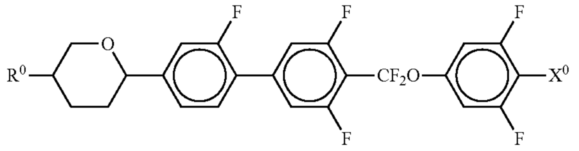

III3

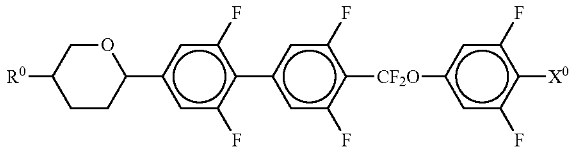

III4

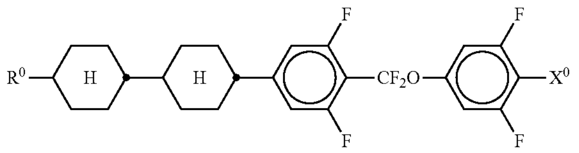

III5

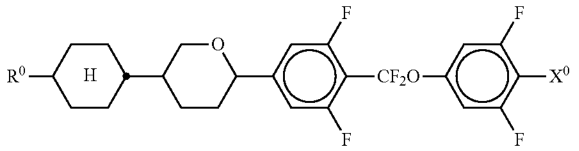

III6

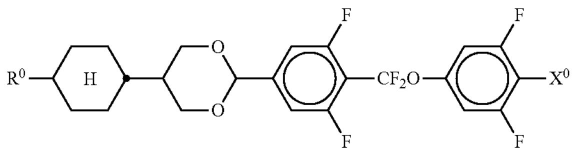

III7

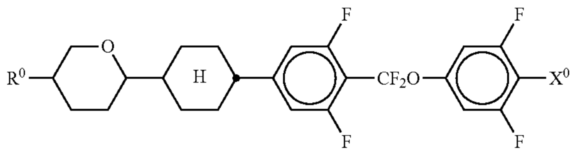

-continued

III8

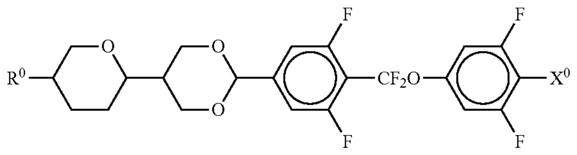

III9

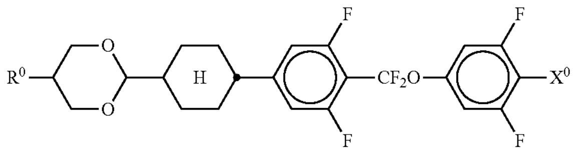

III10

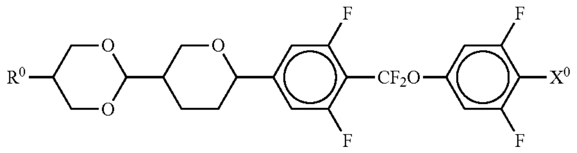

III11

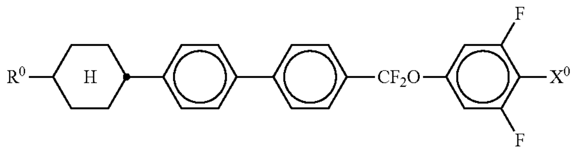

III12

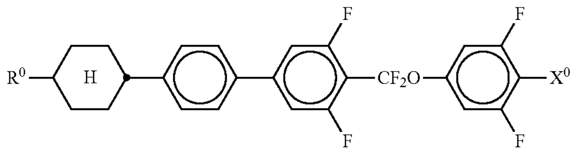

III13

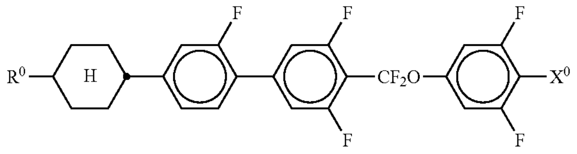

III14

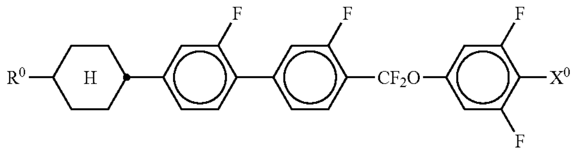

III15

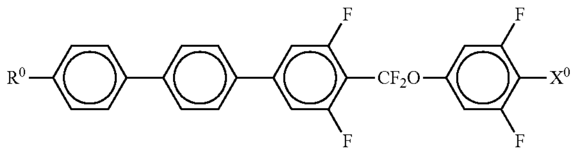

III16

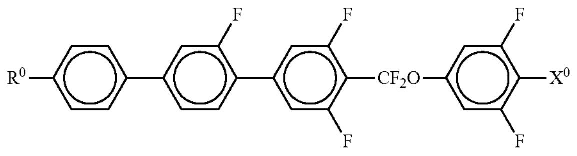

-continued

III17

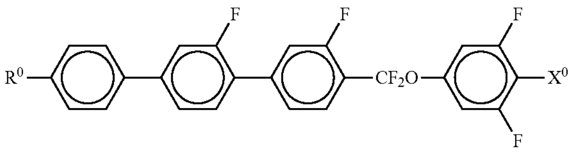

III18

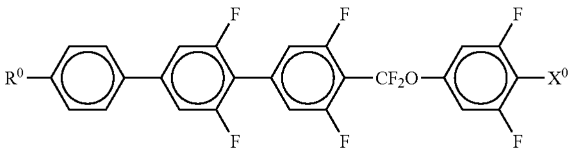

III19

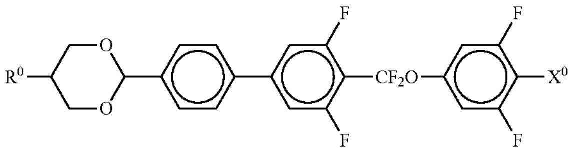

III20

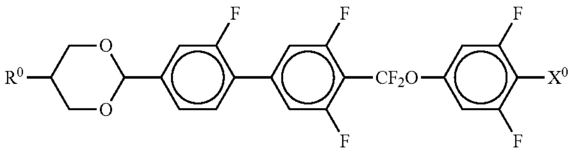

III21

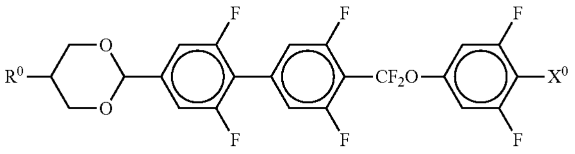

in which $R^0$ and $X^0$ have the meanings given in Formula II.

Preferred compounds are those of Formula III1, III4, III6, III16, III19 and III20.

In the compounds of Formulae III1 to III21 $R^0$ preferably denotes alkyl having 1 to 6 C atoms, very preferably ethyl or propyl, $X^0$ preferably denotes F or $OCF_3$, very preferably F, and $Y^2$ preferably denotes F.

The medium contains one or more compounds of Formula III or their subformulae as described above and below wherein $Y^0$ is $CH_3$. Very preferably, the medium according to this preferred embodiment comprises one or more compounds of Formula III selected from the following subformulae:

IIIA1

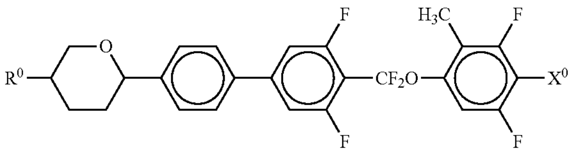

-continued
IIIA2
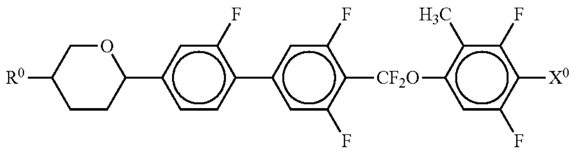
IIIA3
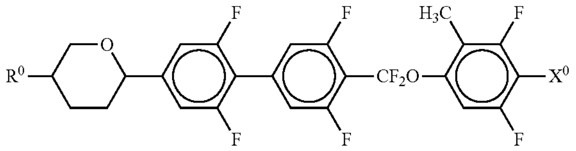
IIIA4
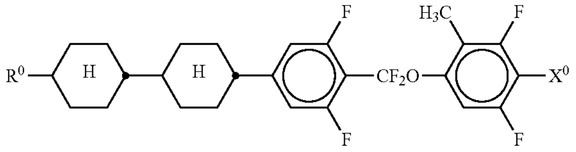
IIIA5
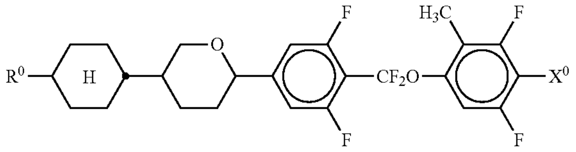
IIIA6
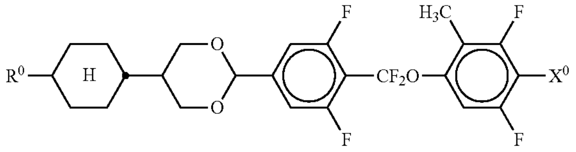
IIIA7
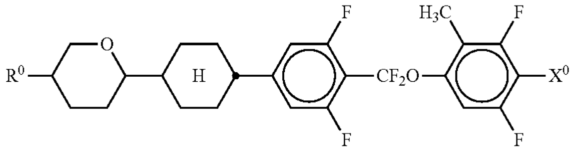
IIIA8
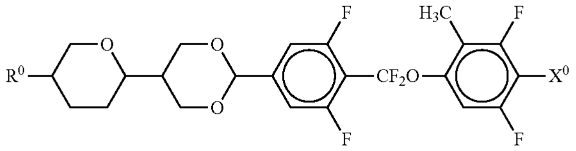
IIIA9
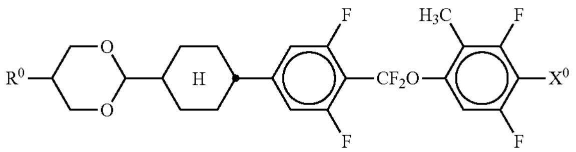
IIIA10
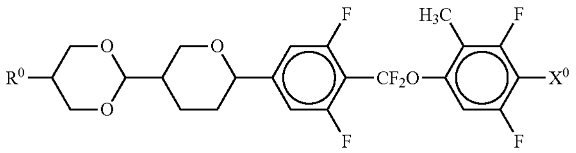
-continued
IIIA11
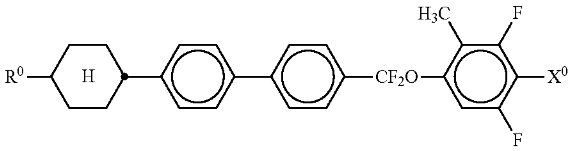
IIIA12
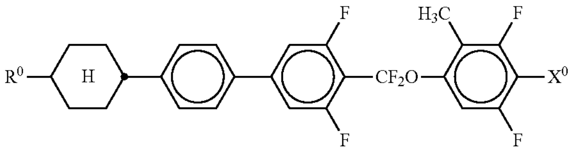
IIIA13
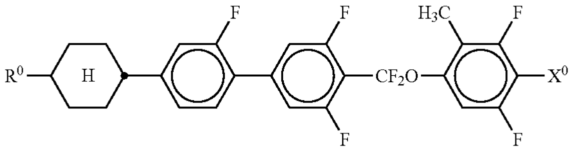
IIIA14
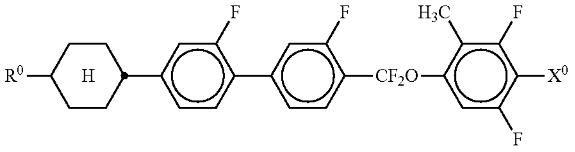
IIIA15
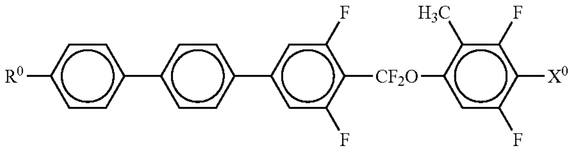
IIIA16
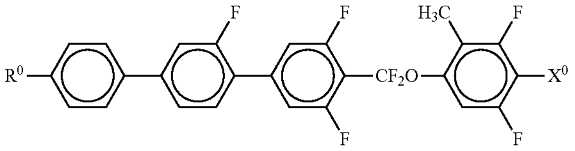
IIIA17
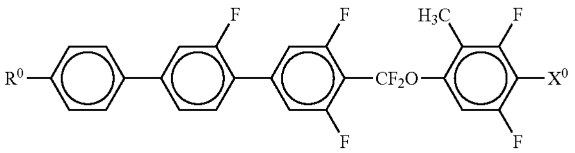
IIIA18
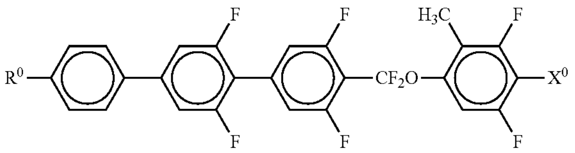
IIIA19
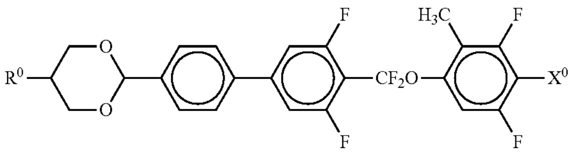

-continued

IIIA20

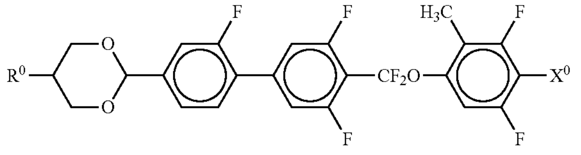

IIIA21

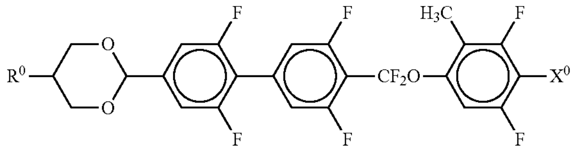

in which $R^0$ and $X^0$ have the meanings given in Formula III.

Preferred compounds are those of Formula IIIA1, IIIA4, IIIA6, IIIA16, IIIA19 and IIIA20.

In the compounds of Formulae IIIA1 to IIIA21 $R^0$ preferably denotes alkyl having 1 to 6 C atoms, very preferably ethyl or propyl, $X^0$ preferably denotes F or $OCF_3$, very preferably F, and $Y^2$ preferably denotes F.

The medium additionally comprises one or more compounds selected from the following formulae:

IV

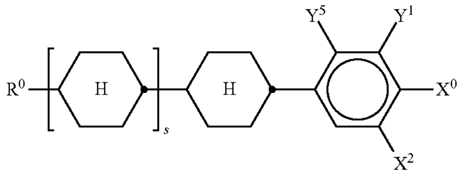

V

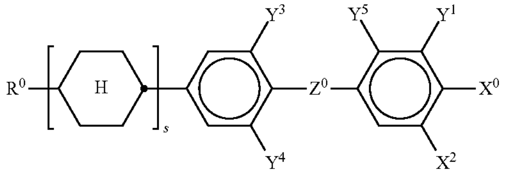

VI

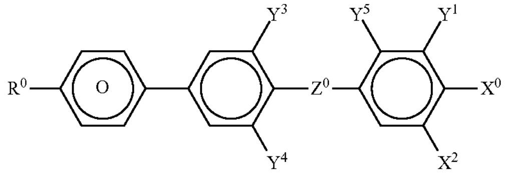

VII

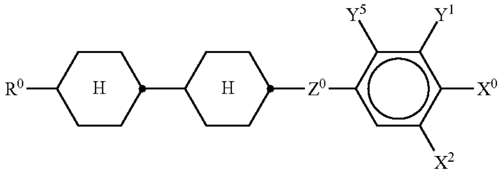

VIII

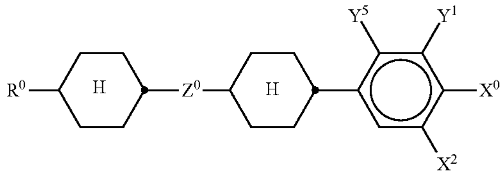

in which $R^0$, $X^0$ and $Y^{1-5}$ have the meanings indicated in Formulae II and III, $Z^0$ denotes $—C_2H_4—$, $—(CH_2)_4—$, $—CH{=}CH—$, $—CF{=}CF—$, $—C_2F_4—$, $—CH_2CF_2—$, $—CF_2CH_2—$, $—CH_2O—$, $—OCH_2—$, $—COO—$ or $—OCF_2—$, in Formulae V and VI also a single bond, in Formulae V and VIII also $—CF_2O—$, r denotes 0 or 1, and s denotes 0 or 1.

The compounds of the Formula IV are preferably selected from the following formulae:

IVa

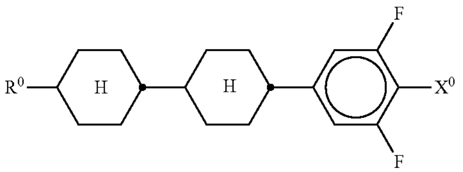

IVb

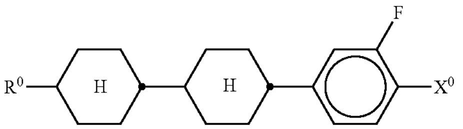

IVc

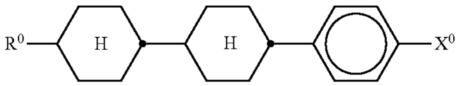

IVd

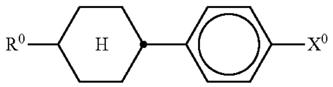

in which $R^0$ and $X^0$ have the meanings indicated in Formulae II and III.

$R^0$ preferably denotes alkyl having 1 to 6 C atoms. $X^0$ preferably denotes F or $OCF_3$, furthermore $OCF{=}CF_2$ or Cl.

The compounds of the Formula IVa are preferably selected from the following subformula:

IVa1

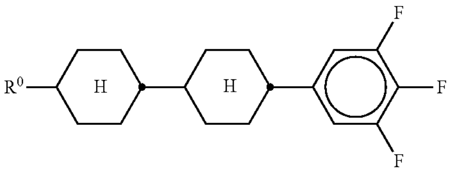

The compounds of the Formula IVb are preferably represented by the following formula:

IVb1

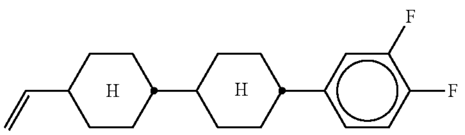

The compounds of the Formula IVc are preferably selected from the following subformula:

IVc1

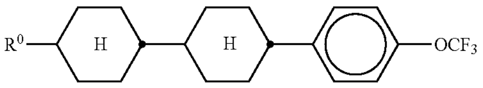

in which $R^0$ has the meanings indicated in Formula II and is preferably propyl or pentyl.

The compound(s) of the Formula IVc, in particular of the Formula IVc1, is (are) preferably employed in the mixtures according to the invention in amounts of 1-20% by weight, particularly preferably 2-15% by weight.

The compounds of the Formula V are preferably selected from the following subformulae:

Va

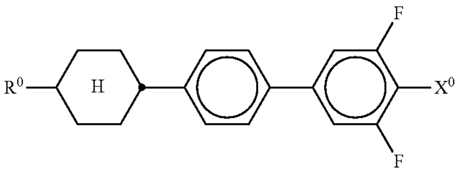

Vb

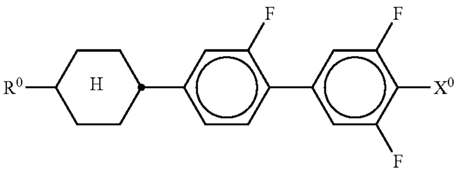

Vc

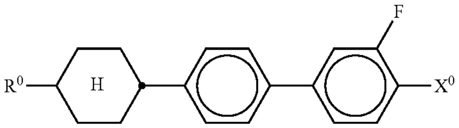

Vd

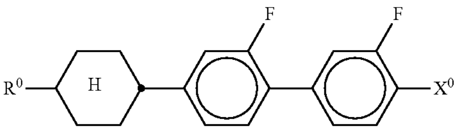

Ve

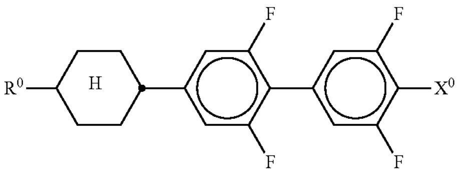

Vf

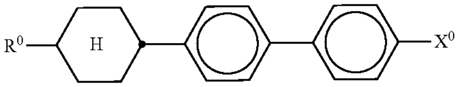

Vg

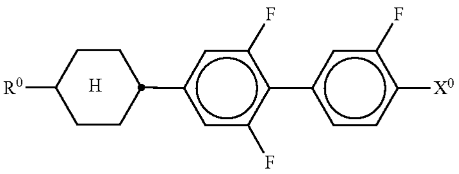

-continued

Vh

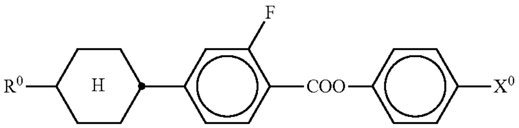

in which $R^0$ and $X^0$ have the meanings indicated in Formula II.

$R^0$ preferably denotes alkyl having 1 to 6 C atoms. $X^0$ preferably denotes F and $OCF_3$, furthermore $OCHF_2$, $CF_3$, $OCF{=}CF_2$ and $OCH{=}CF_2$.

The compounds of the Formula VI are preferably selected from the following subformulae:

VIa

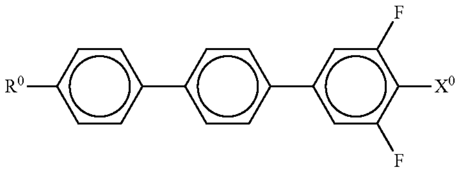

VIb

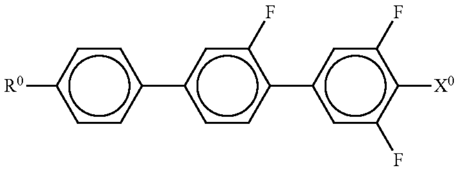

VIc

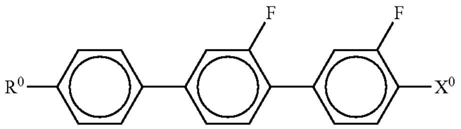

VId

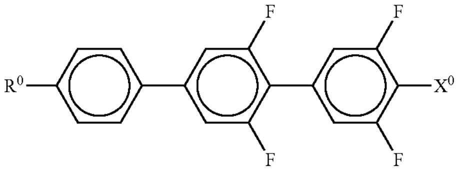

in which $R^0$ and $X^0$ have the meanings indicated in Formula II.

$R^0$ preferably denotes alkyl having 1 to 6 C atoms. $X^0$ preferably denotes F, furthermore $OCF_3$, $CF_3$, $CF{=}CF_2$, $OCHF_2$ and $OCH{=}CF_2$.

The compounds of the Formula VII are preferably selected from the following subformulae:

VIIa

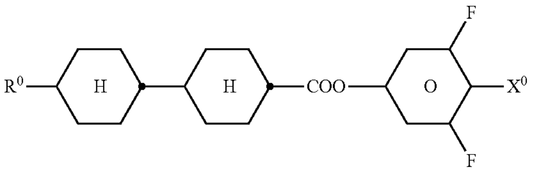

-continued

VIIb

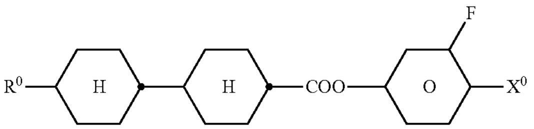

in which $R^0$ and $X^0$ have the meanings indicated in Formula II.

$R^0$ preferably denotes alkyl having 1 to 6 C atoms. $X^0$ preferably denotes F, furthermore $OCF_3$, $OCHF_2$ and $OCH{=}CF_2$.

In some embodiments, the medium additionally comprises one or more compounds selected from the following formulae:

XVIII

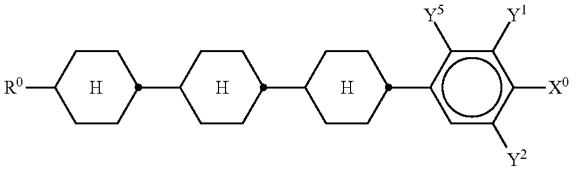

XIX

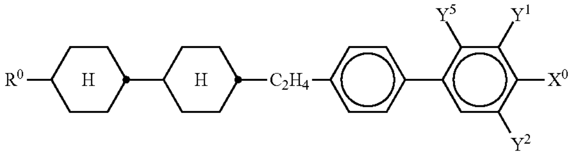

XX

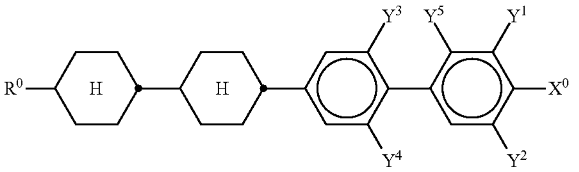

XXI

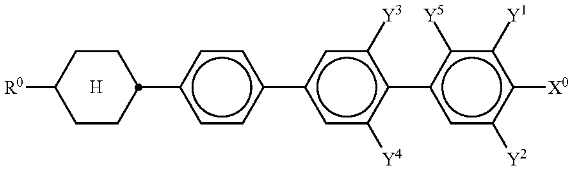

XXII

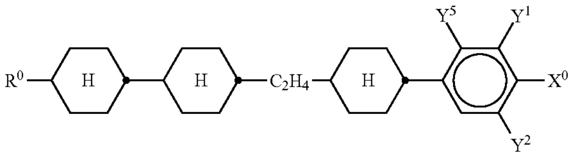

XXIII

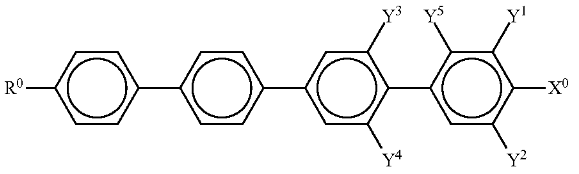

in which $R^0$ and $X^0$ each, independently of one another, have one of the meanings indicated in Formula II, $Y^{1-4}$ each, independently of one another, denote H or F, $Y^5$ denotes H or $CH_3$, preferably H, $X^0$ is preferably F, Cl, $CF_3$, $OCF_3$ or $OCHF_2$, $R^0$ preferably denotes alkyl, alkoxy, oxaalkyl, fluoroalkyl or alkenyl, each having up to 6 C atoms.

Very preferably the medium according to the invention comprises one or more compounds of the Formula XXa, XXa

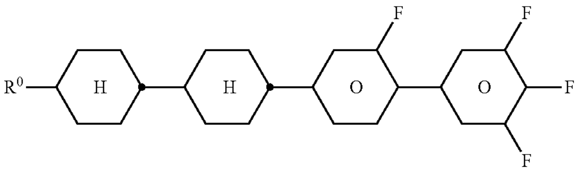

in which $R^0$ has the meanings of $R^1$ in Formula I. $R^0$ preferably denotes straight-chain alkyl, in particular ethyl, n-propyl, n-butyl or n-pentyl and very particularly preferably n-propyl.

The compound(s) of the Formula XX, in particular of the Formula XXa, is (are) preferably employed in the mixtures according to the invention in amounts of 0-15% by weight, particularly preferably 1-10% by weight.

Very preferably the medium according to the invention comprises one or more compounds of the Formula XXIa, XXIa

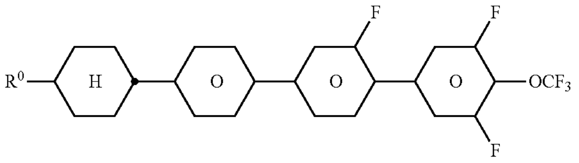

in which $R^0$ has the meaning of $R^1$ in Formula I. $R^0$ preferably denotes straight-chain alkyl, in particular ethyl, n-propyl, n-butyl or n-pentyl and very particularly preferably n-propyl.

The compound(s) of the Formula XXI, in particular of the Formula XXIa, is (are) preferably employed in the mixtures according to the invention in amounts of 1-15% by weight, particularly preferably 2-10% by weight.

Further preferably the medium according to the invention comprises one or more compounds of the Formula XXIIIa, XXIIIa

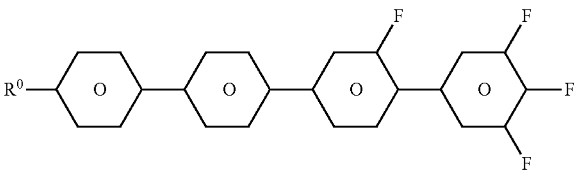

in which $R^0$ has the meaning of $R^1$ in Formula I. $R^0$ preferably denotes straight-chain alkyl, in particular ethyl, n-propyl, n-butyl or n-pentyl and very particularly preferably n-propyl.

The compound(s) of the Formula XXIII, in particular of the Formula XXIIIa, is (are) preferably employed in the mixtures according to the invention in amounts of 0.5-5% by weight, particularly preferably 0.5-2% by weight.

The medium additionally comprises one or more compounds of the Formula XXIV,

XXIV

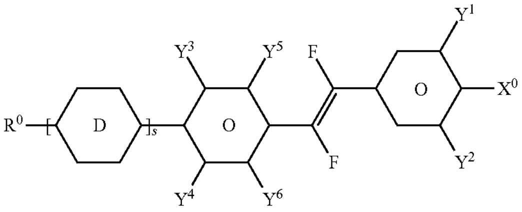

in which $R^0$, $X^0$ and $Y^{1-6}$ have the meanings indicated in Formula III, s denotes 0 or 1, and

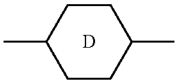

denotes

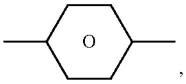

,

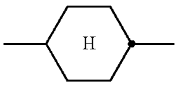

or

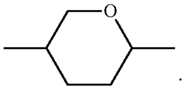

.

In the Formula XXIV, $X^0$ may also denote an alkyl radical having 1 to 6 C atoms or an alkoxy radical having 1 to 6 C atoms. The alkyl or alkoxy radical is preferably straight-chain.

$R^0$ preferably denotes alkyl having 1 to 6 C atoms. $X^0$ preferably denotes F.

The compounds of the Formula XXIV are preferably selected from the following subformulae:

XXIVa

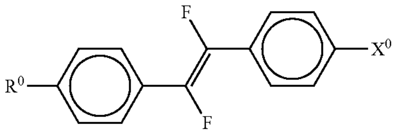

XXIVb

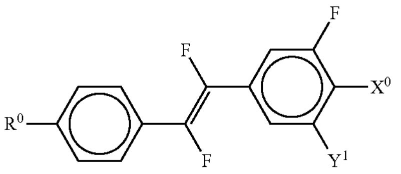

XXIVc

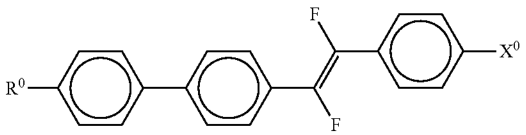

-continued

XXIVd

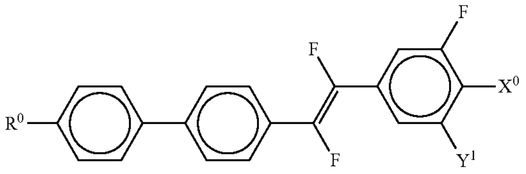

XXIVe

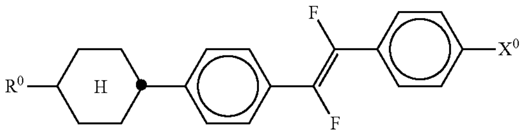

XXIVf

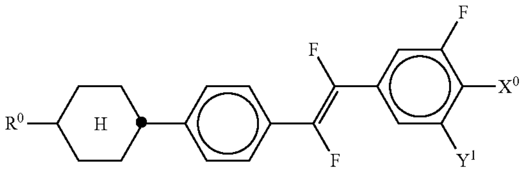

XXIVg

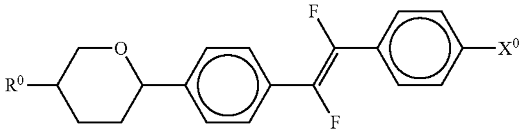

XXIVh

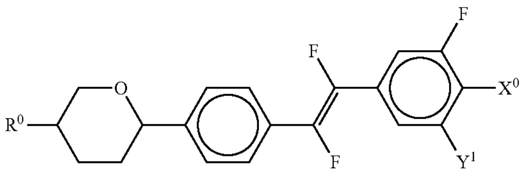

in which $R^0$, $X^0$ and $Y^1$ have the meanings indicated in Formula III. $R^0$ preferably denotes alkyl having 1 to 6 C atoms. $X^0$ preferably denotes F, and $Y^1$ is preferably F.

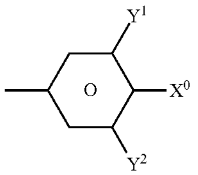

is preferably

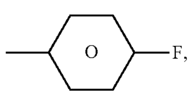

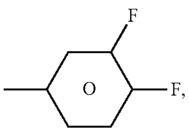

-continued

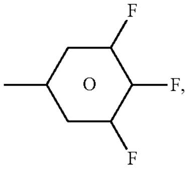 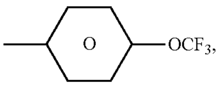,

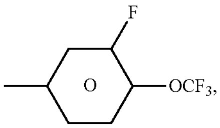, 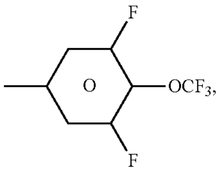,

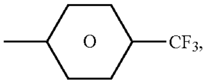, 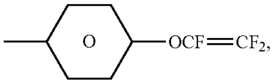,

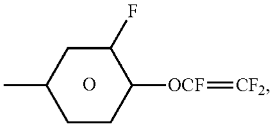, 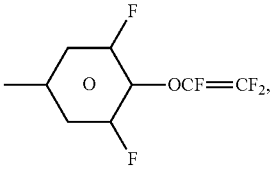,

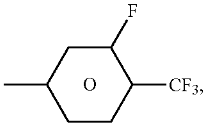, 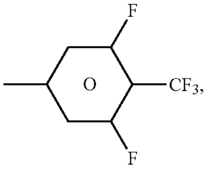,

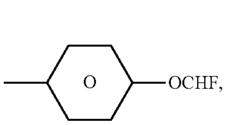, 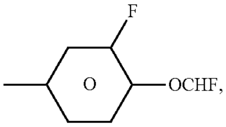,

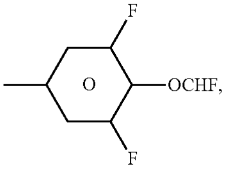, 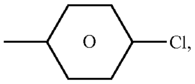,

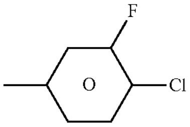 or 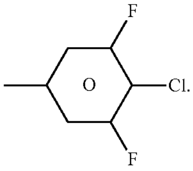.

$R^0$ is straight-chain alkyl or alkenyl having 2 to 6 C atoms.

The medium may further comprise one or more compounds of the following formulae:

XXV

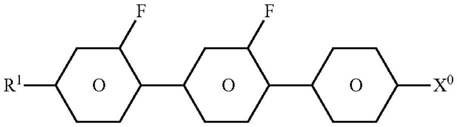

XXVI

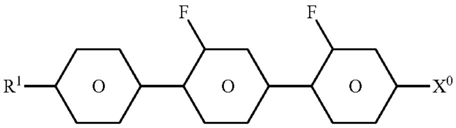

in which $R^1$ and $X^0$ have the meanings of $R^0$ and $X^0$ indicated in Formula II, respectively. $R^1$ preferably denotes alkyl having 1 to 6 C atoms. $X^0$ preferably denotes F or Cl. In the Formula XXIV, $X^0$ very particularly preferably denotes Cl.

The medium comprises one or more compounds of the following formulae:

XXVII

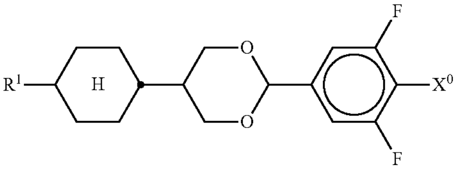

XXVIII

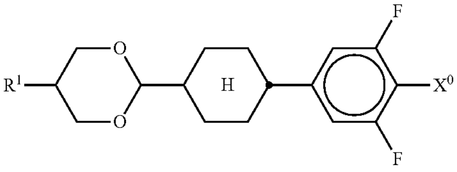

XXIX

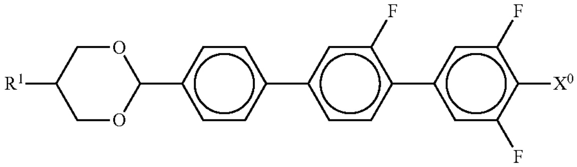

XXX

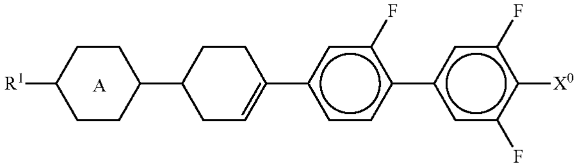

in which

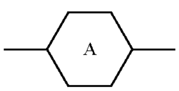, 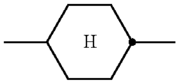, 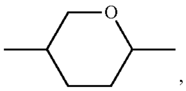, 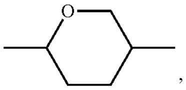, 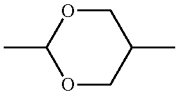 or 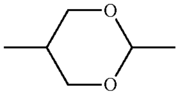 and $R^1$ and $X^0$ have the meanings of $R^0$ and $X^0$ indicated in Formula II, respectively.

$R^1$ preferably denotes alkyl having 1 to 6 C atoms. $X^0$ preferably denotes F. The medium according to the invention particularly preferably comprises one or more compounds of the Formula XXIX in which $X^0$ preferably denotes F.

The compound of general Formula XXX may be advantageously selected from one of the following Formulae XXX1 to XXX3, wherein use of the compound of Formula XXX1 is particularly preferred:

XXX1

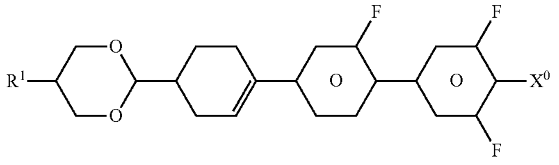

XXX2

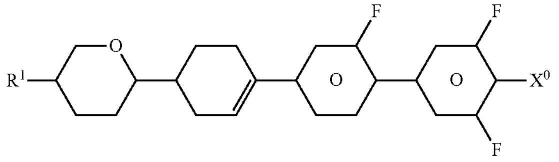

XXX3

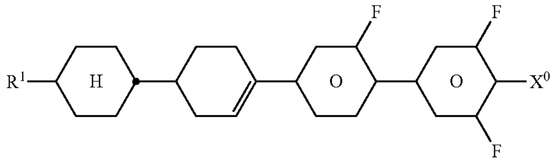

The compound(s) of the Formulae XXVI-XXIX is (are) preferably employed in the mixtures according to the invention in amounts of 1-20% by weight, particularly preferably 1-15% by weight. Particularly preferred mixtures comprise at least one compound of the Formula XXIX.

In some further embodiments, the medium comprises one or more compounds of the following formulae:

XXXVI

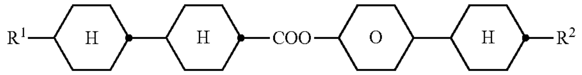

in which $R^1$ and $R^2$ have the meanings indicated in Formula I, and preferably each, independently of one another, denote alkyl having 1 to 6 C atoms.

Very preferably the medium according to the invention comprises one or more compounds of the Formula XXIXa:

XXIXa

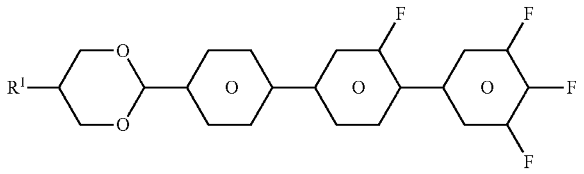

in which $R^1$ has the meanings indicated in Formula I, and preferably denotes straight-chain alkyl, in particular ethyl, n-propyl, n-butyl or n-pentyl and very particularly preferably n-propyl.

The compound(s) of the Formula XXIXa is (are) preferably employed in the mixtures according to the invention in amounts of 1-15% by weight, particularly preferably 2-10% by weight.

The medium may further comprise one or more compounds of the following pyrimidine or pyridine compounds of the formulae

XXXI1

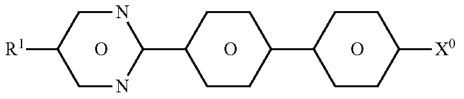

XXXI2

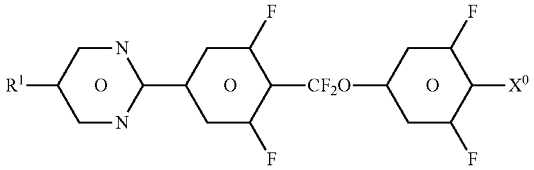

XXXI3

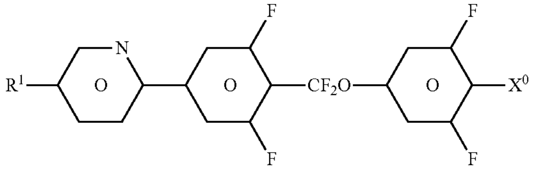

in which $R^1$ and $X^0$ have the meanings indicated in Formula II for $R^0$ and $X^0$, respectively. $R^1$ preferably denotes alkyl having 1 to 6 C atoms. $X^0$ preferably denotes F. The medium according to the invention particularly preferably comprises one or more compounds of the Formula XXXI1, in which $X^0$ preferably denotes F. The compound(s) of the Formulae XXXI1 to XXXI3 is (are) preferably employed in the mixtures according to the invention in amounts of 1-20% by weight, particularly preferably 1-15% by weight.

The medium may additionally comprise one or more compounds of the following formulae:

XXXII

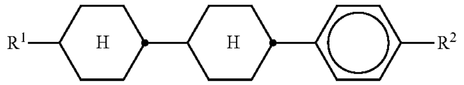

XXXIII

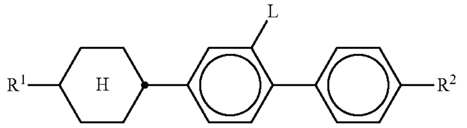

XXXIV

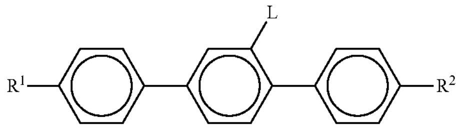

XXXV

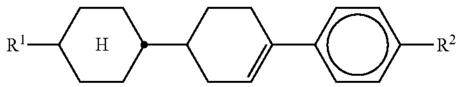

in which L, $R^1$ and $R^2$ have the meanings indicated in Formula Y for $Y^1$, $R^1$ and $R^2$, respectively. $R^1$ and $R^2$ preferably denote alkyl, alkoxy, oxaalkyl, fluoroalkyl or alkenyl, each having up to 6 C atoms.

Very preferably the medium according to the invention comprises one or more compounds of the Formula XXXVa XXXVa

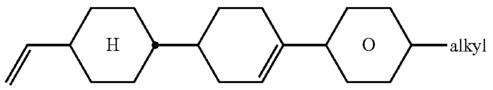

in which "alkyl" denotes a straight-chain alkyl radical having 1 to 6 C atoms, in particular ethyl, propyl or pentyl.

The compound(s) of the Formula XXXV, in particular of the Formula XXXVa, is (are) preferably employed in the mixtures according to the invention in amounts of 0.5-10% by weight, particularly preferably 1-5% by weight.

Further preferred LC media are selected from the following preferred embodiments, including any combination thereof:

The total content of compounds of the Formula I in the LC medium is preferably 2 to 80% by weight, preferably 5 to 70% by weight, and particularly preferably 10 to 60% by weight, based on the weight of the LC medium.

It has proved surprisingly advantageous to select the compounds of Formula I in such a way that they can be described in the LC medium of the invention by a single formula selected from I-1-1 to I-1-17 and I-2-1 to I-2-53. It is particularly preferred that all compounds of Formula I can be described in the LC medium of the invention by a single structure selected from the following list:

I-3-1, I-3-2, I-3-3, I-3-4, I-3-5, I-3-6, I-3-7, I-3-8, I-3-9, I-3-10, I-3-11, I-3-12, I-3-15, I-3-16, I-3-17, I-3-18, I-3-19, I-3-20, I-3-21, I-3-22.

In some embodiments of the present invention the medium may in particular comprise a combination of at least two different compounds of the general Formula I selected from the following compounds:

I-3-9-2-2, I-3-9-3-2, I-3-9-4-5, I-3-9-5-5, I-3-9-6-5, I-3-22-4, I-3-6-3.

It has been shown that a combination of at least two different compounds of Formula I in the LC medium of the present invention not only has much better solubility than a single compound of Formula I but also exhibits significantly improved stability to UV radiation and elevated temperatures. The stabilizing effect of the compounds of the general Formula ST and, if present, H is thereby synergistically enhanced.

Preferably, the proportion of compounds of Formula ST, as described above or listed in Table G, in the LC medium is from 10 to 2000 ppm, very preferably from 30 to 1000 ppm by weight.

Preferred content of the one or more compounds of Formula H in the LC medium depends inter alia on the inherent chemical stability of the LC medium as well as on the nature of the compound of Formula H. Compounds of Formula H in which $R^{16}$ denotes O*, which are known as NO radical type HALS are preferably used in proportion ranging from 50 ppm to 1000 ppm by weight, based on the weight of the LC medium. Compounds of Formula H in which $R^{16}$ denotes a H atom, which are known as NH radical type HALS are advantageously used in proportion ranging from 50 ppm to 2000 ppm by weight, based on the weight of the LC medium.

If two compounds of Formula I are present in the LC medium of the invention, their weight ratio is preferably between 10:90 and 90:10, particularly preferably between 20:80 and 80:20, even more preferably between 30:70 and 70:30, based on the total weight of the two compounds of Formula I.

The medium comprises one or more compounds of Formula I or its sub-formulae, a compound of Formula ST and one or more compounds selected from the group consisting of Formulae H, Z1, Z2, Z3, Z4, Z5, Y, B, LY, AY, II, III, IV, V, VI, VII, VIII, XII, XIII, XIV, XV, XVI, XVIIa, XVIIb, XVIIc, XVIII, XIX, XX, XXI, XII, XXIII, XXIV, XXV, XXVI, XXVII, XXVIII, XXIX, XXXI, XXXI1, XXXI2, XXXI3, XXXII, XXXIII, XXXIV and XXXV and their sub-formulae.

The medium comprises one or more compounds of Formula I or its sub-formulae, a compound of Formula ST and one or more compounds selected from the group consisting of Formulae H, Z1, Z2, Z3, Z4, Z5, Y, B, II, III, IV, VI, XIV, XVI, XVIIa, XVIIb, XVIIc, XX, XII, XXIII, XXIX, XXXII and XXXV and their sub-formulae.

The medium does not contain a compound of Formula Y, B, AY or LY.

The medium comprises one or more compounds of the Formula II, preferably selected from the group consisting of Formulae II1, II2 and II3, very preferably from Formulae II1 and II2. The individual concentration of each of these compounds is preferably from 2 to 15% by weight. The total concentration of these compounds is preferably from 5 to 25% by weight.

The medium comprises one or more compounds of the Formula III, preferably selected from the group consisting of Formula III1, III4, III6, III16, III19 and III20, very preferably from the group consisting of Formula III1, III6, III16 and III20.

The individual concentration of each of these compounds is preferably from 2 to 15% by weight. The total concentration of these compounds is preferably from 5 to 30% by weight.

The medium comprises one or more compounds of the Formula IV, preferably selected from Formula IVa or IVc, very preferably from Formula IVa1 or IVc1, most preferably of Formula IVc1. The individual concentration of each of these compounds is preferably from 2 to 15% by weight. The total concentration of these compounds is preferably from 5 to 20% by weight.

The medium comprises one or more compounds of the Formula VI, preferably selected from Formula VIb. The individual concentration of each of these compounds is preferably from 1 to 20% by weight. The total concentration of these compounds is preferably from 5 to 20% by weight.

The medium comprises one or more compounds of the Formula Z1, preferably selected from Formula Z1-1. The total concentration of these compounds is preferably from 1 to 25% by weight.

The medium comprises one or more compounds of the Formula Z2, preferably selected from Formulae Z2-1 and Z2-2. The total concentration of these compounds is preferably from 2 to 35%, very preferably from 3 to 25% by weight.

The medium comprises from 5 to 20% by weight of compounds of Formula Z3, preferably of Formula Z3-1.

The medium comprises from 5 to 20% by weight of compounds of Formula Z4, preferably of Formula Z4-1.

The medium comprises from 10 to 65%, very preferably from 20 to 60% by weight of compounds of Formula Z5.

The medium comprises one or more compounds of the Formula XII, preferably of the Formula XIIa or XIIb, very preferably of Formula XIIa, most preferably of Formula XIIa1. The concentration of these compounds is preferably from 2 to 15% by weight.

The medium comprises from 1 to 15% by weight of compounds of Formula XIIb.

The medium comprises one or more compounds of the Formula XIV, preferably of the Formula XIVd, very preferably of Formula XIVd1. The concentration of these compounds is preferably from 2 to 10% by weight.

The medium comprises one or more compounds of the Formula XVIb, preferably of Formula XVIb1, XVIb2 and/or XVI3. The concentration of these compounds is preferably from 2 to 15% by weight.

The medium comprises one or more compounds of the Formula XVIc, preferably of Formula XVIc1, XVIc2 and/or XVIc3. The concentration of these compounds is preferably from 2 to 20% by weight.

The medium comprises one or more compounds of the Formula XVIg, preferably of the Formula XVIg1 and/or XVIg2. The total concentration of these compounds is preferably from 5 to 25% by weight.

The medium comprises one or more compounds selected from the group consisting of the Formulae XVIIa, XVIIb and XVIIc, very preferably of Formula XVIIa wherein L is H and of Formula XVIIb wherein L is F. The total concentration of these compounds is preferably from 0.5 to 5% by weight.

The medium comprises one or more compounds of the Formula XX, preferably of the Formula XXa. The concentration of these compounds is preferably from 2 to 10% by weight.

The medium comprises one or more compounds of the Formula XXI, preferably of the Formula XXIa. The concentration of these compounds is preferably from 2 to 10% by weight.

The medium comprises one or more compounds of the Formula XXIII, preferably of the Formula XXIIIa. The concentration of these compounds is preferably from 0.5 to 5% by weight.

The medium comprises one or more compounds of the Formula XXIX, preferably of the Formula XXIXa. The concentration of these compounds is preferably from 2 to 10% by weight.

The medium comprises one or more compounds of the Formula XXXI, preferably of the Formula XXXIa. The concentration of these compounds is preferably from 2 to 10% by weight.

The medium comprises one or more compounds of the Formula XXXII. The concentration of these compounds is preferably from 2 to 10% by weight.

The medium comprises one or more compounds of the Formula XXXII. The concentration of these compounds is preferably from 2 to 10% by weight.

The medium comprises one or more compounds of the Formula XXXV, preferably of the Formula XXXVa. The concentration of these compounds is preferably from 1 to 5% by weight.

The medium comprises one or more compounds of Formula I, preferably of Formula I-2-6, a compound of Formula ST, one or more compounds selected from the group consisting of the Formulae Z1, Z2 and Z3, Z4, Z5 or their sub-formulae, one or more compounds selected from the group consisting of Formula XIV or its sub-formulae, one or more compounds selected from the group consisting of Formulae II, III, IV, VI, XX, XXIII and XXIX or their sub-formulae, and one or more compounds selected from the group consisting of the Formulae XII, XVI, XVIIa, XVIIb, XVIIc, XXXII and XXXV or their sub-formulae.

The medium comprises one or more compounds of Formula I, preferably of Formula I-2-6, a compound of Formula ST, one or more compounds selected from the group consisting of the Formulae Z1, Z2 and Z3, Z4, Z5 or their sub-formulae, one or more compounds selected from the group consisting of Formulae Z1-1, Xb, XIb and XIVd or their sub-formulae, one or more compounds selected from the group consisting of Formulae II, III, IVc, VIb, XXa, XXIIIa and XXIXa or their sub-formulae, and one or more compounds selected from the group consisting of the Formulae XIIb, XVIb, XVIc, XVIIa, XVIIb, XVIIc, XXXII and XXXVa or their sub-formulae.

The medium comprises one or more compounds of Formula I, preferably of Formula I-2-6, a compound of Formula ST, one or more compounds selected from the group consisting of the Formulae Z1, Z2, Z3, Z4 and Z4 or their sub-formulae, one or more compounds of Formula Y, preferably selected from the group consisting of the Formulae $Y^1$ and $Y^2$, one or more compounds selected from the Formula XIV or its sub-formulae, one or more compounds selected from the group consisting of Formulae II, III, IV, VI, XX, XXIII and XXIX or their sub-formulae, and one or more compounds selected from the group consisting of the Formulae XII, XVI, XVIIa, XVIIb, XVIIc, XXXII and XXXV or their sub-formulae.

The medium comprises one or more compounds of Formula I, preferably of Formula I-2-6, a compound of Formula ST, one or more compounds selected from the group consisting of the Formulae Z1, Z2, Z3, Z4 and Z5 or their sub-formulae, one or more compounds of Formula B, preferably selected from the group consisting of the Formulae B1, B2 and B3, one or more compounds selected from the group consisting of Formulae Z1-1, Z2-2, Z5 and XIVd or their sub-formulae, one or more compounds selected from the group consisting of Formulae II, III, IVc, VIb, XXa, XXIIIa and XXIXa or their sub-formulae, and one or more compounds selected from the group consisting of the Formulae XIIb, XVIb, XVIc, XVIIa, XVIIb, XVIIc, XXXII and XXXVa or their sub-formulae.

Besides the compounds of the Formulae I and ST, the medium comprises further compounds selected from the group of the compounds of the Formula Z1, Z2, Z3, Z4, Z5, Y, B, IV, XII, XIV, XVI, XVIIa, XVIIb, XVIIc, XXI, XXIII, XXIX, XXXI, XXXII and XXIV or their sub-formulae.

Besides the compounds of the Formulae I and ST, the medium comprises further compounds selected from the group of the compounds of the Formula Z1, Z2, Z3, IV, XII, XIV, XVI, XVIIa, XVIIb, XVIIc, XXI, XXIII, XXIX, XXXI, XXXII and XXIV or their sub-formulae.

The proportion of compounds of Formula I or its sub-formulae in the medium is from 1 to 30%, very preferably from 2 to 25%, most preferably from 2 to 20% by weight.

The proportion of compounds of the Formula Z1, Z2 and Z3 or their sub-formulae in the mixture as a whole is from 10 to 65%, very preferably from 20 to 60%.

The proportion of compounds of the Formula Y or its sub-formulae in the mixture as a whole is from 1 to 20%, very preferably from 2 to 15%.

The proportion of compounds of the Formula B or its sub-formulae in the mixture as a whole is from 1 to 20%, very preferably from 2 to 18%.

The proportion of compounds of the Formulae II, III, IV-VIII, XVIII-XXIII and XXVII-XXXI in the mixture as a whole is 30 to 60% by weight.

The proportion of compounds of the Formulae XII-XV in the mixture as a whole is 40 to 70% by weight.

The proportion of compounds of the Formulae XIV, XVIIa-c and XXXII-XXXV in the mixture as a whole is 0.5 to 15% by weight.

The term "alkyl" or "alkyl*" in this application encompasses straight-chain and branched alkyl groups having 1 to 6 carbon atoms, in particular the straight-chain groups methyl, ethyl, propyl, butyl, pentyl and hexyl. Groups having 2 to 5 carbon atoms are generally preferred.

The term "alkenyl" or "alkenyl*" encompasses straight-chain and branched alkenyl groups having 2 to 6 carbon atoms, in particular the straight-chain groups.

Preferred alkenyl groups are $C_2$-$C_7$-1E-alkenyl, $C_4$-$C_6$-3E-alkenyl, in particular $C_2$-$C_6$-1E-alkenyl. Examples of particularly preferred alkenyl groups are vinyl, 1E-propenyl, 1E-butenyl, 1E-pentenyl, 1E-hexenyl, 3-butenyl, 3E-pentenyl, 3E-hexenyl, 4-pentenyl, 4Z-hexenyl, 4E-hexenyl and 5-hexenyl. Groups having up to 5 carbon atoms are generally preferred, in particular $CH_2{=}CH$, $CH_3CH{=}CH$.

The term "fluoroalkyl" preferably encompasses straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxy" preferably encompasses straight-chain radicals of the formula $C_nH_{2n+1}$—O—$(CH_2)_m$, in which n and m each, independently of one another, denote 1 to 6. m may also denote 0. Preferably, n=1 and m=1-6 or m=0 and n=1-3. Further preferably the alkoxy or oxaalkyl group can also contain one or more further O atoms such that oxygen atoms are not directly linked to one another.

Through a suitable choice of the meanings of $R^0$ and $X^0$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio between the elastic constants $k_{33}$ (bend) and $k_{11}$ (splay) compared with alkyl and alkoxy radicals. 4-Alkenyl radicals, 3-alkenyl radicals and the like generally give lower threshold voltages and lower values of $k_{33}/k_{11}$ compared with alkyl and alkoxy radicals. The mixtures according to the invention are distinguished, in particular, by high Δε values and thus have significantly faster response times than the mixtures from the prior art.

The optimum mixing ratio of the compounds of the above-mentioned formulae depends substantially on the desired properties, on the choice of the components of the above-mentioned formulae and on the choice of any further components that may be present.

Suitable mixing ratios within the range indicated above can easily be determined from case to case.

The total amount of compounds of the above-mentioned formulae in the liquid-crystalline media according to the invention is not crucial. The mixtures can therefore comprise one or more further components for the purposes of optimisation of various properties. However, the observed effect on the desired improvement in the properties of the medium is generally greater, the higher the total concentration of compounds of the above-mentioned formulae.

In a particularly preferred embodiment, the liquid-crystalline media according to the invention comprise compounds of the Formulae IV to VIII (preferably IV and V) in which $X^0$ denotes F, $OCF_3$, $OCHF_2$, $OCH{=}CF_2$, $OCF{=}CF_2$ or $OCF_2$—$CF_2H$. A favourable synergistic action with the compounds of the Formulae I, II and III results in particularly advantageous properties. In particular, mixtures comprising compounds of the Formulae I, ST, II and III are distinguished by their low threshold voltage.

The individual compounds of the above-mentioned formulae and the sub-formulae thereof which can be used in the liquid-crystalline media according to the invention are either known or can be prepared analogously to the known compounds.

The invention also relates to a process for the preparation of a liquid-crystalline medium as described above and below, by mixing one or more compounds of the Formula I with one or more compounds of the Formula ST, and, optionally, one or more compounds of Formula H, and one or more compounds selected from the group consisting of Formulae II, III, IV, VI, XIV, XII, XVI, XVIIa, XVIIb, XVIIc, XX, XXIII, XXIX, XXXII and XXXV.

In another preferred embodiment of the present invention the liquid-crystalline medium additionally comprises one or more polymerizable compounds. The polymerizable compounds are preferably selected from Formula M $$R^a\text{—}B^1\text{—}(Z^b\text{—}B^2)_m\text{—}R^b \qquad M$$

in which the individual radicals, on each occurrence identically or differently, and each, independently of one another, have the following meaning:

$R^a$ and $R^b$ P, P-Sp-, H, F, Cl, Br, I, —CN, —$NO_2$, —NCO, —NCS, —OCN, —SCN, $SF_5$ or straight-chain or branched alkyl having 1 to 25 C atoms, in which, in addition, one or more non-adjacent $CH_2$ groups may each be replaced, independently of one another, by —$C(R^0){=}C(R^{00})$—, —C≡C—, —$N(R^{00})$—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN, P or P-Sp-, where, if $B^1$ and/or $B^2$ contain a saturated C atom, $R^a$ and/or $R^b$ may also denote a radical which is spiro-linked to this saturated C atom, wherein at least one of the radicals $R^a$ and $R^b$ denotes or contains a group P or P-Sp-, P a polymerizable group, Sp a spacer group or a single bond, $B^1$ and $B^2$ an aromatic, heteroaromatic, alicyclic or heterocyclic group, preferably having 4 to 25 ring atoms, which may also contain fused rings, and which is unsubstituted, or mono- or polysubstituted by L, $Z^b$ —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH=CH—, —CF=CF—, —C≡C—, —CH=CH—COO—, —OCO—CH=CH—, $CR^0R^{00}$ or a single bond, $R^0$ and $R^{00}$ each, independently of one another, denote H or alkyl having 1 to 12 C atoms, m denotes 0, 1, 2, 3 or 4, n1 denotes 1, 2, 3 or 4, L P, P-Sp-, OH, $CH_2OH$, F, Cl, Br, I, —CN, —$NO_2$, —NCO, —NCS, —OCN, —SCN, —C(═O)N($R^x$)$_2$, —C(═O)$Y^1$, —C(═O)$R^x$, —N($R^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, P and Sp have the meanings indicated above, $Y^1$ denotes halogen, $R^x$ denotes P, P-Sp-, H, halogen, straight-chain, branched or cyclic alkyl having 1 to 25 C atoms, in which, in addition, one or more non-adjacent $CH_2$ groups may be replaced by —O—, —S—, —CO—, —CO—O—, —O—CO—, —O—CO—O— in such a way that 0 and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms.

Particularly preferred compounds of the Formula M are those in which $B^1$ and $B^2$ each, independently of one another, denote 1,4-phenylene, 1,3-phenylene, naphthalene-1,4-diyl, naphthalene-2,6-diyl, phenanthrene-2,7-diyl, 9,10-dihydro-phenanthrene-2,7-diyl, anthracene-2,7-diyl, fluorene-2,7-diyl, coumarine, flavone, where, in addition, one or more CH groups in these groups may be replaced by N, cyclohexane-1,4-diyl, in which, in addition, one or more non-adjacent $CH_2$ groups may be replaced by 0 and/or S, 1,4-cyclohexenylene, bicycle[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L as defined above.

Particularly preferred compounds of the Formula M are those in which $B^1$ and $B^2$ each, independently of one another, denote 1,4-phenylene, 1,3-phenylene, naphthalene-1,4-diyl or naphthalene-2,6-diyl.

Very preferred compounds of Formula M are selected from the following formulae:

M1

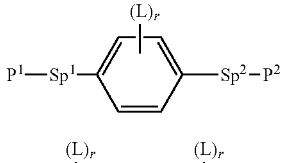

M2

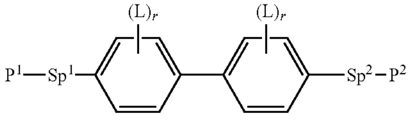

M3

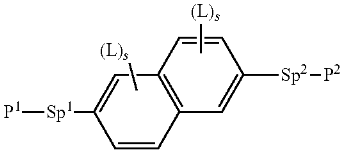

-continued

M4

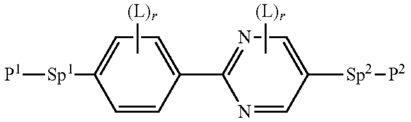

M5

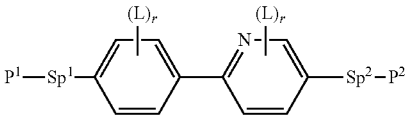

M6

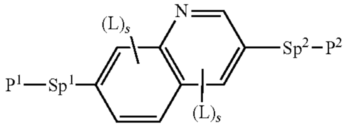

M7

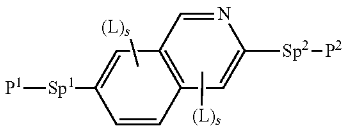

M8

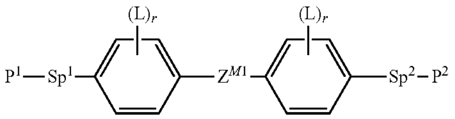

M9

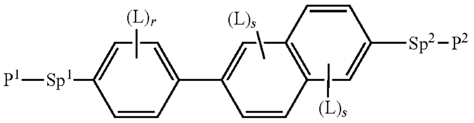

M10

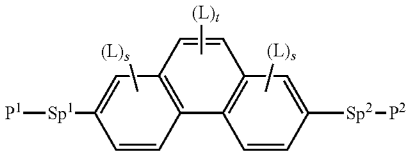

M11

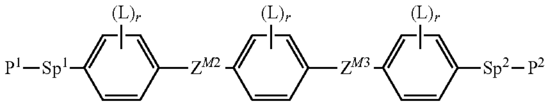

M12

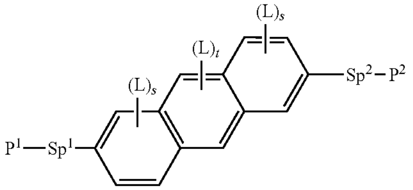

M13

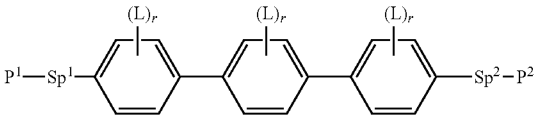

M14

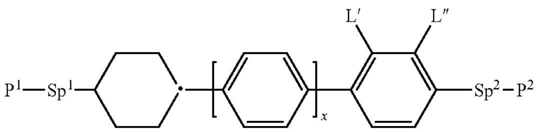

-continued
M15
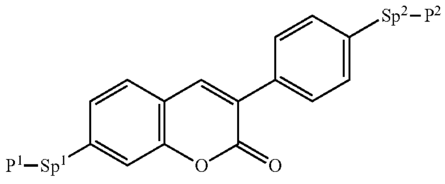
M16
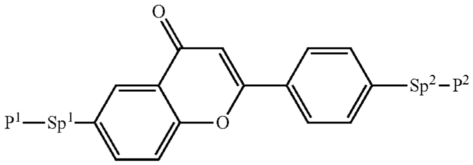
M17
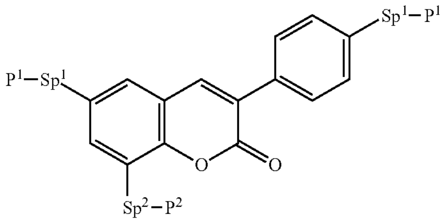
M18
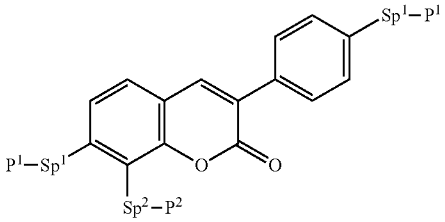
M19
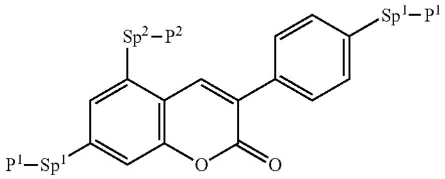
M20
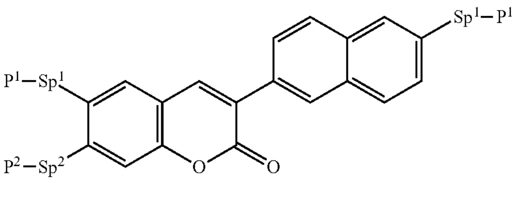
M21
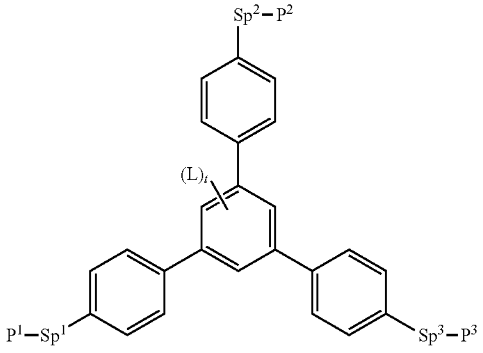
-continued
M22
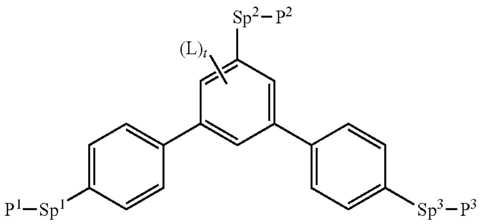
M23
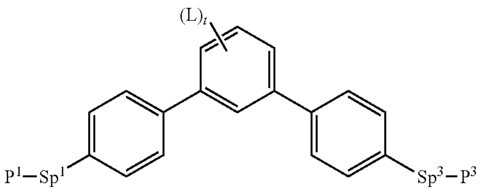
M24
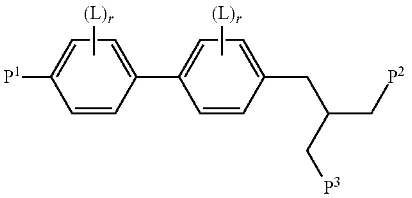
M25
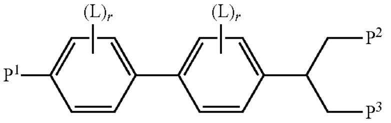
M26
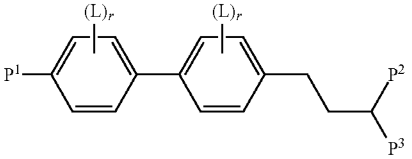
M27
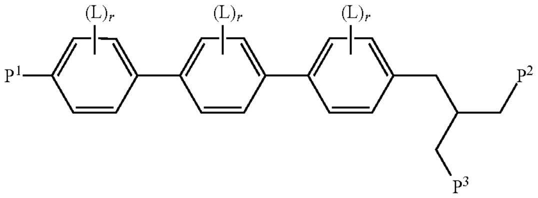
M28
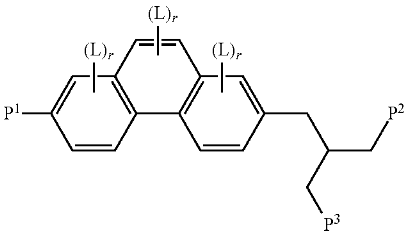
M29
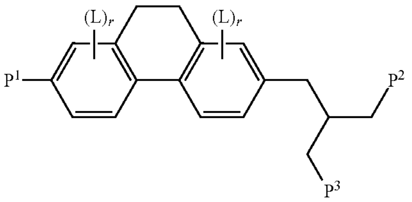

-continued

M30

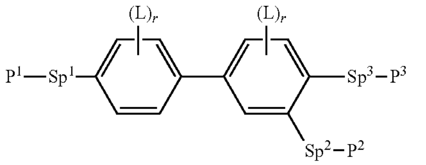

M31

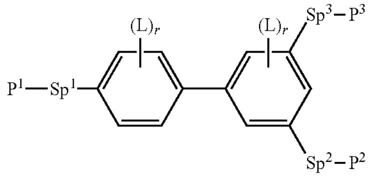

in which the individual radicals, on each occurrence identically or differently, and each, independently of one another, have the following meaning:

$P^1$, $P^2$, $P^3$ a polymerizable group, preferably selected from vinyloxy, acrylate, methacrylate, fluoroacrylate, chloroacrylate, oxetane and epoxy, $Sp^1$, $Sp^2$, $Sp^3$ a single bond or a spacer group where, in addition, one or more of the radicals $P^1$-$Sp^1$-, $P^1$—$Sp^2$- and $P^3$—$Sp^3$- may denote $R^{aa}$, with the proviso that at least one of the radicals $P^1$-$Sp^1$-, $P^2$-$Sp^2$ and $P^3$—$Sp^3$- present is different from $R^{aa}$, preferably —$(CH_2)_{p1}$—, —$(CH_2)_{p1}$—O—, —$(CH_2)_{p1}$—CO—O— or —$(CH_2)_{p1}$—O—CO—O—, wherein p1 is an integer from 1 to 12, $R^{aa}$ H, F, Cl, CN or straight-chain or branched alkyl having 1 to 25 C atoms, in which, in addition, one or more non-adjacent $CH_2$ groups may each be replaced, independently of one another, by —C($R^0$)═C($R^{00}$)—, —C≡C—, —N($R^0$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$—$Sp^1$-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), $R^0$, $R^{00}$ H or alkyl having 1 to 12 C atoms, $R^y$ and $R^z$ H, F, $CH_3$ or $CF_3$, $X^1$, $X^2$, $X^3$ —CO—O—, —O—CO— or a single bond, $Z^{M1}$ —O—, —CO—, —C($R^yR^z$)— or —$CF_2CF_2$—, $Z^{M2}$, $Z^{M3}$ —CO—O—, —O—CO—, —$CH_2$O—, —O$CH_2$—, —$CF_2$O—, —O$CF_2$— or —$(CH_2)_n$—, where n is 2, 3 or 4, L F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, L', L" H, F or Cl, r 0, 1, 2, 3 or 4, s 0, 1, 2 or 3, t 0, 1 or 2, x 0 or 1.

Especially preferred are compounds of Formulae M2 and M13.

Further preferred are trireactive compounds M15 to M31, in particular M17, M18, M19, M22, M23, M24, M25, M30 and M31.

In the compounds of Formulae M1 to M31 the group

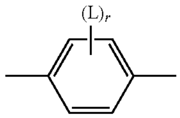

is preferably,

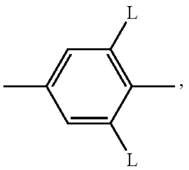,
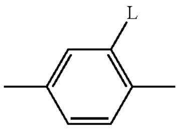,
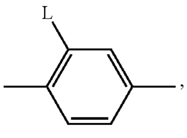,
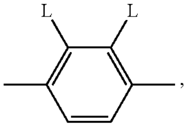,
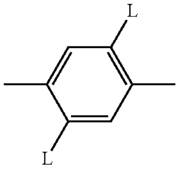 or
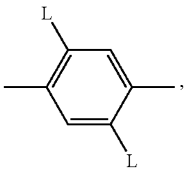, wherein L on each occurrence, identically or differently, has one of the meanings given above or below, and is preferably F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, very preferably F, Cl, CN, $CH_3$, $C_2H_5$, $OCH_3$, $COCH_3$, $OCF_3$ or P-Sp-, more preferably F, Cl, $CH_3$, $OCH_3$, $COCH_3$ or $OCF_3$, especially F or $CH_3$.

Preferred compounds of Formulae M1 to M31 are those wherein $P^1$, $P^2$ and $P^3$ denote an acrylate, methacrylate, oxetane or epoxy group, very preferably an acrylate or methacrylate group.

Further preferred compounds of Formulae M1 to M31 are those wherein $Sp^1$, $Sp^2$ and $Sp^3$ are a single bond.

Further preferred compounds of Formulae M1 to M31 are those wherein one of $Sp^1$, $Sp^2$ and $Sp^3$ is a single bond and another one of $Sp^1$, $Sp^2$ and $Sp^3$ is different from a single bond.

Further preferred compounds of Formulae M1 to M31 are those wherein those groups $Sp^1$, $Sp^2$ and $Sp^3$ that are different from a single bond denote —$(CH_2)_{s1}$—X"—, wherein s1 is an integer from 1 to 6, preferably 2, 3, 4 or 5, and X" is X" is the linkage to the benzene ring and is —O—, —O—CO—, —CO—O—, —O—CO—O— or a single bond.

Particular preference is given to liquid-crystalline media comprising one, two or three polymerizable compounds of Formula M, preferably selected from Formulae M1 to M31.

Further preferably the liquid-crystalline media according to the present invention comprise one or more polymerizable compounds selected from Table E below.

Preferably the proportion of polymerizable compounds in the liquid-crystalline medium, preferably selected from Formula M and Table E, is from 0.01 to 5%, very preferably from 0.05 to 1%, most preferably from 0.1 to 0.5%.

It was observed that the addition of one or more polymerizable compounds to the liquid-crystalline medium, like those selected from Formula M and Table E, leads to advantageous properties like fast response times. Such a liquid-crystalline medium is especially suitable for use in PSA displays where it shows low image sticking, a quick and complete polymerisation, the quick generation of a low pretilt angle which is stable after UV exposure, a high reliability, high VHR value after UV exposure, and a high birefringence. By appropriate selection of the polymerizable compounds it is possible to increase the absorption of the liquid-crystalline medium at longer UV wavelengths, so that it is possible to use such longer UV wavelengths for polymerisation, which is advantageous for the display manufacturing process.

The polymerizable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C═C double bond or —C≡C— triple bond, and groups which are suitable for polymerisation with ring opening, such as, for example, oxetane or epoxide groups.

Preferred groups P are selected from the group consisting of $CH_2$═$CW^1$—CO—O—, $CH_2$═$CW^1$—CO—,

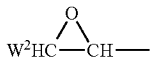, 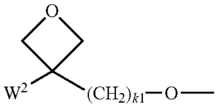,

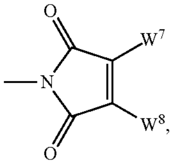 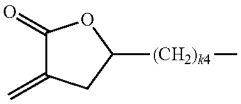, $CH_2$═$CW^2$—$(O)_{k3}$—, $CW^1$═CH—CO—$(O)_{k3}$—, $CW^1$═CH—CO—NH—, $CH_2$═$CW^1$—CO—NH—, $CH_3$—CH═CH—O—, $(CH_2═CH)_2$CH—OCO—, $(CH_2═CH—CH_2)_2$CH—OCO—, $(CH_2═CH)_2$CH—O—, $(CH_2═CH—CH_2)_2$N—, $(CH_2═CH—CH_2)_2$N—CO—, HO—$CW^2W^3$—, HS—$CW^2W^3$—, $HW^2$N—, HO—$CW^2W^3$—NH—, $CH_2$═$CW^1$—CO—NH—, $CH_2$═CH—$(COO)_{k1}$-Phe-$(O)_{k2}$—, $CH_2$═CH—$(CO)_{k1}$-Phe-$(O)_{k2}$—, Phe-CH═CH—, HOOC—, OCN— and $W^4W^5W^6$Si—, in which $W^1$ denotes H, F, Cl, CN, $CF_3$, phenyl or alkyl having 1 to 5 C atoms, in particular H, F, C or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, C or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Very preferred groups P are selected from the group consisting of $CH_2$═$CW^1$—CO—O—$CH_2$═$CW^1$—CO—,

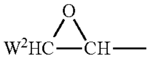, 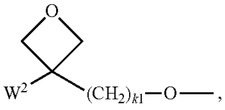,

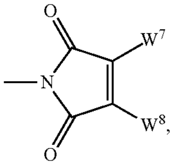 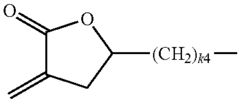, $CH_2$═$CW^2$—O—, $CH_2$═$CW^2$—, $CW^1$═CH—CO—$(O)_{k3}$—, $CW^1$═CH—CO—NH—, $CH_2$═$CW^1$—CO—NH—, $(CH_2═CH)_2$CH—OCO—, $(CH_2═CH—CH_2)_2$CH—OCO—, $(CH_2═CH)_2$CH—O—, $(CH_2═CH—CH_2)_2$N—, $(CH_2═CH—CH_2)_2$N—CO—, $CH_2$═$CW^1$—CO—NH—, $CH_2$═CH—$(COO)_{k1}$-Phe-$(O)_{k2}$—, $CH_2$═CH—$(CO)_{k1}$-Phe-$(O)_{k2}$—, Phe-CH═CH— and $W^4W^5W^6$Si—, in which $W^1$ denotes H, F, C, CN, $CF_3$, phenyl or alkyl having 1 to 5 C atoms, in particular H, F, C or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, $C_1$ or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups P are selected from the group consisting of $CH_2$═$CW^1$—CO—O—, in particular $CH_2$═CH—CO—O—, $CH_2$═$C(CH_3)$—CO—O— and $CH_2$═CF—CO—O—, furthermore $CH_2$═CH—O—, $(CH_2═CH)_2$CH—O—CO—, $(CH_2═CH)_2$CH—O—

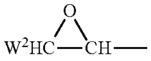 and 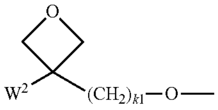.

Further preferred polymerizable groups P are selected from the group consisting of vinyloxy, acrylate, methacrylate, fluoroacrylate, chloroacrylate, oxetane and epoxide, most preferably from acrylate and methacrylate.

If Sp is different from a single bond, it is preferably of the formula Sp"-X", so that the respective radical P-Sp- conforms to the formula P-Sp"-X"—, wherein Sp" denotes alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, —$N(R^0)$—, —$Si(R^0R^{00})$—, —CO—, —CO—O—, —O—CO—, —O—CO—O—, —S—CO—, —CO—S—, —$N(R^{00})$—CO—O—, —O—CO—$N(R^0)$—, —$N(R^0)$—CO—$N(R^{00})$—, —CH═CH— or —C═C— in such a way that 0 and/or S atoms are not linked directly to one another, X" denotes —O—, —S—, —CO—, —CO—O—, —O—CO—, —O—CO—O—, —CO—$N(R^0)$—, —$N(R^0)$—CO—, —$N(R^0)$—CO—$N(R^{00})$—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH═N—, —N═CH—, —N═N—, —CH═CRO—, —$CY^2$═$CY^3$—, —C≡C—, —CH═CH—CO—O—, —O—CO—CH═CH— or a single bond, $R^0$ and $R^{00}$ each, independently of one another, denote H or alkyl having 1 to 20 C atoms, and $Y^2$ and $Y^3$ each, independently of one another, denote H, F, Cl or CN.

X" is preferably —O—, —S—, —CO—, —COO—, —OCO—, —O—COO—, —CO—$NR^0$—, —$NR^0$—CO—, —$NR^0$—CO—$NR^{00}$— or a single bond.

Typical spacer groups Sp and -Sp"-X"— are, for example, —$(CH_2)_{p1}$—, —$(CH_2CH_2O)_1$—$CH_2CH_2$—, —$CH_2CH_2$—S—$CH_2CH_2$—, —$CH_2CH_2$—NH—$CH_2CH_2$— or —$(SiR^0R^{00}$—$O)_{p1}$—, in which p1 is an integer from 1 to 12, q1 is an integer from 1 to 3, and $R^0$ and $R^{00}$ have the meanings indicated above.

Particularly preferred groups Sp and -Sp"-X"— are —$(CH_2)_{p1}$—, —$(CH_2)_{p1}$—O—, —$(CH_2)_{p1}$—O—CO—, —$(CH_2)_{p1}$—CO—O—, —$(CH_2)_{p1}$—O—CO—O—, in which p1 and q1 have the meanings indicated above.

Particularly preferred groups Sp" are, in each case straight-chain, ethylene, propylene, butylene, pentylene, hexylene, heptylene, octylene, nonylene, decylene, undecylene, dodecylene, octadecylene, ethyleneoxyethylene, methyleneoxybutyl-ene, ethylenethioethylene, ethylene-N-methyliminoethylene, 1-methylalkylene, ethenylene, propenylene and butenylene.

For the production of PSA displays, the polymerizable compounds contained in the liquid-crystalline medium are polymerised or crosslinked (if one compound contains two or more polymerizable groups) by in-situ polymerisation in the liquid-crystalline medium between the substrates of the LC display, optionally while a voltage is applied to the electrodes.

The structure of the PSA displays according to the invention corresponds to the usual geometry for PSA displays, as described in the prior art cited at the outset. Geometries without protrusions are preferred, in particular those in which, in addition, the electrode on the colour filter side is unstructured and only the electrode on the TFT side has slots. Particularly suitable and preferred electrode structures for PS-VA displays are described, for example, in US 2006/0066793 A1.

The combination of compounds of the preferred embodiments mentioned above with the polymerised compounds described above causes low threshold voltages, low rotational viscosities and very good low-temperature stabilities in the liquid-crystalline media according to the invention at the same time as constantly high clearing points and high VHR values.

The use of liquid-crystalline media containing polymerizable compounds allows the rapid establishment of a particularly low pretilt angle in PSA displays. In particular, the liquid-crystalline media exhibit significantly shortened response times, in particular also the grey-shade response times, in PSA displays compared with the media from the prior art.

Preference is generally given to liquid-crystalline media which have a nematic liquid-crystalline phase, and preferably have no chiral liquid crystal phase.

The invention also relates to the use of a liquid-crystalline medium according to the present invention as described above and below for electro-optical purposes, in particular for the use is in shutter glasses, for 3D applications, in TN, PS-TN, STN, TN-TFT, OCB, IPS, PS-IPS, FFS, HB-FFS, XB-FFS, PS-FFS, positive VA and positive PS-VA displays, and to electro-optical displays, in particular of the aforementioned types, containing a liquid-crystalline medium according to the present invention as described above and below, in particular a TN, PS-TN, STN, TN-TFT, OCB, IPS, PS-IPS, FFS, HB-FFS, XB-FFS, PS-FFS, positive VA (vertically aligned) or positive PS-VA display.

The invention also relates to electro-optical displays, such as, for example, STN or MLC displays, having two plane-parallel outer plates, which, together with a frame, form a cell, integrated non-linear elements for switching individual pixels on the outer plates, and a nematic liquid-crystal medium having positive dielectric anisotropy and high specific resistance located in the cell, wherein the a nematic liquid-crystal medium is a liquid-crystalline medium according to the present invention as described above and below.

The liquid-crystalline media according to the invention enable a significant broadening of the available parameter latitude. The achievable combinations of clearing point, viscosity at low temperature, thermal and UV stability and high optical anisotropy are far superior to previous materials from the prior art.

In particular, the combination of compounds of Formula I with compounds of Formula Y and/or B, and additionally with compounds selected from Formulae II-XXXV or their sub-formulae, leads to liquid-crystalline media which show a moderate positive dielectric anisotropy and at the same time an increased dielectric constant $\varepsilon\perp$ perpendicular to the longitudinal axes of the liquid-crystalline molecules, while maintaining a low rotational viscosity and a low value of the ratio $\gamma_1/k_{11}$. This enables liquid-crystalline displays, especially of the FFS, HB-FFS, XB-FFS and IPS mode, with high brightness and transmission and low response times.

The liquid-crystalline media according to the invention are suitable for mobile applications and TFT applications, such as, for example, mobile telephones and PDAs. Furthermore, the liquid-crystalline media according to the invention are particularly suitably for use in FFS, HB-FFS, XB-FFS and IPS displays based on dielectrically positive liquid crystals.

The liquid-crystalline media according to the invention, while retaining the nematic phase down to −20° C. and preferably down to −30° C., particularly preferably down to −40° C., and the clearing point ≥75° C., preferably ≥80° C., at the same time allow rotational viscosities $\gamma_1$ of ≤110 mPa-s, particularly preferably ≤100 mPa·s, to be achieved, enabling excellent MLC displays having fast response times to be achieved. The rotational viscosities are determined at 20° C.

The dielectric anisotropy $\Delta\varepsilon$ of the liquid-crystalline media according to the invention at 20° C. and 1 kHz is preferably ≥+1.5, very preferably from +2 to +6.

The birefringence $\Delta n$ of the liquid-crystalline media according to the invention at 20° C. is preferably from 0.08 to 0.15, very preferably from 0.1 to 0.14.

The rotational viscosity $\gamma_1$ of the liquid-crystalline media according to the invention is preferably ≤80 mPa s, more preferably ≤70 mPa s, very preferably ≤60 mPa s.

The ratio $\gamma_1/k_{11}$ (wherein $\gamma_1$ is the rotational viscosity $\gamma_1$ and $k_{11}$ is the elastic constant for splay deformation) of the liquid-crystalline media according to the invention is preferably ≤4.6 mPa·s/pN, very preferably ≤4.2 mPa·s/pN, most preferably ≤4.0 mPa·s/pN.

The nematic phase range of the liquid-crystalline media according to the invention preferably has a width of at least 90° C., more preferably of at least 100° C., in particular at least 110° C. This range preferably extends at least from −25° C. to +80° C.

It goes without saying that, through a suitable choice of the components of the liquid-crystalline media according to the invention, it is also possible for higher clearing points (for example above 100° C.) to be achieved at higher threshold voltages or lower clearing points to be achieved at lower threshold voltages with retention of the other advantageous properties. At viscosities correspondingly increased only slightly, it is likewise possible to obtain liquid-crystalline media having a higher Δε and thus low thresholds. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favourable electro-optical properties, such as, for example, high steepness of the characteristic line and low angle dependence of the contrast (German patent 30 22 818), lower dielectric anisotropy is sufficient at the same threshold voltage as in an analogous display at the second minimum. This enables significantly higher specific resistance values to be achieved using the mixtures according to the invention at the first minimum than in the case of liquid-crystalline media comprising cyano compounds. Through a suitable choice of the individual components and their proportions by weight, the person skilled in the art is able to set the birefringence necessary for a pre-specified layer thickness of the MLC display using simple routine methods.

Measurements of the voltage holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that liquid-crystalline media according to the invention comprising compounds of the Formulae ST-1, ST-2, RV, IA and IB exhibit a significantly smaller decrease in the HR on UV exposure than analogous mixtures comprising cyanophenylcyclohexanes of the formula

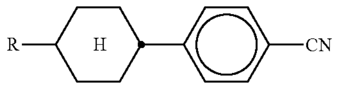

or esters of the formula

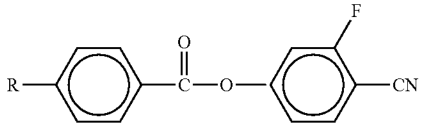

instead of the compounds of the Formulae I ST-1, ST-2, RV, IA and IB.

The light stability and UV stability of the liquid-crystalline media according to the invention are considerably better, i.e. they exhibit a significantly smaller decrease in the HR on exposure to light, heat or UV.

The construction of the MLC display according to the invention from polarisers, electrode base plates and surface-treated electrodes corresponds to the usual design for displays of this type. The term usual design is broadly drawn here and also encompasses all derivatives and modifications of the MLC display, in particular including matrix display elements based on poly-Si TFTs or MIM.

A significant difference between the displays according to the invention and the hitherto conventional displays based on the twisted nematic cell consists, however, in the choice of the liquid-crystal parameters of the liquid-crystal layer.

The liquid-crystalline media which can be used in accordance with the invention are prepared in a manner conventional per se, for example by mixing one or more compounds of Claim 1 with one or more compounds of the Formulae II-XXXV or with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The LC media may also comprise further additives known to the person skilled in the art and described in the literature, such as, for example, polymerisation initiators, inhibitors, surface-active substances, light stabilisers, antioxidants, e.g. BHT, TEMPOL, microparticles, free-radical scavengers, nanoparticles, etc. For example, 0-15% of pleochroic dyes or chiral dopants or initiators like Irgacure® 651 or Irgacure® 907 can be added. Suitable stabilisers and dopants are mentioned below in Tables C and D.

In a preferred embodiment of the present invention the LC media contain one or more further stabilisers, preferably selected from the group consisting of the following Formulae H and ST as described above.

In a preferred embodiment the LC medium comprises one or more stabilisers selected from Table D.

Preferably the proportion of stabilisers, like those of Formula S1-S3, in the LC medium is from 10 to 2000 ppm, very preferably from 30 to 1000 ppm.

In another preferred embodiment the LC medium according to the present invention contains a self-aligning (SA) additive, preferably in a concentration of 0.1 to 2.5%. An LC medium according to this preferred embodiment is especially suitable for use in polymer stabilised SA-FFS, SA-HB-FFS or SA-XB-FFS displays.

In a preferred embodiment the SA-FFS, SA-HB-FFS or SA-XB-FFS display according to the present invention does not contain a polyimide alignment layer. In another preferred embodiment the SA-FFS, SA-HB-FFS or SA-XB-FFS display according to preferred embodiment contains a polyimide alignment layer.

Preferred SA additives for use in this preferred embodiment are selected from compounds comprising a mesogenic group and a straight-chain or branched alkyl side chain that is terminated with one or more polar anchor groups selected from hydroxy, carboxy, amino or thiol groups.

Further preferred SA additives contain one or more polymerizable groups which are attached, optionally via spacer groups, to the mesogenic group. These polymerizable SA additives can be polymerised in the LC medium under similar conditions as applied for the RMs in the PSA process.

Suitable SA additives to induce homeotropic alignment, especially for use in SA-VA mode displays, are disclosed for example in US 2013/0182202 A1, US 2014/0138581 A1, US 2015/0166890 A1 and US 2015/0252265 A1.

In another preferred embodiment an LC medium or a polymer stabilised SA-FFS, SA-HB-FFS or SA-XB-FFS display according to the present invention contains one or more self-aligning additives selected from Table F below.

Furthermore, it is possible to add to the liquid-crystalline media, for example, 0 to 15% by weight of pleochroic dyes, furthermore nanoparticles, conductive salts, preferably ethyldimethyldodecylammonium 4-hexoxybenzoate, tetrabutyl-ammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

For the present invention and in the following examples, the structures of the liquid-crystal compounds are indicated by means of acronyms, with the transformation into chemical formulae taking place in accordance with Tables A to C below. All radicals $C_mH_{2m}+1$, $C_nH_{2n+1}$, and $C_lH_{2l+1}$ or $C_mH_{2m-1}$, $C_nH_{2n-1}$ and $C_lH_{2l-1}$ are straight-chain alkyl radicals or alkylene radicals, in each case having n, m and l C atoms respectively. Preferably n, m and l are independently of each other 1, 2, 3, 4, 5, 6, or 7. Table A shows the codes for the ring elements of the nuclei of the compound, Table B lists the bridging units, and Table C lists the meanings of the symbols for the left- and right-hand end groups of the molecules. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A

| Ring elements | |
|---|---|
| 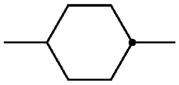 | C |
| 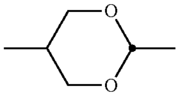 | D |
| 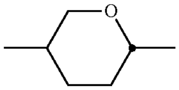 | A |
| 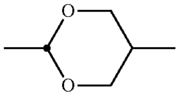 | DI |
| 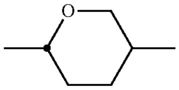 | Al |
| 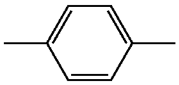 | P |
| 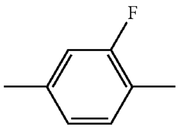 | G |

TABLE A-continued

| Ring elements | |
|---|---|
| 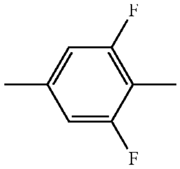 | U |
| 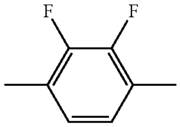 | Y |
| 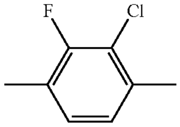 | P(F, CI)Y |
| 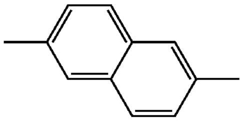 | np |
| 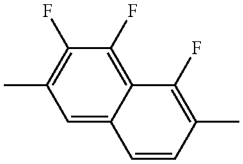 | n3f |
| 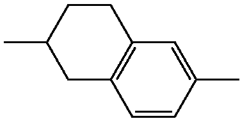 | th |
| 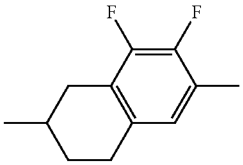 | tH2f |
| 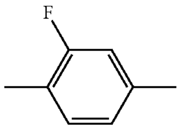 | GI |
| 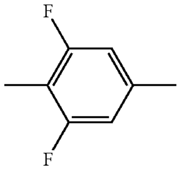 | UI |
| 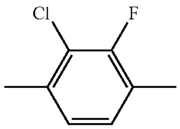 | P(CI,F)Y |

TABLE A-continued
| Ring elements | |
|---|---|
| 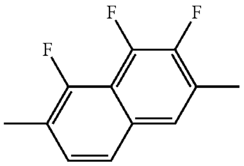 | nN3fI |
| 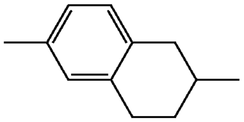 | thI |
| 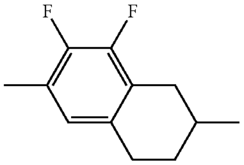 | tH2fI |
| 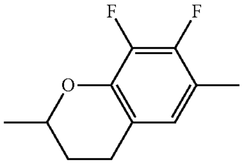 | o2f |
| 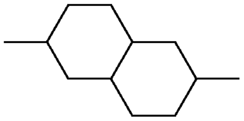 | dh |
| 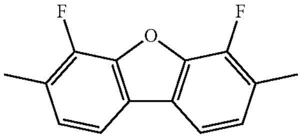 | B |
| 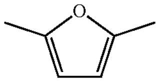 | O |
| 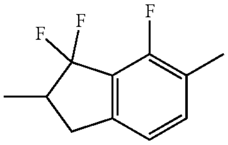 | K |
| 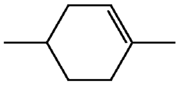 | L |
| 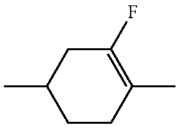 | F |
TABLE A-continued
| Ring elements | |
|---|---|
| 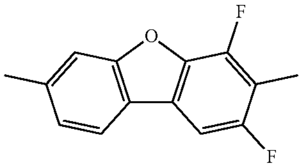 | Bh |
| 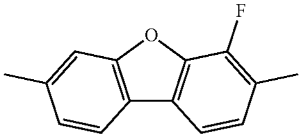 | Bf |
| 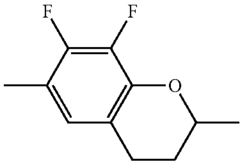 | o2fI |
| 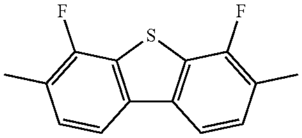 | B(S) |
| 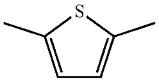 | S |
| 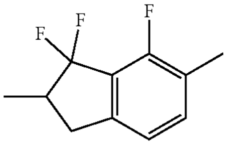 | KI |
| 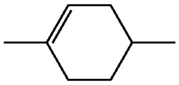 | LI |
| 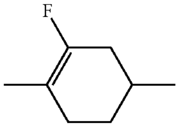 | FI |
| 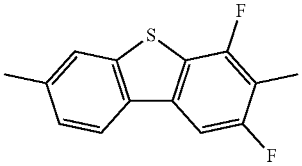 | Bh(S) |
| 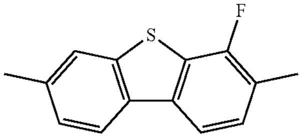 | Bf(S) |

TABLE A-continued

| Ring elements | |
|---|---|
| 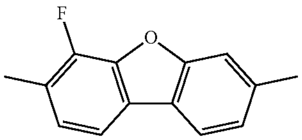 | Bfi |
| 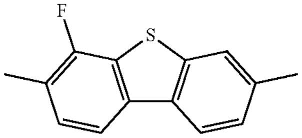 | Bfi(S) |

TABLE B

| Bridging units | | | |
|---|---|---|---|
| E | $—CH_2—CH_2—$ | | |
| V | —CH═CH— | | |
| T | —C≡C— | | |
| W | $—CF_2—CF_2—$ | | |
| B | —CF═CF— | | |
| Z | —CO—O— | ZI | —O—CO— |
| X | —CF═CH— | XI | —CH═CF— |
| O | $—CH_2—O—$ | OI | $—O—CH_2—$ |
| Q | $—CF_2—O—$ | QI | $—O—CF_2—$ |

TABLE C

| End groups | | | |
|---|---|---|---|
| On the left individually or in combination | | On the right individually or in combination | |
| -n- | $C_nH_{2n+1}—$ | -n | $—C_nH_{2n+1}$ |
| -nO— | $C_nH_{2n+1}—O—$ | —On | $—O—C_nH_{2n+1}$ |
| —V— | $CH_2═CH—$ | —V | $—CH═CH_2$ |
| -nV— | $C_nH_{2n+1}—CH═CH—$ | -nV | $—C_nH_{2n}—CH═CH_2$ |
| —Vn- | $CH_2═CH—C_nH_{2n}—$ | —Vn | $—CH═CH—C_nH_{2n+1}$ |
| -nVm- | $C_nH_{2n+1}—CH═CH—C_mH_{2m}—$ | -nVm | $—C_nH_{2n}—CH═CH—C_mH_{2m+1}$ |
| —N— | N≡C— | —N | —C≡N |
| —S— | S═C═N— | —S | —N═C═S |

TABLE C-continued

| End groups | | | |
|---|---|---|---|
| On the left individually or in combination | | On the right individually or in combination | |
| —F— | F— | —F | —F |
| —CL— | Cl- | —CL | —Cl |
| —M— | $CFH_2—$ | —M | $—CFH_2$ |
| —D— | $CF_2H—$ | —D | $—CF_2H$ |
| —T— | $CF_3—$ | —T | $—CF_3$ |
| —MO— | $CFH_2O—$ | —OM | $—OCFH_2$ |
| —DO— | $CF_2HO—$ | —OD | $—OCF_2H$ |
| —TO— | $CF_3O—$ | —OT | $—OCF_3$ |
| —A— | H—C≡C— | —A | —C═C—H |
| -nA— | $C_nH_{2n+1}—C≡C—$ | —An | $—C═C—C_nH_{2n+1}$ |
| —NA— | N═C—C═C— | —AN | —C═C—C≡N |
| -(cn)- | 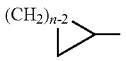 | -(cn) | 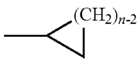 |
| -(cn)m- | 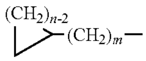 | -m(cn) | 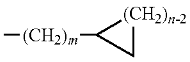 |
| —. . .n. . .— | $—C_nH_{2n}—$ | —. . .n. . . | $—C_nH_{2n}—$ |
| —. . .M. . .— | —CFH— | —. . .M. . . | —CFH— |
| —. . .D. . .— | $—CF_2—$ | —. . .D. . . | $—CF_2—$ |
| —. . .V. . .— | —CH═CH— | —. . .V. . . | —CH═CH— |
| —. . .Z. . .— | —CO—O— | —. . .Z. . . | —CO—O— |
| —. . .ZI. . .— | —O—CO— | —. . .ZI. . . | —O—CO— |
| —. . .K. . .— | —CO— | —. . .K. . . | —CO— |
| —. . .W. . .— | —CF═CF— | —. . .W. . . | —CF═CF— |

in which n and m are each integers, and the three dots " . . . " are placeholders for other abbreviations from this table.

The following abbreviations are used:

(n, m, k and l are, independently of one another, each an integer, preferably 1 to 9 preferably 1 to 7, k and l possibly may be also 0 and preferably are 0 to 4, more preferably 0 or 2 and most preferably 2, n preferably is 1, 2, 3, 4 or 5, in the combination "-nO—" it preferably is 1, 2, 3 or 4, preferably 2 or 4, m preferably is 1, 2, 3, 4 or 5, in the combination "-Om" it preferably is 1, 2, 3 or 4, more preferably 2 or 4. The combination "-IVm" preferably is "2V1".)

Preferred mixture components are shown in Tables D and E.

TABLE D

| | |
|---|---|
| 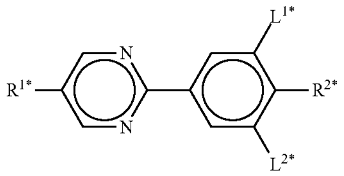 | PYP |
| 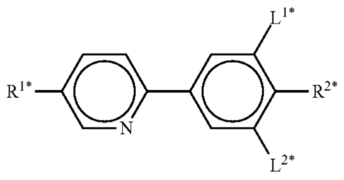 | PYRP |

TABLE D-continued
| | |
|---|---|
| 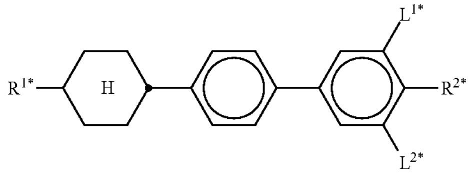 | BCH |
| 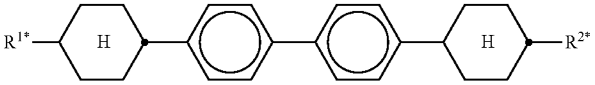 | CBC |
| 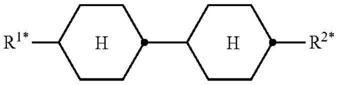 | CCH |
| 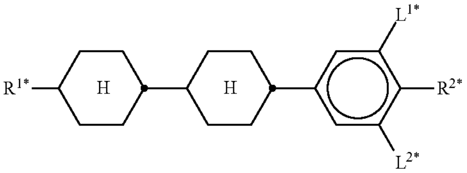 | CCP |
| 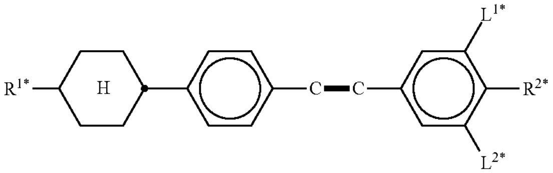 | CPTP |
| 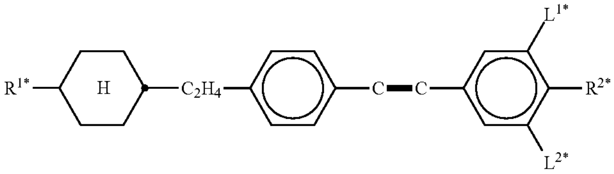 | CEPTP |
| 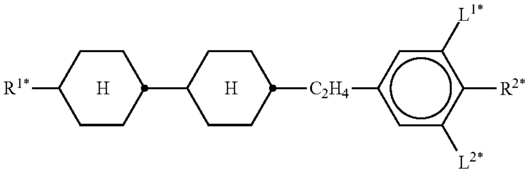 | ECCP |
| 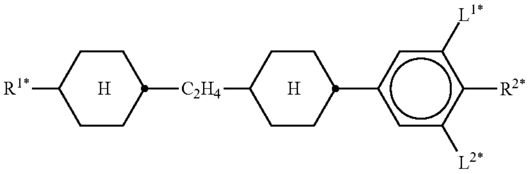 | CECP |
| 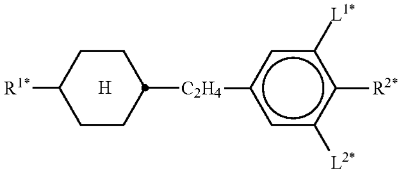 | EPCH |

TABLE D-continued
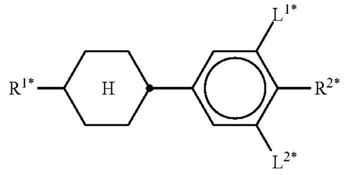
PCH
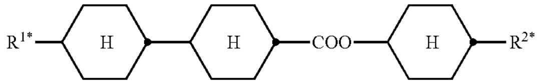
CH
CH
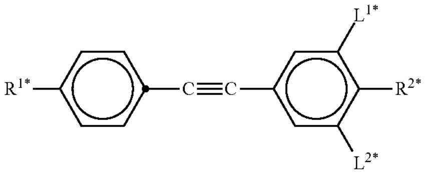
PTP
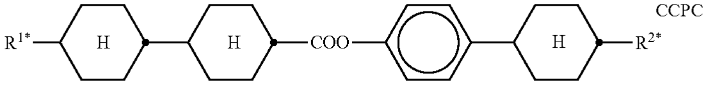
CCPC
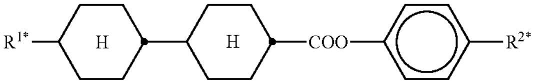
CP
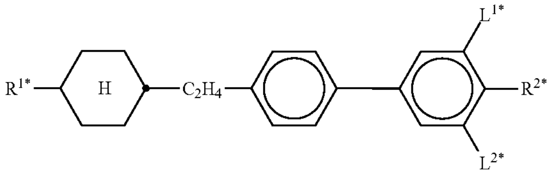
BECH
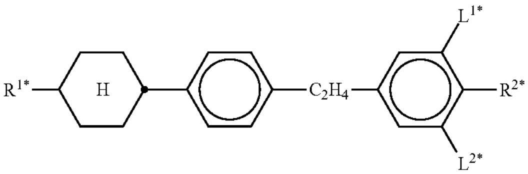
EBCH
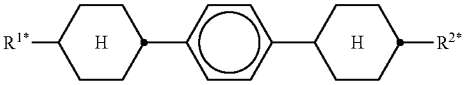
CPC
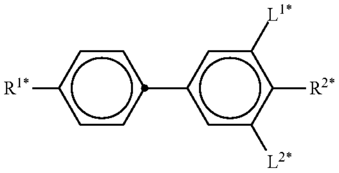
B
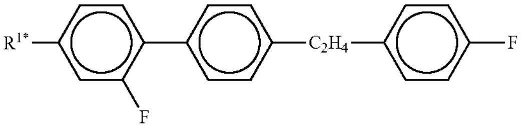
FET-nF
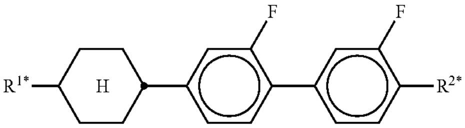
CGG TABLE D-continued
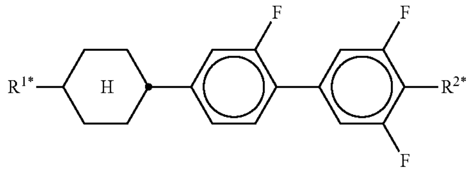
CGU
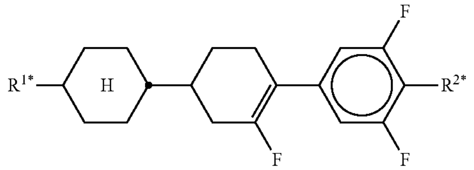
CFU
Table E
In the following formulae, n and m each, independently of one another, denote 0, 1, 2, 3, 4, 5, 6, 7, 8, 9, 10, 11 or 12, in particular 2, 3, 5, furthermore 0, 4, 6.
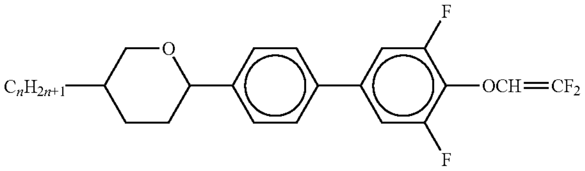
APU-n-OXF
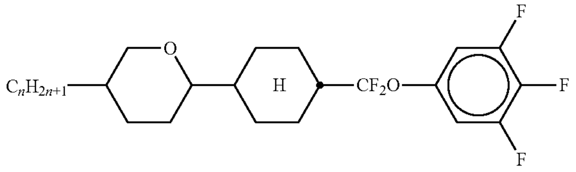
ACQU-n-F
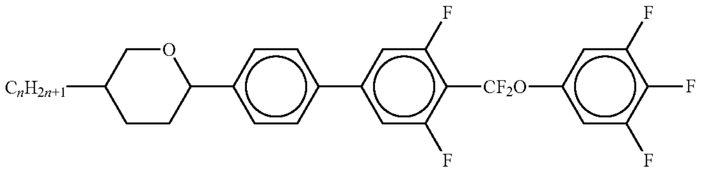
APUQU-n-F
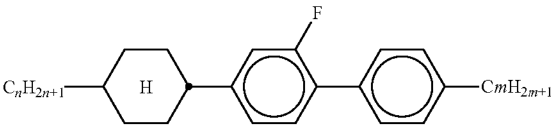
BCH-n.Fm
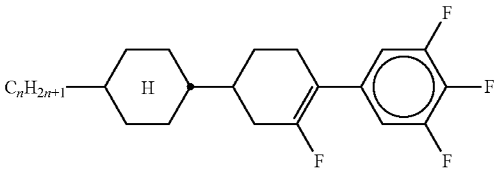
CFU-n-F
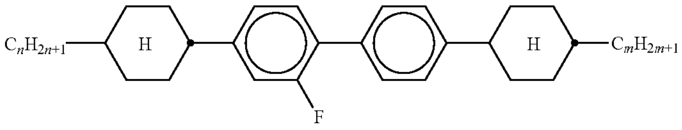
CBC-nmF -continued
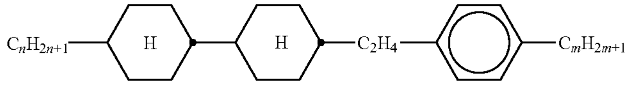
ECCP-nm
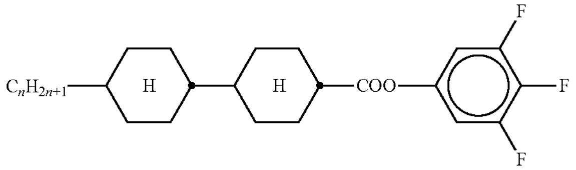
CCZU-n-F
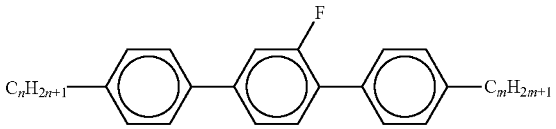
PGP-n-m
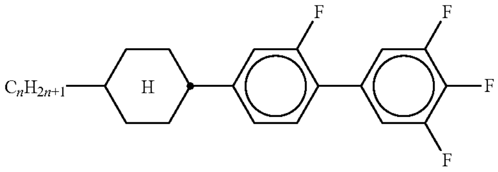
CGU-n-F
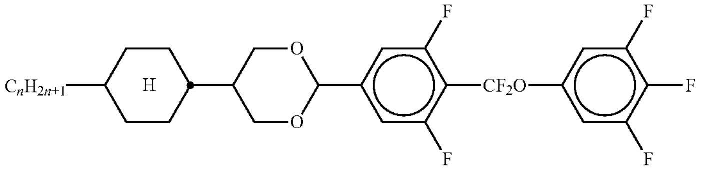
CDUQU-n-F
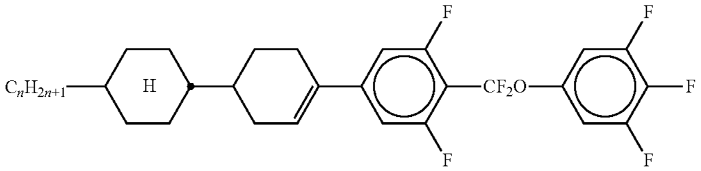
CLUQU-n-F
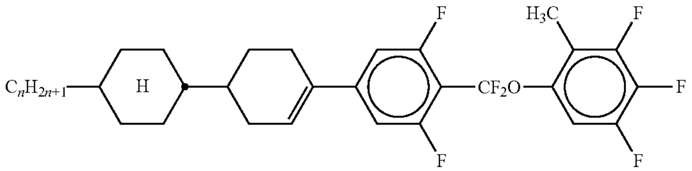
CLUQU(1)-n-F
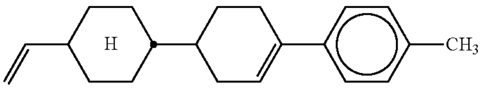
CLP-V-n
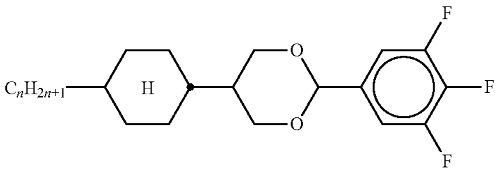
CDU-n-F
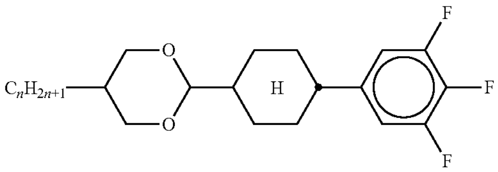
DCU-n-F -continued
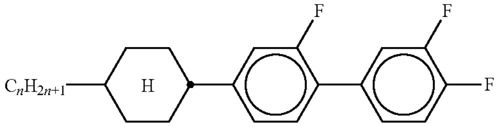
CGG-n-F
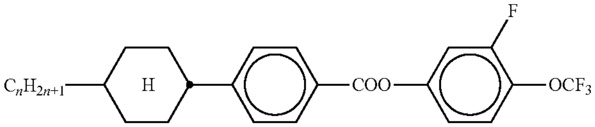
CPZG-n-OT
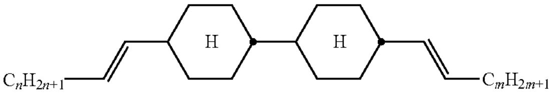
CC-nV-Vm
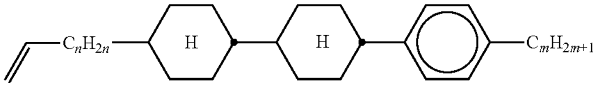
CCP-Vn-m
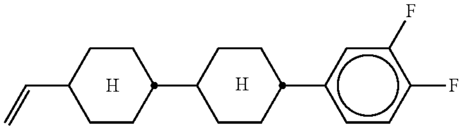
CCG-V-F
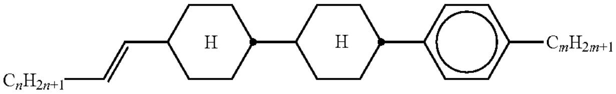
CCP-nV-m
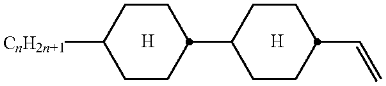
CC-n-V
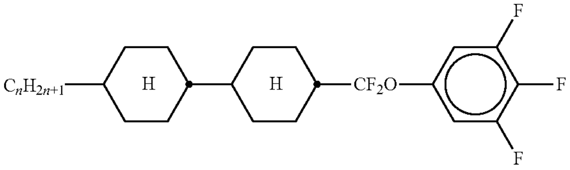
CCQU-n-F
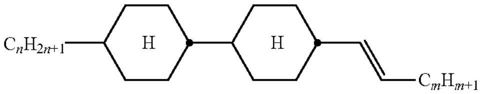
CC-n-Vm
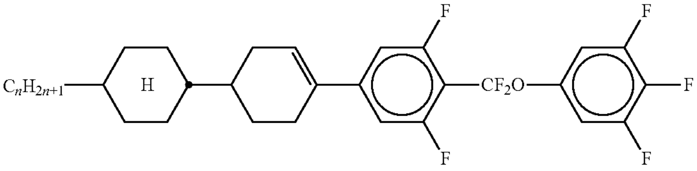
CLUQU-n-F
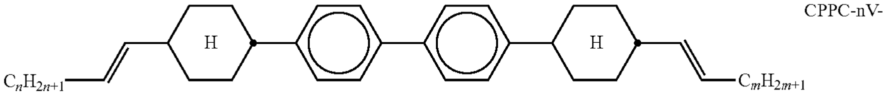
CPPC-nV-Vm
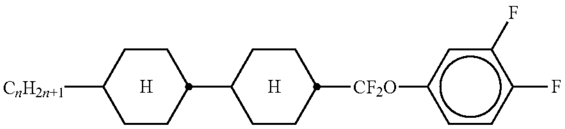
CCQG-n-F -continued
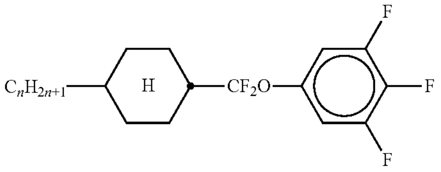
CQU-n-F
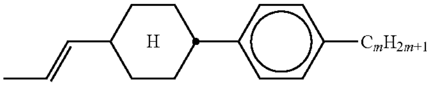
CP-1V-m
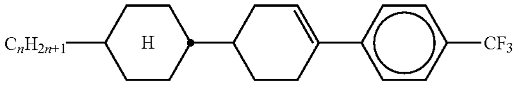
CLP-n-T
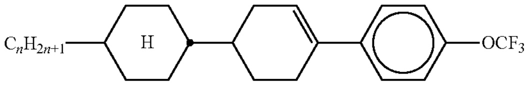
CLP-n-OT
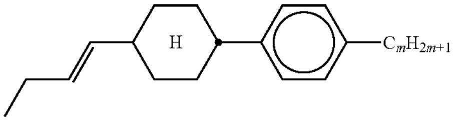
CP-2V-m
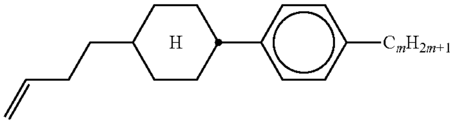
CP-V2-m
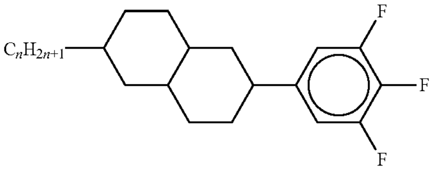
Dec-U-n-F
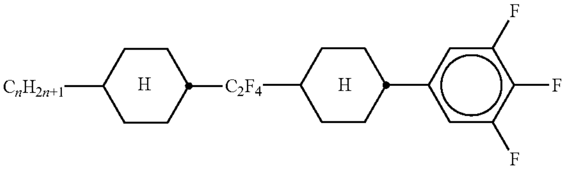
CWCU-n-F
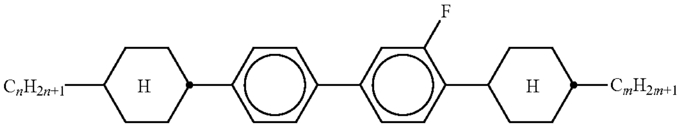
CPGP-n-m
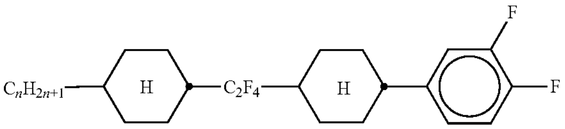
CWCG-n-F
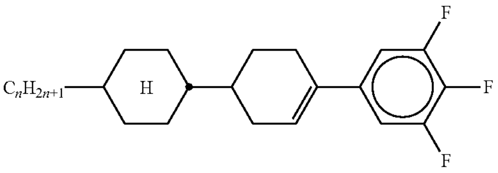
CLU-n-F -continued
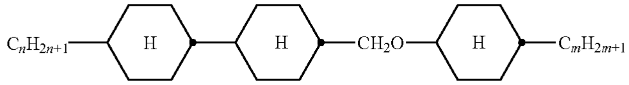
CCOC-n-m
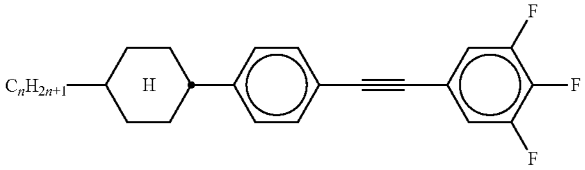
CPTU-n-F
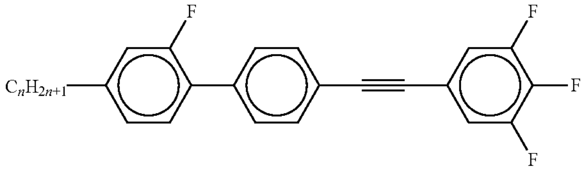
GPTU-n-F
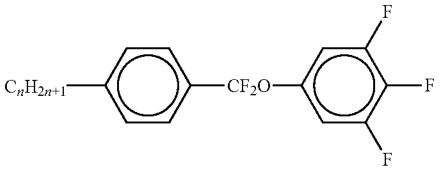
PQU-n-F
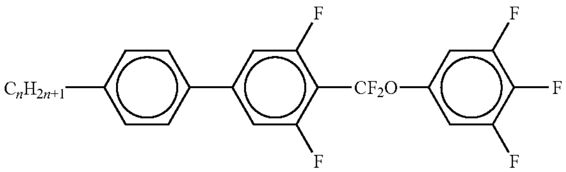
PUQU-n-F
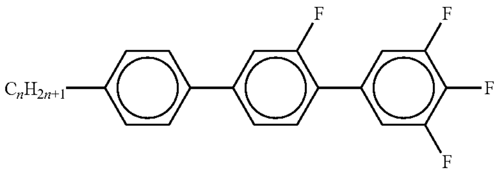
PGU-n-F
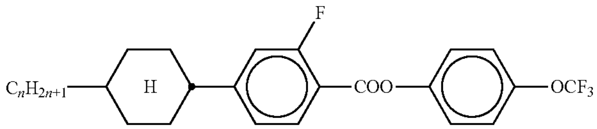
CGZP-n-OT
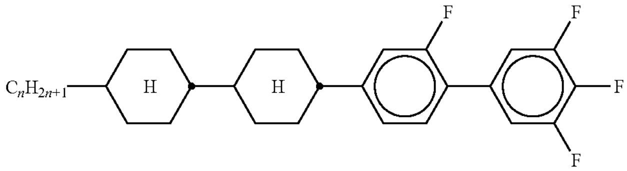
CCGU-n-F
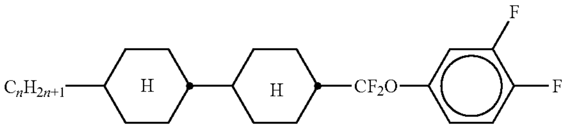
CCQG-n-F
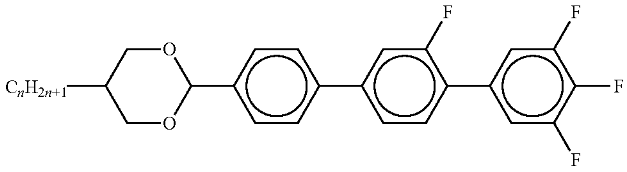
DPGU-n-F -continued
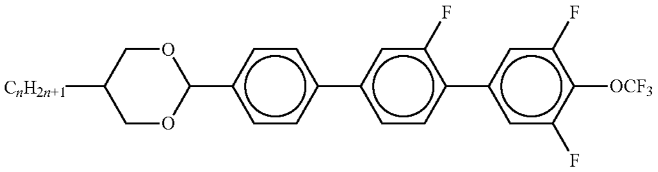
DPGU-n-OT
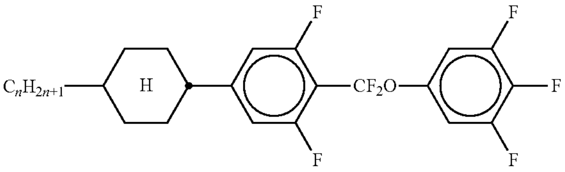
CUQU-n-F
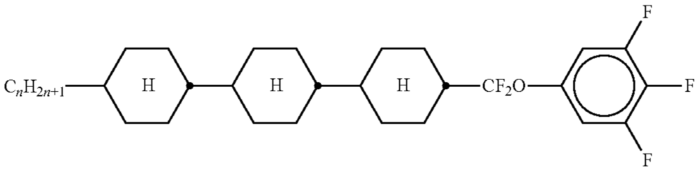
CCCQU-n-F
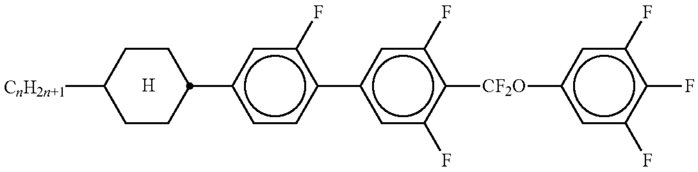
CGUQU-n-F
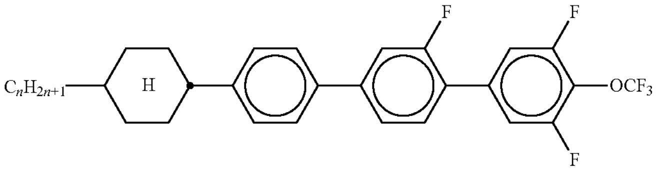
CPGU-n-OT
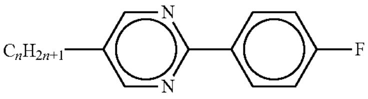
PYP-nF
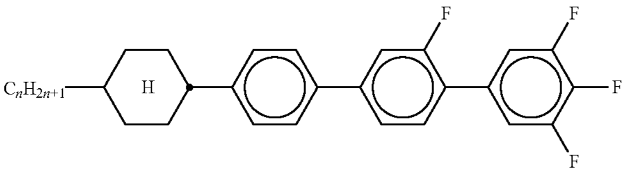
CPGU-n-F
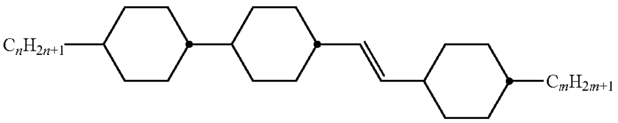
CCVC-n-m
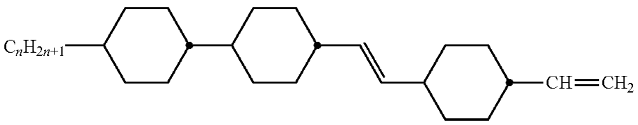
CCVC-n-V
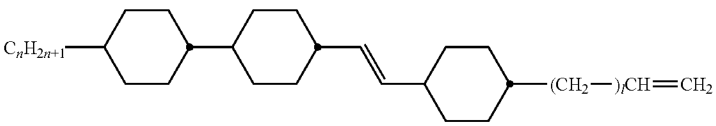
CCVC-n-IV -continued
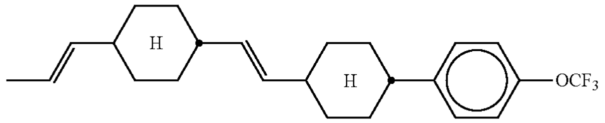
CVCP-1V-OT
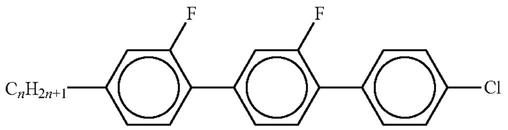
GGP-n-Cl
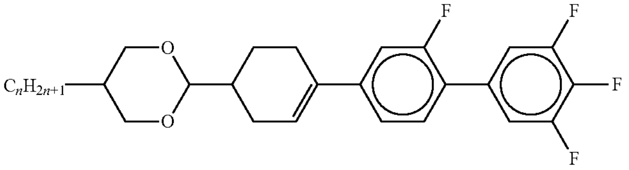
DLGU-n-F
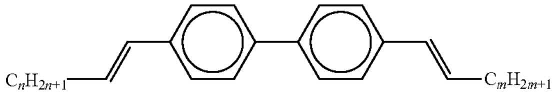
PP-nV-Vm
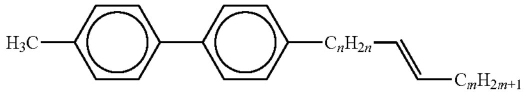
PP-1-nVm
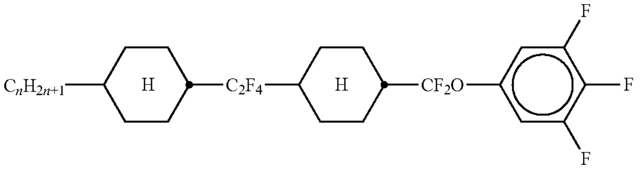
CWCQU-n-F
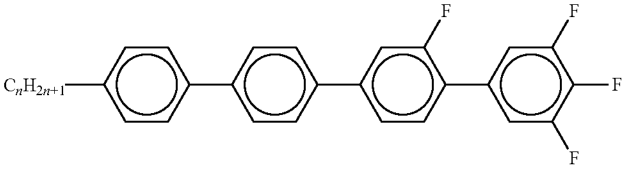
PPGU-n-F
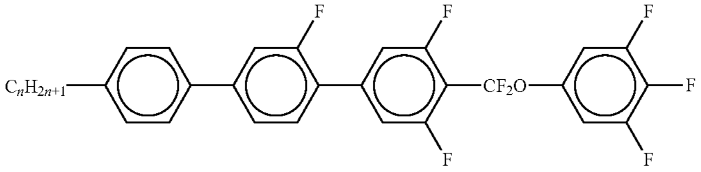
PGUQU-n-F
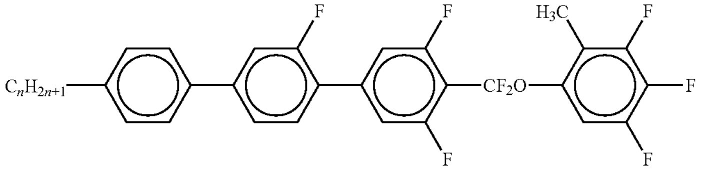
PGUQU(1)-n-F
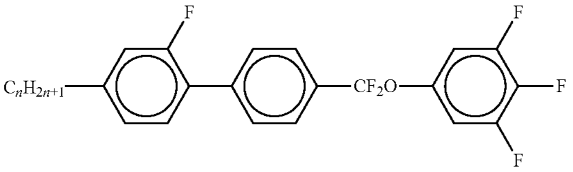
GPQU-n-F -continued
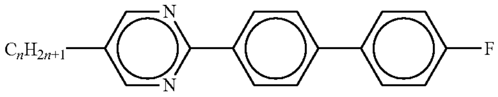
MPP-n-F
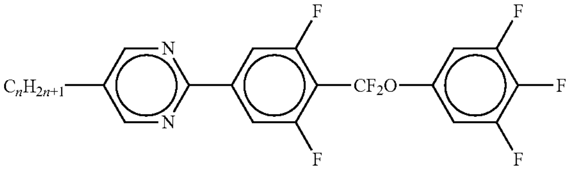
MUQU-n-F
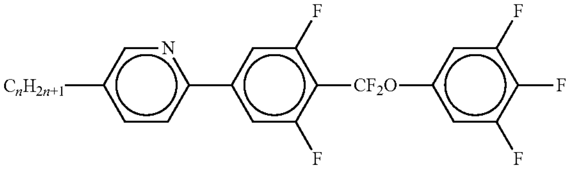
NUQU-n-F
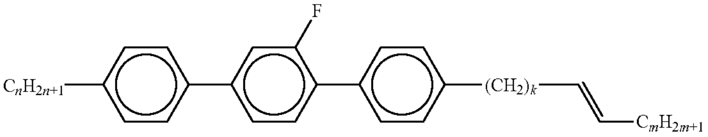
PGP-n-kVm
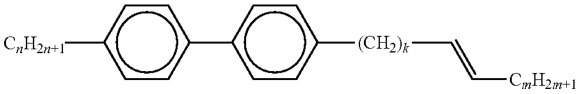
PP-n-kVm
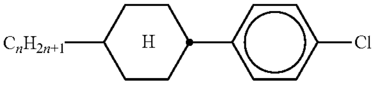
PCH-nCI
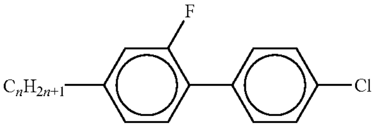
GP-n-CI
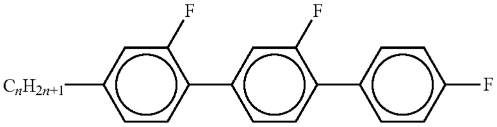
GGP-n-F
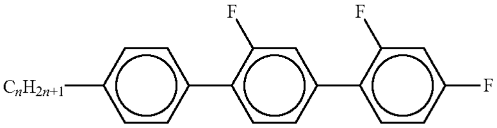
PGIGI-n-F
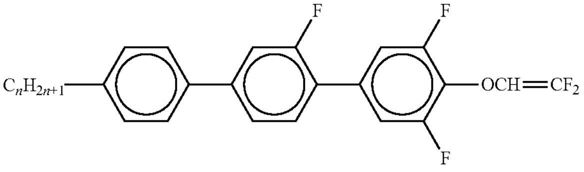
PGU-n-OXF
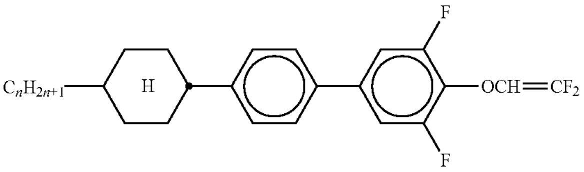
CPU-n-OXF -continued
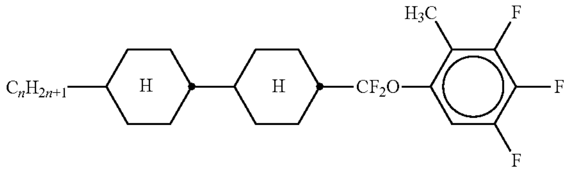
CCQU-n-F(1)
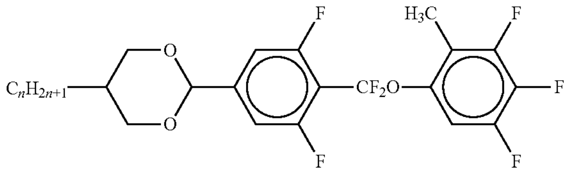
DUQU-n-F(1)
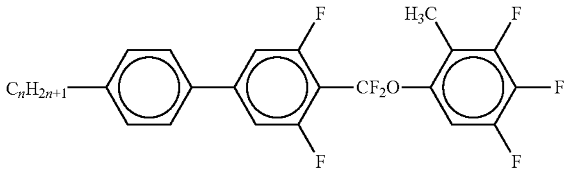
PUQU-n-F(1)
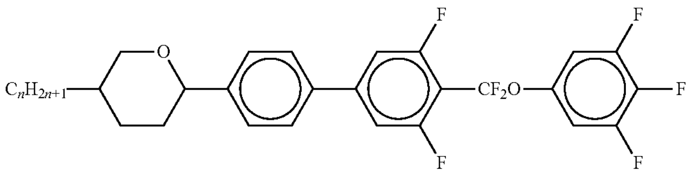
APUQU-n-F(1)
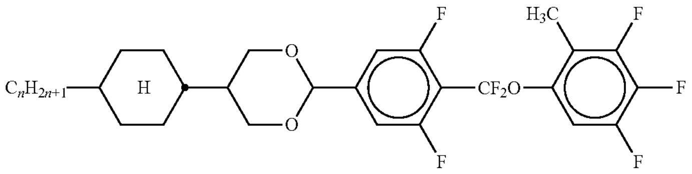
CDUQU-n-F(1)
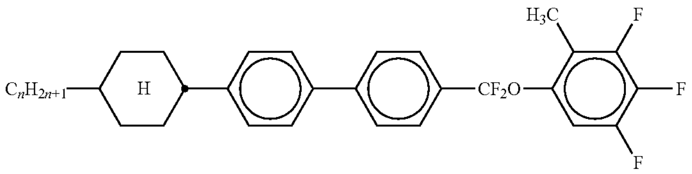
CPPQU-n-F(1)
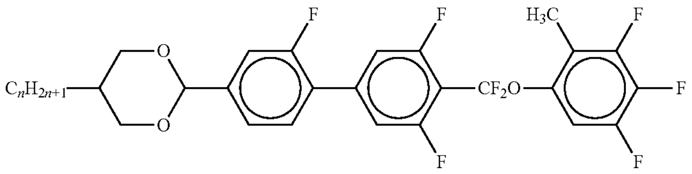
DGUQU-n-F(1)
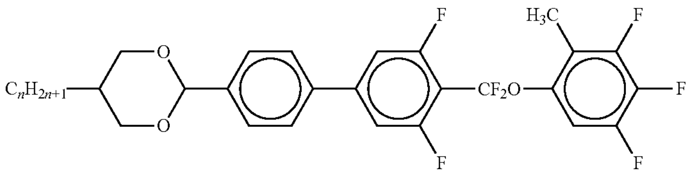
DPUQU-n-F(1)
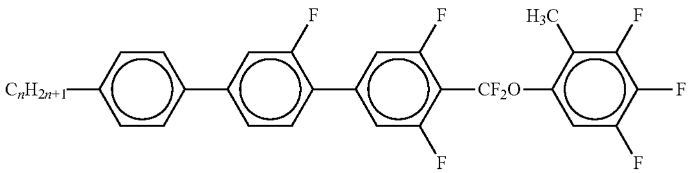
PGUQU-n-F(1)

-continued

| | |
|---|---|
| 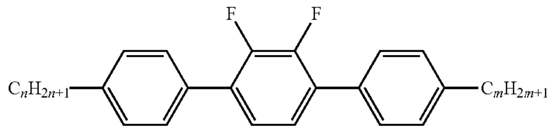 | PYP-n-m |

Particular preference is given to liquid-crystalline media which, besides the compounds of the Formulae IA, IIA, IB and IIB, comprise at least one, two, three, four or more compounds from Table E.

Table F

Table F indicates possible dopants which are generally added to the liquid-crystalline media according to the invention. The liquid-crystalline media preferably comprise 0-10% by weight, in particular 0.01-5% by weight and particularly preferably 0.01-3% by weight of dopants.

| | |
|---|---|
| 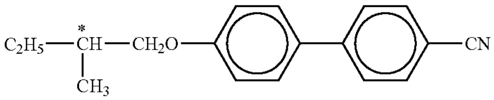 | C 15 |
| 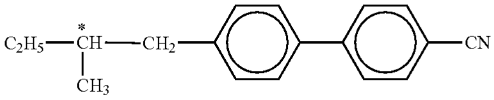 | CB 15 |
| 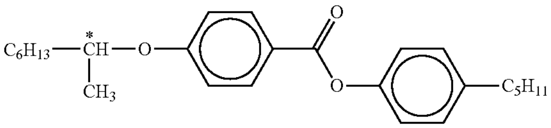 | CM 21 |
| 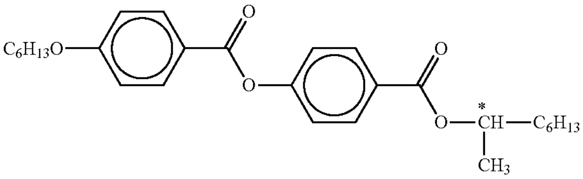 | R/S-811 |
| 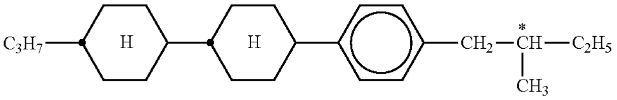 | CM 44 |
| 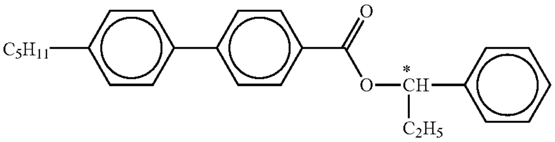 | CM 45 |
| 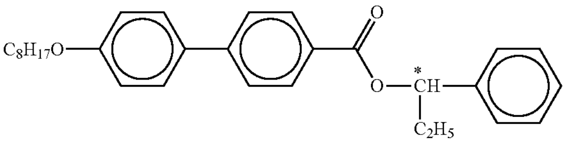 | CM 47 |

-continued
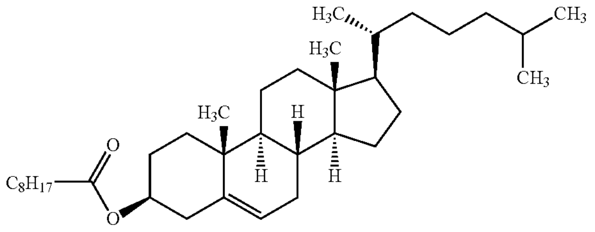
CN
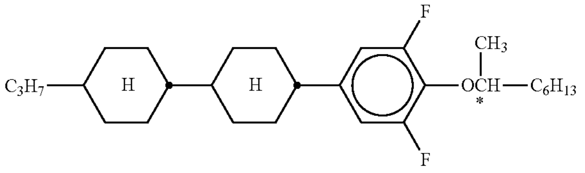
R/S-2011
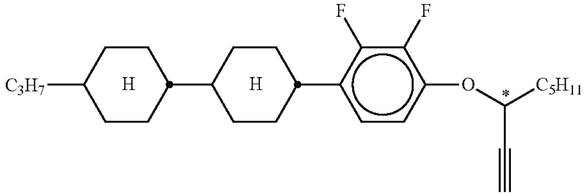
R/S-3011
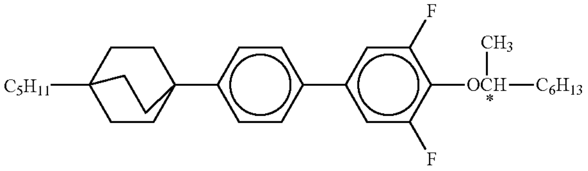
R/S-4011
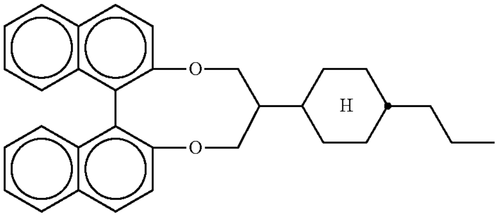
R/S-5011
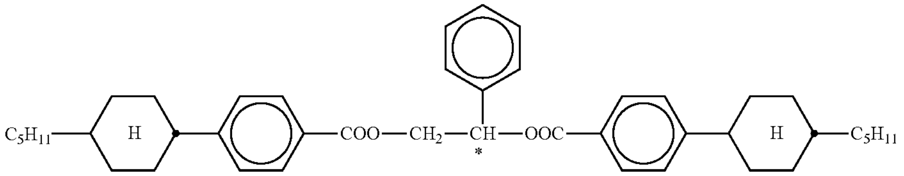
R/S-1011
Table G
Stabilisers, which can additionally be added, for example, to the liquid-crystalline media according to the invention in amounts of 0-10% by weight, are mentioned below.
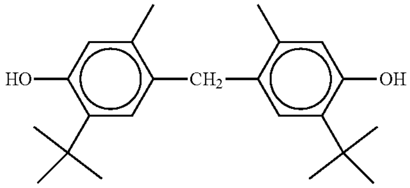

-continued
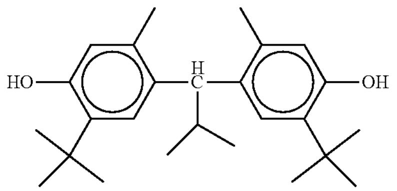
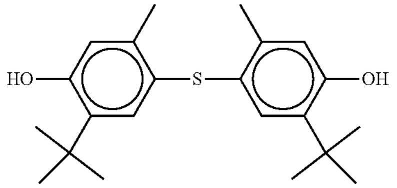
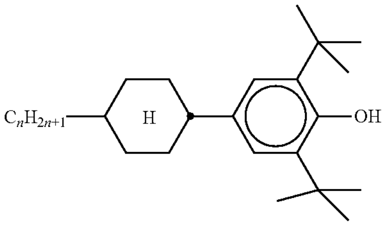
n = 1, 2, 3, 4, 5, 6 or 7
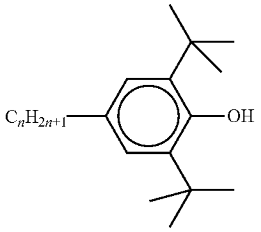
n = 1, 2, 3, 4, 5, 6 or 7
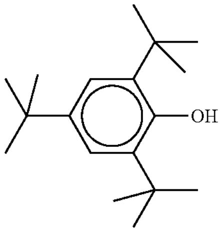
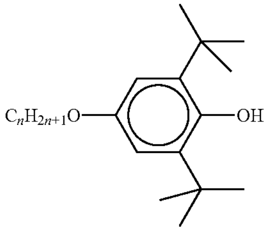
n = 1, 2, 3, 4, 5, 6 or 7

-continued
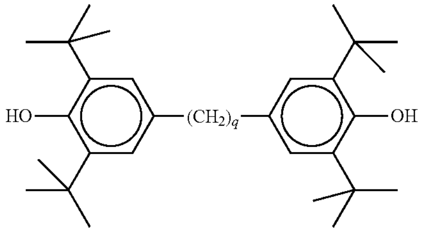
q = 1, 2, 3, 4, 5, 6 or 7
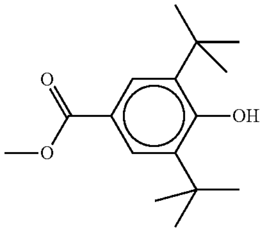
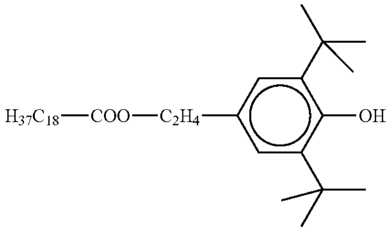
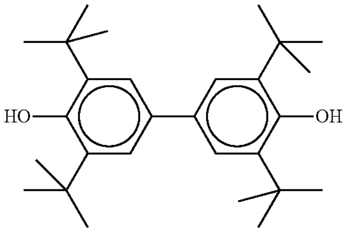
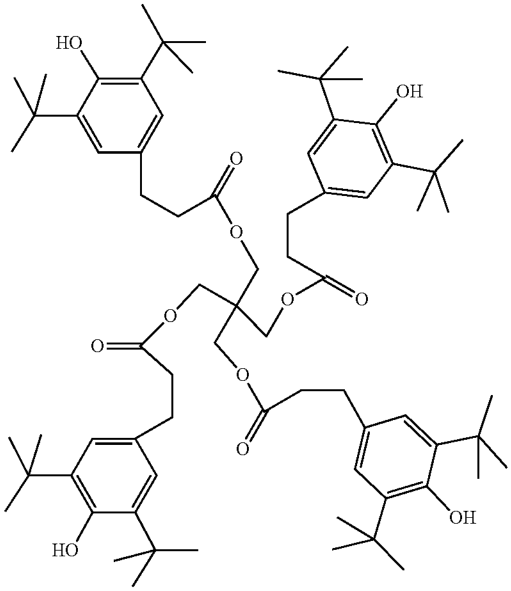 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]

-continued
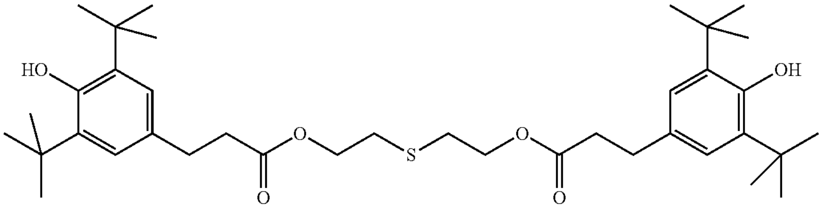 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
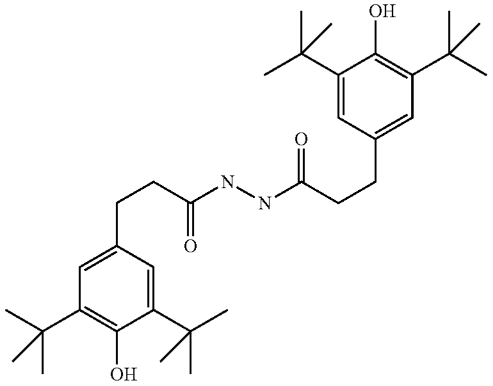
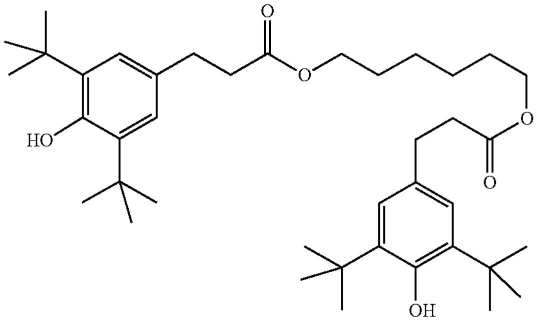 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
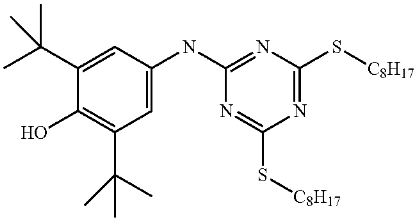

-continued
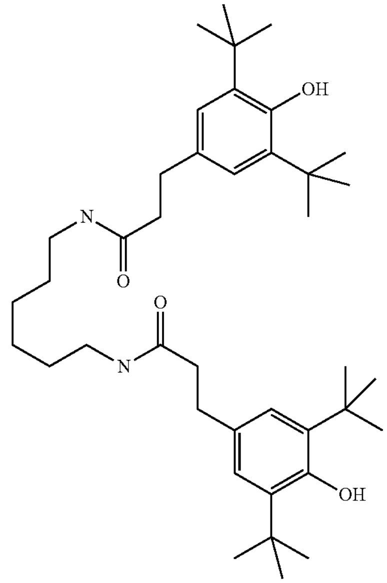
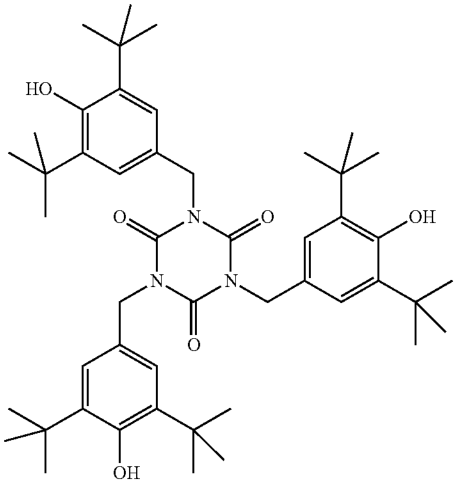 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
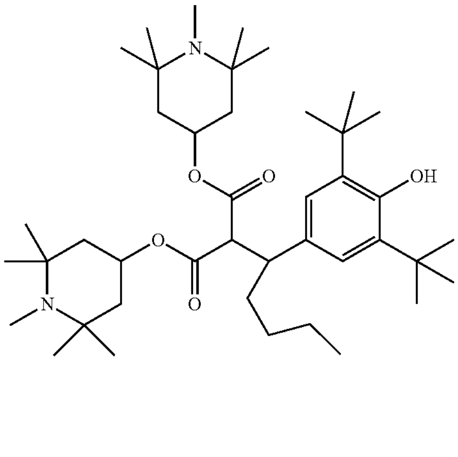 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]

-continued
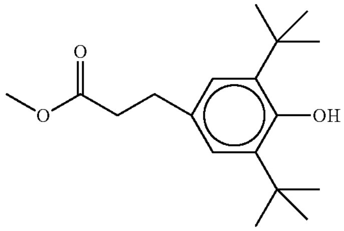
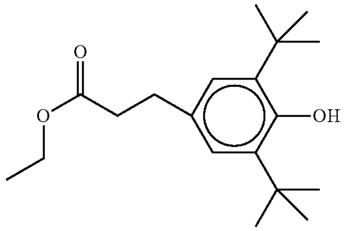
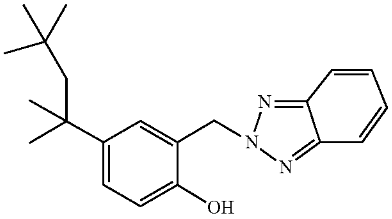 [SMILES: CC(C)(C)CC(C)(C)c1ccc(O)c(Cn2nc3ccccc3n2)c1]
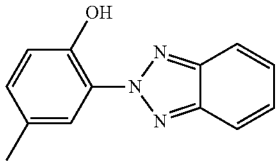 [SMILES: Cc1ccc(O)c(-n2nc3ccccc3n2)c1]
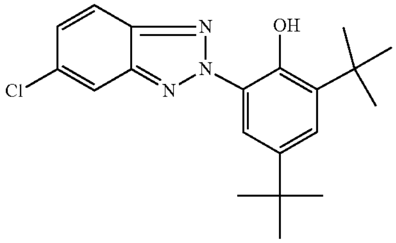 [SMILES: CC(C)(C)c1cc(-n2nc3ccc(Cl)cc3n2)c(O)c(C(C)(C)C)c1]
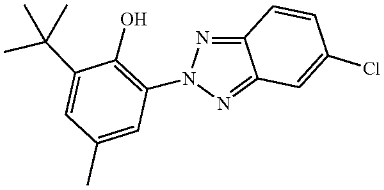 [SMILES: Cc1cc(-n2nc3ccc(Cl)cc3n2)c(O)c(C(C)(C)C)c1]

-continued
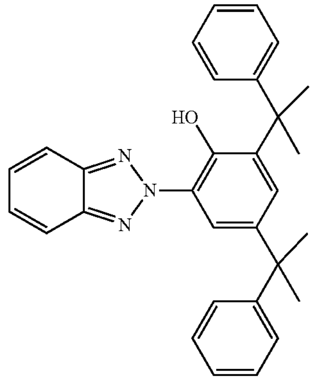 [SMILES: CC(C)(c1ccccc1)c1cc(-n2nc3ccccc3n2)c(O)c(C(C)(C)c2ccccc2)c1]
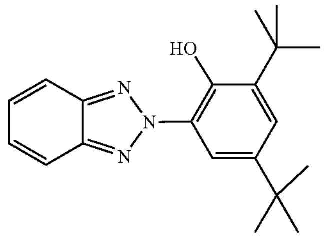 [SMILES: CC(C)(C)c1cc(-n2nc3ccccc3n2)c(O)c(C(C)(C)C)c1]
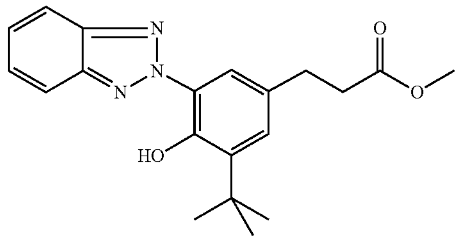 [SMILES: COC(=O)CCc1cc(-n2nc3ccccc3n2)c(O)c(C(C)(C)C)c1]
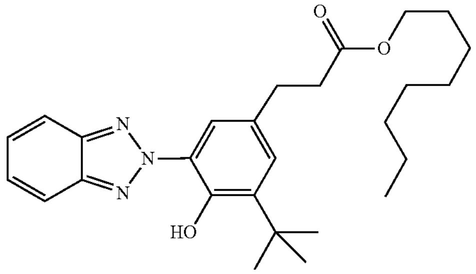 [SMILES: CCCCCCCCOC(=O)CCc1cc(-n2nc3ccccc3n2)c(O)c(C(C)(C)C)c1]

-continued
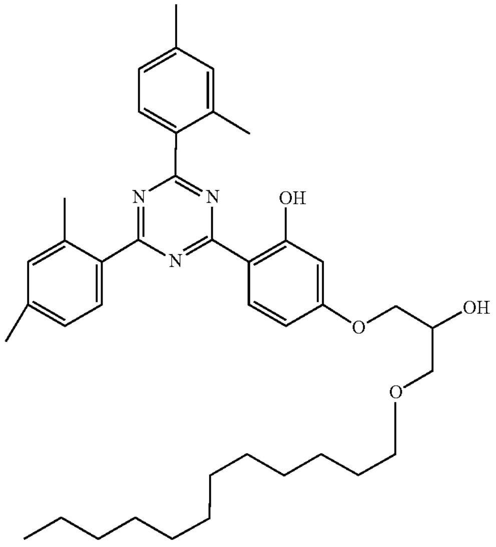
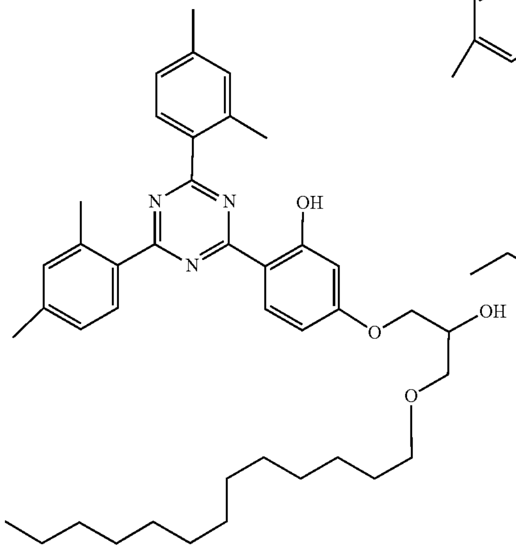
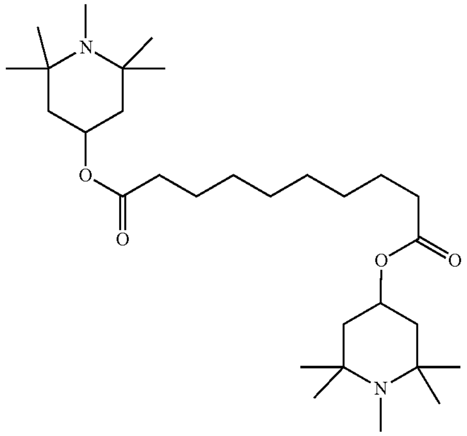

-continued
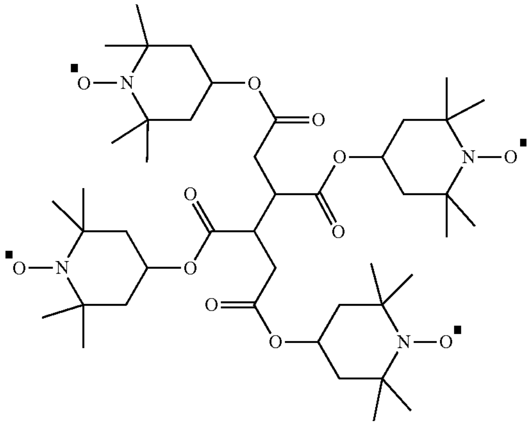 [SMILES: CC1(C)CC(OC(=O)CC(C(=O)OC2CC(C)(C)N(O)C(C)(C)C2)C(CC(=O)OC2CC(C)(C)N(O)C(C)(C)C2)C(=O)OC2CC(C)(C)N(O)C(C)(C)C2)CC(C)(C)N1O]
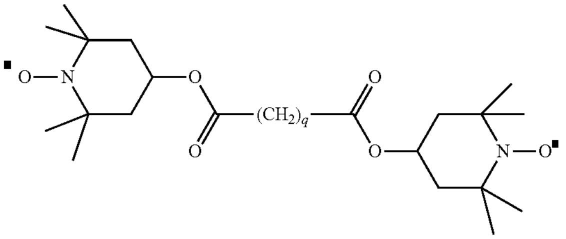
q = 1, 2, 3, 4, 5, 6 , 7, 8, 9 or 10
Table H
Table H shows illustrative reactive mesogenic compounds (RMs) which can be used in the liquid-crystalline media in accordance with the present invention.
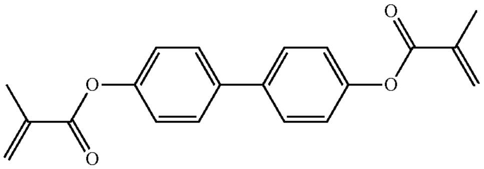 [SMILES: C=C(C)C(=O)Oc1ccc(-c2ccc(OC(=O)C(=C)C)cc2)cc1]
RM-1
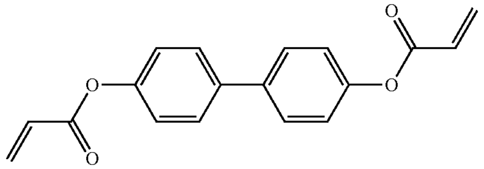
RM-2
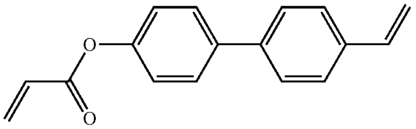 [SMILES: C=CC(=O)Oc1ccc(-c2ccc(C=C)cc2)cc1]
RM-3
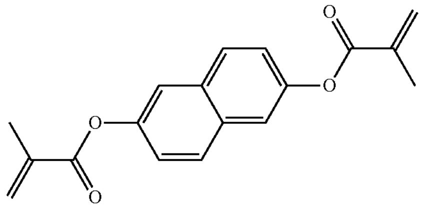 [SMILES: C=C(C)C(=O)Oc1ccc2cc(OC(=O)C(=C)C)ccc2c1]
RM-4

-continued
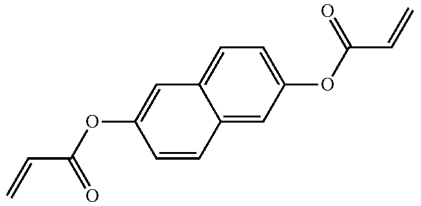 [SMILES: C=CC(=O)Oc1ccc2cc(OC(=O)C=C)ccc2c1]
RM-5
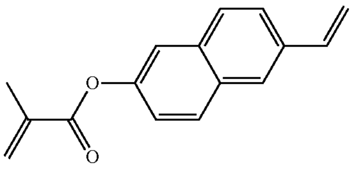 [SMILES: C=Cc1ccc2cc(OC(=O)C(=C)C)ccc2c1]
RM-6
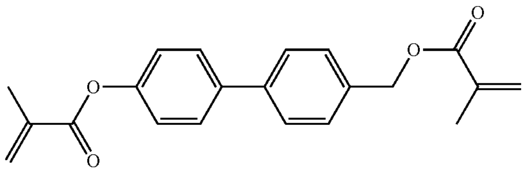 [SMILES: C=C(C)C(=O)OCc1ccc(-c2ccc(OC(=O)C(=C)C)cc2)cc1]
RM-7
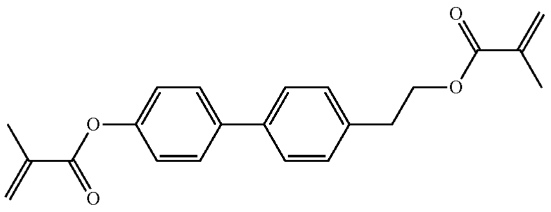 [SMILES: C=C(C)C(=O)OCCc1ccc(-c2ccc(OC(=O)C(=C)C)cc2)cc1]
RM-8
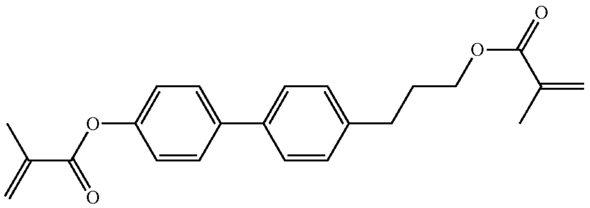 [SMILES: C=C(C)C(=O)OCCCc1ccc(-c2ccc(OC(=O)C(=C)C)cc2)cc1]
RM-9
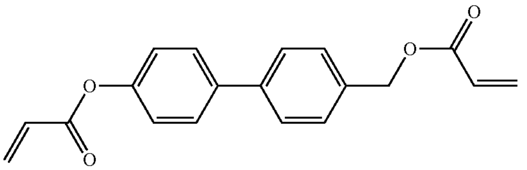 [SMILES: C=CC(=O)OCc1ccc(-c2ccc(OC(=O)C=C)cc2)cc1]
RM-10
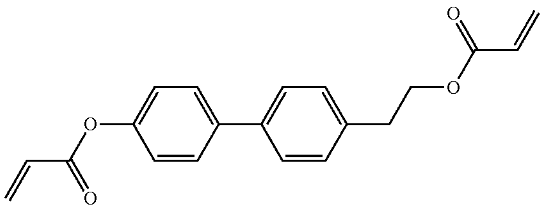 [SMILES: C=CC(=O)OCCc1ccc(-c2ccc(OC(=O)C=C)cc2)cc1]
RM-11
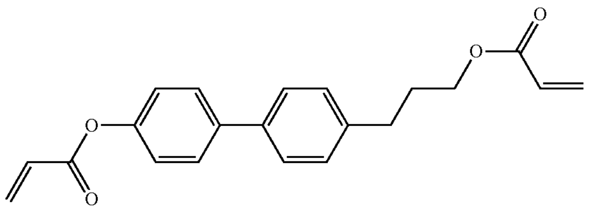 [SMILES: C=CC(=O)OCCCc1ccc(-c2ccc(OC(=O)C=C)cc2)cc1]
RM-12

-continued
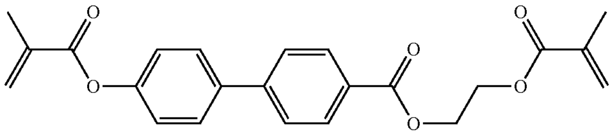 [SMILES: C=C(C)C(=O)OCCOC(=O)c1ccc(-c2ccc(OC(=O)C(=C)C)cc2)cc1]
RM-13
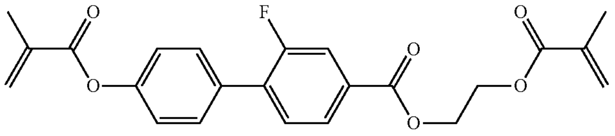 [SMILES: C=C(C)C(=O)OCCOC(=O)c1ccc(-c2ccc(OC(=O)C(=C)C)cc2)c(F)c1]
RM-14
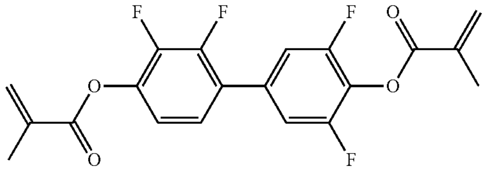 [SMILES: C=C(C)C(=O)Oc1ccc(-c2cc(F)c(OC(=O)C(=C)C)c(F)c2)c(F)c1F]
RM-15
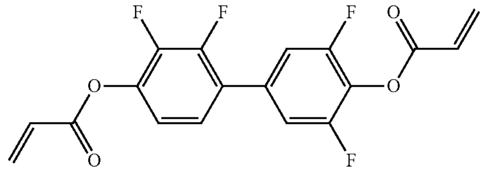 [SMILES: C=CC(=O)Oc1ccc(-c2cc(F)c(OC(=O)C=C)c(F)c2)c(F)c1F]
RM-16
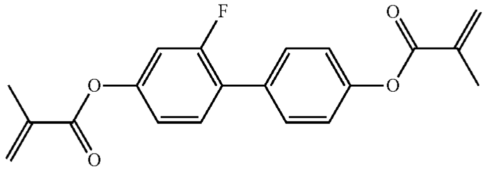 [SMILES: C=C(C)C(=O)Oc1ccc(-c2ccc(OC(=O)C(=C)C)cc2F)cc1]
RM-17
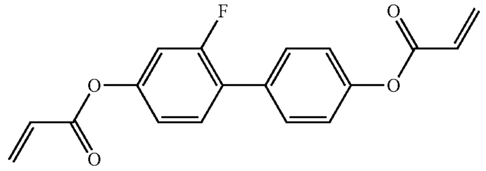 [SMILES: C=CC(=O)Oc1ccc(-c2ccc(OC(=O)C=C)cc2F)cc1]
RM-18
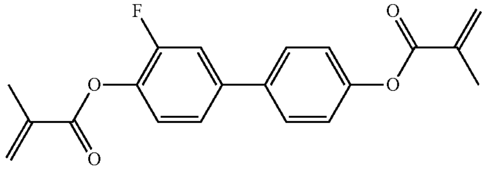 [SMILES: C=C(C)C(=O)Oc1ccc(-c2ccc(OC(=O)C(=C)C)c(F)c2)cc1]
RM-19
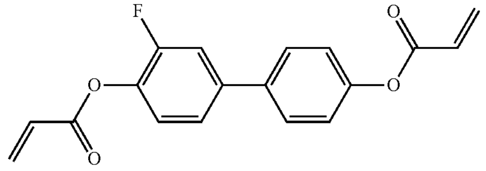 [SMILES: C=CC(=O)Oc1ccc(-c2ccc(OC(=O)C=C)c(F)c2)cc1]
RM-20
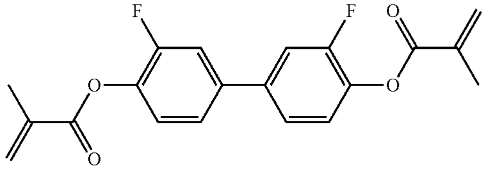 [SMILES: C=C(C)C(=O)Oc1ccc(-c2ccc(OC(=O)C(=C)C)c(F)c2)cc1F]
RM-21

-continued
RM-22
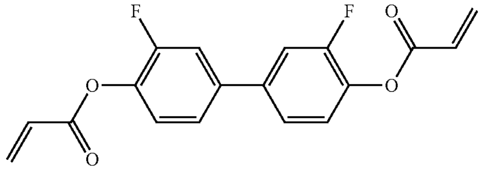 [SMILES: C=CC(=O)Oc1ccc(-c2ccc(OC(=O)C=C)c(F)c2)cc1F]
RM-23
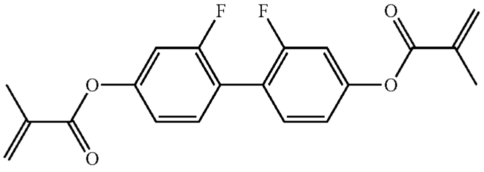 [SMILES: C=C(C)C(=O)Oc1ccc(-c2ccc(OC(=O)C(=C)C)cc2F)c(F)c1]
RM-24
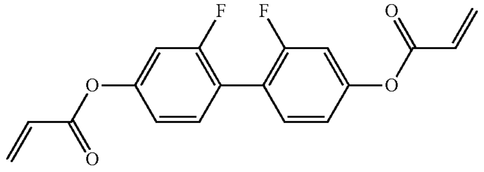 [SMILES: C=CC(=O)Oc1ccc(-c2ccc(OC(=O)C=C)cc2F)c(F)c1]
RM-25
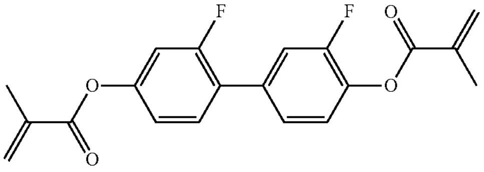 [SMILES: C=C(C)C(=O)Oc1ccc(-c2ccc(OC(=O)C(=C)C)c(F)c2)c(F)c1]
RM-26
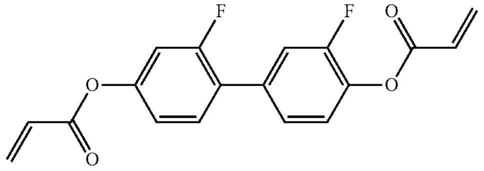 [SMILES: C=CC(=O)Oc1ccc(-c2ccc(OC(=O)C=C)c(F)c2)c(F)c1]
RM-27
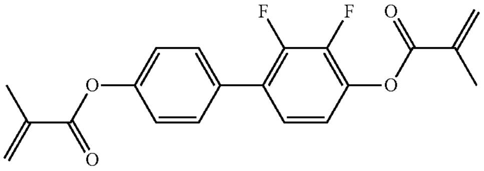 [SMILES: C=C(C)C(=O)Oc1ccc(-c2ccc(OC(=O)C(=C)C)c(F)c2F)cc1]
RM-28
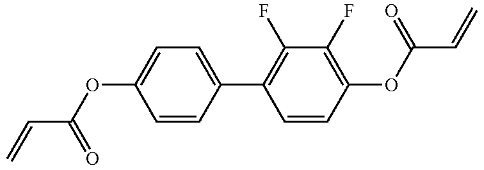 [SMILES: C=CC(=O)Oc1ccc(-c2ccc(OC(=O)C=C)c(F)c2F)cc1]
RM-29
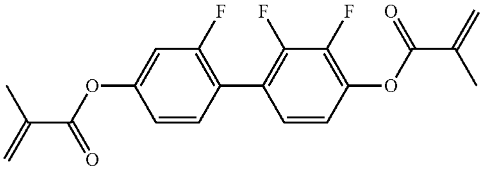 [SMILES: C=C(C)C(=O)Oc1ccc(-c2ccc(OC(=O)C(=C)C)c(F)c2F)c(F)c1]
RM-30
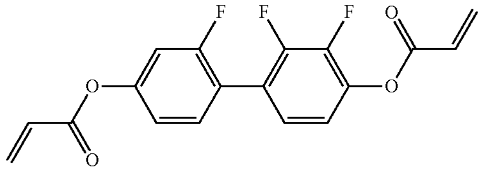 [SMILES: C=CC(=O)Oc1ccc(-c2ccc(OC(=O)C=C)c(F)c2F)c(F)c1]

-continued
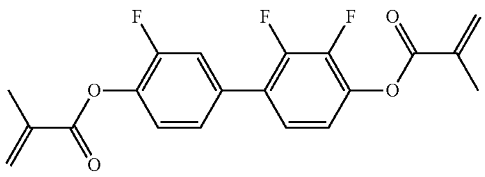 [SMILES: C=C(C)C(=O)Oc1ccc(-c2ccc(OC(=O)C(=C)C)c(F)c2F)cc1F]
RM-31
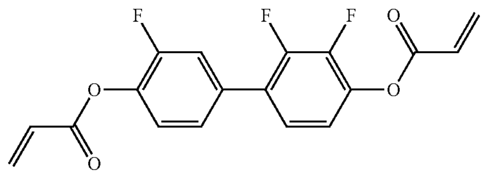 [SMILES: C=CC(=O)Oc1ccc(-c2ccc(OC(=O)C=C)c(F)c2F)cc1F]
RM-32
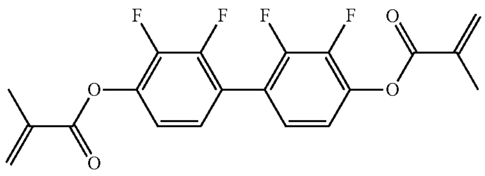 [SMILES: C=C(C)C(=O)Oc1ccc(-c2ccc(OC(=O)C(=C)C)c(F)c2F)c(F)c1F]
RM-33
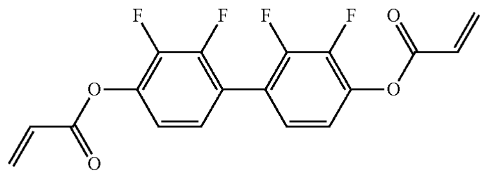 [SMILES: C=CC(=O)Oc1ccc(-c2ccc(OC(=O)C=C)c(F)c2F)c(F)c1F]
RM-34
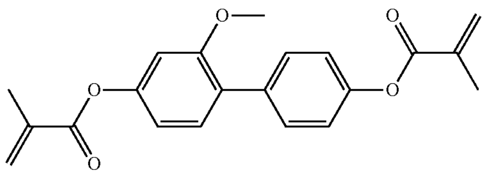
RM-35
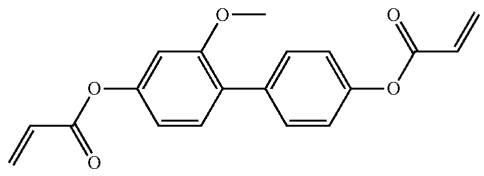
RM-36
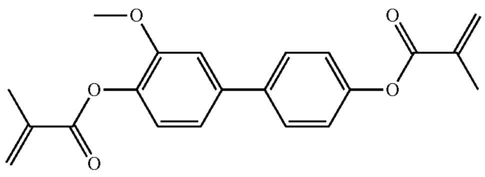
RM-37
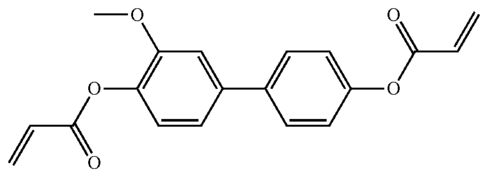
RM-38

-continued
RM-39
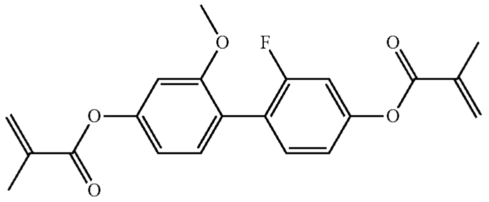 [SMILES: C=C(C)C(=O)Oc1ccc(-c2ccc(OC(=O)C(=C)C)cc2OC)c(F)c1]
RM-40
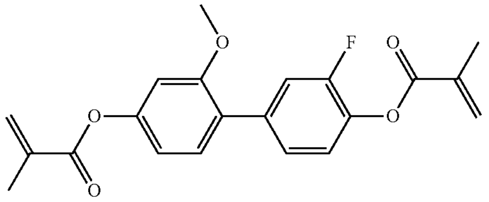 [SMILES: C=C(C)C(=O)Oc1ccc(-c2ccc(OC(=O)C(=C)C)c(F)c2)c(OC)c1]
RM-41
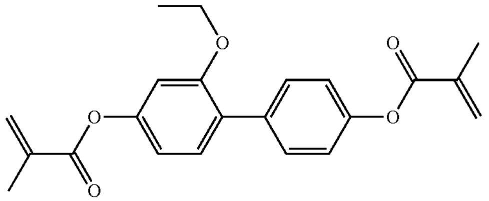 [SMILES: C=C(C)C(=O)Oc1ccc(-c2ccc(OC(=O)C(=C)C)cc2OCC)cc1]
RM-42
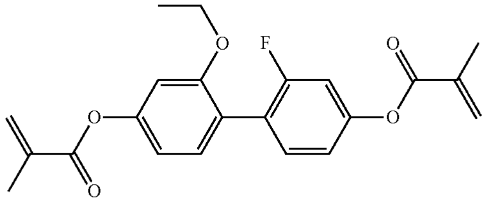 [SMILES: C=C(C)C(=O)Oc1ccc(-c2ccc(OC(=O)C(=C)C)cc2OCC)c(F)c1]
RM-43
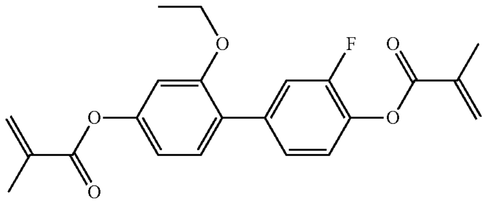 [SMILES: C=C(C)C(=O)Oc1ccc(-c2ccc(OC(=O)C(=C)C)c(F)c2)c(OCC)c1]
RM-44
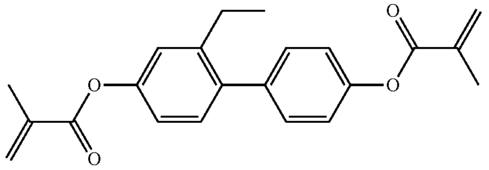
RM-45
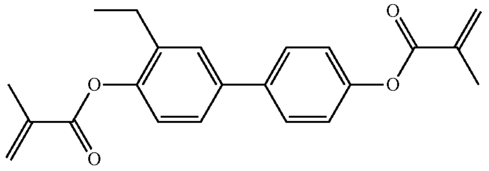 [SMILES: C=C(C)C(=O)Oc1ccc(-c2ccc(OC(=O)C(=C)C)c(CC)c2)cc1]
RM-46
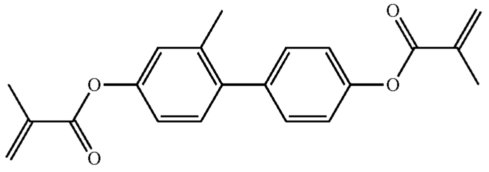

-continued
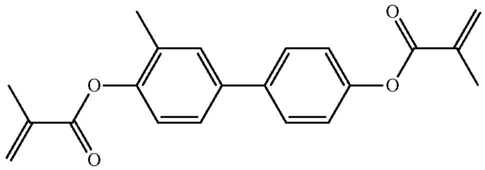 [SMILES: C=C(C)C(=O)Oc1ccc(-c2ccc(OC(=O)C(=C)C)c(C)c2)cc1]
RM-47
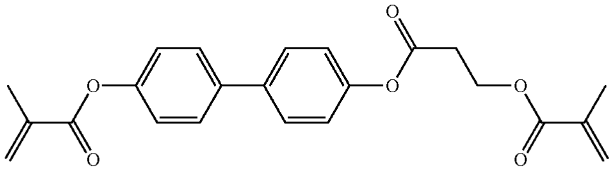 [SMILES: C=C(C)C(=O)OCCC(=O)Oc1ccc(-c2ccc(OC(=O)C(=C)C)cc2)cc1]
RM-48
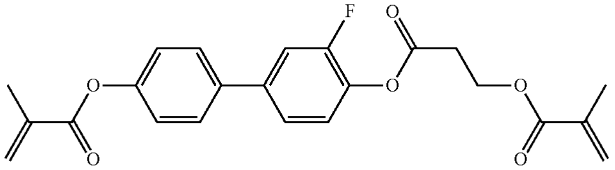 [SMILES: C=C(C)C(=O)OCCC(=O)Oc1ccc(-c2ccc(OC(=O)C(=C)C)cc2)cc1F]
RM-49
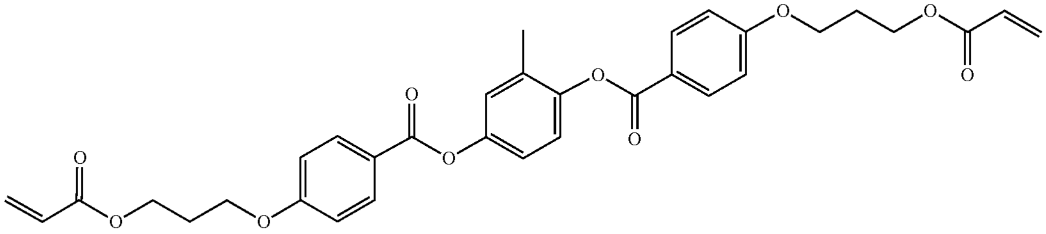 [SMILES: C=CC(=O)OCCCOc1ccc(C(=O)Oc2ccc(OC(=O)c3ccc(OCCCOC(=O)C=C)cc3)c(C)c2)cc1]
RM-50
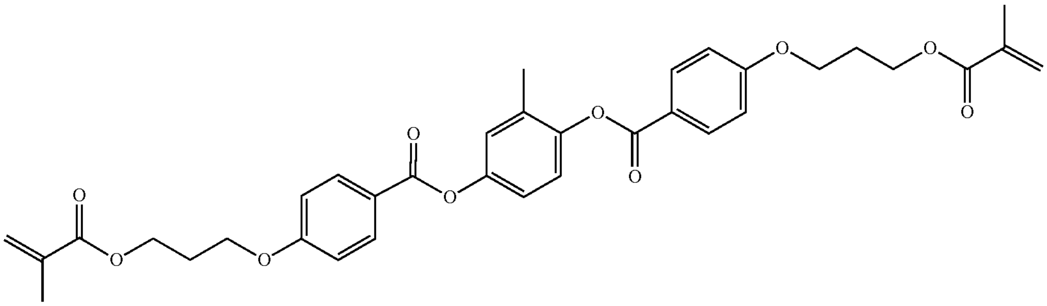 [SMILES: C=C(C)C(=O)OCCCOc1ccc(C(=O)Oc2ccc(OC(=O)c3ccc(OCCCOC(=O)C(=C)C)cc3)c(C)c2)cc1]
RM-51
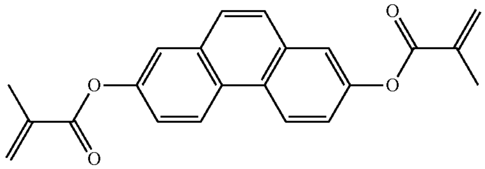 [SMILES: C=C(C)C(=O)Oc1ccc2c(ccc3cc(OC(=O)C(=C)C)ccc32)c1]
RM-52
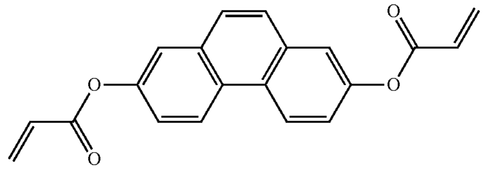 [SMILES: C=CC(=O)Oc1ccc2c(ccc3cc(OC(=O)C=C)ccc32)c1]
RM-53

-continued
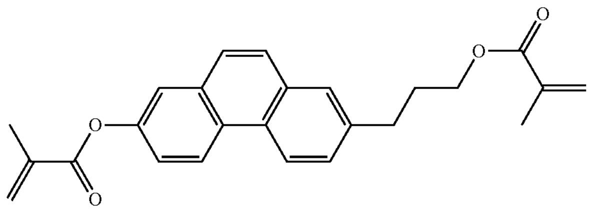 [SMILES: C=C(C)C(=O)OCCCc1ccc2c(ccc3cc(OC(=O)C(=C)C)ccc32)c1]
RM-54
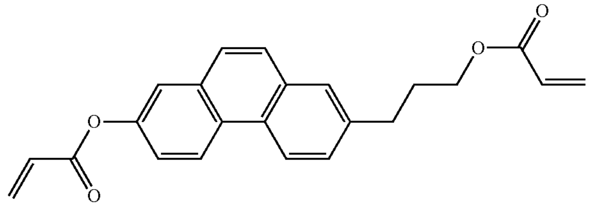 [SMILES: C=CC(=O)OCCCc1ccc2c(ccc3cc(OC(=O)C=C)ccc32)c1]
RM-55
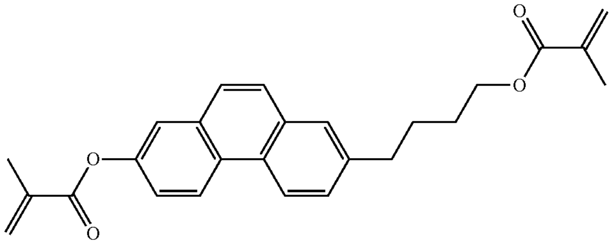 [SMILES: C=C(C)C(=O)OCCCCc1ccc2c(ccc3cc(OC(=O)C(=C)C)ccc32)c1]
RM-56
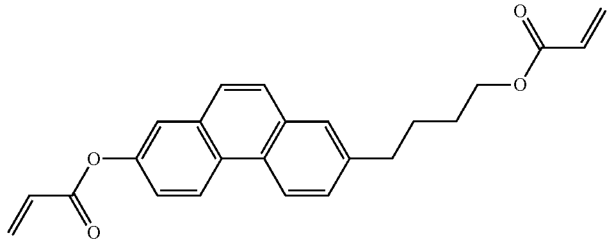 [SMILES: C=CC(=O)OCCCCc1ccc2c(ccc3cc(OC(=O)C=C)ccc32)c1]
RM-57
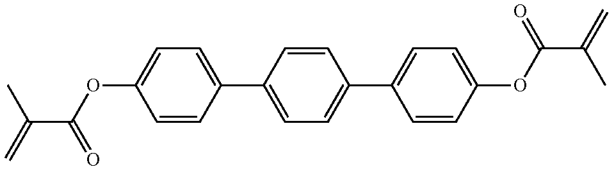
RM-58
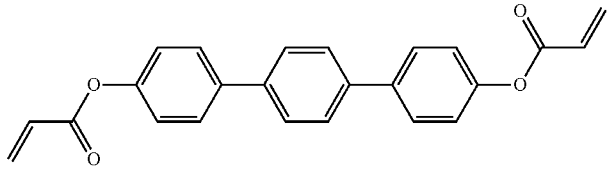 [SMILES: C=CC(=O)Oc1ccc(-c2ccc(-c3ccc(OC(=O)C=C)cc3)cc2)cc1]
RM-59
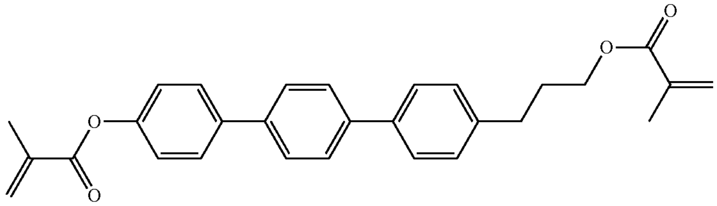 [SMILES: C=C(C)C(=O)OCCCc1ccc(-c2ccc(-c3ccc(OC(=O)C(=C)C)cc3)cc2)cc1]
RM-60

-continued
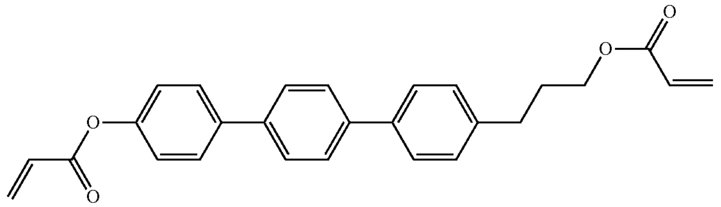 [SMILES: C=CC(=O)OCCCc1ccc(-c2ccc(-c3ccc(OC(=O)C=C)cc3)cc2)cc1]
RM-61
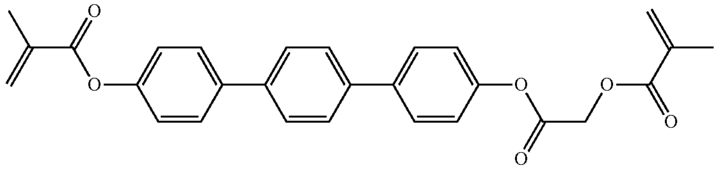 [SMILES: C=C(C)C(=O)OCC(=O)Oc1ccc(-c2ccc(-c3ccc(OC(=O)C(=C)C)cc3)cc2)cc1]
RM-62
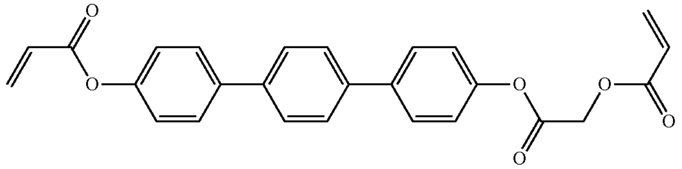 [SMILES: C=CC(=O)OCC(=O)Oc1ccc(-c2ccc(-c3ccc(OC(=O)C=C)cc3)cc2)cc1]
RM-63
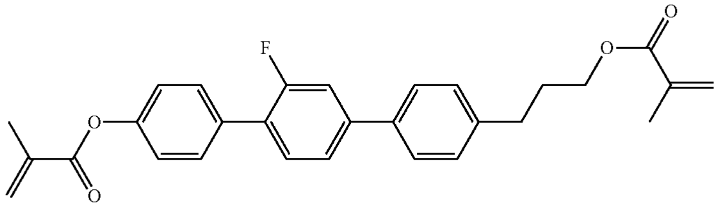 [SMILES: C=C(C)C(=O)OCCCc1ccc(-c2ccc(-c3ccc(OC(=O)C(=C)C)cc3)c(F)c2)cc1]
RM-64
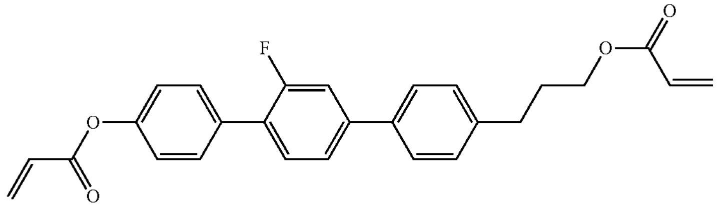 [SMILES: C=CC(=O)OCCCc1ccc(-c2ccc(-c3ccc(OC(=O)C=C)cc3)c(F)c2)cc1]
RM-65
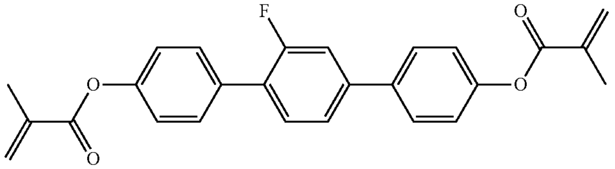 [SMILES: C=C(C)C(=O)Oc1ccc(-c2ccc(-c3ccc(OC(=O)C(=C)C)cc3)c(F)c2)cc1]
RM-66
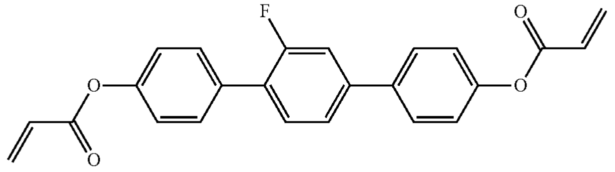 [SMILES: C=CC(=O)Oc1ccc(-c2ccc(-c3ccc(OC(=O)C=C)cc3)c(F)c2)cc1]
RM-67
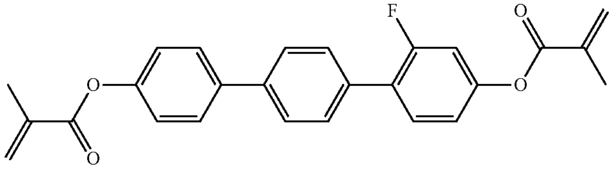 [SMILES: C=C(C)C(=O)Oc1ccc(-c2ccc(-c3ccc(OC(=O)C(=C)C)cc3F)cc2)cc1]
RM-68

-continued
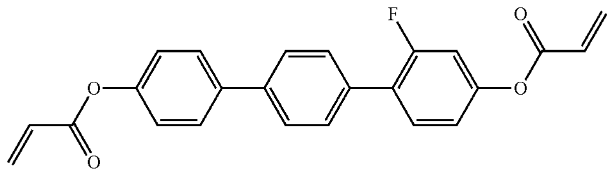
RM-69
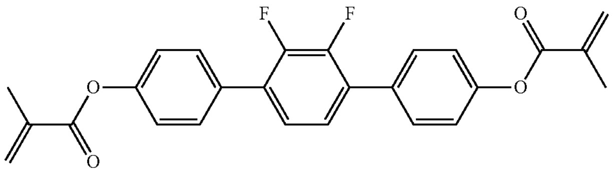 [SMILES: C=C(C)C(=O)Oc1ccc(-c2ccc(-c3ccc(OC(=O)C(=C)C)cc3)c(F)c2F)cc1]
RM-70
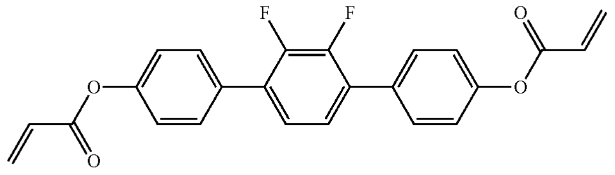
RM-71
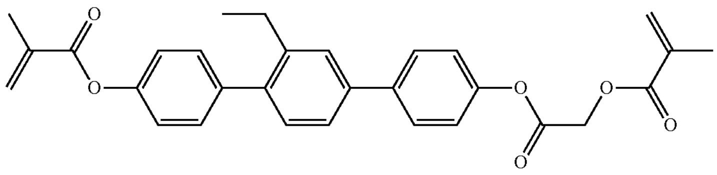 [SMILES: C=C(C)C(=O)OCC(=O)Oc1ccc(-c2ccc(-c3ccc(OC(=O)C(=C)C)cc3)c(CC)c2)cc1]
RM-72
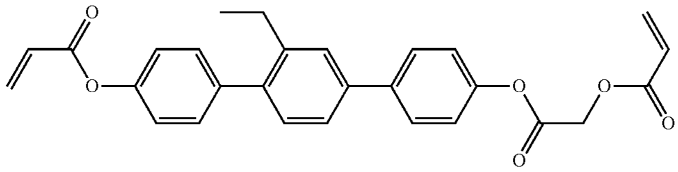
RM-73
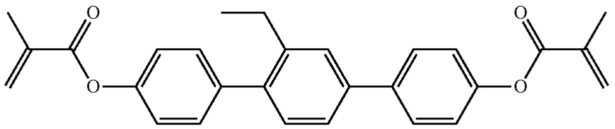 [SMILES: C=CC(=O)Oc1ccc(-c2ccc(-c3ccc(OC(=O)C=C)cc3)c(CC)c2)cc1]
RM-74
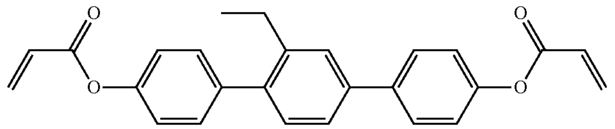
RM-75
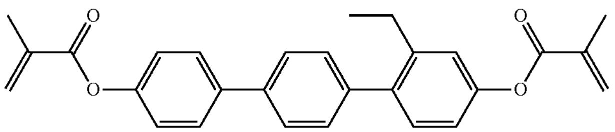 [SMILES: C=C(C)C(=O)Oc1ccc(-c2ccc(-c3ccc(OC(=O)C(=C)C)cc3CC)cc2)cc1]
RM-76
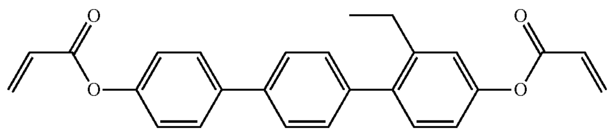 [SMILES: C=CC(=O)Oc1ccc(-c2ccc(-c3ccc(OC(=O)C=C)cc3CC)cc2)cc1]
RM-77

-continued
RM-78
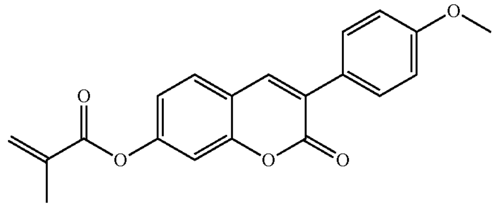 [SMILES: C=C(C)C(=O)Oc1ccc2cc(-c3ccc(OC)cc3)c(=O)oc2c1]
RM-79
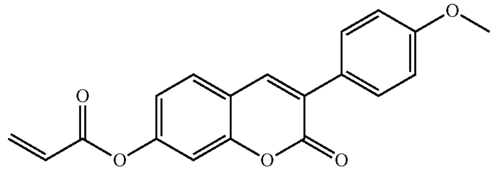 [SMILES: C=CC(=O)Oc1ccc2cc(-c3ccc(OC)cc3)c(=O)oc2c1]
RM-80
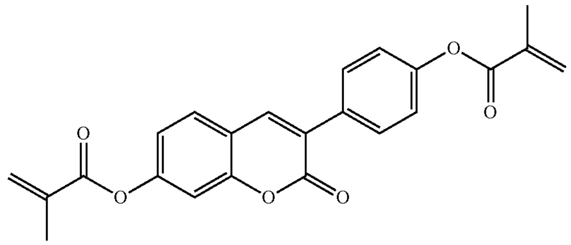 [SMILES: C=C(C)C(=O)Oc1ccc(-c2cc3ccc(OC(=O)C(=C)C)cc3oc2=O)cc1]
RM-81
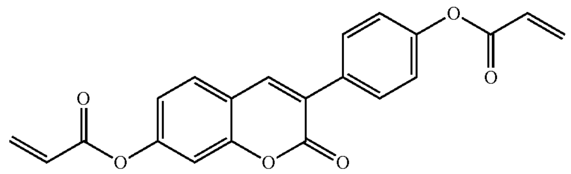 [SMILES: C=CC(=O)Oc1ccc(-c2cc3ccc(OC(=O)C=C)cc3oc2=O)cc1]
RM-82
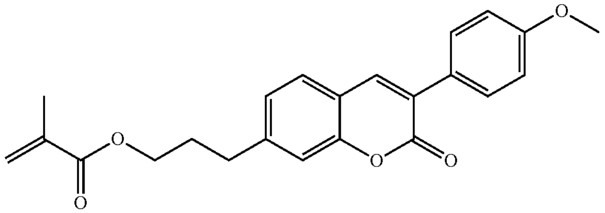 [SMILES: C=C(C)C(=O)OCCCc1ccc2cc(-c3ccc(OC)cc3)c(=O)oc2c1]
RM-83
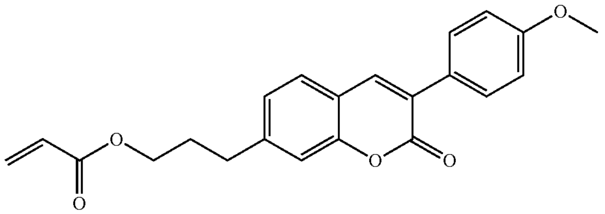 [SMILES: C=CC(=O)OCCCc1ccc2cc(-c3ccc(OC)cc3)c(=O)oc2c1]
RM-84
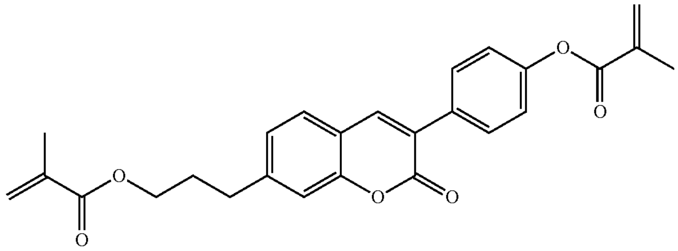 [SMILES: C=C(C)C(=O)OCCCc1ccc2cc(-c3ccc(OC(=O)C(=C)C)cc3)c(=O)oc2c1]

-continued
RM-85
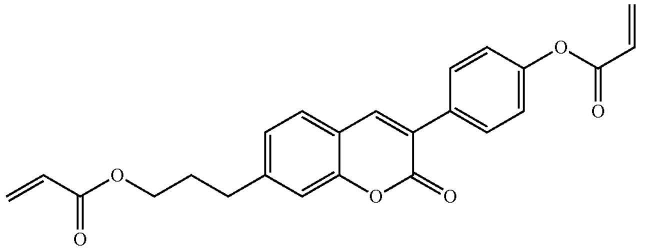 [SMILES: C=CC(=O)OCCCc1ccc2cc(-c3ccc(OC(=O)C=C)cc3)c(=O)oc2c1]
RM-86
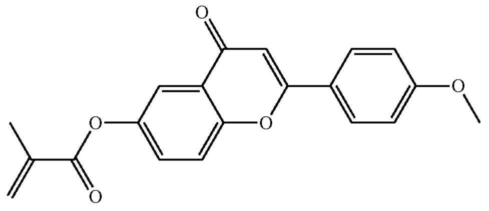 [SMILES: C=C(C)C(=O)Oc1ccc2oc(-c3ccc(OC)cc3)cc(=O)c2c1]
RM-87
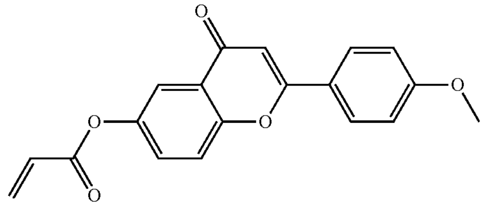 [SMILES: C=CC(=O)Oc1ccc2oc(-c3ccc(OC)cc3)cc(=O)c2c1]
RM-88
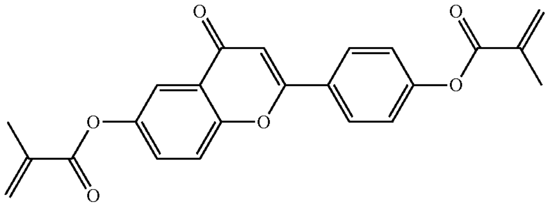 [SMILES: C=C(C)C(=O)Oc1ccc(-c2cc(=O)c3cc(OC(=O)C(=C)C)ccc3o2)cc1]
RM-89
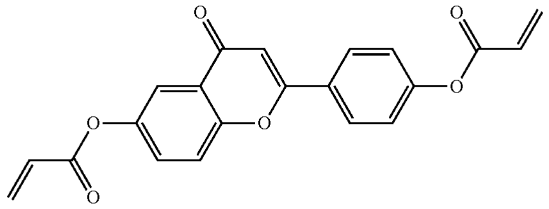 [SMILES: C=CC(=O)Oc1ccc(-c2cc(=O)c3cc(OC(=O)C=C)ccc3o2)cc1]
RM-90
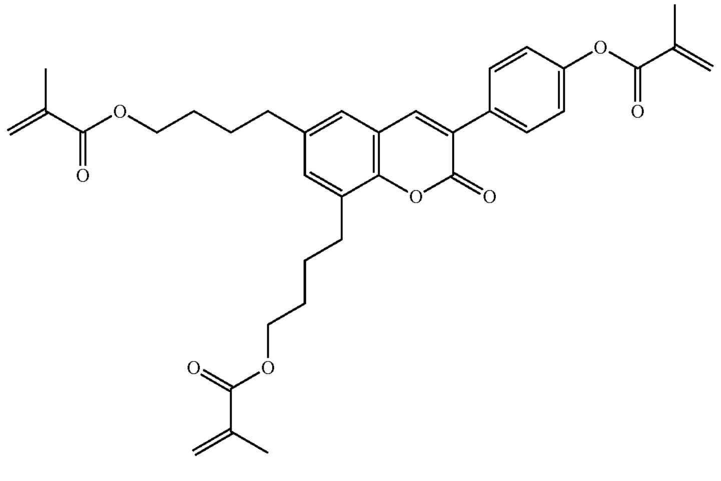 [SMILES: C=C(C)C(=O)OCCCCc1cc(CCCCOC(=O)C(=C)C)c2oc(=O)c(-c3ccc(OC(=O)C(=C)C)cc3)cc2c1]

-continued
RM-91
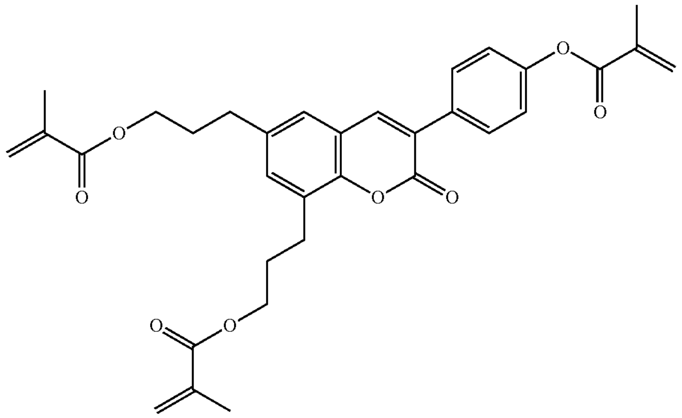 [SMILES: C=C(C)C(=O)OCCCc1cc(CCCOC(=O)C(=C)C)c2oc(=O)c(-c3ccc(OC(=O)C(=C)C)cc3)cc2c1]
RM-92
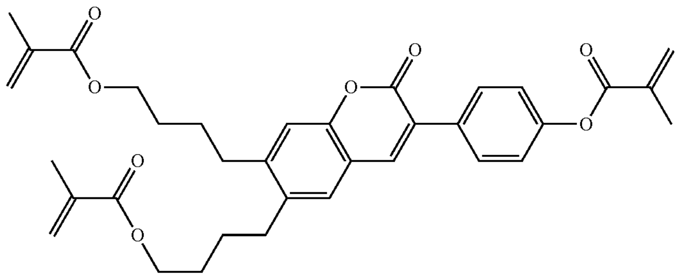 [SMILES: C=C(C)C(=O)OCCCCc1cc2cc(-c3ccc(OC(=O)C(=C)C)cc3)c(=O)oc2cc1CCCCOC(=O)C(=C)C]
RM-93
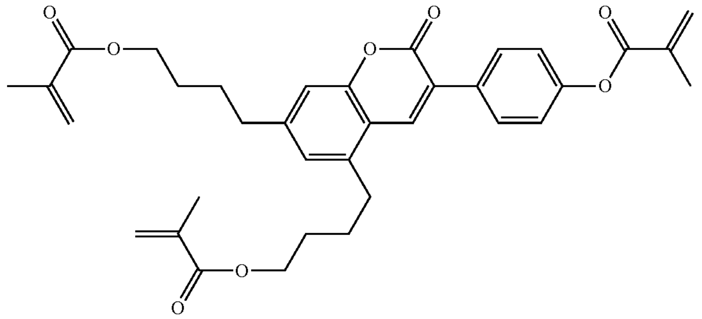 [SMILES: C=C(C)C(=O)OCCCCc1cc(CCCCOC(=O)C(=C)C)c2cc(-c3ccc(OC(=O)C(=C)C)cc3)c(=O)oc2c1]
RM-94
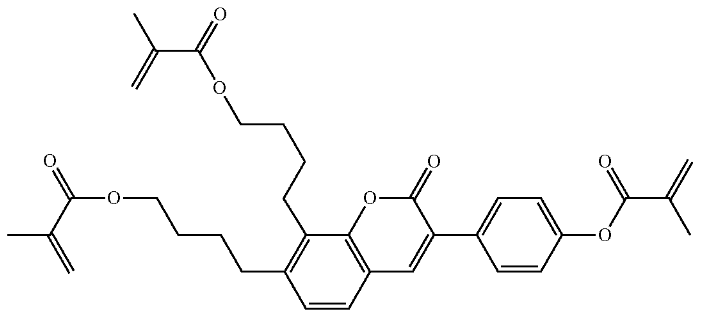 [SMILES: C=C(C)C(=O)OCCCCc1ccc2cc(-c3ccc(OC(=O)C(=C)C)cc3)c(=O)oc2c1CCCCOC(=O)C(=C)C]
RM-95
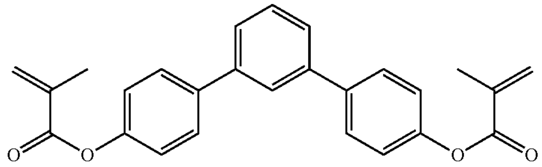 [SMILES: C=C(C)C(=O)Oc1ccc(-c2cccc(-c3ccc(OC(=O)C(=C)C)cc3)c2)cc1]

-continued
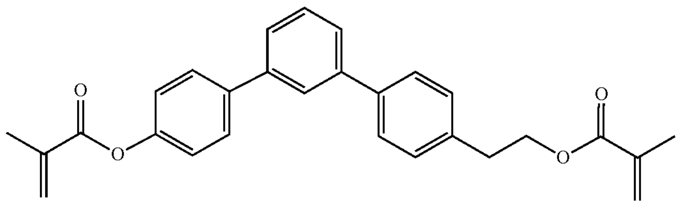 [SMILES: C=C(C)C(=O)OCCc1ccc(-c2cccc(-c3ccc(OC(=O)C(=C)C)cc3)c2)cc1]
RM-96
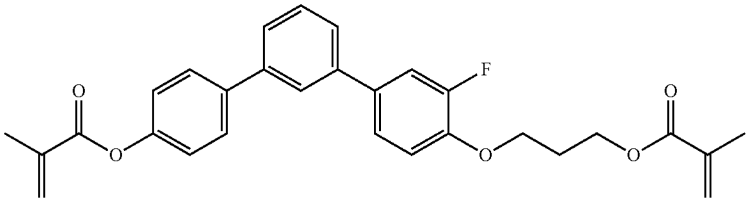 [SMILES: C=C(C)C(=O)OCCCOc1ccc(-c2cccc(-c3ccc(OC(=O)C(=C)C)cc3)c2)cc1F]
RM-97
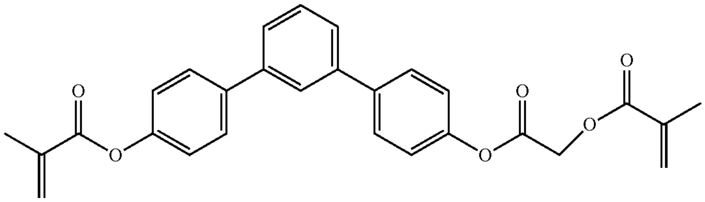 [SMILES: C=C(C)C(=O)OCC(=O)Oc1ccc(-c2cccc(-c3ccc(OC(=O)C(=C)C)cc3)c2)cc1]
RM-98
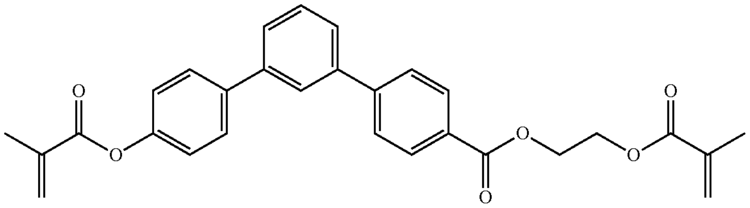 [SMILES: C=C(C)C(=O)OCCOC(=O)c1ccc(-c2cccc(-c3ccc(OC(=O)C(=C)C)cc3)c2)cc1]
RM-99
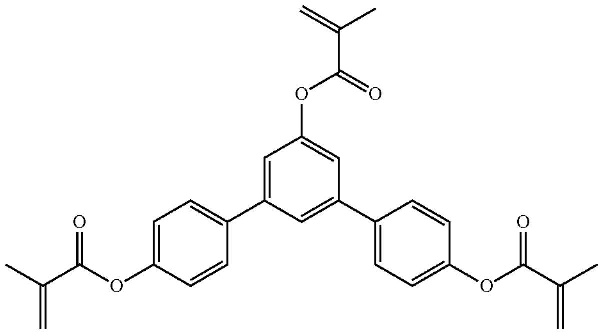 [SMILES: C=C(C)C(=O)Oc1ccc(-c2cc(OC(=O)C(=C)C)cc(-c3ccc(OC(=O)C(=C)C)cc3)c2)cc1]
RM-100
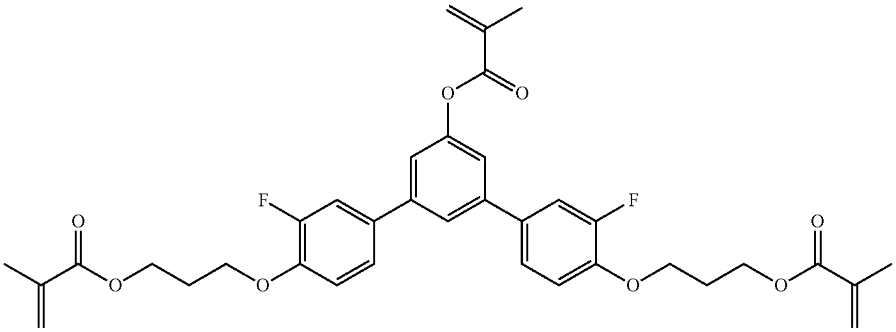 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-101

-continued
RM-102
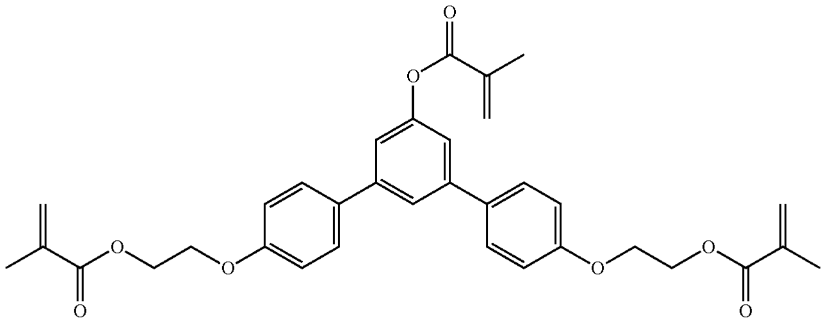 [SMILES: C=C(C)C(=O)OCCOc1ccc(-c2cc(OC(=O)C(=C)C)cc(-c3ccc(OCCOC(=O)C(=C)C)cc3)c2)cc1]
RM-103
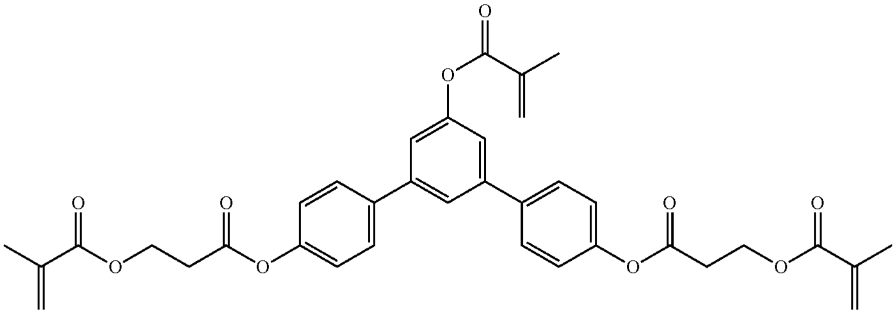 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]
RM-104
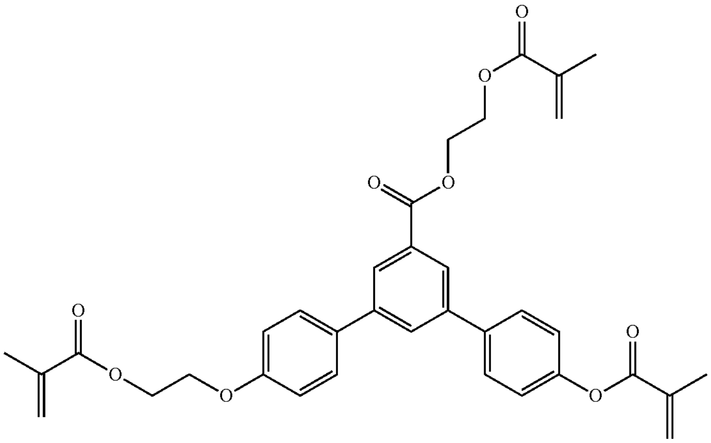 [SMILES: C=C(C)C(=O)OCCOC(=O)c1cc(-c2ccc(OCCOC(=O)C(=C)C)cc2)cc(-c2ccc(OC(=O)C(=C)C)cc2)c1]
RM-105
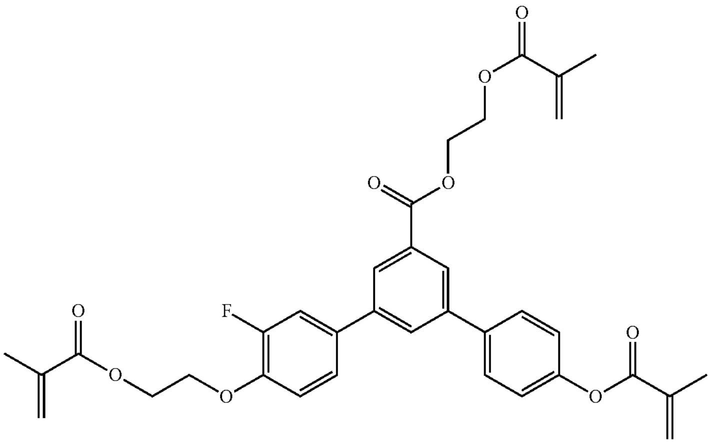 [SMILES: C=C(C)C(=O)OCCOC(=O)c1cc(-c2ccc(OC(=O)C(=C)C)cc2)cc(-c2ccc(OCCOC(=O)C(=C)C)c(F)c2)c1]

-continued
RM-106
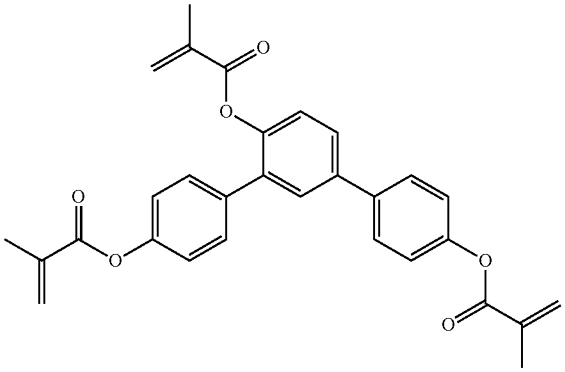 [SMILES: C=C(C)C(=O)Oc1ccc(-c2ccc(OC(=O)C(=C)C)c(-c3ccc(OC(=O)C(=C)C)cc3)c2)cc1]
RM-107
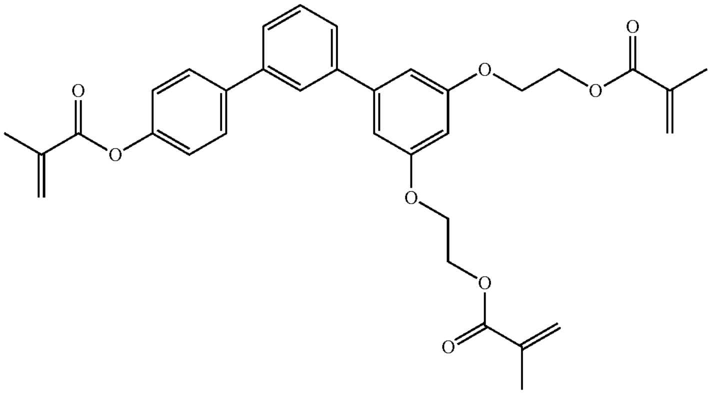 [SMILES: C=C(C)C(=O)OCCOc1cc(OCCOC(=O)C(=C)C)cc(-c2cccc(-c3ccc(OC(=O)C(=C)C)cc3)c2)c1]
RM-108
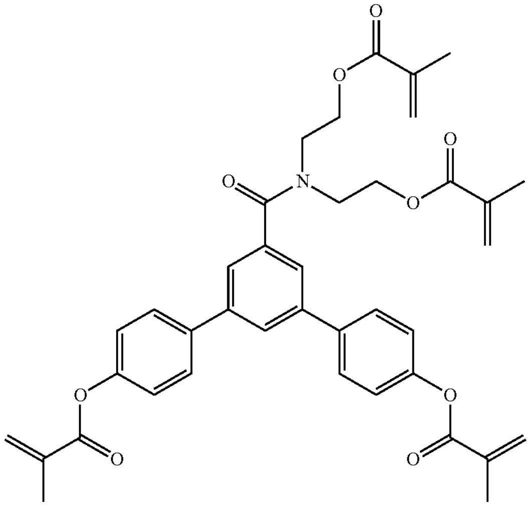 [SMILES: C=C(C)C(=O)OCCN(CCOC(=O)C(=C)C)C(=O)c1cc(-c2ccc(OC(=O)C(=C)C)cc2)cc(-c2ccc(OC(=O)C(=C)C)cc2)c1]
RM-109
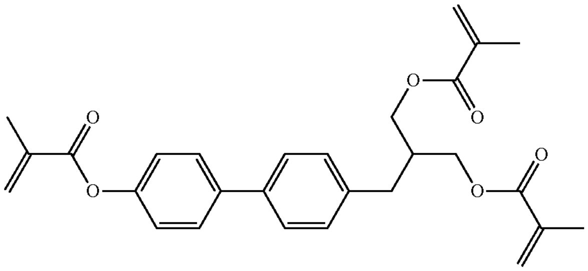 [SMILES: C=C(C)C(=O)OCC(COC(=O)C(=C)C)Cc1ccc(-c2ccc(OC(=O)C(=C)C)cc2)cc1]

-continued
RM-110
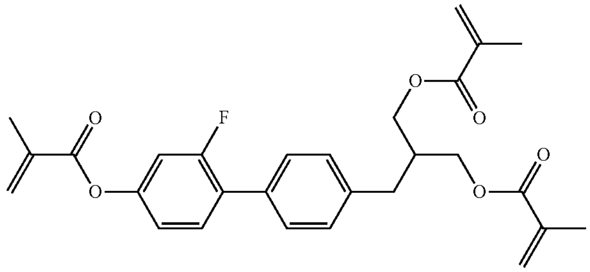 [SMILES: C=C(C)C(=O)OCC(COC(=O)C(=C)C)Cc1ccc(-c2ccc(OC(=O)C(=C)C)cc2F)cc1]
RM-111
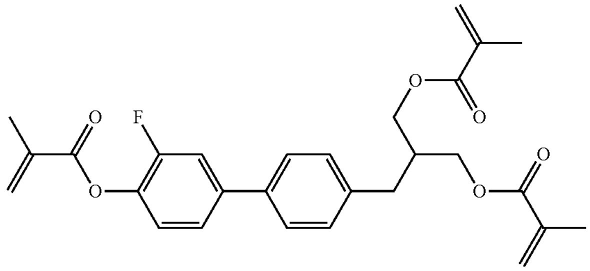 [SMILES: C=C(C)C(=O)OCC(COC(=O)C(=C)C)Cc1ccc(-c2ccc(OC(=O)C(=C)C)c(F)c2)cc1]
RM-112
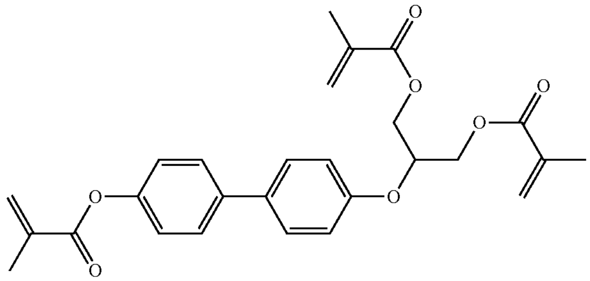 [SMILES: C=C(C)C(=O)OCC(COC(=O)C(=C)C)Oc1ccc(-c2ccc(OC(=O)C(=C)C)cc2)cc1]
RM-113
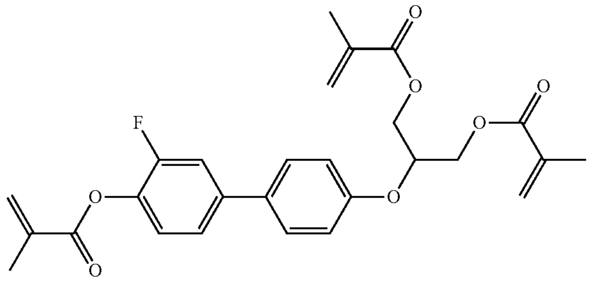 [SMILES: C=C(C)C(=O)OCC(COC(=O)C(=C)C)Oc1ccc(-c2ccc(OC(=O)C(=C)C)c(F)c2)cc1]
RM-114
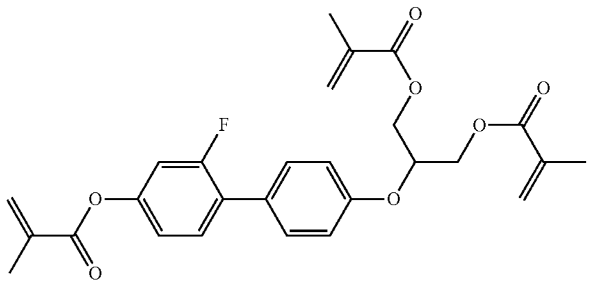 [SMILES: C=C(C)C(=O)OCC(COC(=O)C(=C)C)Oc1ccc(-c2ccc(OC(=O)C(=C)C)cc2F)cc1]

-continued
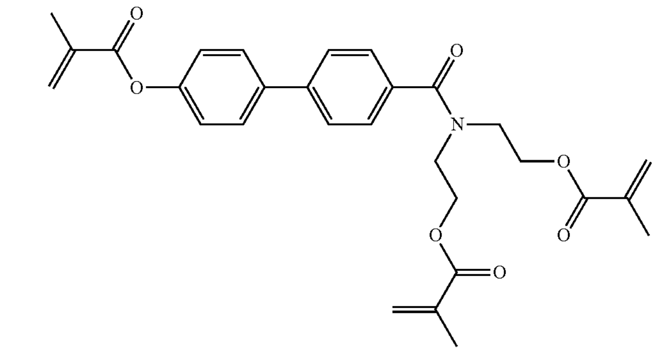 [SMILES: C=C(C)C(=O)OCCN(CCOC(=O)C(=C)C)C(=O)c1ccc(-c2ccc(OC(=O)C(=C)C)cc2)cc1]
RM-115
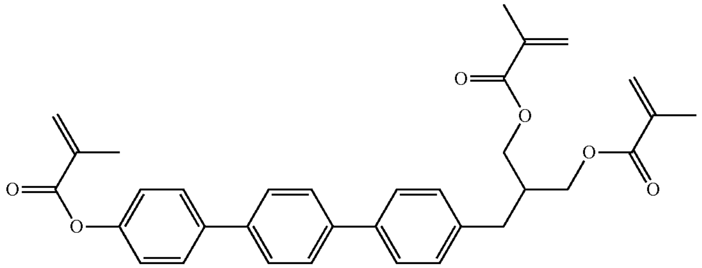 [SMILES: C=C(C)C(=O)OCC(COC(=O)C(=C)C)Cc1ccc(-c2ccc(-c3ccc(OC(=O)C(=C)C)cc3)cc2)cc1]
RM-116
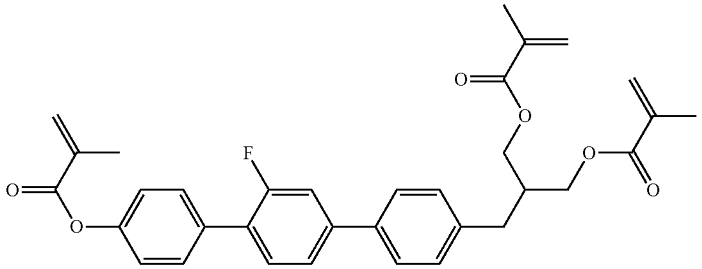 [SMILES: C=C(C)C(=O)OCC(COC(=O)C(=C)C)Cc1ccc(-c2ccc(-c3ccc(OC(=O)C(=C)C)cc3)c(F)c2)cc1]
RM-117
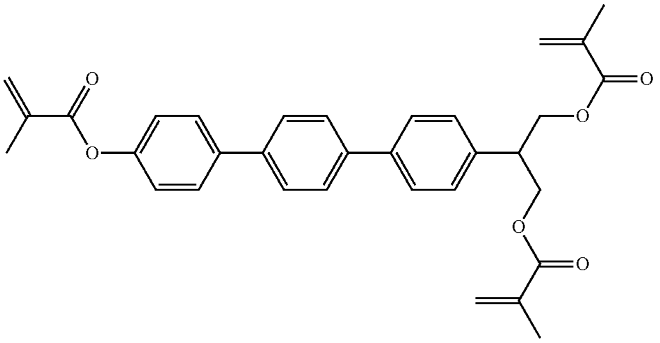 [SMILES: C=C(C)C(=O)OCC(COC(=O)C(=C)C)c1ccc(-c2ccc(-c3ccc(OC(=O)C(=C)C)cc3)cc2)cc1]
RM-118
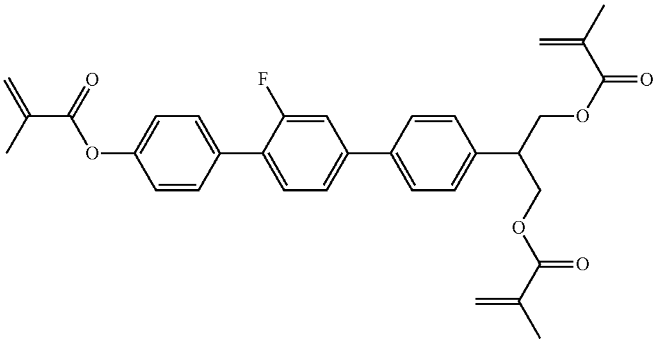 [SMILES: C=C(C)C(=O)OCC(COC(=O)C(=C)C)c1ccc(-c2ccc(-c3ccc(OC(=O)C(=C)C)cc3)c(F)c2)cc1]
RM-119

-continued
RM-120
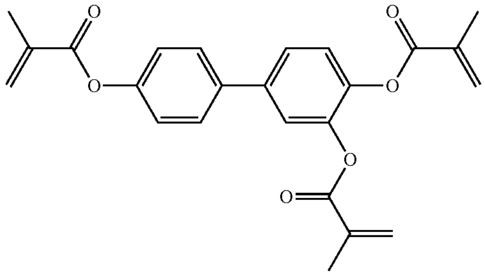 [SMILES: C=C(C)C(=O)Oc1ccc(-c2ccc(OC(=O)C(=C)C)c(OC(=O)C(=C)C)c2)cc1]
RM-121
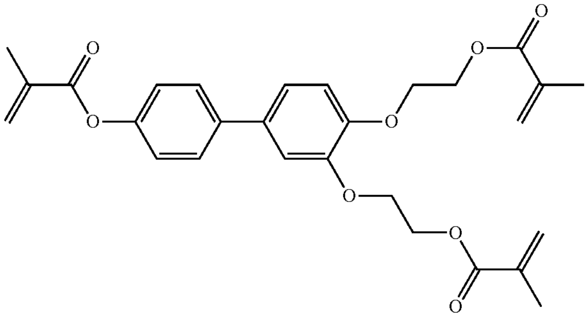 [SMILES: C=C(C)C(=O)OCCOc1ccc(-c2ccc(OC(=O)C(=C)C)cc2)cc1OCCOC(=O)C(=C)C]
RM-122
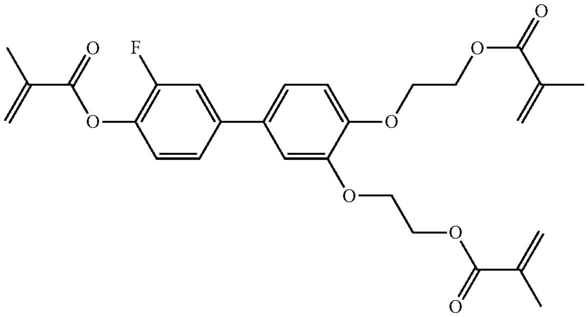
RM-123
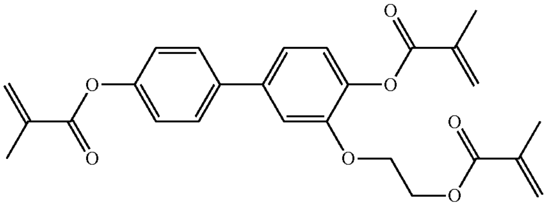 [SMILES: C=C(C)C(=O)OCCOc1cc(-c2ccc(OC(=O)C(=C)C)cc2)ccc1OC(=O)C(=C)C]
RM-124
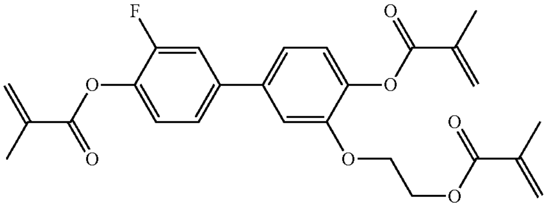

-continued
RM-125
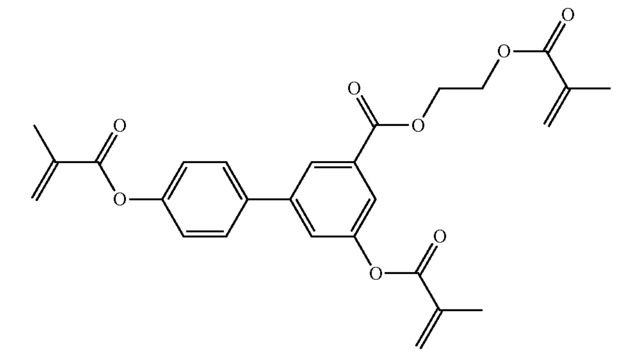 [SMILES: C=C(C)C(=O)OCCOC(=O)c1cc(OC(=O)C(=C)C)cc(-c2ccc(OC(=O)C(=C)C)cc2)c1]
RM-126
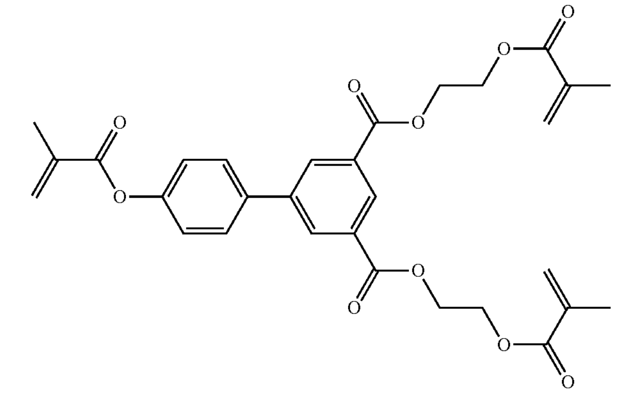 [SMILES: C=C(C)C(=O)OCCOC(=O)c1cc(C(=O)OCCOC(=O)C(=C)C)cc(-c2ccc(OC(=O)C(=C)C)cc2)c1]
RM-127
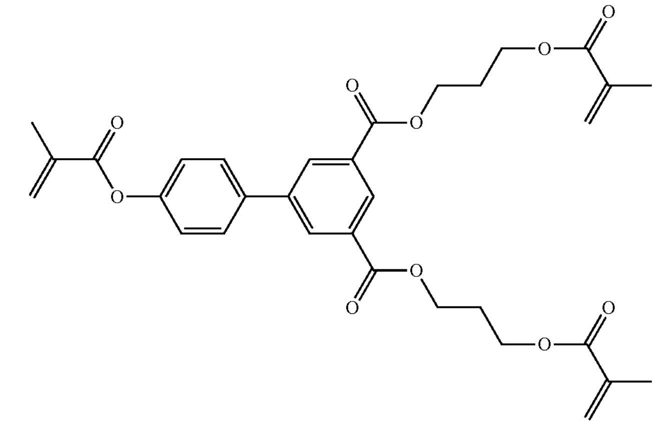 [SMILES: C=C(C)C(=O)OCCCOC(=O)c1cc(C(=O)OCCCOC(=O)C(=C)C)cc(-c2ccc(OC(=O)C(=C)C)cc2)c1]
RM-128
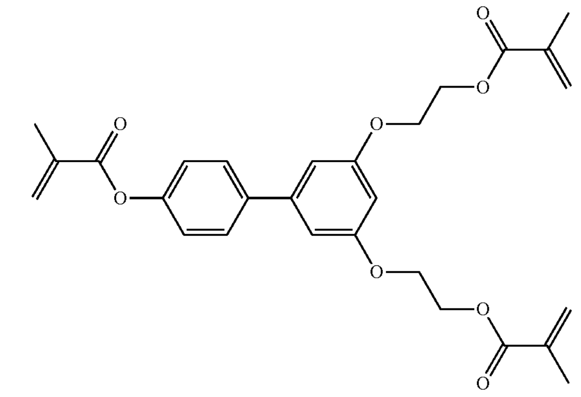 [SMILES: C=C(C)C(=O)OCCOc1cc(OCCOC(=O)C(=C)C)cc(-c2ccc(OC(=O)C(=C)C)cc2)c1]

-continued
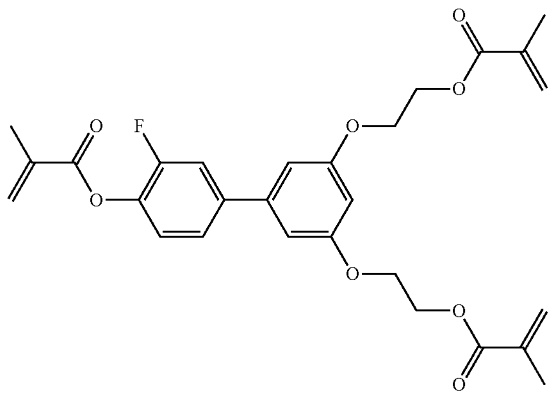 [SMILES: C=C(C)C(=O)OCCOc1cc(OCCOC(=O)C(=C)C)cc(-c2ccc(OC(=O)C(=C)C)c(F)c2)c1]
RM-129
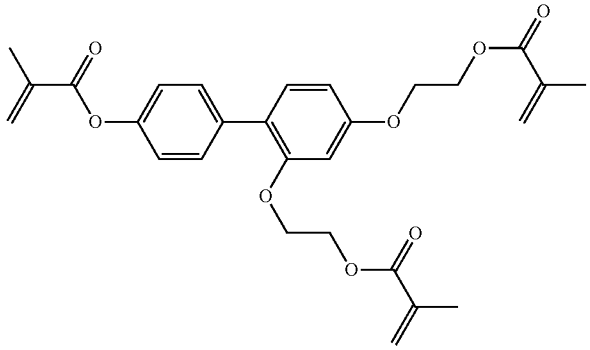 [SMILES: C=C(C)C(=O)OCCOc1ccc(-c2ccc(OC(=O)C(=C)C)cc2)c(OCCOC(=O)C(=C)C)c1]
RM-130
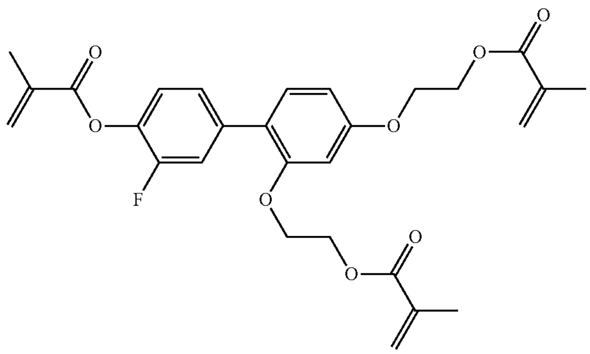 [SMILES: C=C(C)C(=O)OCCOc1ccc(-c2ccc(OC(=O)C(=C)C)c(F)c2)c(OCCOC(=O)C(=C)C)c1]
RM-131
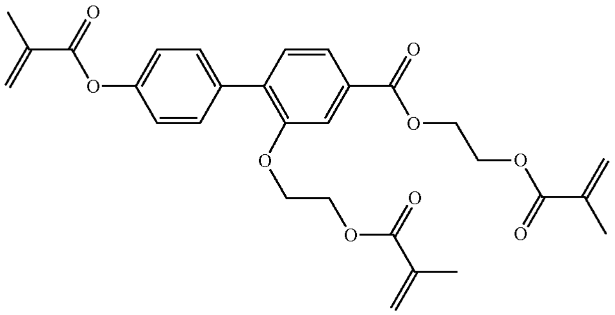 [SMILES: C=C(C)C(=O)OCCOC(=O)c1ccc(-c2ccc(OC(=O)C(=C)C)cc2)c(OCCOC(=O)C(=C)C)c1]
RM-132

-continued
RM-133
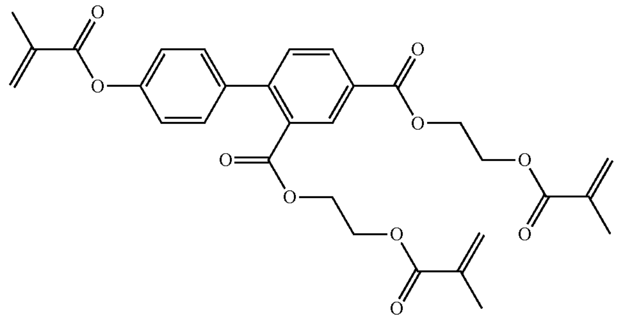 [SMILES: C=C(C)C(=O)OCCOC(=O)c1ccc(-c2ccc(OC(=O)C(=C)C)cc2)c(C(=O)OCCOC(=O)C(=C)C)c1]
RM-134
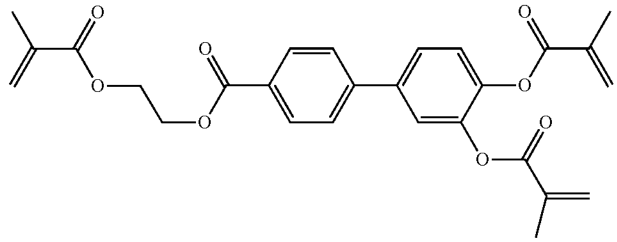 [SMILES: C=C(C)C(=O)OCCOC(=O)c1ccc(-c2ccc(OC(=O)C(=C)C)c(OC(=O)C(=C)C)c2)cc1]
RM-135
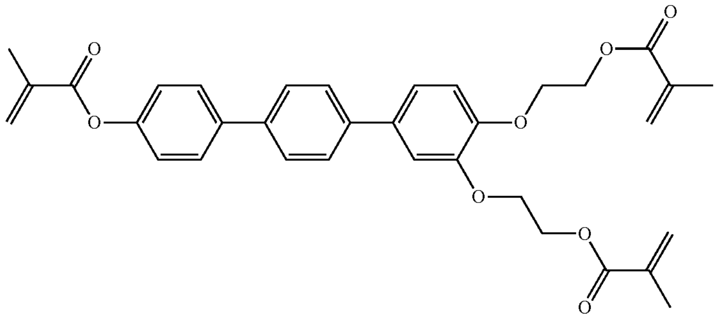 [SMILES: C=C(C)C(=O)OCCOc1ccc(-c2ccc(-c3ccc(OC(=O)C(=C)C)cc3)cc2)cc1OCCOC(=O)C(=C)C]
RM-136
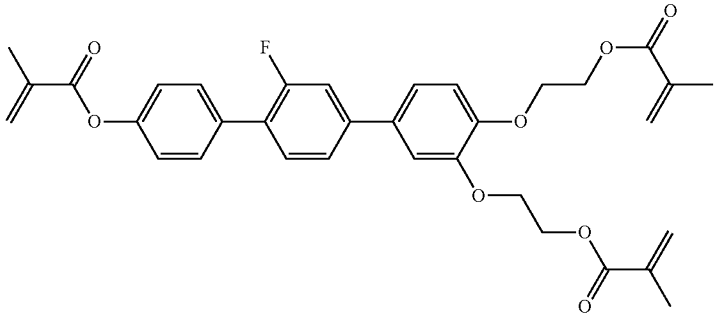 [SMILES: C=C(C)C(=O)OCCOc1ccc(-c2ccc(-c3ccc(OC(=O)C(=C)C)cc3)c(F)c2)cc1OCCOC(=O)C(=C)C]
RM-137
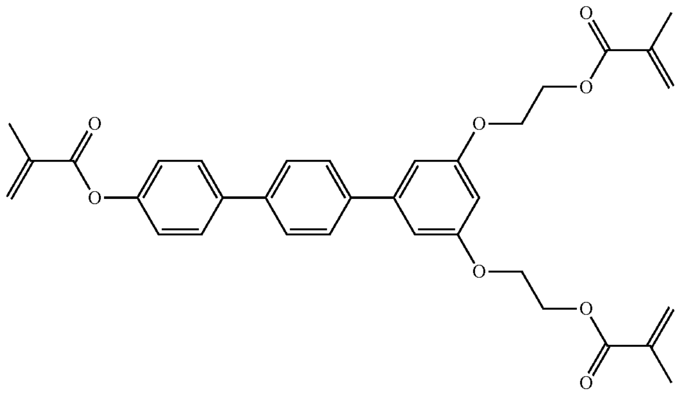 [SMILES: C=C(C)C(=O)OCCOc1cc(OCCOC(=O)C(=C)C)cc(-c2ccc(-c3ccc(OC(=O)C(=C)C)cc3)cc2)c1]

-continued
RM-138
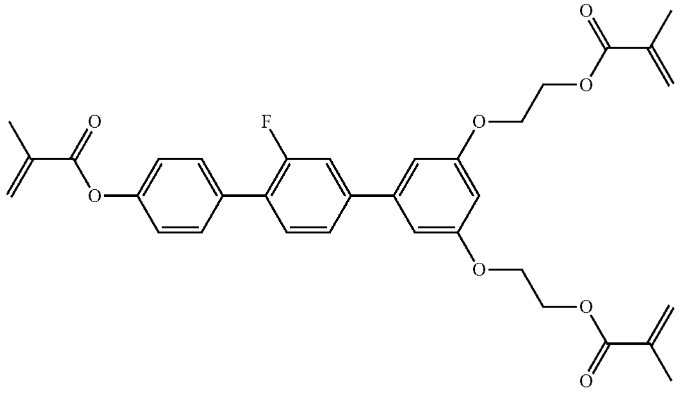 [SMILES: C=C(C)C(=O)OCCOc1cc(OCCOC(=O)C(=C)C)cc(-c2ccc(-c3ccc(OC(=O)C(=C)C)cc3)c(F)c2)c1]
RM-139
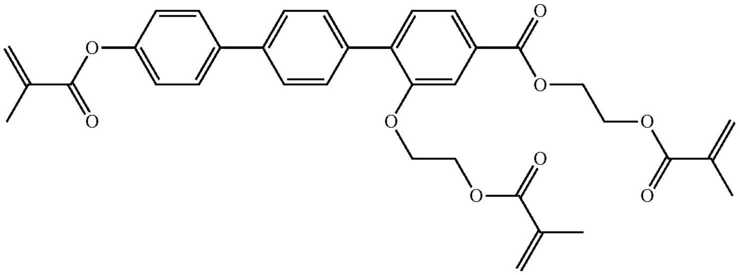 [SMILES: C=C(C)C(=O)OCCOC(=O)c1ccc(-c2ccc(-c3ccc(OC(=O)C(=C)C)cc3)cc2)c(OCCOC(=O)C(=C)C)c1]
RM-140
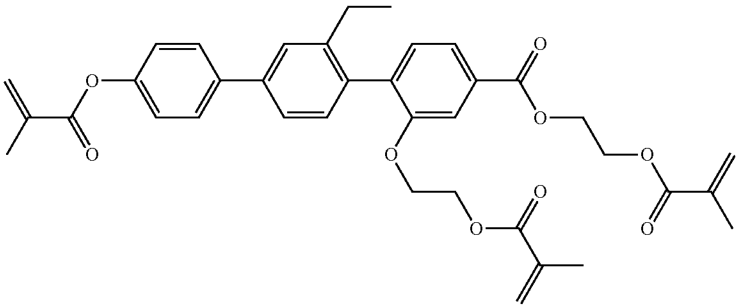 [SMILES: C=C(C)C(=O)OCCOC(=O)c1ccc(-c2ccc(-c3ccc(OC(=O)C(=C)C)cc3)cc2CC)c(OCCOC(=O)C(=C)C)c1]
RM-141
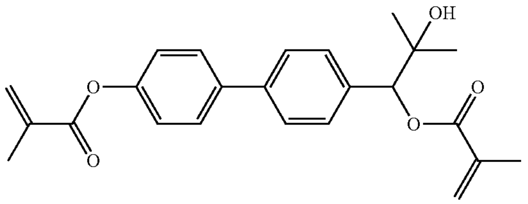 [SMILES: C=C(C)C(=O)Oc1ccc(-c2ccc(C(OC(=O)C(=C)C)C(C)(C)O)cc2)cc1]
RM-142
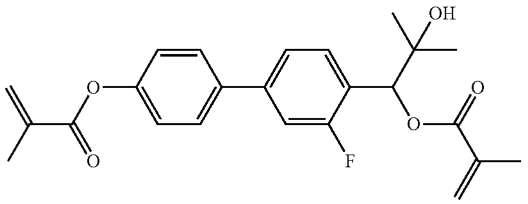 [SMILES: C=C(C)C(=O)Oc1ccc(-c2ccc(C(OC(=O)C(=C)C)C(C)(C)O)c(F)c2)cc1]
RM-143
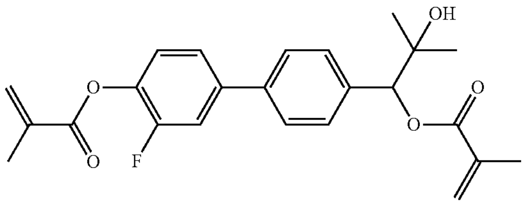 [SMILES: C=C(C)C(=O)Oc1ccc(-c2ccc(C(OC(=O)C(=C)C)C(C)(C)O)cc2)cc1F]

In a preferred embodiment, the liquid-crystalline media according to the invention comprise one or more polymerizable compounds, preferably selected from the polymerizable compounds of the Formulae RM-1 to RM-143. Of these, compounds RM-1, RM-4, RM-8, RM-17, RM-19, RM-35, RM-37, RM-39, RM-40, RM-41, RM-48, RM-52, RM-54, RM-57, RM-64, RM-74, RM-76, RM-88, RM-102, RM-103, RM-109, RM-117, RM-120, RM-121 and RM-122 are particularly preferred.

Table I

Table I shows self-alignment additives for vertical alignment which can be used in LC media for SA-FFS, SA-HB-FFS and SA-XB-FFS displays according to the present invention:

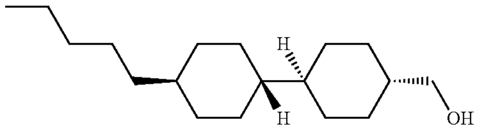 [SMILES: CCCCC[C@H]1CC[C@H]([C@H]2CC[C@H](CO)CC2)CC1]

SA-1

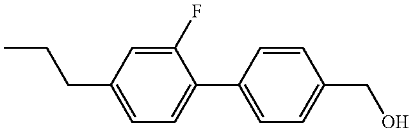 [SMILES: CCCc1ccc(-c2ccc(CO)cc2)c(F)c1]

SA-2

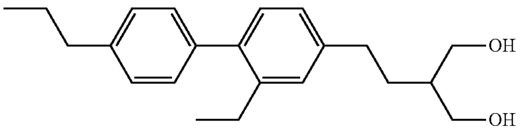 [SMILES: CCCc1ccc(-c2ccc(CCC(CO)CO)cc2CC)cc1]

SA-3

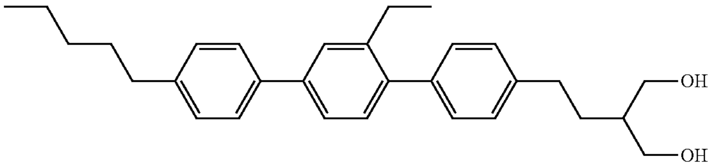 [SMILES: CCCCCc1ccc(-c2ccc(-c3ccc(CCC(CO)CO)cc3)c(CC)c2)cc1]

SA-4

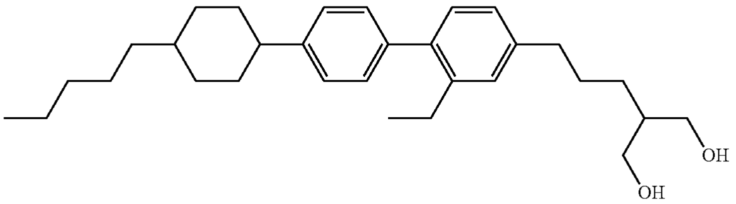 [SMILES: CCCCCC1CCC(c2ccc(-c3ccc(CCCC(CO)CO)cc3CC)cc2)CC1]

SA-5

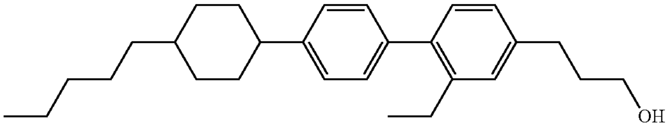 [SMILES: CCCCCC1CCC(c2ccc(-c3ccc(CCCO)cc3CC)cc2)CC1]

SA-6

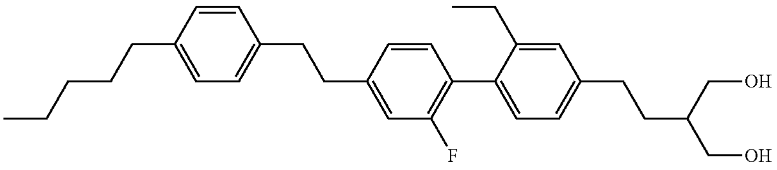 [SMILES: CCCCCc1ccc(CCc2ccc(-c3ccc(CCC(CO)CO)cc3CC)c(F)c2)cc1]

SA-7

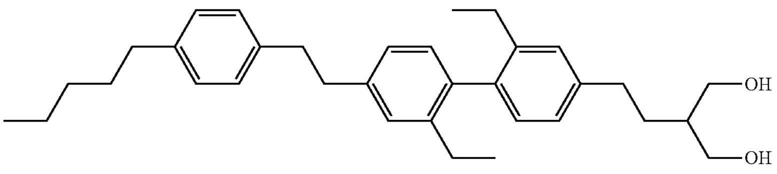 [SMILES: CCCCCc1ccc(CCc2ccc(-c3ccc(CCC(CO)CO)cc3CC)c(CC)c2)cc1]

SA-8

-continued
SA-9
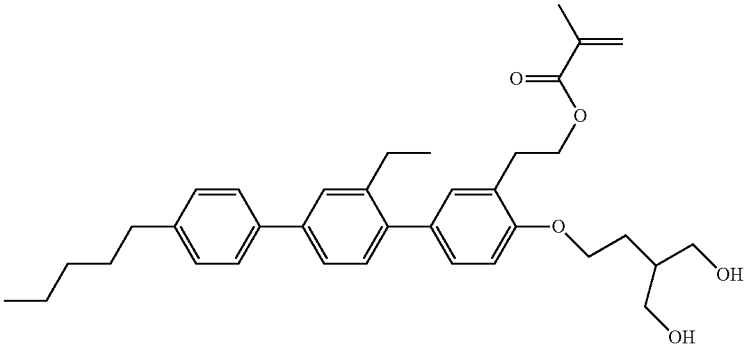 [SMILES: C=C(C)C(=O)OCCc1cc(-c2ccc(-c3ccc(CCCCC)cc3)cc2CC)ccc1OCCC(CO)CO]
SA-10
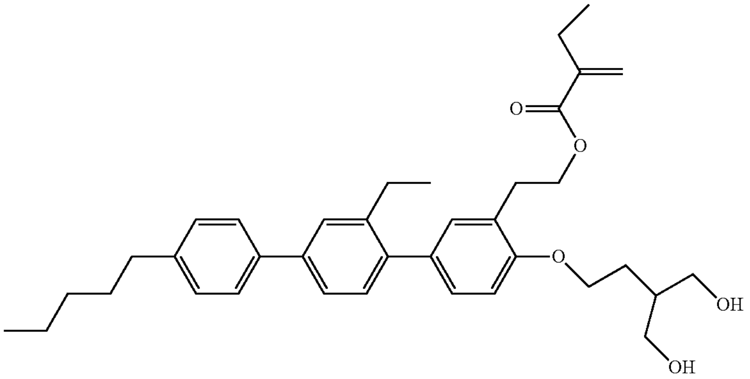 [SMILES: C=C(CC)C(=O)OCCc1cc(-c2ccc(-c3ccc(CCCCC)cc3)cc2CC)ccc1OCCC(CO)CO]
SA-11
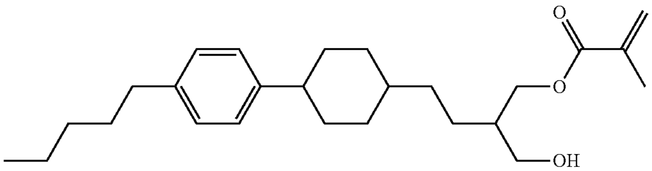 [SMILES: C=C(C)C(=O)OCC(CO)CCC1CCC(c2ccc(CCCCC)cc2)CC1]
SA-12
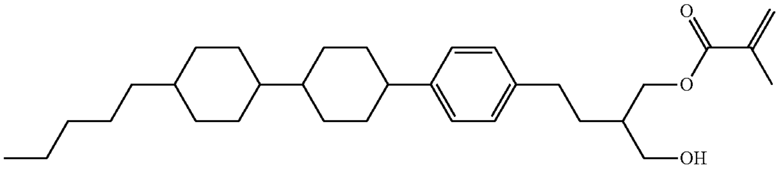 [SMILES: C=C(C)C(=O)OCC(CO)CCc1ccc(C2CCC(C3CCC(CCCCC)CC3)CC2)cc1]
SA-13
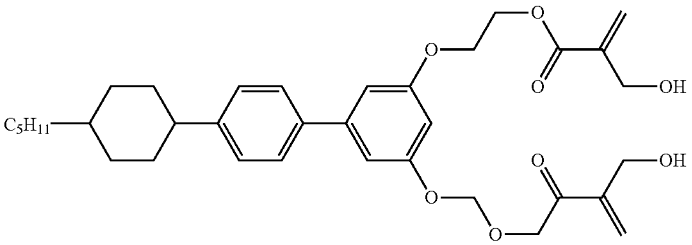

-continued
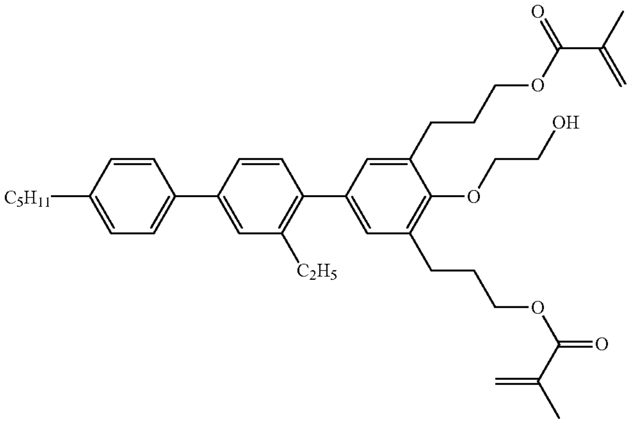
SA-14
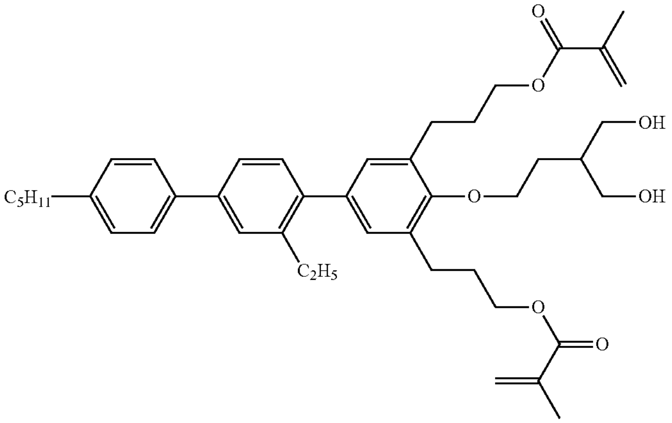
SA-15
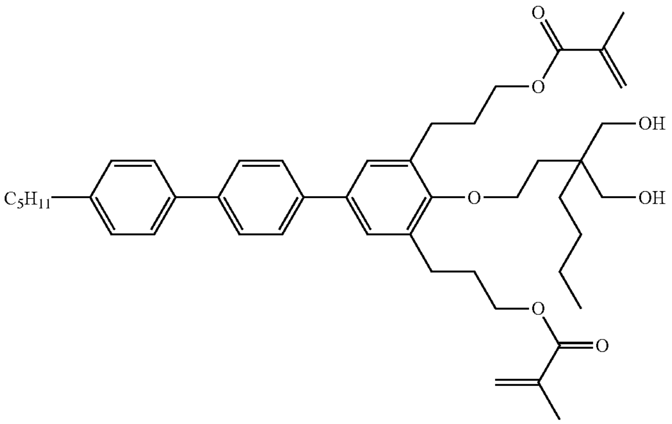
SA-16

-continued
SA-17
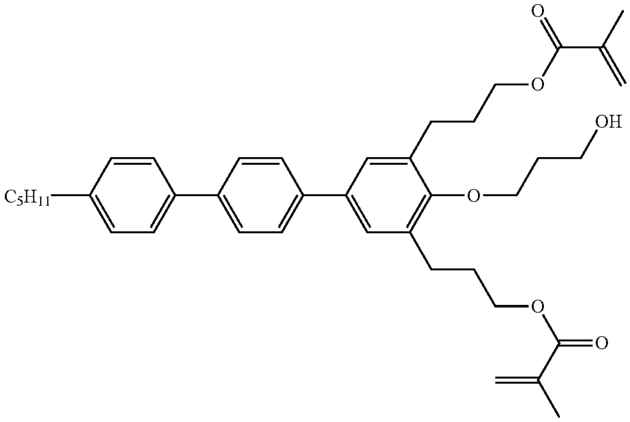
SA-18
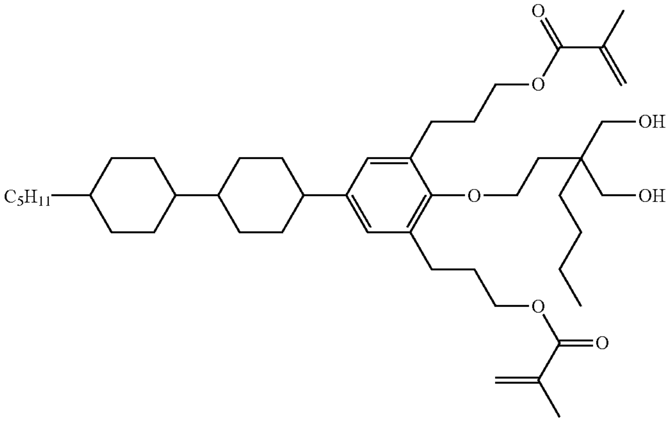
SA-19
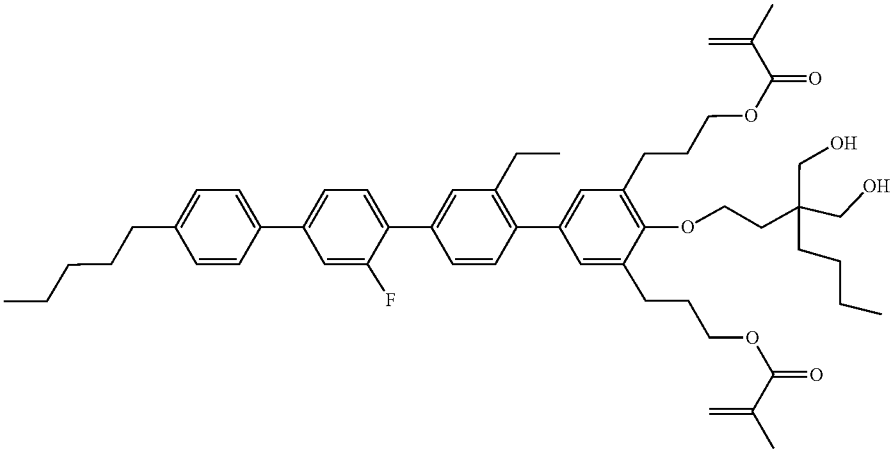 [SMILES: C=C(C)C(=O)OCCCc1cc(-c2ccc(-c3ccc(-c4ccc(CCCCC)cc4)cc3F)cc2CC)cc(CCCOC(=O)C(=C)C)c1OCCC(CO)(CO)CCCC]

-continued
SA-20
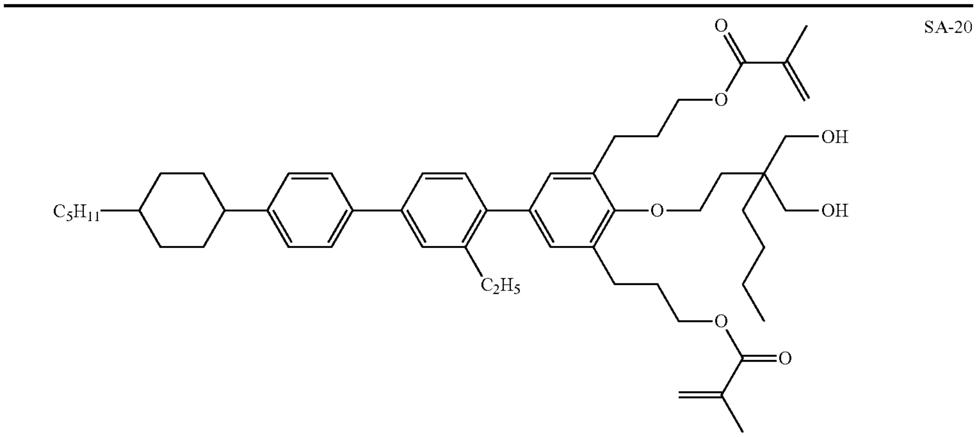
SA-21
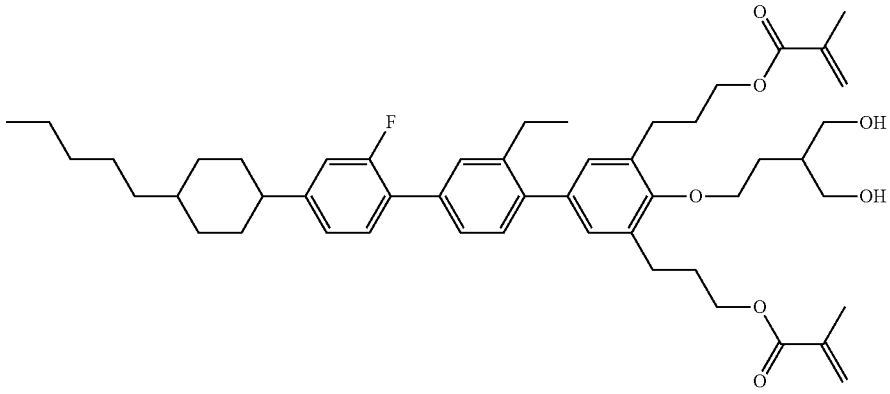 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)CO]
SA-22
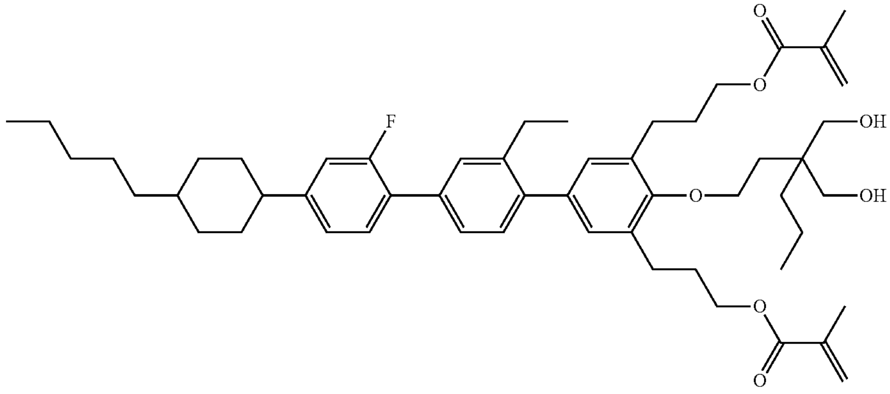 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)(CO)CCC]
SA-23
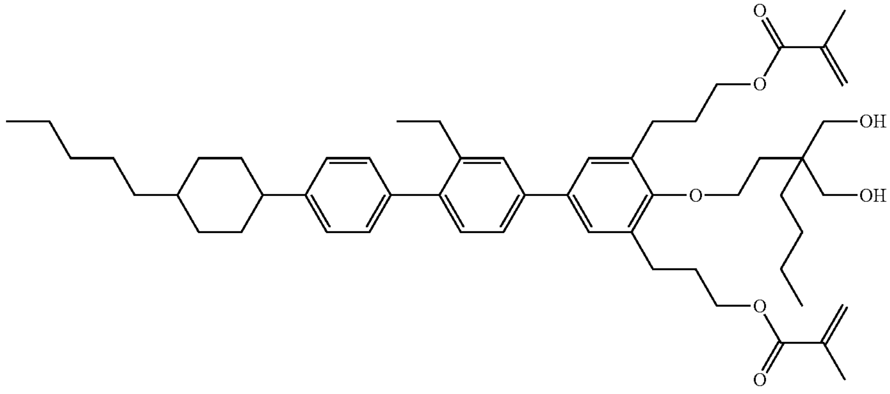 [SMILES: C=C(C)C(=O)OCCCc1cc(-c2ccc(-c3ccc(C4CCC(CCCCC)CC4)cc3)c(CC)c2)cc(CCCOC(=O)C(=C)C)c1OCCC(CO)(CO)CCCC]

-continued
SA-24
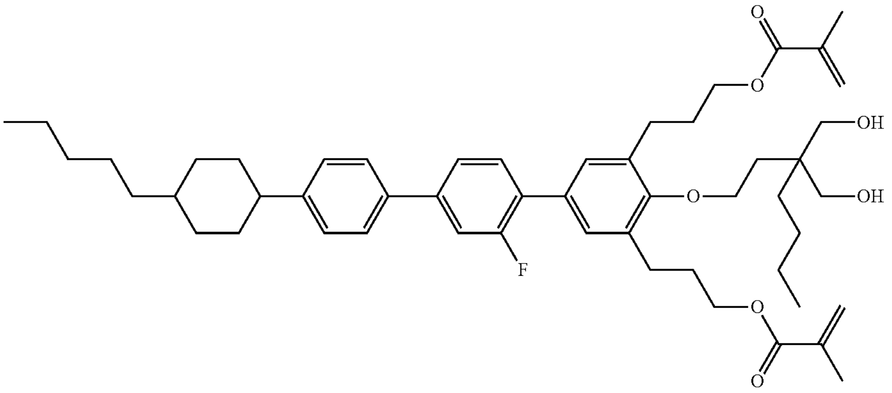 [SMILES: C=C(C)C(=O)OCCCc1cc(-c2ccc(-c3ccc(C4CCC(CCCCC)CC4)cc3)cc2F)cc(CCCOC(=O)C(=C)C)c1OCCC(CO)(CO)CCCC]
SA-25
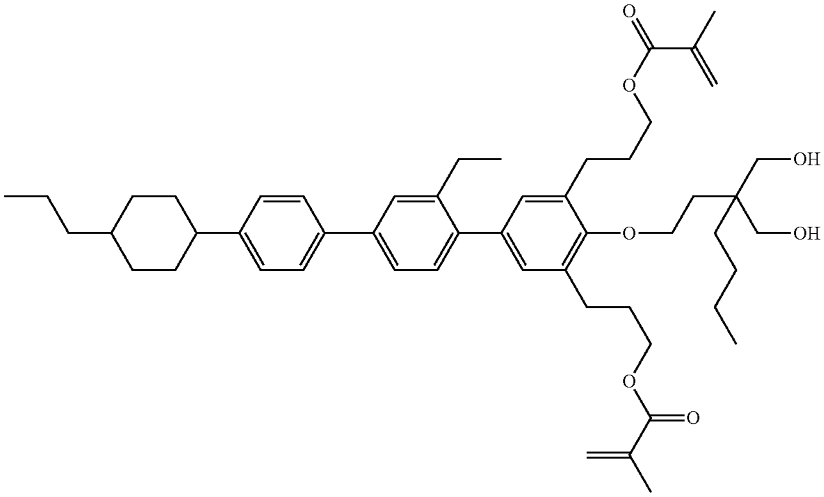 [SMILES: C=C(C)C(=O)OCCCc1cc(-c2ccc(-c3ccc(C4CCC(CCC)CC4)cc3)cc2CC)cc(CCCOC(=O)C(=C)C)c1OCCC(CO)(CO)CCCC]
SA-26
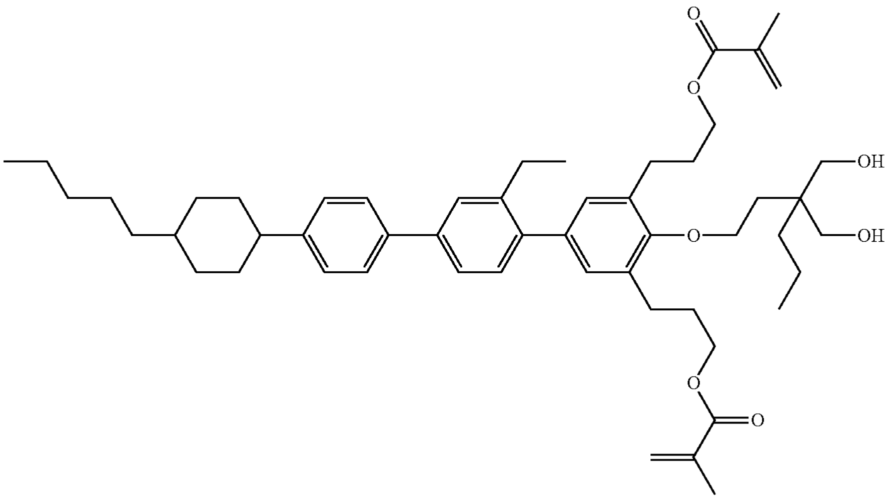 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCC]

-continued
SA-27
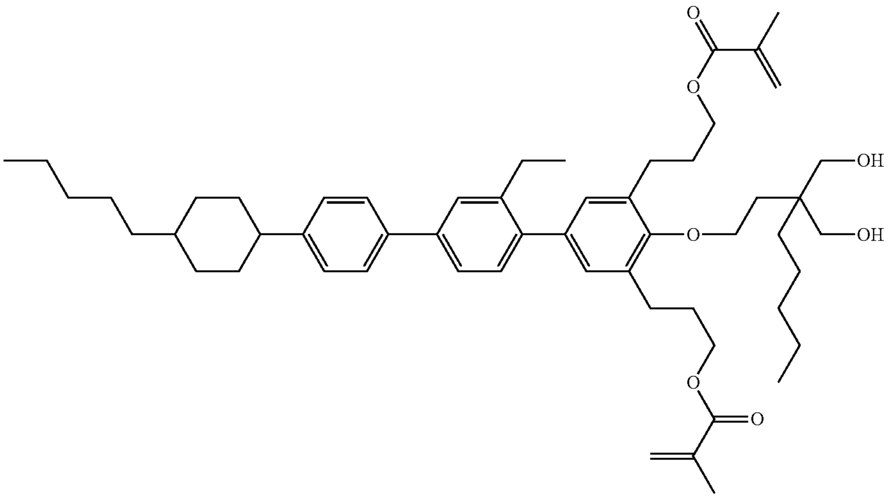 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCCCC]
SA-28
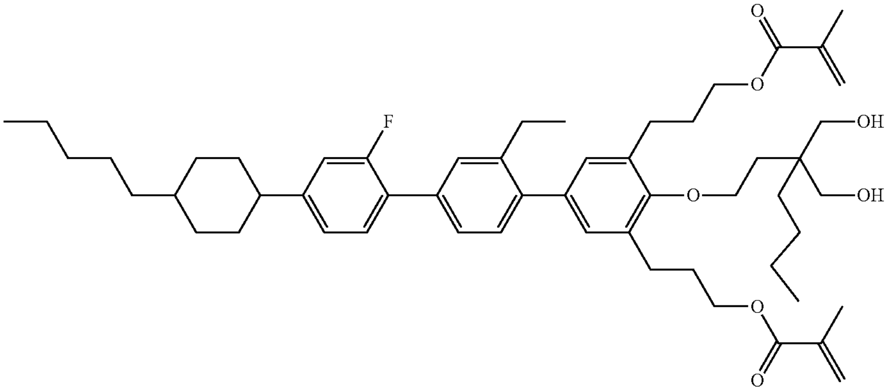 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)(CO)CCCC]
SA-29
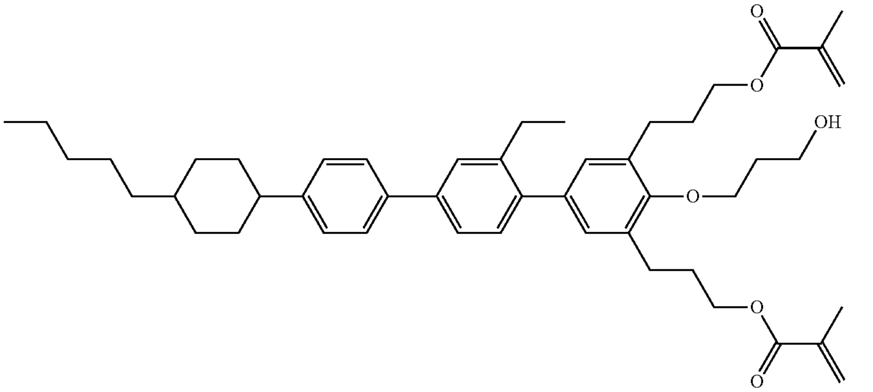 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCCO]
SA-30
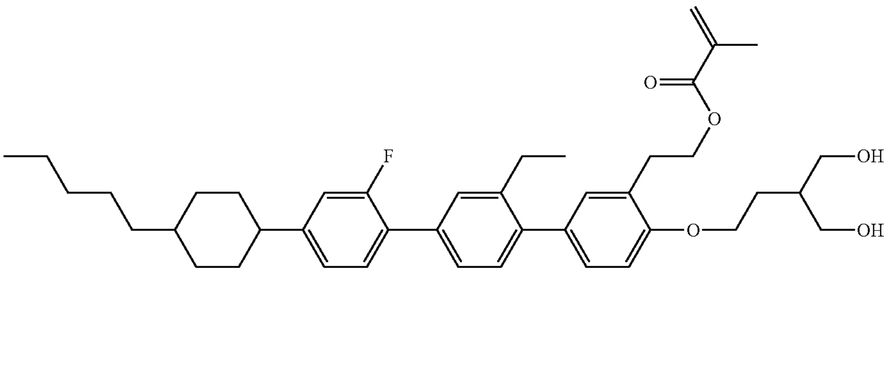 [SMILES: C=C(C)C(=O)OCCc1cc(-c2ccc(-c3ccc(C4CCC(CCCCC)CC4)cc3F)cc2CC)ccc1OCCC(CO)CO]

-continued

SA-31

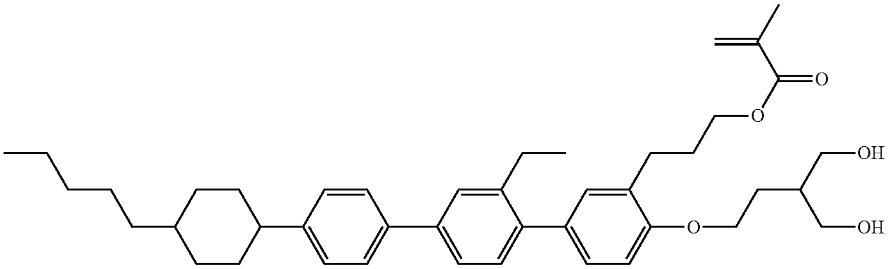 [SMILES: C=C(C)C(=O)OCCCc1cc(-c2ccc(-c3ccc(C4CCC(CCCCC)CC4)cc3)cc2CC)ccc1OCCC(CO)CO]

SA-32

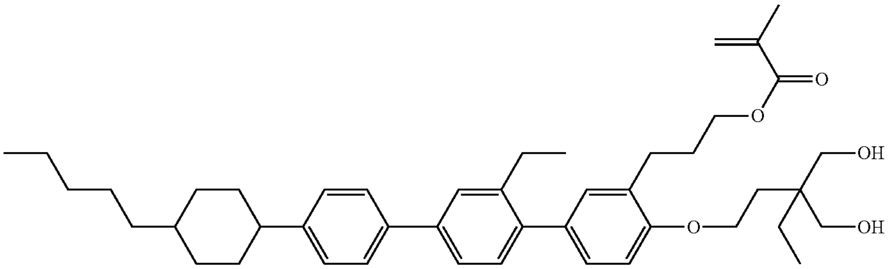 [SMILES: C=C(C)C(=O)OCCCc1cc(-c2ccc(-c3ccc(C4CCC(CCCCC)CC4)cc3)cc2CC)ccc1OCCC(CC)(CO)CO]

SA-33

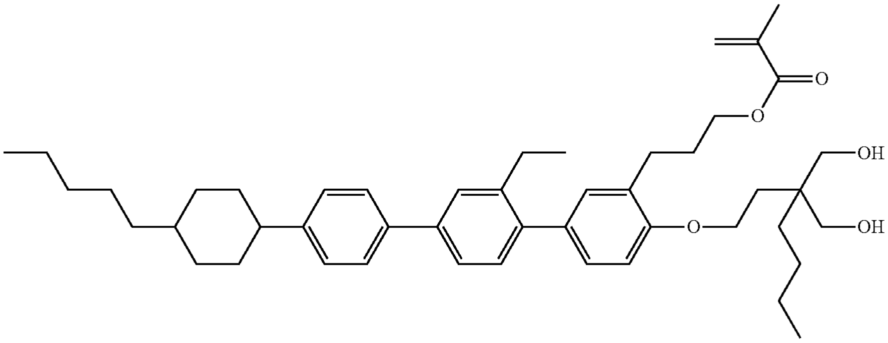 [SMILES: C=C(C)C(=O)OCCCc1cc(-c2ccc(-c3ccc(C4CCC(CCCCC)CC4)cc3)cc2CC)ccc1OCCC(CO)(CO)CCCC]

SA-34

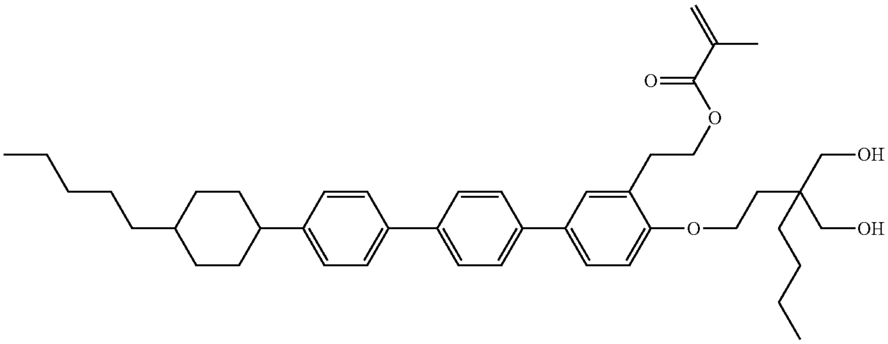 [SMILES: C=C(C)C(=O)OCCc1cc(-c2ccc(-c3ccc(C4CCC(CCCCC)CC4)cc3)cc2)ccc1OCCC(CO)(CO)CCCC]

In a preferred embodiment, the LC media, SA-FFS, SA-HB-FFS and SA-XB-FFS displays according to the present invention comprise one or more SA additives selected from Formulae SA-1 to SA-34, preferably from Formulae SA-14 to SA-34, very preferably from Formulae SA-20 to SA-28, most preferably of Formula SA-20, in combination with one or more RMs of Formula I.

The following mixture examples are intended to explain the invention without limiting it.

Above and below, percentage data denote percent by weight. All temperatures are indicated in degrees Celsius. m.p. denotes melting point, cl.p.=clearing point. Furthermore, C=crystalline state, N=nematic phase, S=smectic phase and I=isotropic phase. The data between these symbols represent the transition temperatures. Furthermore, the following symbols are used $V_0$ Freedericks threshold voltage, capacitive [V] at 20° C., $V_{10}$ voltage [V] for 10% transmission, $n_e$ extraordinary refractive index measured at 20° C. and 589 nm, $n_o$ ordinary refractive index measured at 20° C. and 589 nm, Δn optical anisotropy measured at 20° C. and 589 nm, ε⊥ dielectric susceptibility (or "dielectric constant") perpendicular to the to the longitudinal axes of the molecules at 20° C. and 1 kHz, ε|| dielectric susceptibility (or "dielectric constant") parallel to the to the longitudinal axes of the molecules at 20° C. and 1 kHz, Δε dielectric anisotropy at 20° C. and 1 kHz, cl.p. or T(N,I) clearing point [° C.], v flow viscosity measured at 20° C. [$mm^2 \cdot s^{-1}$], $\gamma_1$ rotational viscosity measured at 20° C. [mPa·s], $k_{11}$ elastic constant, "splay" deformation at 20° C. [pN], $k_{22}$ elastic constant, "twist" deformation at 20° C. [pN], $k_{33}$ elastic constant, "bend" deformation at 20° C. [pN], and LTS low-temperature stability of the phase [h] in bulk VHR voltage holding ratio.

All physical properties are determined in accordance with "Merck Liquid Crystals, Physical Properties of Liquid Crystals", status November 1997, Merck KGaA, Germany, and apply for a temperature of 20° C., unless explicitly indicated otherwise.

EXAMPLES

Base Mixture M1

A nematic LC mixture is formulated as follows:

| Composition | | | |
|---|---|---|---|
| Nr. | Compound | Concentration, wt.-% | Properties |
| 1 | CC-3-V | 47.0 | T(N, I) = 75° C. |
| 2 | CC-3-V1 | 4.5 | Δn (20° C., 589 nm) = 0.1343 |
| 3 | CLP-3-T | 7.0 | $\varepsilon_{\parallel}$ (20° C., 1 kHz) = 5.7 |
| 4 | PGP-1-2V | 5.5 | $\varepsilon_{\perp}$ (20° C., 1 kHz) = 2.7 |
| 5 | PGP-2-2V | 10.0 | Δε (20° C., 1 kHz) = 3.0 |
| 6 | PGU-2-F | 1.0 | $k_{11}$ (20° C.) = 15.8 pN |
| 7 | PGUQU-3-F | 4.0 | $k_{33}$ (20° C.) = 13.5 pN |
| 8 | PGUQU-4-F | 2.5 | $V_0$ (V, 20° C.) = 2.43 V |
| 9 | PP-1-2V1 | 7.5 | $\gamma_1$ (20° C.) = 49 mPa · s |
| 10 | PPGU-3-F | 1.0 | LTS (−20° C.) > 1 000 h |
| 11 | PUS-3-2 | 10.0 | |

Mixture Example S1 (Stabilised with Compound of Formula ST-2-3)

A nematic LC mixture according to the invention is formulated as follows:

| | |
|---|---|
| Mixture M1 | 99.95 wt.-% |
| Compound of Formula ST-2-3 | 500 ppm |

Addition of 500 ppm of the compound of Formula ST-2-3 significantly improves the $VHR_{100}$ after UV exposure compared to the non-stabilized mixture M1, without affecting the remaining physical properties of the mixture M1.

Base Mixture M2

A nematic LC mixture is formulated as follows:

| Composition | | | |
|---|---|---|---|
| Nr. | Compound | Concentration, wt.-% | Properties |
| 1 | CC-3-V | 47.0 | T(N, I) = 75.1° C. |
| 2 | CC-3-V1 | 4.5 | Δn (20° C., 589 nm) = 0.1341 |
| 3 | CLP-3-T | 7.0 | $\varepsilon_{\parallel}$ (20° C., 1 kHz) = 5.7 |
| 4 | PGP-1-2V | 5.5 | $\varepsilon_{\perp}$ (20° C., 1 kHz) = 2.7 |
| 5 | PGP-2-2V | 10.0 | Δε (20° C., 1 kHz) = 3.0 |
| 6 | PGU-2-F | 1.0 | $k_{11}$ (20° C.) = 15.8 pN |
| 7 | PGUQU-3-F | 2.5 | $k_{33}$ (20° C.) = 13.6 pN |
| 8 | PGUQU-4-F | 4.0 | $V_0$ (V, 20° C.) = 2.42 V |
| 9 | PP-1-2V1 | 7.5 | $\gamma_1$ (20° C.) = 56 mPa · s |
| 10 | PPGU-3-F | 1.0 | LTS (−20° C.) > 1 000 h |
| 11 | PUS-3-2 | 10.0 | |

Mixture Example S2 (Stabilised with Compound of Formula ST-2-3)

A nematic LC mixture according to the invention is formulated as follows:

| | |
|---|---|
| Mixture M2 | 99.96 wt.-% |
| Compound of Formula ST-2-3 | 400 ppm |

Addition of 400 ppm of the compound of Formula ST-2-3 significantly improves the $VHR_{100}$ after UV exposure compared to the non-stabilized mixture M2, without affecting the remaining physical properties of the mixture.

Base Mixture M3

A nematic LC mixture is formulated as follows:

| Composition | | | |
|---|---|---|---|
| Nr. | Compound | Concentration, wt.-% | Properties |
| 1 | CC-3-V | 40.0 | T(N, I) = 78.1° C. |
| 2 | CC-3-V1 | 8.5 | Δn (20° C., 589 nm) = 0.1221 |
| 3 | CCH-35 | 6.0 | $\varepsilon_{\parallel}$ (20° C., 1 kHz) = 6.1 |
| 4 | CCP-3-1 | 3.5 | $\varepsilon_{\perp}$ (20° C., 1 kHz) = 2.7 |
| 5 | CLP-3-T | 7.0 | Δε (20° C., 1 kHz) = 3.5 |
| 6 | PGP-2-2V | 10.0 | $k_{11}$ (20° C.) = 16.4 pN |
| 7 | PGU-2-F | 3.0 | $k_{33}$ (20° C.) = 14.3 pN |
| 8 | PGUQU-3-F | 4.0 | $V_0$ (V, 20° C.) = 2.30 V |
| 9 | PGUQU-4-F | 4.0 | $\gamma_1$ (20° C.) = 58 mPa · s |
| 10 | PP-1-2V1 | 5.0 | LTS (−20° C.) > 1 000 h |
| 11 | PUS-3-2 | 9.0 | |

Mixture Example S3 (Stabilised with Compound of Formula ST-2-3)

A nematic LC mixture according to the invention is formulated as follows:

| | |
|---|---|
| Mixture M3 | 99.96 wt.-% |
| Compound of Formula ST-2-3 | 400 ppm |

Addition of 400 ppm of the compound of Formula ST-2-3 significantly improves the $VHR_{100}$ after UV exposure compared to the non-stabilized mixture M3, without affecting the the remaining physical properties of the mixture.

Base Mixture M4

A nematic LC mixture is formulated as follows:

| Nr. | Compound | Concentration, wt.-% | Properties |
|---|---|---|---|
| 1 | CC-3-V | 29.8 | T(N, I) = 109.8° C. |
| 2 | CC-3-V1 | 6.0 | Δn (20° C., 589 nm)= |
| 3 | CCP-V-1 | 14.0 | $\varepsilon_{\|\|}$ (20° C., 1 kHz) = 7.4 |
| 4 | CCP-V2-1 | 5.0 | $\varepsilon_{\perp}$ (20° C., 1 kHz) = 2.9 |
| 5 | CCVC-3-V | 2.8 | Δε (20° C., 1 kHz) = 4.6 |
| 6 | CDUQU-3-F | 5.3 | $k_{11}$ (20° C.) = 17.7 pN |
| 7 | CLP-V-1 | 4.5 | $k_{33}$ (20° C.) = 18.9 pN |
| 8 | CPGP-5-2 | 2.1 | $V_0$ (V, 20° C.) = 2.07 V |
| 9 | DGUQU-4-F | 3.5 | $\gamma_1$ (20° C.) = 94 mPa · s |
| 10 | PCH-302 | 1.5 | LTS (−20° C.) > 1 000 h |
| 11 | PGP-1-2V | 3.3 | |
| 12 | PGP-2-2V | 8.0 | |
| 13 | PGUQU-3-F | 3.5 | |
| 14 | PGUQU-4-F | 2.0 | |
| 15 | PPGU-3-F | 1.0 | |
| 16 | PUS-3-2 | 7.7 | |

Mixture Example S4 (Stabilised with Compound of Formula ST-1-3)

A nematic LC mixture according to the invention is formulated as follows:

| | |
|---|---|
| Mixture M4 | 99.97 wt.-% |
| Compound of Formula ST-1-3 | 300 ppm |

Addition of 300 ppm of the compound of Formula ST-1-3 significantly improves the $VHR_{100}$ after UV exposure compared to the non-stabilized mixture M4, without affecting the remaining physical properties of the mixture.

Base Mixture M5

A nematic LC mixture is formulated as follows:

| Nr. | Compound | Concentration, wt.-% | Properties |
|---|---|---|---|
| 1 | CC-3-V | 29.0 | T(N, I) = 110.1° C. |
| 2 | CC-3-V1 | 6.0 | Δn (20° C., 589 nm) = n.b. |
| 3 | CCP-V-1 | 15.0 | $\varepsilon_{\|\|}$ (20° C., 1 kHz) = 7.5 |
| 4 | CCP-V2-1 | 4.0 | $\varepsilon_{\perp}$ (20° C., 1 kHz) = 2.8 |
| 5 | CCVC-3-V | 3.5 | Δε (20° C., 1 kHz) = 4.7 |
| 6 | CDUQU-3-F | 4.0 | $k_{11}$ (20° C.) = 17.9 pN |
| 7 | CLP-V-1 | 5.8 | $k_{33}$ (20° C.) = 18.9 pN |
| 8 | CPGP-5-2 | 1.5 | $V_0$ (V, 20° C.) = 2.06 V |
| 9 | DGUQU-4-F | 3.5 | $\gamma_1$ (20° C.) = 94 mPa · s |
| 10 | PCH-302 | 1.5 | LTS (−20° C.) > 1 000 h |
| 11 | PGP-1-2V | 1.9 | |
| 12 | PGP-2-2V | 8.0 | |
| 13 | PGUQU-3-F | 3.5 | |
| 14 | PGUQU-4-F | 3.5 | |
| 15 | PPGU-3-F | 1.0 | |
| 16 | PUS-3-2 | 8.3 | |

Mixture Example S5 (Stabilised with Compound of Formula ST-1-3)

A nematic LC mixture according to the invention is formulated as follows:

| | |
|---|---|
| Mixture M5 | 99.97 wt.-% |
| Compound of Formula ST-1-3 | 300 ppm |

Addition of 300 ppm of the compound of Formula ST-1-3 significantly improves the $VHR_{100}$ after UV exposure compared to the non-stabilized mixture M5, without affecting the remaining physical properties of the mixture.

Base Mixture M6

A nematic LC mixture is formulated as follows:

| Nr. | Compound | Concentration, wt.-% | Properties |
|---|---|---|---|
| 1 | CC-3-V | 32.1 | T(N, I) = 111.9° C. |
| 2 | CC-3-V1 | 6.0 | Δn (20° C., 589 nm) = 0.1163 |
| 3 | CCP-V-1 | 15.0 | $\varepsilon_{\|\|}$ (20° C., 1 kHz) = 7.3 |
| 4 | CCP-V2-1 | 4.0 | $\varepsilon_{\perp}$ (20° C., 1 kHz) = 2.8 |
| 5 | CCVC-3-V | 6.0 | Δε (20° C., 1 kHz) = 4.5 |
| 6 | CDUQU-3-F | 6.5 | $k_{11}$ (20° C.) = 17.1 pN |
| 7 | CLP-V-1 | 6.0 | $k_{33}$ (20° C.) = 19.3 pN |
| 8 | CPGP-5-2 | 1.7 | $V_0$ (V, 20° C.) = 2.10 V |
| 9 | DGUQU-4-F | 3.5 | $\gamma_1$ (20° C.) = 90 mPa · s |
| 10 | PCH-302 | 1.5 | LTS (−20° C.) > 1 000 h |
| 11 | PGP-2-2V | 7.0 | |
| 12 | PGUQU-3-F | 3.5 | |
| 13 | PGUQU-4-F | 1.3 | |
| 14 | PPGU-3-F | 1.0 | |
| 15 | PUS-3-2 | 4.9 | |

Mixture Example S6 (Stabilised with Compound of Formula ST-1-3)

A nematic LC mixture according to the invention is formulated as follows:

| | |
|---|---|
| Mixture M6 | 99.97 wt.-% |
| Compound of Formula ST-1-3 | 300 ppm |

Addition of 300 ppm of the compound of Formula ST-1-3 significantly improves the $VHR_{100}$ after UV exposure compared to the non-stabilized mixture M6, without affecting the remaining physical properties of the mixture.

Base Mixture M7

A nematic LC mixture is formulated as follows:

| Nr. | Compound | Concentration, wt.-% | Properties |
|---|---|---|---|
| 1 | CC-3-V | 31.8 | T(N, I) = 110.3° C. |
| 2 | CC-3-V1 | 6.0 | Δn (20° C., 589 nm) = 0.1208 |
| 3 | CCP-V-1 | 15.0 | $\varepsilon_{\|\|}$ (20° C., 1 kHz) = 7.4 |
| 4 | CCP-V2-1 | 3.3 | $\varepsilon_{\perp}$ (20° C., 1 kHz) = 2.8 |
| 5 | CCVC-3-V | 6.0 | Δε (20° C., 1 kHz) = 4.6 |
| 6 | CDUQU-3-F | 4.4 | $k_{11}$ (20° C.) = 17.0 pN |
| 7 | CLP-V-1 | 5.0 | $k_{33}$ (20° C.) = 18.8 pN |

-continued

| Composition | | | |
|---|---|---|---|
| Nr. | Compound | Concentration, wt.-% | Properties |
| 8 | CPGP-4-3 | 2.0 | $V_0$ (V, 20° C.) = 2.03 V |
| 9 | CPGP-5-2 | 0.6 | $\gamma_1$ (20° C.) = 89 mPa · s |
| 10 | DGUQU-4-F | 3.5 | LTS (−20° C.) > 1 000 h |
| 11 | PCH-302 | 2.0 | |
| 12 | PGP-2-2V | 4.4 | |
| 13 | PGUQU-3-F | 3.5 | |
| 14 | PGUQU-4-F | 3.5 | |
| 15 | PPGU-3-F | 1.0 | |
| 16 | PUS-3-2 | 8.0 | |

Mixture Example S7 (Stabilised with Compound of Formula ST-1-3)

A nematic LC mixture according to the invention is formulated as follows:

| | |
|---|---|
| Mixture M7 | 99.97 wt.-% |
| Compound of Formula ST-1-3 | 300 ppm |

Addition of 300 ppm of the compound of Formula ST-1-3 significantly improves the $VHR_{100}$ after UV exposure compared to the non-stabilized mixture M7, without affecting the remaining physical properties of the mixture.

Base Mixture M8

A nematic LC mixture is formulated as follows:

| Composition | | | |
|---|---|---|---|
| Nr. | Compound | Concentration, wt.-% | Properties |
| 1 | APUQU-2-F | 1.0 | T(N, I) = 74.9° C. |
| 2 | CC-3-V | 45.0 | $\Delta n$ (20° C., 589 nm) = 0.1318 |
| 3 | CC-3-V1 | 7.0 | $\varepsilon_{\parallel}$ (20° C., 1 kHz) = 7.9 |
| 4 | CLP-3-T | 5.0 | $\varepsilon_{\perp}$ (20° C., 1 kHz) = 2.9 |
| 5 | CPGU-3-OT | 1.0 | $\Delta\varepsilon$ (20° C., 1 kHz) = 5.0 |
| 6 | PCH-302 | 1.0 | $k_{11}$ (20° C.) = 14.3 pN |
| 7 | PGP-2-2V | 9.0 | $k_{33}$ (20° C.) = 12.5 pN |
| 8 | PGU-2-F | 5.0 | $V_0$ (V, 20° C.) = 1.78 V |
| 9 | PGUQU-3-F | 5.5 | $\gamma_1$ (20° C.) = 50 mPa · s |
| 10 | PGUQU-4-F | 5.5 | LTS (−20° C.) > 1 000 h |
| 11 | PP-1-2V1 | 2.0 | |
| 12 | PPGU-3-F | 0.5 | |
| 13 | PUS-3-2 | 12.5 | |

Mixture Example S8 (Stabilised with Compound of Formula ST-2-3)

A nematic LC mixture according to the invention is formulated as follows:

| | |
|---|---|
| Mixture M8 | 99.96 wt.-% |
| Compound of Formula ST-2-3 | 400 ppm |

Addition of 400 ppm of the compound of Formula ST-2-3 significantly improves the $VHR_{100}$ after UV exposure compared to the non-stabilized mixture M8, without affecting the remaining physical properties of the mixture.

Base Mixture M9

A nematic LC mixture is formulated as follows:

| Composition | | | |
|---|---|---|---|
| Nr. | Compound | Concentration, wt.-% | Properties |
| 1 | CC-3-2V1 | 3.3 | T(N, I) = 74.9° C. |
| 2 | CC-3-V | 47.0 | $\Delta n$ (20° C., 589 nm) = 0.1084 |
| 3 | CC-3-V1 | 9.7 | $\varepsilon_{\parallel}$ (20° C., 1 kHz) = 8.1 |
| 4 | CCH-35 | 1.0 | $\varepsilon_{\perp}$ (20° C., 1 kHz) = 3.0 |
| 5 | CLP-3-T | 8.5 | $\Delta\varepsilon$ (20° C., 1 kHz) = 5.1 |
| 6 | DGUQU-4-F | 5.5 | $k_{11}$ (20° C.) = 15.1 pN |
| 7 | LB(S)-3-OT | 3.3 | $k_{33}$ (20° C.) = 13.8 pN |
| 8 | PGU-2-F | 3.7 | $V_0$ (V, 20° C.) = 1.82 V |
| 9 | PGUQU-3-F | 6.0 | $\gamma_1$ (20° C.) = 51 mPa · s |
| 10 | PPGU-3-F | 0.5 | LTS (−20° C.) > 1000 h |
| 11 | PUS-3-2 | 11.5 | |

Mixture Example S9 (Stabilised with Compound of Formula ST-2-3)

A nematic LC mixture according to the invention is formulated as follows:

| | |
|---|---|
| Mixture M9 | 99.96 wt.-% |
| Compound of Formula ST-2-3 | 400 ppm |

Addition of 400 ppm of the compound of Formula ST-2-3 significantly improves the $VHR_{100}$ after UV exposure compared to the non-stabilized mixture M9, without affecting the remaining physical properties of the mixture.

Base Mixture M10

A nematic LC mixture is formulated as follows:

| Composition | | | |
|---|---|---|---|
| Nr. | Compound | Concentration, wt.-% | Properties |
| 1 | CC-3-V | 33.0 | T(N, I) = 75.7° C. |
| 2 | CC-3-V1 | 8.0 | $\Delta n$ (20° C., 589 nm) = 0.1506 |
| 3 | CLP-3-T | 3.0 | $\varepsilon_{\parallel}$ (20° C., 1 kHz) = 7.2 |
| 4 | CLP-V-1 | 2.5 | $\varepsilon_{\perp}$ (20° C., 1 kHz) = 2.8 |
| 5 | PGP-1-2V | 3.5 | $\Delta\varepsilon$ (20° C., 1 kHz) = 4.4 |
| 6 | PGP-2-2V | 14.0 | $k_{11}$ (20° C.) = 16.2 pN |
| 7 | DGUQU-4-F | 1.0 | $k_{33}$ (20° C.) = 14.1 pN |
| 8 | PGUQU-3-F | 4.0 | $V_0$ (V, 20° C.) = 2.02 V |
| 9 | PGUQU-4-F | 5.5 | $\gamma_1$ (20° C.) = 62 mPa · s |
| 10 | PP-1-2V1 | 13.5 | LTS (−20° C.) > 1000 h |
| 11 | PPGU-3-F | 1.0 | |
| 12 | PUQU-3-F | 3.0 | |
| 13 | PUS-3-2 | 8.0 | |

Mixture Example S10 (Stabilised with Compound of Formula ST-1-3)

A nematic LC mixture according to the invention is formulated as follows:

| | |
|---|---|
| Mixture M10 | 99.96 wt.-% |
| Compound of Formula ST-1-3 | 400 ppm |

Addition of 400 ppm of the compound of Formula ST-1-3 significantly improves the $VHR_{100}$ after UV exposure compared to the non-stabilized mixture M10, without affecting the remaining physical properties of the mixture.

Base Mixture M11

A nematic LC mixture is formulated as follows:

| Composition | | | |
|---|---|---|---|
| Nr. | Compound | Concentration, wt.-% | Properties |
| 1 | CC-3-V | 33.0 | T(N, I) = 78.5° C. |
| 2 | CC-3-V1 | 4.5 | Δn (20° C., 589 nm) = 0.1595 |
| 3 | CLP-3-T | 3.0 | $\varepsilon_{\parallel}$ (20° C., 1 kHz) = 7.4 |
| 4 | CLP-V-1 | 1.5 | $\varepsilon_{\perp}$ (20° C., 1 kHz) = 2.9 |
| 5 | PGP-1-2V | 4.0 | Δε (20° C., 1 kHz) = 4.5 |
| 6 | PGP-2-2V | 15.0 | $k_{11}$ (20° C.) = 16.7 pN |
| 7 | PGP-3-2V | 4.0 | $k_{33}$ (20° C.) = 14.2 pN |
| 8 | DGUQU-4-F | 1.0 | $V_0$ (V, 20° C.) = 2.03 V |
| 9 | PGUQU-3-F | 4.0 | $\gamma_1$ (20° C.) = 66 mPa · s |
| 10 | PGUQU-4-F | 5.5 | LTS (−20° C.) = 1000 h |
| 11 | PP-1-2V1 | 13.5 | |
| 12 | PPGU-3-F | 1.0 | |
| 13 | PUQU-3-F | 3.0 | |
| 14 | PUS-3-2 | 7.0 | |

Mixture Example S11 (Stabilised with Compound of Formula ST-1-3)

A nematic LC mixture according to the invention is formulated as follows:

| | |
|---|---|
| Mixture M11 | 99.96 wt.-% |
| Compound of Formula ST-1-3 | 400 ppm |

Addition of 400 ppm of the compound of Formula ST-1-3 significantly improves the $VHR_{100}$ after UV exposure compared to the non-stabilized mixture M11, without affecting the remaining physical properties of the mixture.

Base Mixture M12

A nematic LC mixture is formulated as follows:

| Composition | | | |
|---|---|---|---|
| Nr. | Compound | Concentration, wt.-% | Properties |
| 1 | CC-3-V | 30.0 | T(N, I) = 79.7° C. |
| 2 | CC-3-V1 | 7.0 | Δn (20° C., 589 nm) = 0.1512 |
| 3 | CCH-35 | 5.0 | $\varepsilon_{\parallel}$ (20° C., 1 kHz) = 7.0 |
| 4 | CCP-V-1 | 7.0 | $\varepsilon_{\perp}$ (20° C., 1 kHz) = 2.7 |
| 5 | PGP-2-2V | 3.0 | Δε (20° C., 1 kHz) = 4.3 |
| 6 | DGUQU-4-F | 3.0 | $k_{11}$ (20° C.) = 16.2 pN |
| 7 | DPGU-4-F | 3.0 | $k_{33}$ (20° C.) = 13.8 pN |
| 8 | PGUQU-3-F | 2.0 | $V_0$ (V, 20° C.) = 2.07 V |
| 9 | PGUQU-4-F | 5.0 | $\gamma_1$ (20° C.) = 68 mPa · s |
| 10 | PP-1-2V1 | 9.0 | LTS (−20° C.) > 1000 h |
| 11 | PPGU-3-F | 1.0 | |
| 12 | PUS-3-2 | 25.0 | |

Mixture Example S12 (Stabilised with Compound of Formula ST-1-3)

A nematic LC mixture according to the invention is formulated as follows:

| | |
|---|---|
| Mixture M12 | 99.96 wt.-% |
| Compound of Formula ST-1-3 | 400 ppm |

Addition of 400 ppm of the compound of Formula ST-1-3 significantly improves the $VHR_{100}$ after UV exposure compared to the non-stabilized mixture M12, without affecting the remaining physical properties of the mixture.

Base Mixture M13

A nematic LC mixture is formulated as follows:

| Composition | | | |
|---|---|---|---|
| Nr. | Compound | Concentration, wt.-% | Properties |
| 1 | CC-3-V | 30.0 | T(N, I) = 77.5° C. |
| 2 | CC-3-V1 | 7.0 | Δn (20° C., 589 nm) = 0.1509 |
| 3 | CCH-35 | 5.0 | $\varepsilon_{\parallel}$ (20° C., 1 kHz) = 7.0 |
| 4 | CCP-V-1 | 7.0 | $\varepsilon_{\perp}$ (20° C., 1 kHz) = 2.7 |
| 5 | PGP-2-2V | 3.0 | Δε (20° C., 1 kHz) = 4.3 |
| 6 | DGUQU-4-F | 3.0 | $k_{11}$ (20° C.) = 15.7 pN |
| 7 | PGUQU-3-F | 3.0 | $k_{33}$ (20° C.) = 13.5 pN |
| 8 | PGUQU-4-F | 5.0 | $V_0$ (V, 20° C.) = 2.03 V |
| 9 | PGUQU-5-F | 2.0 | $\gamma_1$ (20° C.) = 67 mPa · s |
| 10 | PP-1-2V1 | 9.0 | LTS (−20° C.) > 1000 h |
| 11 | PPGU-3-F | 1.0 | |
| 12 | PUS-3-2 | 25.0 | |

Mixture Example S13 (Stabilised with Compound of Formula ST-1-3)

A nematic LC mixture according to the invention is formulated as follows:

| | |
|---|---|
| Mixture M13 | 99.96 wt.-% |
| Compound of Formula ST-1-3 | 400 ppm |

Addition of 400 ppm of the compound of Formula ST-1-3 significantly improves the $VHR_{100}$ after UV exposure compared to the non-stabilized mixture M13, without affecting the remaining physical properties of the mixture.

Base Mixture M14

A nematic LC mixture is formulated as follows:

| Composition | | | |
|---|---|---|---|
| Nr. | Compound | Concentration, wt.-% | Properties |
| 1 | CC-3-V | 30.0 | T(N, I) = 77.5° C. |
| 2 | CC-3-V1 | 7.0 | Δn (20° C., 589 nm) = 0.1509 |
| 3 | CCH-35 | 5.0 | $\varepsilon_{\parallel}$ (20° C., 1 kHz) = 7.0 |
| 4 | CCP-V-1 | 7.0 | $\varepsilon_{\perp}$ (20° C., 1 kHz) = 2.7 |
| 5 | PGP-2-2V | 3.0 | Δε (20° C., 1 kHz) = 4.3 |
| 6 | DGUQU-4-F | 3.0 | $k_{11}$ (20° C.) = 15.7 pN |

-continued

| Nr. | Compound | Concentration, wt.-% | Properties |
|---|---|---|---|
| 7 | PGUQU-3-F | 3.0 | $k_{33}$ (20° C.) = 13.5 pN |
| 8 | PGUQU-4-F | 5.0 | $V_0$ (V, 20° C.) = 2.03 V |
| 9 | PGUQU-5-F | 2.0 | $\gamma_1$ (20° C.) = 67 mPa · s |
| 10 | PP-1-2V1 | 9.0 | LTS (−20° C.) > 1000 h |
| 11 | PPGU-3-F | 1.0 | |
| 12 | PUS-3-2 | 25.0 | |

Mixture Example S14 (Stabilised with Compound of Formula ST-1-3)

A nematic LC mixture according to the invention is formulated as follows:

| | |
|---|---|
| Mixture M14 | 99.97 wt.-% |
| Compound of Formula ST-1-3 | 300 ppm |

Addition of 300 ppm of the compound of Formula ST-1-3 significantly improves the $VHR_{100}$ after UV exposure compared to the non-stabilized mixture M14, without affecting the remaining physical properties of the mixture.

Base Mixture M15

A nematic LC mixture is formulated as follows:

| Nr. | Compound | Concentration, wt.-% | Properties |
|---|---|---|---|
| 1 | CC-3-V | 49.0 | T(N, I) = 74.5° C. |
| 2 | CC-3-V1 | 5.5 | Δn (20° C., 589 nm)= |
| 3 | CCP-30CF3 | 3.5 | $\varepsilon_{\parallel}$ (20° C., 1 kHz) = 5.5 |
| 4 | CLP-3-T | 7.5 | $\varepsilon_{\perp}$ (20° C., 1 kHz) = 2.6 |
| 5 | PGP-2-2V | 12.0 | Δε (20° C., 1 kHz) = 2.9 |
| 6 | PGU-2-F | 1.0 | $k_{11}$ (20° C.) = 15.4 pN |
| 7 | PGUQU-3-F | 2.5 | $k_{33}$ (20° C.) = 13.6 pN |
| 8 | PGUQU-4-F | 3.5 | $V_0$ (V, 20° C.) = 2.44 V |
| 9 | PP-1-2V1 | 5.5 | $\gamma_1$ (20° C.) = 52 mPa · s |
| 10 | PUS-3-2 | 10.0 | LTS (−20° C.) > 1000 h |

Mixture Example S15 (Stabilised with Compound of Formula ST-2-3)

A nematic LC mixture according to the invention is formulated as follows:

| | |
|---|---|
| Mixture M15 | 99.96 wt.-% |
| Compound of Formula ST-1-3 | 400 ppm |

Addition of 400 ppm of the compound of Formula ST-2-3 significantly improves the $VHR_{100}$ after UV exposure compared to the non-stabilized mixture M15, without affecting the remaining physical properties of the mixture.

Base Mixture M16

A nematic LC mixture is formulated as follows:

| Nr. | Compound | Concentration, wt.-% | Properties |
|---|---|---|---|
| 1 | CC-3-V | 45.0 | T(N, I) =74.6° C. |
| 2 | CC-3-V1 | 8.0 | Δn (20° C., 589 nm)= |
| 3 | CC-4-V1 | 4.7 | $\varepsilon_{\parallel}$ (20° C., 1 kHz) = 5.2 |
| 4 | CLP-3-T | 7.5 | $\varepsilon_{\perp}$ (20° C., 1 kHz) = 2.6 |
| 5 | PGP-2-2V | 12.0 | Δε (20° C., 1 kHz) = 2.6 |
| 6 | PGU-2-F | 1.0 | $k_{11}$ (20° C.) = 15.5 pN |
| 7 | PGUQU-3-F | 2.5 | $k_{33}$ (20° C.) = 13.6 pN |
| 8 | PGUQU-4-F | 3.3 | $V_0$ (V, 20° C.) = 2.57 V |
| 9 | PP-1-2V1 | 4.5 | $\gamma_1$ (20° C.) = 54 mPa · s |
| 10 | PUS-3-2 | 11.5 | LTS (−20° C.) > 1000 h |

Mixture Example S16 (Stabilised with Compound of Formula ST-2-3)

A nematic LC mixture according to the invention is formulated as follows:

| | |
|---|---|
| Mixture M16 | 99.96 wt.-% |
| Compound of Formula ST-1-3 | 400 ppm |

Addition of 400 ppm of the compound of Formula ST-1-3 significantly improves the $VHR_{100}$ after UV exposure compared to the non-stabilized mixture M16, without affecting the remaining physical properties of the mixture.

Base Mixture M17

A nematic LC mixture is formulated as follows:

| Nr. | Compound | Concentration, wt.-% | Properties |
|---|---|---|---|
| 1 | CC-3-V | 42.0 | T(N, I) = 111.8° C. |
| 2 | CCP-30CF3 | 7.0 | Δn (20° C., 589 nm) = 0.1211 |
| 3 | CCP-V-1 | 12.0 | $\varepsilon_{\parallel}$ (20° C., 1 kHz) = 6.1 |
| 4 | CCPC-33 | 3.0 | $\varepsilon_{\perp}$ (20° C., 1 kHz) = 2.6 |
| 5 | CCVC-3-V | 6.0 | Δε (20° C., 1 kHz) = 3.5 |
| 6 | CPGP-4-3 | 3.0 | $k_{11}$ (20° C.) = 17.6 pN |
| 7 | CPGU-3-OT | 4.0 | $k_{33}$ (20° C.) = 17.8 pN |
| 8 | DGUQU-4-F | 4.0 | $V_0$ (V, 20° C.) = 2.39 V |
| 9 | DPGU-4-F | 3.0 | $\gamma_1$ (20° C.) = 98 mPa · s |
| 10 | PPGU-3-F | 0.5 | LTS (−20° C.) > 1 000 h |
| 11 | PUS-3-2 | 15.5 | |

Mixture Example S17 (Stabilised with Compound of Formula ST-1-3)

A nematic LC mixture according to the invention is formulated as follows:

| | |
|---|---|
| Mixture M17 | 99.96 wt.-% |
| Compound of Formula ST-1-3 | 400 ppm |

Addition of 400 ppm of the compound of Formula ST-1-3 significantly improves the $VHR_{100}$ after UV exposure compared to the non-stabilized mixture M17, without affecting the remaining physical properties of the mixture.

Base Mixture M18

A nematic LC mixture is formulated as follows:

| Composition | | | |
|---|---|---|---|
| Nr. | Compound | Concentration, wt.-% | Properties |
| 1 | B(S)-2O-O5 | 4.4 | T(N, I) = 110° C. |
| 2 | BCH-32 | 3.0 | Δn (20° C., 589 nm) = 0.1312 |
| 3 | CC-3-V | 34.3 | $\varepsilon_{\parallel}$ (20° C., 1 kHz) = 7.2 |
| 4 | CC-3-V1 | 2.5 | $\varepsilon_{\perp}$ (20° C., 1 kHz) = 3.6 |
| 5 | CCP-V-1 | 15.0 | Δε (20° C., 1 kHz) = 3.6 |
| 6 | CCP-V2-1 | 4.5 | $k_{11}$ (20° C.) = 17.5 pN |
| 7 | CCPC-33 | 1.1 | $k_{33}$ (20° C.) = 18.0 pN |
| 8 | CDUQU-3-F | 5.9 | $V_0$ (V, 20° C.) = 2.32 V |
| 9 | CPGP-4-3 | 2.0 | $\gamma_1$ (20° C.) = 111 mPa · s |
| 10 | CPGP-5-2 | 2.0 | LTS (−20° C.) > 1 000 h |
| 11 | DGUQU-4-F | 3.5 | |
| 12 | LB(S)-3-OT | 3.0 | |
| 13 | PGP-1-2V | 2.8 | |
| 14 | PGP-2-2V | 6.0 | |
| 15 | PGP-3-2V | 2.0 | |
| 16 | PGUQU-3-F | 3.0 | |
| 17 | PPGU-3-F | 1.0 | |
| 18 | PUS-3-2 | 4.0 | |

Mixture Example S18 (Stabilised with Compound of Formula ST-1-3)

A nematic LC mixture according to the invention is formulated as follows:

| | |
|---|---|
| Mixture M18 | 99.97 wt.-% |
| Compound of Formula ST-1-3 | 300 ppm |

Addition of 300 ppm of the compound of Formula ST-1-3 significantly improves the $VHR_{100}$ after UV exposure compared to the non-stabilized mixture M18, without affecting the remaining physical properties of the mixture.

Base Mixture M19

A nematic LC mixture is formulated as follows:

| Composition | | | |
|---|---|---|---|
| Nr. | Compound | Concentration, wt.-% | Properties |
| 1 | BCH-32 | 4.5 | T(N, I) = 110° C. |
| 2 | CBC-33F | 2.2 | Δn (20° C., 589 nm) = 0.1311 |
| 3 | CC-3-V | 30.2 | $\varepsilon_{\parallel}$ (20° C., 1 kHz) = 6.9 |
| 4 | CC-3-V1 | 5.0 | $\varepsilon_{\perp}$ (20° C., 1 kHz) = 3.3 |
| 5 | CCP-V-1 | 6.5 | Δε (20° C., 1 kHz) = 3.6 |
| 6 | CCP-V2-1 | 11.0 | $k_{11}$ (20° C.) = 17.6 pN |
| 7 | CDUQU-3-F | 3.9 | $k_{33}$ (20° C.) = 19.2 pN |
| 8 | CPGP-4-3 | 2.0 | $V_0$ (V, 20° C.) = 2.34 V |
| 9 | CPGP-5-2 | 2.0 | $\gamma_1$ (20° C.) = 120 mPa · s |
| 10 | CPY-3-O2 | 5.7 | LTS (−20° C.) > 1 000 h |
| 11 | DGUQU-4-F | 3.5 | |
| 12 | LB(S)-3-OT | 3.5 | |
| 13 | PGP-1-2V | 3.5 | |
| 14 | PGP-2-2V | 6.0 | |
| 15 | PP-1-2V1 | 2.5 | |
| 16 | PPGU-3-F | 1.0 | |
| 17 | PUQU-3-F | 5.0 | |
| 18 | PUS-3-2 | 2.0 | |

Mixture Example S19 (Stabilised with Compound of Formula ST-1-3)

A nematic LC mixture according to the invention is formulated as follows:

| | |
|---|---|
| Mixture M19 | 99.97 wt.-% |
| Compound of Formula ST-1-3 | 300 ppm |

Addition of 300 ppm of the compound of Formula ST-1-3 significantly improves the $VHR_{100}$ after UV exposure compared to the non-stabilized mixture M19, without affecting the remaining physical properties of the mixture.

Base Mixture M20

A nematic LC mixture is formulated as follows:

| Composition | | | |
|---|---|---|---|
| Nr. | Compound | Concentration, wt.-% | Properties |
| 1 | B(S)-2O-O5 | 2.0 | T(N, I) = 111.3° C. |
| 2 | BCH-32 | 3.0 | Δn (20° C., 589 nm) = 0.1315 |
| 3 | CC-3-V | 32.2 | $\varepsilon_{\parallel}$ (20° C., 1 kHz) = 7.5 |
| 4 | CCP-V-1 | 12.0 | $\varepsilon_{\perp}$ (20° C., 1 kHz) = 4.0 |
| 5 | CCP-V2-1 | 3.1 | Δε (20° C., 1 kHz) = 3.5 |
| 6 | CCVC-3-V | 3.5 | $k_{11}$ (20° C.) = 17.2 pN |
| 7 | CCY-3-O2 | 2.3 | $k_{33}$ (20° C.) = 18.7 pN |
| 8 | CDUQU-3-F | 4.0 | $V_0$ (V, 20° C.) = 2.34 V |
| 9 | CPGP-4-3 | 2.0 | $\gamma_1$ (20° C.) = 131 mPa · s |
| 10 | CPGP-5-2 | 2.0 | LTS (−20° C.) > 1 000 h |
| 11 | CPY-3-O2 | 8.0 | |
| 12 | DGUQU-4-F | 3.5 | |
| 13 | LB(S)-3-OT | 3.5 | |
| 14 | PGP-1-2V | 3.3 | |
| 15 | PGP-2-2V | 6.0 | |
| 16 | PPGU-3-F | 1.0 | |
| 17 | PUQU-3-F | 6.0 | |
| 18 | PUS-3-2 | 2.6 | |

Mixture Example S20 (Stabilised with Compound of Formula ST-1-3)

A nematic LC mixture according to the invention is formulated as follows:

| | |
|---|---|
| Mixture M20 | 99.97 wt.-% |
| Compound of Formula ST-1-3 | 300 ppm |

Addition of 300 ppm of the compound of Formula ST-1-3 significantly improves the $VHR_{100}$ after UV exposure compared to the non-stabilized mixture M20, without affecting the remaining physical properties of the mixture.

Base Mixture M21

A nematic LC mixture is formulated as follows:

| Composition | | | |
|---|---|---|---|
| Nr. | Compound | Concentration, wt.-% | Properties |
| 1 | CC-3-V | 40.5 | T(N, I) = 79.9° C. |
| 2 | CC-3-V1 | 4.5 | Δn (20° C., 589 nm) = 0.1532 |
| 3 | CPGU-3-OT | 3.0 | $\varepsilon_{\parallel}$ (20° C., 1 kHz) = 5.9 |
| 4 | PCH-302 | 3.0 | $\varepsilon_{\perp}$ (20° C., 1 kHz) = 2.8 |

-continued

| Composition | | | |
|---|---|---|---|
| Nr. | Compound | Concentration, wt.-% | Properties |
| 5 | PGP-1-2V | 3.0 | Δε (20° C., 1 kHz) = 3.1 |
| 6 | PGP-2-2V | 15.0 | $k_{11}$ (20° C.) = 15.0 pN |
| 7 | PGP-2-3 | 5.5 | $k_{33}$ (20° C.) = 13.3 pN |
| 8 | PGU-2-F | 1.5 | $V_0$ (V, 20° C.) = 2.33 V |
| 9 | PGUQU-3-F | 3.0 | $\gamma_1$ (20° C.) = 67 mPa · s |
| 10 | PGUQU-4-F | 3.5 | LTS (−20° C.) > 1 000 h |
| 11 | PP-1-2V1 | 4.0 | |
| 12 | PPGU-3-F | 1.0 | |
| 13 | PUS-3-2 | 12.5 | |

Mixture Example S21 (Stabilised with Compound of Formula ST-2-3)

A nematic LC mixture according to the invention is formulated as follows:

| | |
|---|---|
| Mixture M21 | 99.96 wt.-% |
| Compound of Formula ST-2-3 | 400 ppm |

Addition of 400 ppm of the compound of Formula ST-2-3 significantly improves the $VHR_{100}$ after UV exposure compared to the non-stabilized mixture M21, without affecting the remaining physical properties of the mixture.

Base Mixture M22

A nematic LC mixture is formulated as follows:

| Composition | | | |
|---|---|---|---|
| Nr. | Compound | Concentration, wt.-% | Properties |
| 1 | CC-3-V | 46.5 | T(N, I) = 75.4° C. |
| 2 | CC-3-V1 | 7.5 | Δn (20° C., 589 nm) = 0.1222 |
| 3 | CCH-23 | 3.0 | $\varepsilon_{\parallel}$ (20° C., 1 kHz) = 5.7 |
| 4 | CLP-3-T | 4.5 | $\varepsilon_{\perp}$ (20° C., 1 kHz) = 2.7 |
| 5 | CLP-V-1 | 3.5 | Δε (20° C., 1 kHz) = 3.0 |
| 6 | PCH-302 | 1.5 | $k_{11}$ (20° C.) = 14.8 pN |
| 7 | PGP-1-2V | 2.5 | $k_{33}$ (20° C.) = 13.2 pN |
| 8 | PGP-2-2V | 7.0 | $V_0$ (V, 20° C.) = 2.35 V |
| 9 | PGU-2-F | 3.0 | $\gamma_1$ (20° C.) = 52 mPa · s |
| 10 | PGUQU-3-F | 2.5 | LTS (−20° C.) > 1 000 h |
| 11 | PGUQU-4-F | 4.0 | |
| 12 | PP-1-2V1 | 1.0 | |
| 13 | PPGU-3-F | 1.0 | |
| 14 | PUS-3-2 | 12.5 | |

Mixture Example S22 (Stabilised with Compound of Formula ST-2-3)

A nematic LC mixture according to the invention is formulated as follows:

| | |
|---|---|
| Mixture M22 | 99.96 wt.-% |
| Compound of Formula ST-2-3 | 400 ppm |

Addition of 400 ppm of the compound of Formula ST-2-3 significantly improves the $VHR_{100}$ after UV exposure compared to the non-stabilized mixture M22, without affecting the remaining physical properties of the mixture.

Base Mixture M23

A nematic LC mixture is formulated as follows:

| Composition | | | |
|---|---|---|---|
| Nr. | Compound | Concentration, wt.-% | Properties |
| 1 | APUQU-2-F | 3.0 | T(N, I) = 85.1° C. |
| 2 | CC-3-2V1 | 5.0 | Δn (20° C., 589 nm) = 0.1251 |
| 3 | CC-3-V | 22.5 | $\varepsilon_{\parallel}$ (20° C., 1 kHz) = 7.5 |
| 4 | CC-3-V1 | 10.0 | $\varepsilon_{\perp}$ (20° C., 1 kHz) = 2.8 |
| 5 | CC-4-V1 | 4.0 | Δε (20° C., 1 kHz) = 4.8 |
| 6 | CCH-23 | 4.5 | $k_{11}$ (20° C.) = 20.3 pN |
| 7 | CCP-3-3 | 5.0 | $k_{33}$ (20° C.) = 16.8 pN |
| 8 | CCP-30CF3 | 5.0 | $V_0$ (V, 20° C.) = 2.17 V |
| 9 | CLP-3-T | 6.0 | $\gamma_1$ (20° C.) = 68 mPa · s |
| 10 | DGUQU-4-F | 8.0 | LTS (−20° C.) > 1 000 h |
| 11 | PGP-1-2V | 3.5 | |
| 12 | PGP-3-2V | 4.0 | |
| 13 | PP-1-2V1 | 8.5 | |
| 14 | PPGU-3-F | 1.0 | |
| 15 | PUS-3-2 | 10.0 | |

Mixture Example S23 (Stabilised with Compound of Formula ST-1-3)

A nematic LC mixture according to the invention is formulated as follows:

| | |
|---|---|
| Mixture M23 | 99.965 wt.-% |
| Compound of Formula ST-1-3 | 350 ppm |

Addition of 350 ppm of the compound of Formula ST-1-3 significantly improves the $VHR_{100}$ after UV exposure compared to the non-stabilized mixture M23, without affecting the remaining physical properties of the mixture.

Base Mixture M24

A nematic LC mixture is formulated as follows:

| Composition | | | |
|---|---|---|---|
| Nr. | Compound | Concentration, wt.-% | Properties |
| 1 | CC-3-2V1 | 5.0 | T(N, I) = 81.7° C. |
| 2 | CC-3-V | 11.5 | Δn (20° C., 589 nm) = 0.1241 |
| 3 | CC-3-V1 | 10.5 | $\varepsilon_{\parallel}$ (20° C., 1 kHz) = 7.9 |
| 4 | CCG-V-F | 4.0 | $\varepsilon_{\perp}$ (20° C., 1 kHz) = 2.9 |
| 5 | CCH-23 | 5.0 | Δε (20° C., 1 kHz) = 4.9 |
| 6 | CCH-301 | 5.0 | $k_{11}$ (20° C.) = 18.5 pN |
| 7 | CCP-30CF3 | 7.0 | $k_{33}$ (20° C.) = 16.7 pN |
| 8 | CCP-V2-1 | 3.0 | $V_0$ (V, 20° C.) = 2.04 V |
| 9 | CDUQU-3-F | 5.0 | $\gamma_1$ (20° C.) = 74 mPa · s |
| 10 | CLP-3-T | 6.0 | LTS (−20° C.) > 1000 h |
| 11 | CPGP-4-3 | 1.5 | |
| 12 | DGUQU-4-F | 6.0 | |
| 13 | PCH-302 | 5.0 | |
| 14 | PP-1-2V1 | 11.5 | |
| 15 | PPGU-3-F | 1.0 | |
| 16 | PUS-3-2 | 13.0 | |

Mixture Example S24 (Stabilised with Compound of Formula ST-1-3)

A nematic LC mixture according to the invention is formulated as follows:

| | |
|---|---|
| Mixture M24 | 99.965 wt.-% |
| Compound of Formula ST-1-3 | 350 ppm |

Addition of 350 ppm of the compound of Formula ST-1-3 significantly improves the $VHR_{100}$ after UV exposure compared to the non-stabilized mixture M24, without affecting the remaining physical properties of the mixture.

Base Mixture M25

A nematic LC mixture is formulated as follows:

| Composition | | | |
|---|---|---|---|
| Nr. | Compound | Concentration, wt.-% | Properties |
| 1 | CC-3-2V1 | 5.0 | T(N, I) = 80.7° C. |
| 2 | CC-3-V | 12.5 | $\Delta n$ (20° C., 589 nm) = 0.1190 |
| 3 | CC-3-V1 | 11.0 | $\varepsilon_{\|\|}$ (20° C., 1 kHz) = 7.8 |
| 4 | CCG-V-F | 3.0 | $\varepsilon_{\perp}$ (20° C., 1 kHz) = 2.9 |
| 5 | CCH-23 | 5.0 | $\Delta\varepsilon$ (20° C., 1 kHz) = 4.9 |
| 6 | CCH-301 | 5.0 | $k_{11}$ (20° C.) = 18.5 pN |
| 7 | CCP-3-3 | 3.0 | $k_{33}$ (20° C.) = 16.6 pN |
| 8 | CCP-30CF3 | 8.0 | $V_0$ (V, 20° C.) = 2.03 V |
| 9 | CDUQU-3-F | 6.0 | $\gamma_1$ (20° C.) = 74 mPa · s |
| 10 | CLP-3-T | 6.0 | LTS (−20° C.) > 1000 h |
| 11 | CPGP-4-3 | 1.5 | |
| 12 | DGUQU-4-F | 5.5 | |
| 13 | PCH-302 | 5.0 | |
| 14 | PP-1-2V1 | 12.0 | |
| 15 | PPGU-3-F | 1.0 | |
| 16 | PUS-3-2 | 10.5 | |

Mixture Example S25 (Stabilised with Compound of Formula ST-1-3)

A nematic LC mixture according to the invention is formulated as follows:

| | |
|---|---|
| Mixture M25 | 99.965 wt.-% |
| Compound of Formula ST-1-3 | 350 ppm |

Addition of 350 ppm of the compound of Formula ST-1-3 significantly improves the $VHR_{100}$ after UV exposure compared to the non-stabilized mixture M25, without affecting the remaining physical properties of the mixture.

Base Mixture M26

A nematic LC mixture is formulated as follows:

| Composition | | | |
|---|---|---|---|
| Nr. | Compound | Concentration, wt.-% | Properties |
| 1 | CC-3-V | 47.0 | T(N, I) = 75° C. |
| 2 | CC-3-V1 | 4.5 | $\Delta n$ (20° C., 589 nm) = 0.1343 |
| 3 | CLP-3-T | 7.0 | $\varepsilon_{\|\|}$ (20° C., 1 kHz) = 5.7 |
| 4 | PGP-1-2V | 5.5 | $\varepsilon_{\perp}$ (20° C., 1 kHz) = 2.7 |
| 5 | PGP-2-2V | 10.0 | $\Delta\varepsilon$ (20° C., 1 kHz) = 3.0 |
| 6 | PGU-2-F | 1.0 | $k_{11}$ (20° C.) = 15.8 pN |

-continued

| Composition | | | |
|---|---|---|---|
| Nr. | Compound | Concentration, wt.-% | Properties |
| 7 | PGUQU-3-F | 4.0 | $k_{33}$ (20° C.) = 13.5 pN |
| 8 | PGUQU-4-F | 2.5 | $V_0$ (V, 20° C.) = 2.43 V |
| 9 | PP-1-2V1 | 7.5 | $\gamma_1$ (20° C.) = 49 mPa · s |
| 10 | PPGU-3-F | 1.0 | LTS (−20° C.) > 1000 h |
| 11 | PUS-3-2 | 10.0 | |

Mixture Example S26 (Stabilised with Compounds of Formula ST-2-3 and of Formula H-3-1)

A nematic LC mixture according to the invention is formulated as follows:

| | |
|---|---|
| Mixture M26 | 99.85 wt . - % |
| Compound of Formula ST-1-3 | 500 ppm |
| Compound of Formula H-3-1 | 1000 ppm |

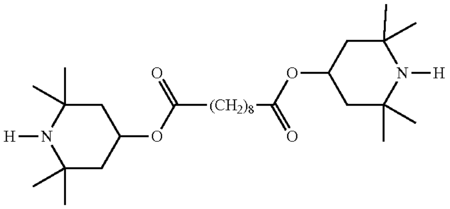

H-3-1

Addition of 500 ppm of the compound of Formula ST-2-3 in combination with 1000 ppm of the compound of Formula H-3-1 significantly improves the $VHR_{100}$ after UV exposure compared to the non-stabilized mixture M26, without affecting the remaining physical properties of the mixture.

Base Mixture M27

A nematic LC mixture is formulated as follows:

| Composition | | | |
|---|---|---|---|
| Nr. | Compound | Concentration, wt.-% | Properties |
| 1 | APUQU-2-F | 4.5 | T(N, I) = ° C. |
| 2 | CC-3-V | 45.5 | $\Delta n$ (20° C., 589 nm)= |
| 3 | CC-3-V1 | 5.0 | $\varepsilon_{\|\|}$ (20° C., 1 kHz)= |
| 4 | CLP-3-T | 5.0 | $\varepsilon_{\perp}$ (20° C., 1 kHz)= |
| 5 | PCH-302 | 2.0 | $\Delta\varepsilon$ (20° C., 1 kHz)= |
| 6 | PGP-1-2V | 3.5 | $k_{11}$ (20° C.) = pN |
| 7 | PGP-2-2V | 8.0 | $k_{33}$ (20° C.) = pN |
| 8 | PGU-2-F | 5.0 | $V_0$ (V, 20° C.) = V |
| 9 | PGUQU-3-F | 3.0 | $\gamma_1$ (20° C.) = mPa · s |
| 10 | PGUQU-4-F | 4.0 | LTS (−20° C.) > 1000 h |
| 11 | PP-1-2V1 | 3.5 | |
| 12 | PPGU-3-F | 1.0 | |
| 13 | PUS-3-2 | 10.0 | |

Mixture Example S27 (Stabilised with Compounds of Formula ST-1-3, ST-2-3 and of Formula H-3-1)

A nematic LC mixture according to the invention is formulated as follows:

| | |
|---|---|
| Mixture M27 | 99.825 wt. - % |
| Compound of Formula ST-1-3 | 350 ppm |
| Compound of Formula ST-2-3 | 400 ppm |
| Compound of Formula H-3-7 | 1000 ppm |

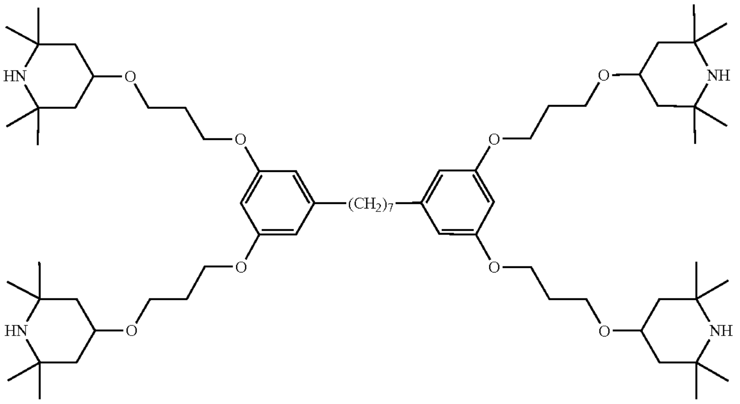

H-3-7

Addition of 350 ppm of the compound of Formula ST-1-3 in combination with 400 ppm of the compound of Formula ST-2-3 and 1000 ppm of the compound of Formula H-3-7 significantly improves the $VHR_{100}$ after UV exposure compared to the non-stabilized mixture M27, without affecting the remaining physical properties of the mixture.

Base Mixture M28

A nematic LC mixture is formulated as follows:

| Composition | | | |
|---|---|---|---|
| Nr. | Compound | Concentration, wt.-% | Properties |
| 1 | CC-3-V | 40.0 | T(N, I) = ° C. |
| 2 | CC-3-V1 | 0.5 | Δn (20° C., 589 nm)= |
| 3 | DGUQU-4-F | 1.5 | $\varepsilon_{\parallel}$ (20° C., 1 kHz)= |
| 4 | PCH-302 | 1.0 | $\varepsilon_{\perp}$ (20° C., 1 kHz)= |
| 5 | PGP-2-2V | 16.0 | Δε (20° C., 1 kHz)= |
| 6 | PGP-2-3 | 5.5 | $k_{11}$ (20° C.) = pN |
| 7 | PGU-2-F | 2.0 | $k_{33}$ (20° C.) = pN |
| 8 | PGUQU-3-F | 4.0 | $V_0$ (V, 20° C.) = V |
| 9 | PGUQU-4-F | 4.5 | $\gamma_1$ (20° C.) = mPa · s |
| 10 | PP-1-2V1 | 8.5 | LTS (−20° C.) > 1000 h |
| 11 | PPGU-3-F | 1.0 | |
| 12 | PUS-3-2 | 15.5 | |

Base Mixture M29

A nematic LC mixture is formulated as follows:

| Composition | | | |
|---|---|---|---|
| Nr. | Compound | Concentration, wt. - % | Properties |
| 1 | CC-3-V | 40.0 | T(N, I) = ° C. |
| 2 | CC-3-V1 | 0.5 | Δn (20° C., 589 nm) = |
| 3 | DGUQU-4-F | 1.5 | $\varepsilon_{\parallel}$ (20° C., 1 kHz) = |
| 4 | PCH-302 | 1.0 | $\varepsilon_{\perp}$ (20° C., 1 kHz) = |
| 5 | PGP-2-2V | 16.0 | $\Delta_{\varepsilon}$ (20° C., 1 kHz) = |
| 6 | PGP-2-3 | 5.5 | $k_{11}$ (20° C.) = pl |
| 7 | PGU-2-F | 2.0 | $k_{33}$ (20° C.) = pN |
| 8 | PGUQU-3-F | 4.0 | $V_0$ (V, 20° C.) = V |
| 9 | PGUQU-4-F | 4.5 | $\gamma_1$ (20° C.) = mPa·s |

-continued

| Composition | | | |
|---|---|---|---|
| Nr. | Compound | Concentration, wt. - % | Properties |
| 10 | PP-1-2V1 | 8.5 | LTS (−20° C.) >1000 h |
| 11 | PPGU-3-F | 1.0 | |
| 12 | i-3-22-4 | 15.5 | |

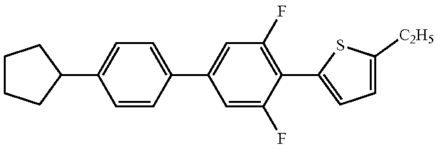

I-3-22-4

Base Mixture M30

A nematic LC mixture is formulated as follows:

| Composition | | | |
|---|---|---|---|
| Nr. | Compound | Concentration, wt .- % | Properties |
| 1 | CC-3-V | 40.0 | T(N, I) = ° C. |
| 2 | CC-3-V1 | 0.5 | Δn (20° C., 589 nm) = |
| 3 | DGUQU-4-F | 1.5 | $\varepsilon_{\parallel}$ (20° C., 1 kHz) = |
| 4 | PCH-302 | 1.0 | $\varepsilon_{\perp}$ (20° C., 1 kHz) = |
| 5 | PGP-2-2V | 16.0 | $\Delta_{\varepsilon}$ (20° C., 1 kHz) = |
| 6 | PGP-2-3 | 5.5 | $K_{11}$ (20° C.) = pN |
| 7 | PGU-2-F | 2.0 | $k_{33}$ (20° C.) = pN |
| 8 | PGUQU-3-F | 4.0 | $V_0$ (V, 20° C.) = V |
| 9 | PGUQU-4-F | 4.5 | $\gamma_1$ (20° C.) = mPa·s |
| 10 | PP-1-2V1 | 8.5 | LTS (−20° C.) >1000 h |
| 11 | PPGU-3-F | 1.0 | |
| 12 | I-3-22-5 | 15.5 | |

-continued

| Composition | | | |
|---|---|---|---|
| Nr. | Compound | Concentration, wt .- % | Properties |

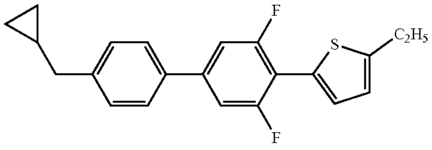

I-3-22-5

Base Mixture M31

A nematic LC mixture is formulated as follows:

| Composition | | | |
|---|---|---|---|
| Nr. | Compound | Concentration, wt. - % | Properties |
| 1 | CC-3-V | 40.0 | T(N, I) = ° C. |
| 2 | CC-3-V1 | 0.5 | Δn (20° C., 589 nm) = |
| 3 | DGUQU-4-F | 1.5 | $\varepsilon_{\|}$ (20°C, 1 kHz) = |
| 4 | PCH-302 | 1.0 | $\varepsilon_{\perp}$ (20°° C., 1 kHz) = |
| 5 | PGP-2-2V | 16.0 | $\Delta_{\varepsilon}$ (20° C., 1 kHz) = |
| 6 | PGP-2-3 | 5.5 | $K_{11}$ (20° C.) = pN |
| 7 | PGU-2-F | 2.0 | $K_{33}$ (20° C.) = pN |
| 8 | PGUQU-3-F | 4.0 | $V_0$ (V, 20° C.) = V |
| 9 | PGUQU-4-F | 4.5 | $\gamma_1$ (20° C.) = mPa·s |
| 10 | PP-1-2V1 | 8.5 | LTS (−20° C.) > 1000 h |
| 11 | PPGU-3-F | 1.0 | |
| 12 | I-3-22-2 | 15.5 | |

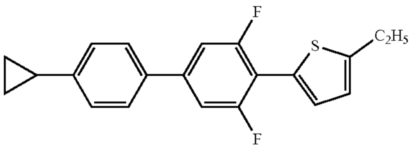

I-3-22-2

Base Mixture M32

A nematic LC mixture is formulated as follows:

| Composition | | | |
|---|---|---|---|
| Nr. | Compound | Concentration, wt. - % | Properties |
| 1 | CC-3-V | 40.0 | T(N, I) = ° C. |
| 2 | CC-3-V1 | 0.5 | Δn (20° C., 589 nm) = |
| 3 | DGUQU-4-F | 1.5 | $\varepsilon_{\|}$ (20°C, 1 kHz) = |
| 4 | PCH-302 | 1.0 | $\varepsilon_{\perp}$ (20°° C., 1 kHz) = |
| 5 | PGP-2-2V | 16.0 | $\Delta_{\varepsilon}$ (20° C., 1 kHz) = |
| 6 | PGP-2-3 | 5.5 | $K_{11}$ (20° C.) = pN |
| 7 | PGU-2-F | 2.0 | $K_{33}$ (20° C.) = pN |

-continued

| Composition | | | |
|---|---|---|---|
| Nr. | Compound | Concentration, wt. - % | Properties |
| 8 | PGUQU-3-F | 4.0 | $V_0$ (V, 20° C.) = V |
| 9 | PGUQU-4-F | 4.5 | $\gamma_1$ (20° C.) = mPa·s |
| 10 | PP-1-2V1 | 8.5 | LTS (−20° C.) > 1000 h |
| 11 | PPGU-3-F | 1.0 | |
| 12 | 1-3-22-3 | 15.5 | |

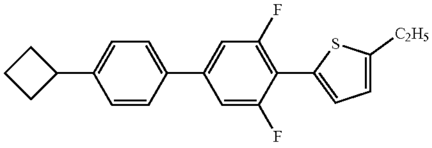

I-3-22-2

Base Mixture M33

A nematic LC mixture is formulated as follows:

| Composition | | | |
|---|---|---|---|
| Nr. | Compound | Concentration, wt. - % | Properties |
| 1 | CC-3-V | 40.0 | T(N, I) = ° C. |
| 2 | CC-3-V1 | 0.5 | Δn (20° C., 589 nm) = |
| 3 | DGUQU-4-F | 1.5 | $\varepsilon_{\|}$ (20°C, 1 kHz) = |
| 4 | PCH-302 | 1.0 | $\varepsilon_{\perp}$ (20°° C., 1 kHz) = |
| 5 | PGP-2-2V | 16.0 | $\Delta_{\varepsilon}$ (20° C., 1 kHz) = |
| 6 | PGP-2-3 | 5.5 | $K_{11}$ (20° C.) = pN |
| 7 | PGU-2-F | 2.0 | $K_{33}$ (20° C.) = pN |
| 8 | PGUQU-3-F | 4.0 | $V_0$ (V, 20° C.) = V |
| 9 | PGUQU-4-F | 4.5 | $\gamma_1$ (20° C.) = mPa·s |
| 10 | PP-1-2V1 | 8.5 | LTS (−20° C.) > 1000 h |
| 11 | PPGU-3-F | 1.0 | |
| 12 | 1-3-22-1 | 15.5 | |

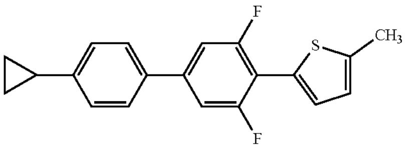

I-3-22-1

Base Mixture M34

A nematic LC mixture is formulated as follows:

| Composition | | | |
|---|---|---|---|
| Nr. | Compound | Concentration, wt.-% | Properties |
| 1 | CC-3-V | 32.0 | T(N, I) = 100° C. |
| 2 | CC-3-V1 | 5.5 | Δn (20° C., 589 nm) = 0.1492 |
| 3 | CC-3-2V1 | 4.0 | $n_{\|}$ (20° C., 1 kHz) = 1.6457 |
| 4 | PCH-302 | 3.5 | $n_{\perp}$ (20° C., 1 kHz) = 1.4965 |
| 5 | PGP-1-2V | 5.0 | $\varepsilon_{\|}$ (20° C., 1 kHz) = 6.7 |
| 6 | PGP-2-2V | 8.0 | $\varepsilon_{\perp}$ (20° C., 1 kHz) = 2.8 |
| 7 | CCVC-3-V | 3.5 | Δε (20° C., 1 kHz) = 3.9 |
| 8 | PGUQU-3-F | 4.0 | $k_{11}$ (20° C.) = 18.2 pN |
| 9 | PGUQU-4-F | 2.0 | $k_{33}$ (20° C.) = 16.8 pN |

-continued

| Composition | | | |
|---|---|---|---|
| Nr. | Compound | Concentration, wt.-% | Properties |
| 10 | PP-1-2V1 | 1.0 | $V_0$ (V, 20° C.) = 2.29 V |
| 11 | CDUQU-3-F | 2.8 | $\gamma_1$ (20° C.) = 82 mPa · s |
| 12 | CLP-V-1 | 5.0 | LTS (−20° C.) h |
| 13 | CPGP-4-3 | 3.2 | |
| 14 | CPGU-3-OT | 3.0 | |
| 15 | DLGU-3-F | 2.0 | |
| 16 | PUS-3-2 | 15.5 | |

Mixture Example S34 (Stabilised with Compound of Formula ST-1-3)

A nematic LC mixture according to the invention is formulated as follows:

| | |
|---|---|
| Mixture M34 | 99.97 wt.-% |
| Compound of Formula ST-1-3 | 300 ppm |

Addition of 300 ppm of the compound of Formula ST-1-3 significantly improves the $VHR_{100}$ after UV exposure compared to the non-stabilized mixture M34, without affecting the remaining physical properties of the mixture.

Base Mixture M35

A nematic LC mixture is formulated as follows:

| Composition | | | |
|---|---|---|---|
| Nr. | Compound | Concentration, wt.-% | Properties |
| 1 | CC-3-V | 30.8 | T(N, I) = 104.9° C. |
| 2 | CC-3-V1 | 6.0 | Δn (20° C., 589 nm) = 0.1491 |
| 3 | CCP-V-1 | 10.2 | $n_{\parallel}$ (20° C., 1 kHz) = 1.6469 |
| 4 | CCVC-3-V | 3.5 | $n_{\perp}$ (20° C., 1 kHz) = 1.4978 |
| 5 | CDUQU-3-F | 1.5 | $\varepsilon_{\parallel}$ (20° C., 1 kHz) = 6.6 |
| 6 | CPGP-4-3 | 3.0 | $\varepsilon_{\perp}$ (20° C., 1 kHz) = 2.8 |
| 7 | CPGP-5-3 | 1.0 | Δε (20° C., 1 kHz) = 3.7 |
| 8 | CPGU-3-OT | 3.0 | $k_{11}$ (20° C.) = 17.3 pN |
| 9 | DLGU-3-F | 3.0 | $k_{33}$ (20° C.) = 17.2 pN |
| 10 | PCH-302 | 4.0 | $V_0$ (V, 20° C.) = 2.27 V |
| 11 | PGP-1-2V | 5.0 | $\gamma_1$ (20° C.) = 91 mPa · s |
| 12 | PGP-2-2V | 8.0 | LTS (−20° C.) h |
| 13 | PGUQU-3-F | 4.0 | |
| 14 | PGUQU-4-F | 2.0 | |
| 15 | PP-1-2V1 | 0.5 | |
| 16 | PUS-3-2 | 14.5 | |

Mixture Example S35 (Stabilised with Compound of Formula ST-1-3)

A nematic LC mixture according to the invention is formulated as follows:

| | |
|---|---|
| Mixture M35 | 99.97 wt.-% |
| Compound of Formula ST-1-3 | 300 ppm |

Addition of 300 ppm of the compound of Formula ST-1-3 significantly improves the $VHR_{100}$ after UV exposure compared to the non-stabilized mixture M35, without affecting the remaining physical properties of the mixture.

Base Mixture M36

A nematic LC mixture is formulated as follows:

| Composition | | | |
|---|---|---|---|
| Nr. | Compound | Concentration, wt.-% | Properties |
| 1 | CC-3-V | 46.5 | T(N, I) = 74.5° C. |
| 2 | CC-3-V1 | 9.5 | Δn (20° C., 589 nm) = 0.1325 |
| 3 | CCP-30CF3 | 0.5 | $n_{\parallel}$ (20° C., 1 kHz) = 1.6246 |
| 4 | CLP-3-T | 2.5 | $n_{\perp}$ (20° C., 1 kHz) = 1.4921 |
| 5 | PGP-1-2V | 1.5 | $\varepsilon_{\parallel}$ (20° C., 1 kHz) = 7.1 |
| 6 | PGP-2-2V | 3.5 | $\varepsilon_{\perp}$ (20° C., 1 kHz) = 2.8 |
| 7 | PGU-2-F | 3.5 | Δε (20° C., 1 kHz) = 4.3 |
| 8 | PGUQU-3-F | 5.0 | $k_{11}$ (20° C.) = 14.7 pN |
| 9 | PGUQU-4-F | 6.5 | $k_{33}$ (20° C.) = 12.6 pN |
| 10 | PPGU-3-F | 1.0 | $V_0$ (V, 20° C.) = 1.92 V |
| 11 | PUS-3-2 | 20.0 | $\gamma_1$ (20° C.) = 47 mPa · s |
| | | | LTS (−20° C.) 480 h |

Mixture Example S36 (Stabilised with Compound of Formula ST-2-3)

A nematic LC mixture according to the invention is formulated as follows:

| | |
|---|---|
| Mixture M35 | 99.95 wt.-% |
| Compound of Formula ST-2-3 | 500 ppm |

Addition of 500 ppm of the compound of Formula ST-2-3 significantly improves the $VHR_{100}$ after UV exposure compared to the non-stabilized mixture M36, without affecting the remaining physical properties of the mixture.

Base Mixture M37

A nematic LC mixture is formulated as follows:

| Composition | | | |
|---|---|---|---|
| Nr. | Compound | Concentration, wt.-% | Properties |
| 1 | CC-3-V | 27.5 | T(N, I) = 85.4° C. |
| 2 | CC-3-V1 | 10.0 | Δn (20° C., 589 nm) = 0.1250 |
| 3 | CCP-30CF3 | 8.0 | $n_{\parallel}$ (20° C., 1 kHz) = 1.6160 |
| 4 | CCP-V2-1 | 10.5 | $n_{\perp}$ (20° C., 1 kHz) = 1.4910 |
| 5 | CDUQU-3-F | 1.0 | $\varepsilon_{\parallel}$ (20° C., 1 kHz) = 5.8 |
| 6 | CLP-3-T | 7.0 | $\varepsilon_{\perp}$ (20° C., 1 kHz) = 2.7 |
| 7 | DGUQU-4-F | 4.0 | Δε (20° C., 1 kHz) = 3.1 |
| 8 | PCH-302 | 5.0 | $k_{11}$ (20° C.) = 19.4 pN |
| 9 | PGP-2-2V | 4.0 | $k_{33}$ (20° C.) = 16.1 pN |
| 10 | PP-1-2V1 | 10.0 | $V_0$ (V, 20° C.) = 2.62 V |
| 11 | PPGU-3-F | 1.0 | $\gamma_1$ (20° C.) = 65 mPa · s |
| 12 | PUS-3-2 | 12.0 | LTS (−20° C.) h |

Mixture Example S37 (Stabilised with Compound of Formula ST-1-3)

A nematic LC mixture according to the invention is formulated as follows:

| | |
|---|---|
| Mixture M37 | 99.965 wt.-% |
| Compound of Formula ST-1-3 | 350 ppm |

Addition of 350 ppm of the compound of Formula ST-1-3 significantly improves the $VHR_{100}$ after UV exposure compared to the non-stabilized mixture M37, without affecting the remaining physical properties of the mixture.

The invention claimed is:

1. A liquid-crystalline medium, comprising one or more compounds of Formula I

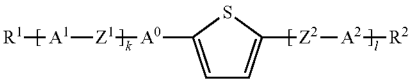

I in which the individual substituents have the following meanings:

$R^1$ and $R^2$ each, independently of one another, a H atom, an alkyl or an alkoxy group having 1 to 12 C atoms or an alkenyl or an alkenyloxy group having 2 or 12 C atoms in which one or more non-adjacent $CH_2$ groups are optionally substituted by —C≡C—, —$CF_2O$—, —$OCF_2$—, —CH═CH—,

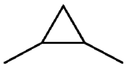, 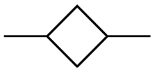, 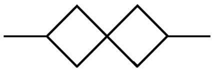, 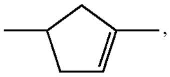, 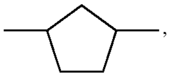,

—O—, —CO—O— or —O—CO— in such a way that O atoms are not linked directly to one another, and in which one or more H atoms may be replaced by a halogen atom or a cycloalkyl or a cycloalkoxy group having 3 to 12 C atoms, and $A^2$ each, independently of one another, denote phenylene-1,4-diyl, in which, in addition, one or two CH groups may be replaced by N and one or more H atoms may be replaced by halogen, CN, $CH_3$, $CHF_2$, $CH_2F$, $CF_3$, $OCH_3$, $OCHF_2$ or $OCF_3$, cyclohexane-1,4-diyl, in which, in addition, one or two non-adjacent $CH_2$ groups may be replaced, independently of one another, by O and/or S and one or more H atoms may be replaced by F, cyclohexene-1,4-diyl, bicyclo[1.1.1]pentane-1,3-diyl, bicyclo-[2.2.2]octane-1,4-diyl, spiro[3.3]heptane-2,6-diyl, tetrahydropyran-2,5-diyl or 1,3-dioxane-2,5-diyl, $A^0$ denotes

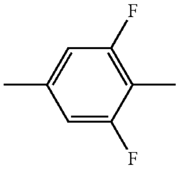, $Z^1$ and $Z^2$ each, independently of one another, denote —$CF_2O$—, —$OCF_2$—, —$CH_2O$—, —$OCH_2$—, —CO—O—, —O—CO—, —$C_2H_4$—, —$C_2F_4$—, —$CF_2CH_2$—, —$CH_2CF_2$—, —CFHCFH—, —$CFHCH_2$—, —$CH_2CFH$—, —$CF_2CFH$—, —$CFHCF_2$—, —CH═CH—, —CF═CH—, —CH═CF—, —CF═CF—, —C≡C— or a single bond, k and l respectively denotes 1 and 0;

one or more compounds selected from the group consisting of the following formulae:

XVIIa

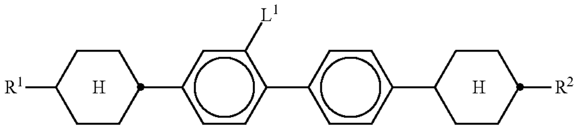

XVIIb

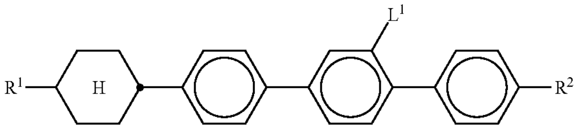

XVIIc

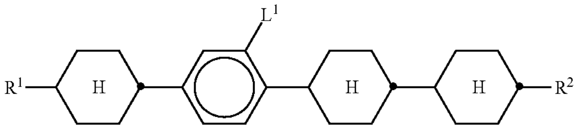

CCPC

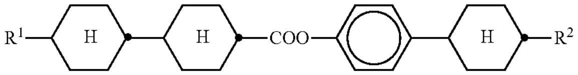

CBC-nmF

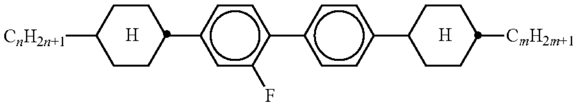

CBC

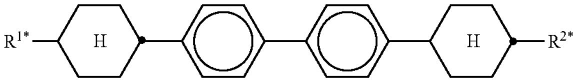

in which $L^1$ is H, F or Cl, and $R^1$ and $R^2$ each, independently of one another, is a H atom, an alkyl or an alkoxy group having 1 to 12 C atoms or an alkenyl or alkenyloxy group having 2 or 12 C atoms in which one or more non-adjacent $CH_2$ groups are optionally substituted by —C≡C—, —$CF_2O$—, —$OCF_2$—, —CH═CH—

, 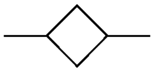, 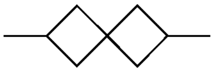, 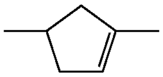, 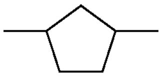,

—O—, —CO—O— or —O—CO— in such a way that O atoms are not linked directly to one another, and in which one or more H atoms may be replaced by a halogen atom or a cycloalkyl or a cycloalkoxy group having 3 to 12 C atoms in which one or more H atoms may be replaced by a halogen atom;

and one or more compounds of the Formula ST

ST

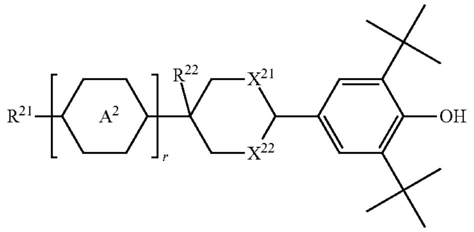

in which the individual substituents have the following meanings:

 denotes 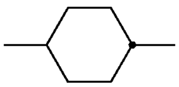,

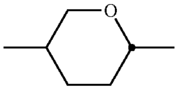 or 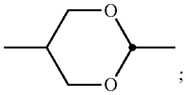;

$X^{21}$, $X^{22}$ each, independently of one another, —O—, —$CH_2$—, —$CHR^{23}$— or —N—$R^{23}$—, $R^{21}$ and $R^{22}$ each, independently of one another, a H atom or an alkyl- or alkoxy group having 1 to 12 C atoms, an alkenyl, alkynyl, alkenyloxy or alkoxyalkyl group having 2 to 12 C atoms or a cycloalkyl group having 3 to 12 C atoms, in which one or more non-adjacent $CH_2$ groups are optionally substituted by —C≡C—, —$CF_2O$—, —$OCF_2$—, —CH═CH—,

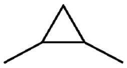, 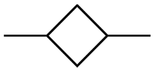, 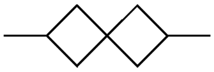, 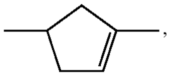, 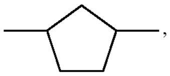,

—O—, —CO—O— or —O—CO— in such a way that O atoms are not linked directly to one another, and in which one or more H atoms may be replaced by a halogen atom or a cycloalkyl or a cycloalkoxy group having 3 to 12 C atoms, in which one or more H atoms may be replaced by a halogen atom, $R^{23}$ denotes a H atom, an alkyl or alkoxy group having 1 to 10 C atoms, r denotes 0 or 1.

2. The medium according to claim 1, wherein the compounds of Formula I are selected from the group consisting of the following compounds:

I-1-1

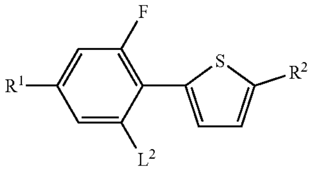

-continued

I-1-2

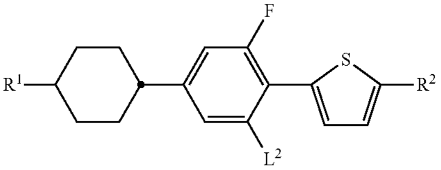

I-1-3

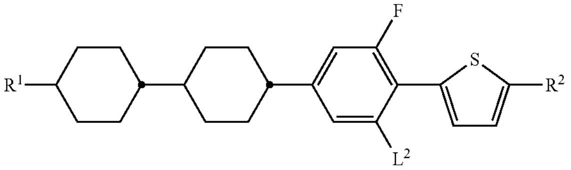

I-1-4

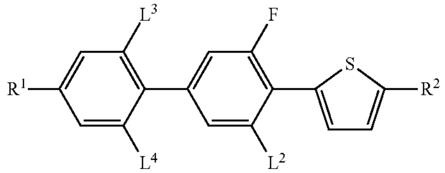

I-1-4-1

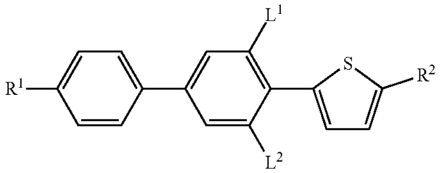

I-1-5

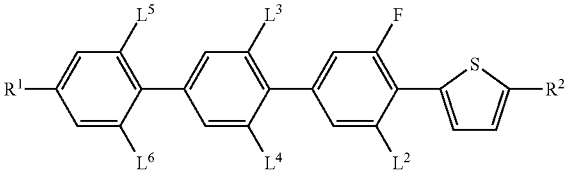

I-1-6

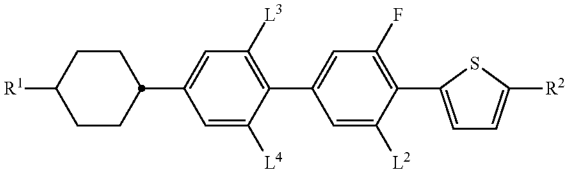

in which $L^2$ denotes F, $L^1$ and $L^3$ to $L^6$ each, independently from one another, denote a H atom, F, Cl, or an alkyl group having 1 to 4 C atoms.

3. The medium according to claim 1, wherein the one or more compounds of the Formula ST are selected from the following Formulae: ST-1 to ST-3:

ST-1

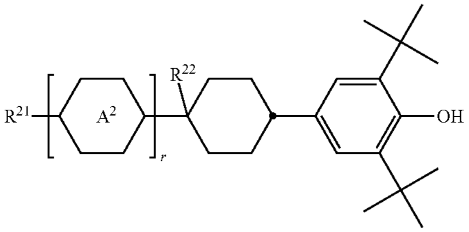

ST-2

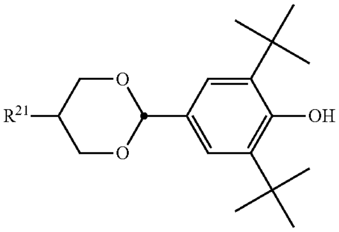

ST-3

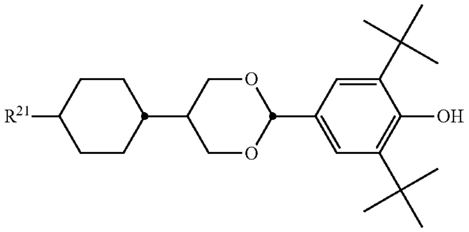

in which the individual substituents have the following meanings:

 denotes 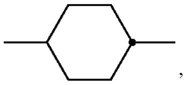, 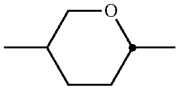 or 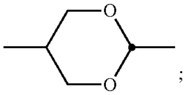;

$R^{21}$ and $R^{22}$ each, independently of one another, denote a H atom or an alkyl or alkoxy group having 1 to 7 C atoms, and r denotes 0 or 1.

4. The liquid-crystalline medium according to claim 1, further comprising one or more compounds selected from the group consisting of the following formulae

Y

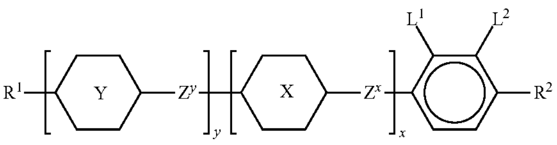

B

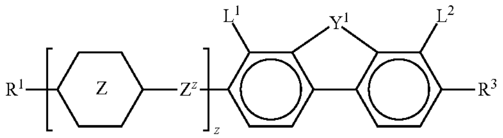

in which the individual radicals, on each occurrence identically or differently, and each, independently of one another, have the following meaning:

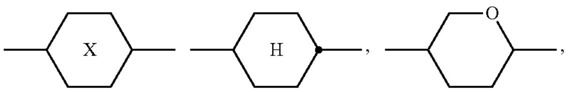,

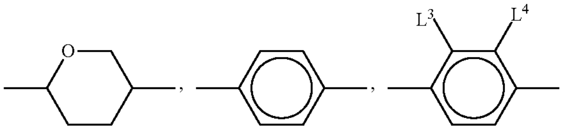

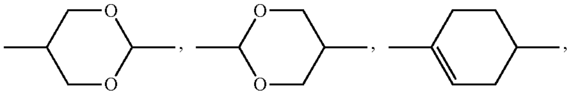,

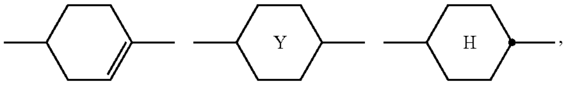,

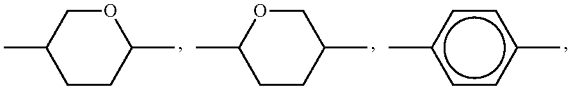,

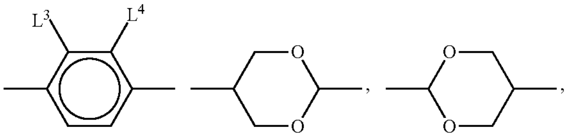,

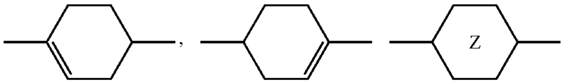

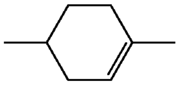 or 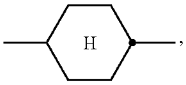, $R^1$, $R^2$ each, independently of one another, is a H atom, an alkyl or an alkoxy group having 1 to 12 C atoms or an alkenyl or an alkenyloxy group having 2 or 12 C atoms in which one or more non-adjacent $CH_2$ groups are optionally substituted by —C≡C—, $CF_2O$—, —$OCF_2$—, —CH═CH—,

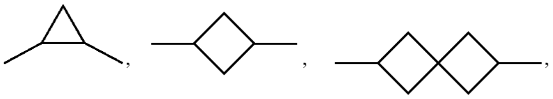,

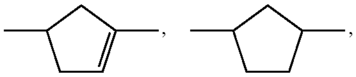,

—O—, —CO—O— or —O—CO— in such a way that O atoms are not linked directly to one another, and in which one or more H atoms may be replaced by a halogen atom or a cycloalkyl or a cycloalkoxy group having 3 to 12 C atoms, in which one or more H atoms may be replaced by a halogen atom, $R^3$ one of the meanings given for $R^1$, or $X^1$, $X^1$ fluorinated alkyl or alkoxy with 1, 2 or 3 C atoms, $Z^x$, $Z^y$ —$CH_2CH_2$—, —CH═CH—, —$CF_2O$—, —$OCF_2$—, —$CH_2O$—, —$OCH_2$—, —CO—O—, —O—CO—, —$C_2F_4$—, —CF═CF—, —CH═CH—$CH_2O$—, or a single bond, $Z^z$ $CH_2O$ or a single bond, $Y^1$ O or S, $L^{1-4}$ H, F or Cl, x, y 0, 1 or 2, with x+y≤3, z 0 or 1, wherein in Formula B the dibenzofuran or dibenzothiophene group may also be further substituted by a methyl or methoxy group, and wherein the compounds of Formula Y contain at least one substituent $L^{1-4}$ that is F or Cl.

5. The liquid-crystalline medium according to claim 1, further comprising one or more compounds selected from the group consisting of the following formulae:

II

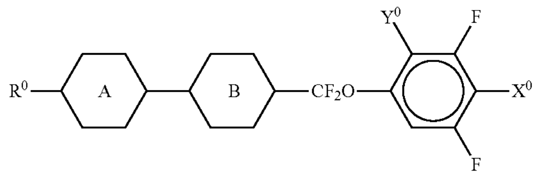

III

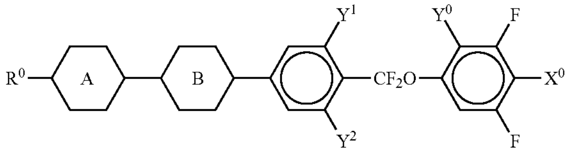

wherein the individual radicals, independently of each other and on each occurrence identically or differently, have the following meanings:

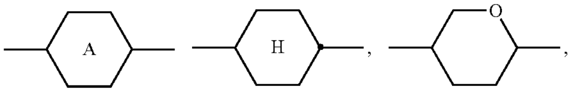

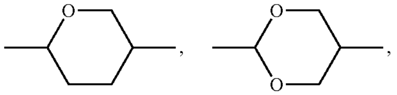

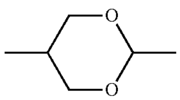

or

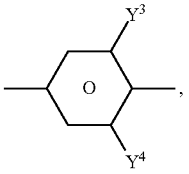

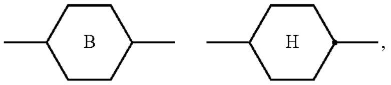

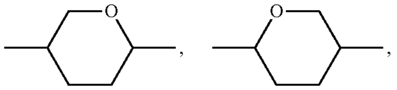

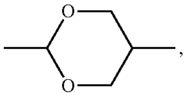

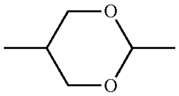

or

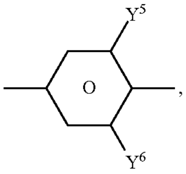

$R^0$ a H atom, an alkyl or an alkoxy group having 1 to 12 C atoms or an alkenyl or an alkenyloxy group having 2 or 12 C atoms in which one or more non-adjacent $CH_2$ groups are optionally substituted by —C≡C—, —$CF_2O$—, —$OCF_2$—, —CH═CH—,

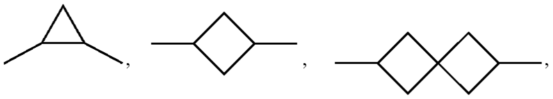

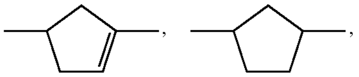

—O—, —CO—O— or —O—CO— in such a way that O® atoms are not linked directly to one another, and in which one or more H atoms may be replaced by a halogen atom or a cycloalkyl or a cycloalkoxy group having 3 to 12 C atoms, in which one or more H atoms may be replaced by a halogen atom, $X^0$ F, Cl, CN, $SF_5$, SCN, NCS, a halogenated alkyl radical, a halogenated alkenyl radical, a halogenated alkoxy radical or a halogenated alkenyloxy radical having up to 6 C atoms, and $Y^{1-6}$ H or F, $Y^0$ H or $CH_3$.

6. The liquid-crystalline medium according to claim 2, wherein the one or more compounds of Formula II are selected from the following sub-formulae:

II1

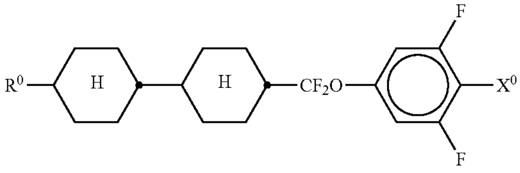

II2

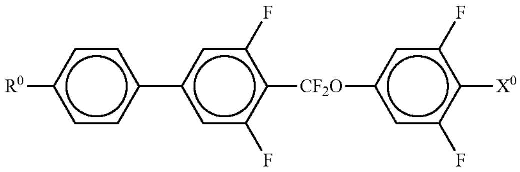

II3

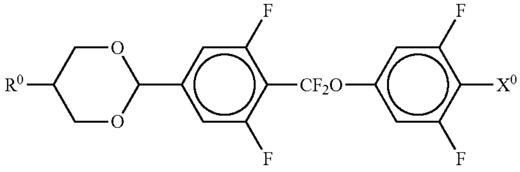

II4

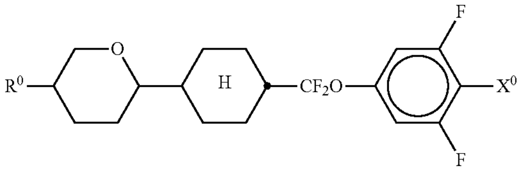

II5

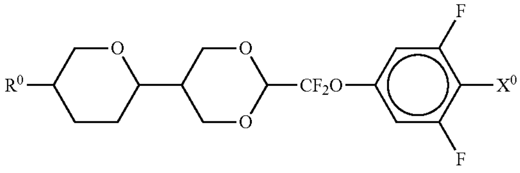

-continued
II6
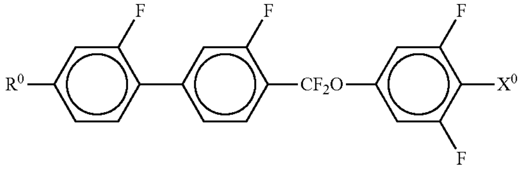
II7
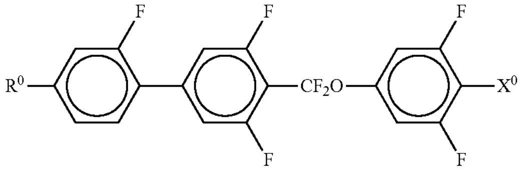
in which $R^0$ and $X^0$ have the meanings given in Formula II.
7. The liquid-crystalline medium according to claim/ wherein the one or more compounds of Formula III are selected from the following sub-formulae:
III1
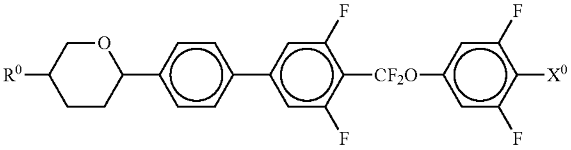
III2
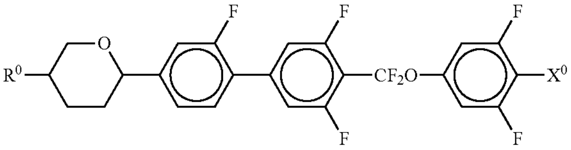
III3
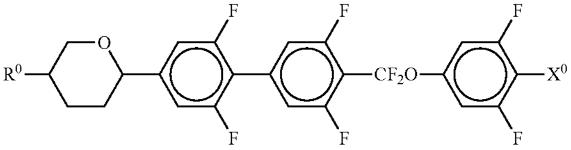
III4
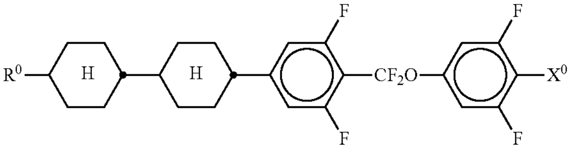
III5
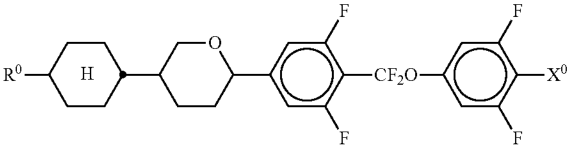
-continued
III6
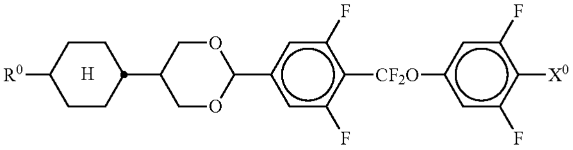
III7
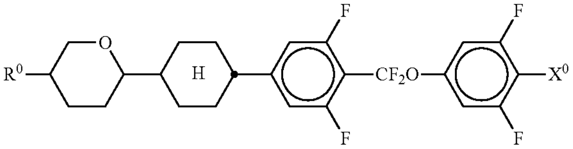
III8
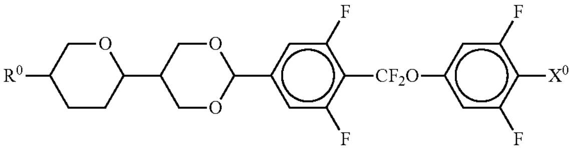
III9
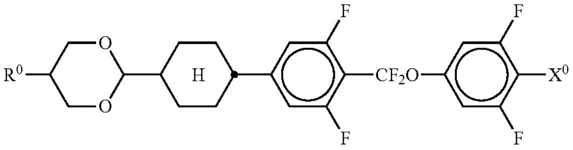
III10
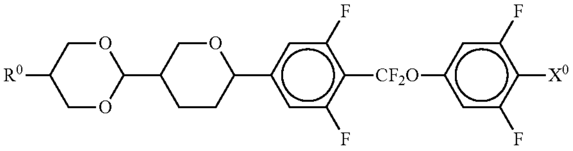
III11
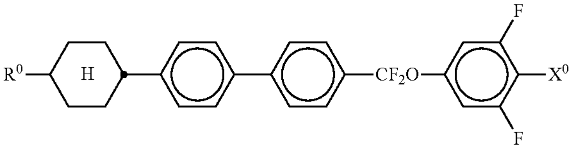
III12
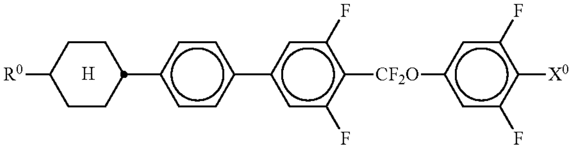
III13
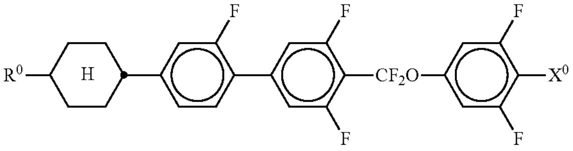
III14
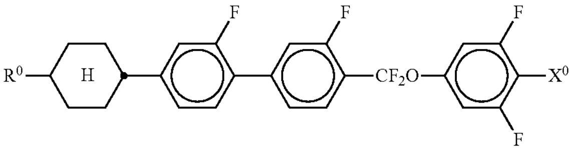

-continued

III15

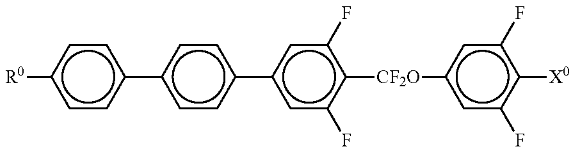

III16

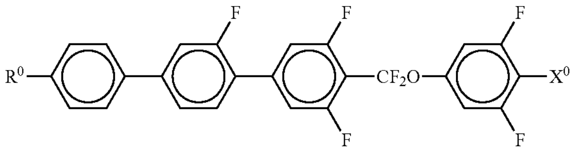

III17

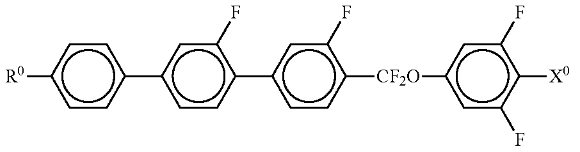

III18

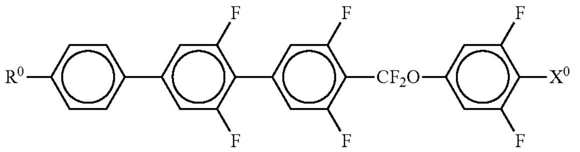

III19

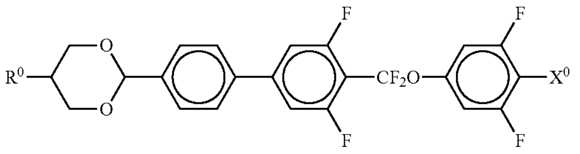

III20

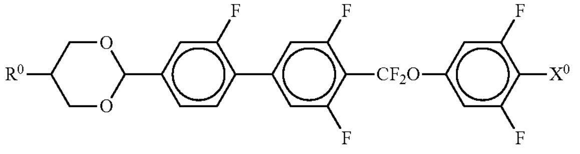

III21

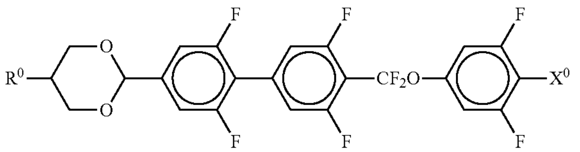

in which $R^0$ and $X^0$ have the meanings given in Formula II.

8. The liquid-crystalline medium according to claim 1, further comprising one or more compounds selected from the group consisting of the following formulae:

IV

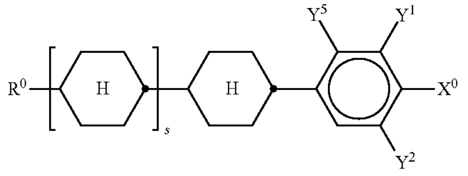

V

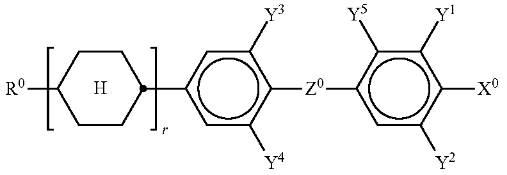

VI

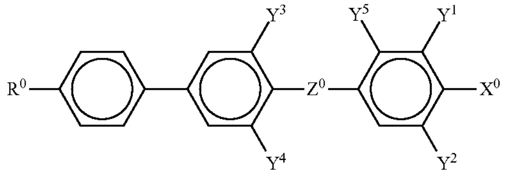

VII

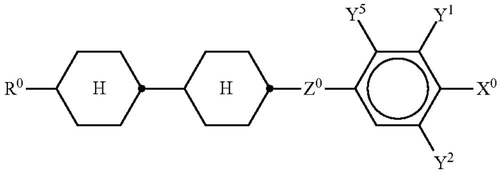

VIII

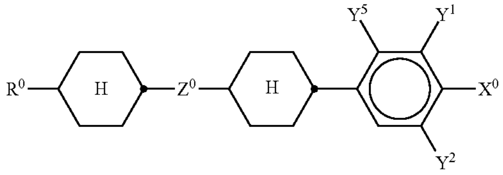

in which $R^0$ is a H atom, an alkyl or an alkoxy group having 1 to 12 C atoms or an alkenyl or an alkenyloxy group having 2 or 12 C atoms in which one or more non-adjacent CH2 groups are optionally substituted by —C≡C—, —$CF_2O$—, —$OCF_2$—, —CH═CH—,

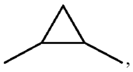, 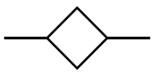, 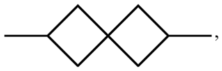, 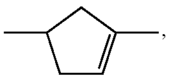, 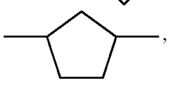,

—O—, —CO—O— or —O—CO— in such a way that 0 atoms are not linked directly to one another, and in which one or more H atoms may be replaced by a halogen atom or a cycloalkyl or a cycloalkoxy group having 3 to 12 C atoms, in which one or more H atoms may be replaced by a halogen atom, $X^0$ is F, Cl, CN, $SF_5$, SCN, NCS, a halogenated alkyl radical, a halogenated alkenyl radical, a halogenated alkoxy radical or a halogenated alkenyloxy radical having up to 6 C atoms, $Y^{1-5}$ are independently H or F, $Z^0$ denotes —$C_2H_4$—, —$(CH_2)_4$—, —CH═CH—, —CF═CF—, —$C_2F_4$—, —$CH_2CF_2$—, —$CF_2CH_2$—, —$CH_2O$—, —$OCH_2$—, —COO— or —$OCF_2$—, in formulae V and VI also a single bond, in formulae V and VIII also —$CF_2O$—, r denotes 0 or 1, and s denotes 0 or 1.

9. The liquid-crystalline medium according to claim 1, wherein it further comprises one or more compounds selected from group consisting of the following formulae:

Z1

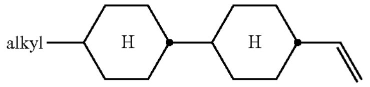

Z2

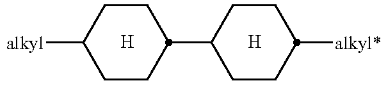

Z3

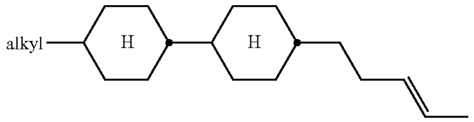

Z4

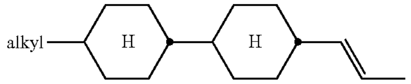

Z5

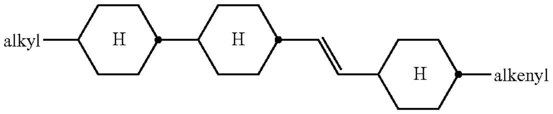

Z6

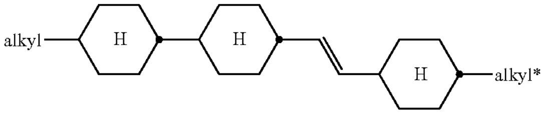

Z7

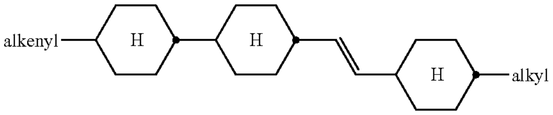

Z8

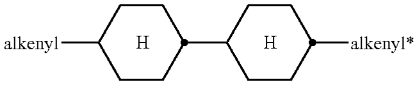

XII

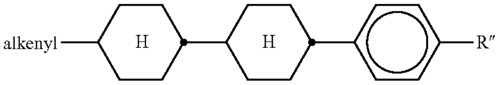

XIII

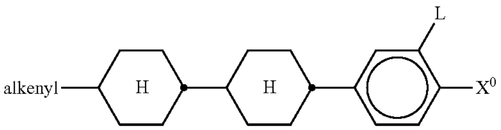

wherein

"alkyl" and "alkyl*" are each, independently from one another, $C_{1-6}$-alkyl,

"alkenyl" and "alkenyl*" are each, independently of one another, denote $C_{2-6}$-alkenyl, $X^0$ is F, Cl, CN, SF5, SCN, NCS, a halogenated alkyl radical, a halogenated alkenyl radical, a halogenated alkoxy radical or a halogenated alkenyloxy radical having up to 6 C atoms, L denotes H or F, and R" denotes $C_{1-6}$-alkyl, $C_{1-6}$-alkoxy or $C_{2-6}$-alkenyl.

10. The liquid-crystalline medium according to claim 1, comprising one or more compounds of the Formula XIV

XIV

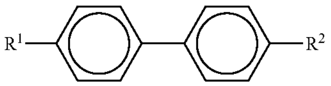

in which $R^1$ and $R^2$ each, independently of one another, denote n-alkyl, alkoxy, oxaalkyl, fluoroalkyl or alkenyl, each having up to 6 C atoms.

11. The liquid-crystalline medium according to claim 1, comprising one or more compounds of the Formula XVI

XVI

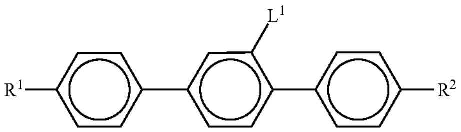

in which $L^1$ is H, F or Cl, and $R^1$ and $R^2$ each, independently of one another, is a H atom, an alkyl or an alkoxy group having 1 to 12 C atoms or an alkenyl or an alkenyloxy group having 2 or 12 C atoms in which one or more non-adjacent $CH_2$ groups are optionally substituted by —C≡C—, —$CF_2O$—, —$OCF_2$—, —CH═CH—,

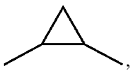, 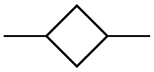, 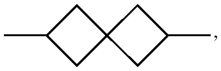, 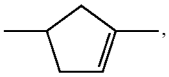, 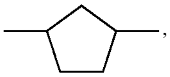,

—O—, —CO—O— or —O—CO— in such a way that 0 atoms are not linked directly to one another, and in which one or more H atoms may be replaced by a halogen atom or a cycloalkyl or a cycloalkoxy group having 3 to 12 C atoms, in which one or more H atoms may be replaced by a halogen atom.

12. The liquid-crystalline medium according to claim 1, comprising one or more compounds selected from the group consisting of the following formulae

XVIII

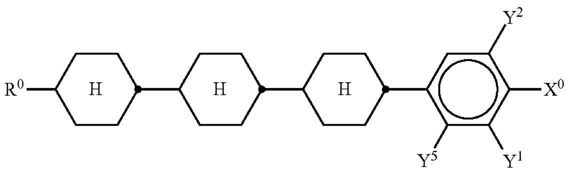

-continued

XIX

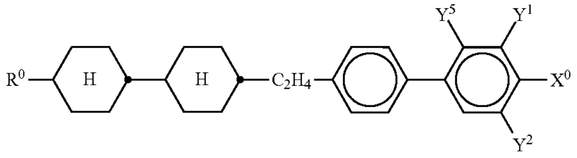

XX

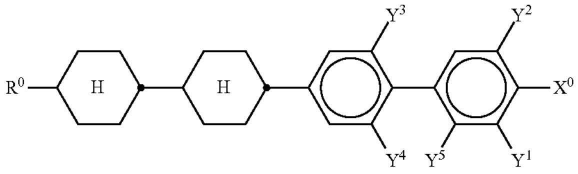

XXI

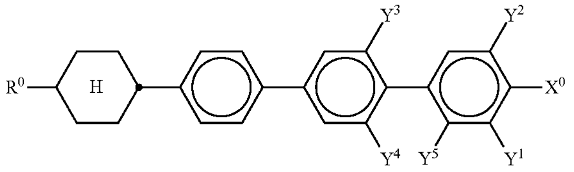

XXII

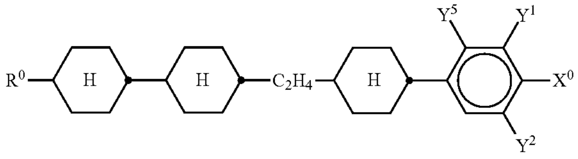

XXIII

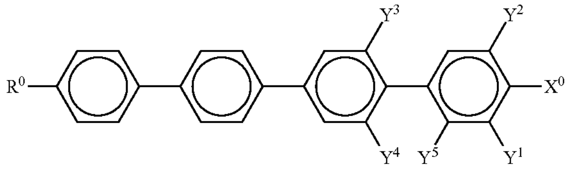

in which $R^0$ is a H atom, an alkyl or an alkoxy group having 1 to 12 C atoms or an alkenyl or an alkenyloxy group having 2 or 12 C atoms in which one or more non-adjacent $CH_2$ groups are optionally substituted by —C≡C—, —$CF_2O$—, —$OCF_2$—, —CH═CH—,

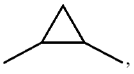, 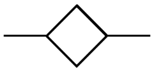, 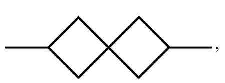,

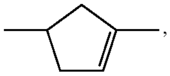, 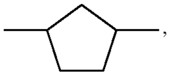,

—O—, —CO—O— or —O—CO— in such a way that 0 atoms are not linked directly to one another, and in which one or more H atoms may be replaced by a halogen atom or a cycloalkyl or a cycloalkoxy group having 3 to 12 C atoms, in which one or more H atoms may be replaced by a halogen atom, $Y^{1-5}$ are independently H or F, and $X^0$ is F, Cl, CN, $SF_5$, SCN, NCS, a halogenated alkyl radical, a halogenated alkenyl radical, a halogenated alkoxy radical or a halogenated alkenyloxy radical having up to 6 C atoms.

13. The liquid-crystalline medium according to claim 1, comprising one or more compounds selected from the group consisting of the following formulae:

XXVII

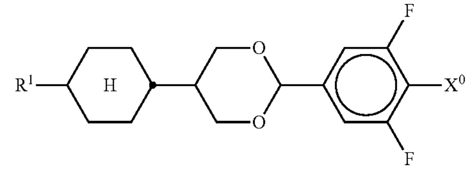

XXVIII

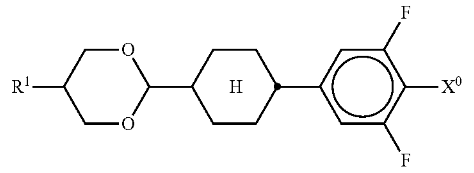

XXIX

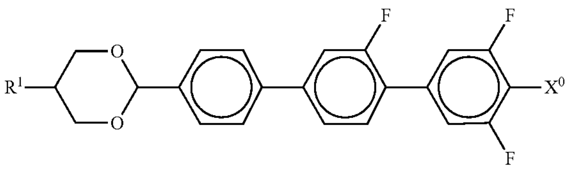

XXX

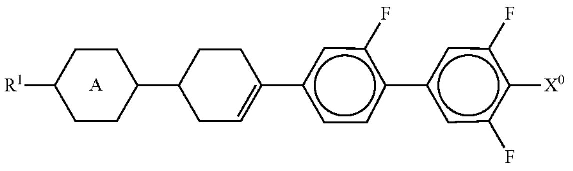

in which

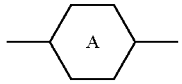 is 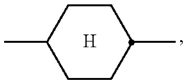,

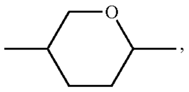, 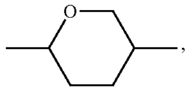,

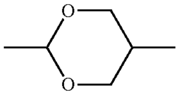 or 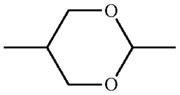

and $R^1$ is a H atom, an alkyl or an alkoxy group having 1 to 12 C atoms or an alkenyl or an alkenyloxy group having 2 or 12 C atoms in which one or more non-adjacent $CH_2$ groups are optionally substituted by —C≡C—,

—$CF_2O$—, —$OCF_2$—, —CH═CH—,

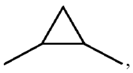, 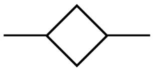, 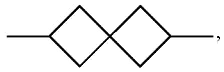,

-continued

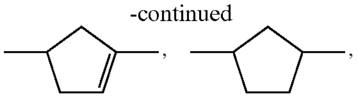

—O—, —CO—O— or —O—CO— in such a way that 0 atoms are not linked directly to one another, and in which one or more H atoms may be replaced by a halogen atom or a cycloalkyl or a cycloalkoxy group having 3 to 12 C atoms, in which one or more H atoms may be replaced by a halogen atom, and $X^0$ is F, Cl, CN, $SF_5$, SCN, NCS, a halogenated alkyl radical, a halogenated alkenyl radical, a halogenated alkoxy radical or a halogenated alkenyloxy radical having up to 6 C atoms.

14. The liquid-crystalline medium according to claim 1, comprising one or more compounds selected from the group consisting of the following formulae:

XXXII

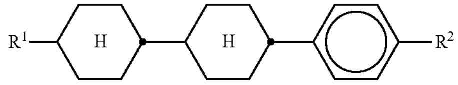

XXXIII

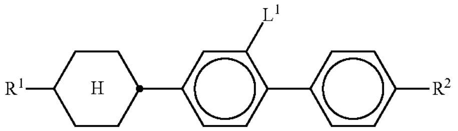

XXXIV

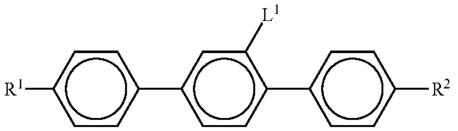

in which $L^1$ is H, F, or Cl, and $R^1$ and $R^2$ each, independently of one another, is a H atom, an alkyl or an alkoxy group having 1 to 12 C atoms or an alkenyl or an alkenyloxy group having 2 or 12 C atoms in which one or more non-adjacent $CH_2$ groups are optionally substituted by —C≡C—, —$CF_2$O—, —O$CF_2$—, —CH=CH—,

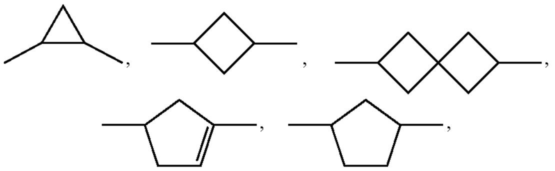

—O—, —CO—O— or —O—CO— in such a way that 0 atoms are not linked directly to one another, and in which one or more H atoms may be replaced by a halogen atom or a cycloalkyl or a cycloalkoxy group having 3 to 12 C atoms, in which one or more H atoms may be replaced by a halogen atom.

15. The liquid-crystalline medium according to claim 1, further comprising one or more polymerizable compounds.

16. A process for the preparation of a liquid-crystalline medium according to claim 1, comprising mixing the one or more compounds of the Formula I and the one or more compounds of the Formula ST with one or more mesogenic compounds and optionally one or more polymerizable compounds and/or one or more additives.

17. An electro-optical liquid-crystal display containing a liquid-crystalline medium according to claim 1.

18. The electro-optical liquid-crystal display according to claim 17, comprising a TN, PS-TN, STN, TN-TFT, OCB, IPS, PS-IPS, FFS, HB-FFS, XB-FFS, PS-HB-FFS, PS-XB-FFS, SA-HB-FFS, SA-XB-FS, polymer stabilised SA-HB-FFS, polymer stabilised SA-XB-FFS, positive VA or positive PS-VA display.

19. The electro-optical liquid-crystal display according to claim 17, comprising an FFS, HB-FFS, XB-FFS, PS-HB-FFS, PS-XB-FFS, IPS or PS-IPS display.

* * * * *